(12) United States Patent
Matsui et al.

(10) Patent No.: US 8,463,995 B2
(45) Date of Patent: Jun. 11, 2013

(54) STORAGE CONTROL APPARATUS AND STORAGE SYSTEM COMPRISING MULTIPLE STORAGE CONTROL APPARATUSES

(75) Inventors: Yuko Matsui, Odawara (JP); Hiroshi Kawano, Tokyo (JP); Shigeo Homma, Odawara (JP); Masayuki Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 12/918,608

(22) PCT Filed: Jul. 16, 2010

(86) PCT No.: PCT/JP2010/004621
§ 371 (c)(1),
(2), (4) Date: Aug. 20, 2010

(87) PCT Pub. No.: WO2012/007999
PCT Pub. Date: Jan. 19, 2012

(65) Prior Publication Data
US 2012/0017042 A1    Jan. 19, 2012

(51) Int. Cl.
*G06F 12/00* (2006.01)
(52) U.S. Cl.
USPC ........... 711/117; 711/111; 711/113; 711/170; 711/203
(58) Field of Classification Search
USPC .................. 711/113, 117, 111, 170, 203
See application file for complete search history.

(56) References Cited

U.S. PATENT DOCUMENTS

| | | | |
|---|---|---|---|
| 6,073,209 A * | 6/2000 | Bergsten | 711/114 |
| 6,658,478 B1 | 12/2003 | Singhal et al. | |
| 6,684,209 B1 | 1/2004 | Ito et al. | |
| 7,337,350 B2 | 2/2008 | Mimatsu et al. | |
| 7,441,095 B2 | 10/2008 | Tamura et al. | |
| 7,555,601 B2 | 6/2009 | Yamagami | |
| 7,587,551 B2 | 9/2009 | Fujibayashi et al. | |
| 2006/0236060 A1 | 10/2006 | Shitomi et al. | |
| 2006/0271758 A1 | 11/2006 | Innan et al. | |
| 2008/0184000 A1 | 7/2008 | Kawaguchi | |
| 2008/0263190 A1 | 10/2008 | Serizawa et al. | |
| 2009/0025007 A1 * | 1/2009 | Hara et al. | 718/105 |
| 2009/0037656 A1 * | 2/2009 | Suetsugu et al. | 711/114 |
| 2010/0082765 A1 | 4/2010 | Murase | |

FOREIGN PATENT DOCUMENTS

| | | |
|---|---|---|
| EP | 1 596 303 A2 | 11/2005 |
| EP | 1 643 353 A2 | 4/2006 |
| EP | 2 104 028 A2 | 9/2009 |
| EP | 2 163 978 A2 | 3/2010 |

* cited by examiner

*Primary Examiner* — Reginald Bragdon
*Assistant Examiner* — Gurtej Bansal
(74) *Attorney, Agent, or Firm* — Mattingly & Malur, PC

(57) ABSTRACT

A storage system has multiple disk controller (DKC) units that are coupled to one another in accordance with a coupling mode that satisfies the following (a1) through (a3):
 (a1) One DKC inside one DKC unit and one DKC inside another DKC unit are coupled via a second type of coupling medium that differs from the internal bus of the DKC and has a longer maximum communication distance than a first type of coupling medium, which is the same type of coupling medium as the internal bus of the DKC;
 (a2) the one DKC unit virtualizes a logical volume of the other DKC unit and provides this virtualized logical volume to host(s) coupled to the one DKC unit; and
 (a3) the other DKC unit virtualizes a logical volume of the DKC unit and provides this virtualized logical volume to host(s) coupled to the other DKC unit.

13 Claims, 69 Drawing Sheets

FIG. 2
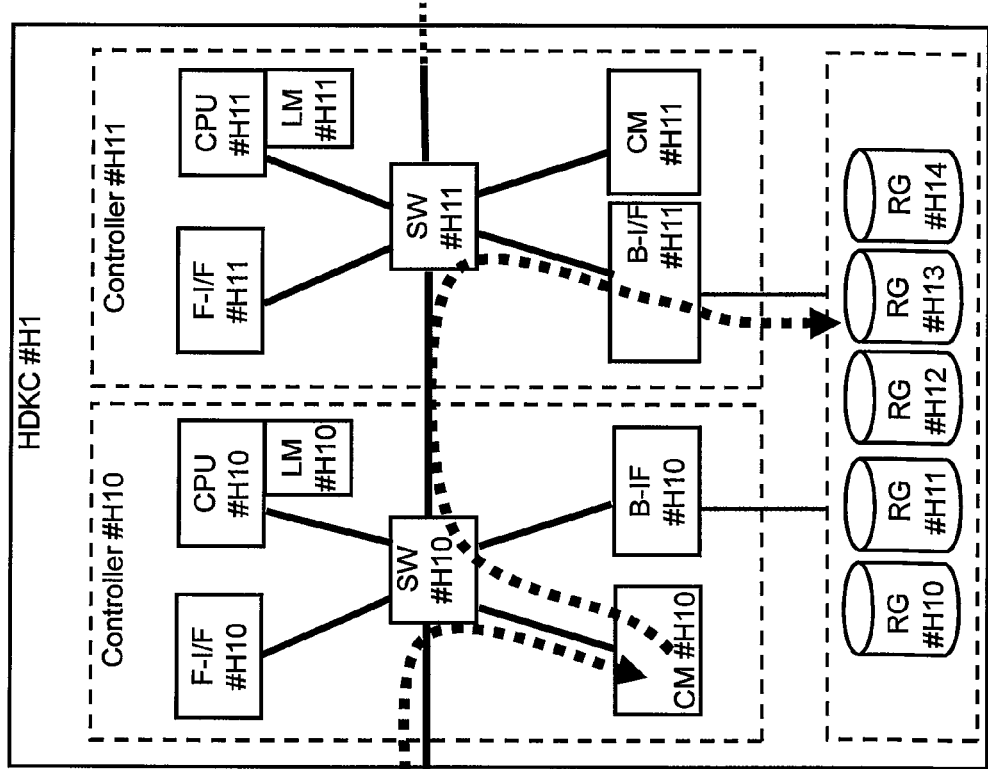
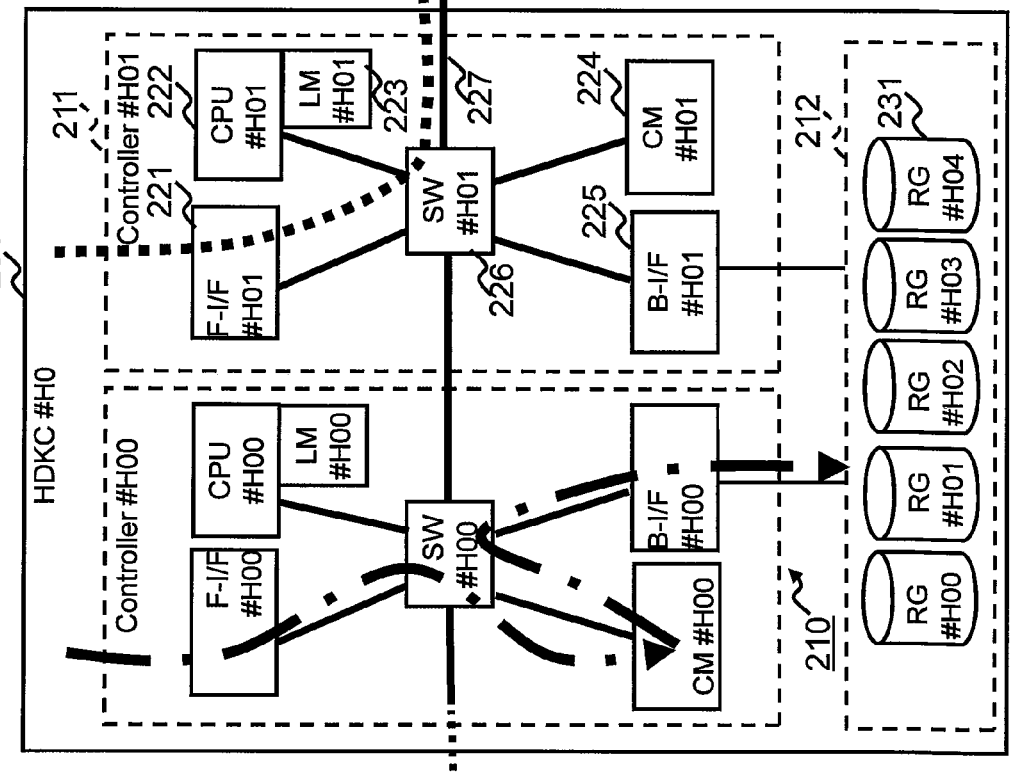

FIG. 8

Coupling management table (#H0) 328

| DKC ID 801 | Coupling medium 802 | DKC 803 | Coupling mode 804 |
|---|---|---|---|
| H0 | Own-device | HDKC | Own-device |
| H1 | Internal bus | HDKC | First coupling |
| H3 | External bus | HDKC | Third coupling |
| L0 | External bus | LDKC | Second coupling |

FIG. 9A

Tier management table (#H0) 321

| RG ID 901 | LU ID 902 | Coupling mode 903 | PDEV type 904 | Total (Tier level) 905 |
|---|---|---|---|---|
| H00 | 0 | 0 | 1 | 1 |
| H00 | 1 | 0 | 1 | 1 |
| H01 | 2 | 1 | 1 | 2 |
| H02 | 3 | 5 | 1 | 6 |
| H04 | 4 | 0 | 3 | 3 |
| ... | ... | ... | ... | ... |

FIG. 9B

| Coupling mode | | PDEV type | |
|---|---|---|---|
| Own-DKC or first coupling | 0 | SSD | 1 |
| Third coupling 1 | | SAS | 3 |
| Second coupling | 5 | SATA | 10 |

FIG. 10

Tier management table (# H0) _321_

| RG ID 1001 | LU ID 1002 | Third coupling mode 1003 | Second coupling mode 1004 | Pre-cache 1005 | PDEV type 1006 |
|---|---|---|---|---|---|
| H00 | 0 | 0 | 0 | 0 | 1 |
| H00 | 1 | 1 | 0 | 0 | 3 |
| H01 | 2 | 1 | 5 | 2 | 10 |
| ... | ... | ... | ... | ... | ... |

| Cascade difference 1007 | Distance (Command response time) 1008 | Controller performance 1009 | Total (Tier level) 1010 |
|---|---|---|---|
| 0 | 0 | 0 | 1 |
| 1 | 1 | 0 | 6 |
| 2 | 5 | 4 | 29 |
| ... | ... | ... | ... |

FIG. 11

| Element | By-item points | | |
|---|---|---|---|
| Third coupling mode | Own-DKC or first coupling<br>0 | Third coupling<br>1 | - |
| Second coupling mode | Non-second coupling<br>0 | Second coupling<br>5 | - |
| Pre-cache | Yes<br>0 | No<br>2 | - |
| PDEV type | SSD<br>1 | SAS<br>3 | SATA<br>10 |
| Cascade difference | 0 stages<br>0 | 1 stage<br>1 | 2 stages<br>2 |
| Distance<br>(Command response time) | up to 1 km<br>0 | 1~100Km<br>1 | 100Km~200km<br>2 |
| controller performance differences | High speed<br>0 | Medium speed<br>2 | Low speed<br>4 |

FIG. 12

LU/PDEV conversion table (#H0)    323

| LU ID | RG ID | RAID level (combination) | Capacity | Start address | PDEV type | PDEV ID |
|---|---|---|---|---|---|---|
| 0 | 0 | RAID5 (4D+1P) | 1024GB | 0x000000000 | SAS | 0,1,2,3,4 |
| 1 | 0 | RAID5 (4D+1P) | 512GB | 0x080000000 | SAS | 0,1,2,3,4 |
| 2 | 1 | RAID5 (4D+4D) | 2048GB | 0x000000000 | SSD | 5,6,7,8,9,10,11,12 |
| 3 | 2 | RAID5 (8D+2P) | 256GB | 0x000000000 | SATA | 20,21,22,23,24,25,26,27,28,29 |
| ... | ... | ... | ... | ... | ... | ... |

Virtual page management table (#H0) 325

| DP-LU ID 1301 | Virtual page address 1302 | Allocation status 1303 | Pool-RG ID 1304 | Actual page address 1305 |
|---|---|---|---|---|
| 60 | 0x00 | Unallocated | — | — |
| | 0x01 | Allocated | H05 | 0x00 |
| | 0x02 | Unallocated | — | — |
| | 0x03 | Allocated | H06 | 0x01 |
| | 0x04 | Unallocated | — | — |
| | 0x05 | Allocated | H07 | 0x02 |
| | 0x06 | Unallocated | — | — |
| ... | ... | ... | ... | ... |

FIG. 14A

Actual page management table (#H0) 326

| Table pointer | Pool-RG ID | Actual page address | Allocation status | DP-LU ID | Unallocated queue pointer |
|---|---|---|---|---|---|
| 0x0000 | H050 | 0x00 | Allocated | 60 | — |
| 0x0001 | H050 | 0x01 | Unallocated | — | 0x1000 |
| 0x0002 | H050 | 0x02 | Allocated | 61 | — |
| ... | | | | | |
| 0x1000 | H051 | 0x00 | Unallocated | — | 0x2000 |
| 0x1001 | H051 | 0x01 | Allocated | 60 | — |
| 0x1002 | H051 | 0x02 | Unallocated | — | 0x2001 |
| ... | | | | | |
| 0x2000 | H052 | 0x00 | Unallocated | — | 0x1002 |
| 0x2001 | H052 | 0x01 | Unallocated | — | 0x3000 |
| 0x2002 | H052 | 0x02 | Allocated | 60 | — |
| ... | | | | | |

Top-of-queue management table (#H0) 327

| Unallocated top-of-queue pointer |
|---|
| 0x0001 |

FIG. 31

CPU-in-charge table (#H0) 324

| CPU-in-charge ID 3101 | CPU utilization rate 3102 | LU ID 3103 | | | | |
|---|---|---|---|---|---|---|
| H00 | 60% | 0 | 4 | 8 | ... | |
| H01 | 40% | 1 | 5 | ... | | |
| ... | ... | ... | | | | |

FIG. 34A

CPU-in-charge table (#H0) 3211

| CPU-in-charge ID 3101 | CPU utilization rate 3102 | LU ID 3103 | CPU utilization rate by LU 3404 |
|---|---|---|---|
| H00 | 60% | 0 | 40% |
|  |  | 4 | 20% |
|  |  | 8 | 0% |
| H01 | 40% | 1 | 10% |
|  |  | 5 | 30% |
| H02 | 85% | 2 | 30% |
|  |  | 3 | 30% |
|  |  | 6 | 5% |
|  |  | 7 | 20% |

|  | High load threshold | Low load threshold |
|---|---|---|
| CPU | 70% | 50% |
| DKC | — | 40% |

FIG. 35

Port load management table (#H0)   3212

| Port ID 3501 | CPU utilization rate by port 3502 | LU ID belonging to port 3503 | CPU utilization rate by LU 3504 | CPU-in-charge ID 3505 |
|---|---|---|---|---|
| H0A | 70% | 0 | 40% | H00 |
|  |  | 1 | 30% | H01 |
|  |  | 2 | 15% | H02 |
| H0B | 85% | 3 | 45% | H02 |
|  |  | 4 | 25% | H00 |
| H0C | 60% | 5 | 35% | H01 |
|  |  | 6 | 5% | H02 |
|  |  | 7 | 20% | H02 |

FIG. 36

Temporary LU management table (#H0)

| 3601 | 3602 | 3603 | 3604 3213 |
|---|---|---|---|
| PDEV type | Total capacity | Temporary LU ID | Temporary LU capacity |
| SSD | 3584GB | 1000 | 1024GB |
| SSD | 3584GB | 1001 | 2048GB |
| SSD | 3584GB | 1002 | 512GB |
| SAS | 5120GB | 1003 | 4096GB |
| SAS | 5120GB | 1004 | 1024GB |
| SATA | 16384GB | 1005 | 16384GB |

| Port ID | CPU utilization rate by port | LU ID belonging to port | CPU utilization rate by LU | CPU-in-charge ID |
|---|---|---|---|---|
| H0A | 70% | 0 | 40% | H00 |
|  |  | 1 | 30% | H01 |
| H0B | 85% | 2 | 15% | H02 |
|  |  | 3 | 45% | H02 |
|  |  | 4 | 25% | H00 |
| H0C | 60% | 5 | 35% | H01 |
|  |  | 6 | 5% | H02 |
|  |  | 7 | 20% | H02 |

| Port ID | CPU utilization rate by port | LU ID belonging to port | CPU utilization rate by LU | CPU-in-charge ID |
|---|---|---|---|---|
| H1A | 0% | — | — | — |
| H1B | 40% | 8 | 10% | H10 |
|  |  | 9 | 30% | H11 |

| CPU-in-charge ID | CPU utilization rate | LU ID | CPU utilization rate by LU |
|---|---|---|---|
| H00 | 65% | 0 | 40% |
|  |  | 4 | 25% |
| H01 | 65% | 1 | 30% |
|  |  | 5 | 35% |
| H02 | 85% | 2 | 15% |
|  |  | 3 | 45% |
|  |  | 6 | 5% |
|  |  | 7 | 20% |
| Average | 71% | | |

| CPU-in-charge ID | CPU utilization rate | LU ID | CPU utilization rate by LU |
|---|---|---|---|
| H10 | 10% | 8 | 10% |
| H11 | 30% | 9 | 30% |
| H12 | 0% | — | — |
| Average | 13% | | |

| Port ID | CPU utilization rate by port | LU ID belonging to port | CPU utilization rate by LU | CPU-in-charge ID |
|---|---|---|---|---|
| H0A | 70% | 0 | 40% | H00 |
|  |  | 1 | 30% | H01 |
| H0B | 0% | – | – | – |
| H0C | 60% | 5 | 35% | H01 |
|  |  | 6 | 5% | H02 |
|  |  | 7 | 20% | H02 |

| Port ID | CPU utilization rate by port | LU ID belonging to port | CPU utilization rate by LU | CPU-in-charge ID |
|---|---|---|---|---|
| H1A | 85% | 2 | 15% | H12 |
|  |  | 3 | 45% | H12 |
|  |  | 4 | 25% | H10 |
| H1B | 40% | 8 | 10% | H10 |
|  |  | 9 | 30% | H11 |

| CPU-in-charge ID | CPU utilization rate | LU ID | CPU utilization rate by LU |
|---|---|---|---|
| H00 | 40% | 0 | 40% |
| H01 | 65% | 1 | 30% |
|  |  | 5 | 35% |
| H02 | 25% | 6 | 5% |
|  |  | 7 | 20% |
| Average | 43% |  |  |

| CPU-in-charge ID | CPU utilization rate | LU ID | CPU utilization rate by LU |
|---|---|---|---|
| H10 | 35% | 8 | 10% |
|  |  | 4 | 25% |
| H11 | 45% | 9 | 30% |
|  |  | 2 | 15% |
| H12 | 45% | 3 | 45% |
| Average | 41% |  |  |

| PDEV type | Total capacity | Temporary LU ID | Temporary LU capacity |
|---|---|---|---|
| SSD | 3584GB | 1000 | 1024GB |
| | | 1001 | 2048GB |
| | | 1002 | 512GB |
| SAS | 5120GB | 1003 | 4096GB |
| | | 1004 | 1024GB |
| SATA | 16384GB | 1005 | 16384GB |

| PDEV type | Total capacity | Temporary LU ID | Temporary LU capacity |
|---|---|---|---|
| SSD | 3584GB | 1000 | 3072GB |
| | | 1002 | 512GB |
| SAS | 5120GB | 1003 | 2048GB |
| | | 1100 | 2048GB |
| | | 1004 | 1024GB |
| SATA | 16384GB | 1005 | 16384GB |

Unallocated page usage management table (#H0) 5001

| Number of unallocated pages 5101 | Previous number of unallocated pages 5102 | Unallocated page usage 5103 |
|---|---|---|
| 8500 | 9500 | 1000 |

| Pool-RG ID (901) | Coupling mode (903) | PDEV type (904) | Distance (command response time) (1008) | Total (tier level) (5210) |
|---|---|---|---|---|
| H00 | 0 | 3 | 0 | 3 |
| H01 | 0 | 3 | 0 | 3 |
| H02 | 0 | 3 | 0 | 3 |
| H13 | 1 | 3 | 0 | 4 |
| H14 | 1 | 3 | 0 | 4 |
| H15 | 1 | 3 | 0 | 4 |

| Pool-RG ID (901) | Coupling mode (903) | PDEV type (904) | Distance (command response time) (1008) | Total (tier level) (5210) |
|---|---|---|---|---|
| H00 | 0 | 3 | 0 | 3 |
| H01 | 0 | 3 | 0 | 3 |
| H02 | 0 | 3 | 0 | 3 |
| H13 | 1 | 3 | 5 | 9 |
| H14 | 1 | 3 | 5 | 9 |
| H15 | 1 | 3 | 5 | 9 |

| Table pointer | Pool-RG ID | Actual page address | Allocation status | DP-LU ID | Unallocated queue pointer |
|---|---|---|---|---|---|
| 0x0000 | H00 | 0x00 | Unallocated | — | — |
| 0x0001 | | 0x01 | Unallocated | — | — |
| 0x0002 | | 0x02 | Unallocated | — | — |
| ... | | ... | ... | ... | ... |
| 0x1000 | H01 | 0x00 | Unallocated | — | — |
| 0x1001 | | 0x01 | Unallocated | — | — |
| 0x1002 | | 0x02 | Unallocated | — | — |
| ... | | ... | ... | ... | ... |
| 0x2000 | H02 | 0x00 | Unallocated | — | — |
| 0x2001 | | 0x01 | Unallocated | — | — |
| 0x2002 | | 0x02 | Unallocated | — | — |
| ... | | ... | ... | ... | ... |
| 0x3000 | H13 | 0x00 | Unallocated | — | — |
| 0x3001 | | 0x01 | Unallocated | — | — |
| 0x3002 | | 0x02 | Unallocated | — | — |
| ... | | ... | ... | ... | ... |
| 0x4000 | H14 | 0x00 | Unallocated | — | — |
| 0x4001 | | 0x01 | Unallocated | — | — |
| 0x4002 | | 0x02 | Unallocated | — | — |
| ... | | ... | ... | ... | ... |
| 0x5000 | H15 | 0x00 | Unallocated | — | — |
| 0x5001 | | 0x01 | Unallocated | — | — |
| 0x5002 | | 0x02 | Unallocated | — | — |
| ... | | ... | ... | ... | ... |

| Table pointer | Pool-RG ID | Actual page address | Allocation status | DP-LU ID | Unallocated queue pointer |
|---|---|---|---|---|---|
| 0x0000 | H00 | 0x00 | Unallocated | — | — |
| 0x0001 |  | 0x01 | Unallocated | — | — |
| 0x0002 |  | 0x02 | Unallocated | — | — |
| ... |  | ... | ... | ... | ... |
| 0x1000 | H01 | 0x00 | Unallocated | — | — |
| 0x1001 |  | 0x01 | Unallocated | — | — |
| 0x1002 |  | 0x02 | Unallocated | — | — |
| ... |  | ... | ... | ... | ... |
| 0x2000 | H02 | 0x00 | Unallocated | — | — |
| 0x2001 |  | 0x01 | Unallocated | — | — |
| 0x2002 |  | 0x02 | Unallocated | — | — |
| ... |  | ... | ... | ... | ... |
| 0x3000 | H13 | 0x00 | Unallocated | — | — |
| 0x3001 |  | 0x01 | Unallocated | — | — |
| 0x3002 |  | 0x02 | Unallocated | — | — |
| ... |  | ... | ... | ... | ... |
| 0x4000 | H14 | 0x00 | Unallocated | — | — |
| 0x4001 |  | 0x01 | Unallocated | — | — |
| 0x4002 |  | 0x02 | Unallocated | — | — |
| ... |  | ... | ... | ... | ... |
| 0x5000 | H15 | 0x00 | Unallocated | — | — |
| 0x5001 |  | 0x01 | Unallocated | — | — |
| 0x5002 |  | 0x02 | Unallocated | — | — |
| ... |  | ... | ... | ... | ... |

| Table pointer | Pool-RG ID | Actual page address | Allocation status | DP-LU ID | Unallocated queue pointer |
|---|---|---|---|---|---|
| 0x0000 | H00 | 0x00 | Unallocated | — | 0x1001 |
| 0x0001 | | 0x01 | Unusable | — | — |
| 0x0002 | | 0x02 | Unallocated | — | 0x1003 |
| ... | | ... | ... | ... | ... |
| 0x1000 | H01 | 0x00 | Unusable | — | — |
| 0x1001 | | 0x01 | Unallocated | — | 0x2000 |
| 0x1002 | | 0x02 | Unusable | — | — |
| ... | | ... | ... | ... | ... |
| 0x2000 | H02 | 0x00 | Unallocated | — | 0x3001 |
| 0x2001 | | 0x01 | Unusable | — | — |
| 0x2002 | | 0x02 | Unallocated | — | 0x3003 |
| ... | | ... | ... | ... | ... |
| 0x3000 | H13 | 0x00 | Unusable | — | — |
| 0x3001 | | 0x01 | Unallocated | — | 0x4000 |
| 0x3002 | | 0x02 | Unallocated | — | — |
| ... | | ... | ... | ... | ... |
| 0x4000 | H14 | 0x00 | Unallocated | — | 0x5001 |
| 0x4001 | | 0x01 | Unusable | — | — |
| 0x4002 | | 0x02 | Unallocated | — | 0x5003 |
| ... | | ... | ... | ... | ... |
| 0x5000 | H15 | 0x00 | Unusable | — | — |
| 0x5001 | | 0x01 | Unallocated | — | 0x0002 |
| 0x5002 | | 0x02 | Unusable | — | — |
| ... | | ... | ... | ... | ... |

| 1401 | 1402 | 1403 | 1404 #H1 | 1405 | 1406 |
|---|---|---|---|---|---|
| Table pointer | Pool-RG ID | Actual page address | Allocation status | DP-LU ID | Unallocated queue pointer |
| 0x0000 | H00 | 0x00 | Unusable | — | — |
| 0x0001 |  | 0x01 | Unallocated | — | 0x1000 |
| 0x0002 |  | 0x02 | Unusable | — | — |
| ... |  | ... | ... | ... | ... |
| 0x1000 | H01 | 0x00 | Unallocated | — | 0x2001 |
| 0x1001 |  | 0x01 | Unusable | — | — |
| 0x1002 |  | 0x02 | Unallocated | — | 0x2003 |
| ... |  | ... | ... | ... | ... |
| 0x2000 | H02 | 0x00 | Unusable | — | — |
| 0x2001 |  | 0x01 | Unallocated | — | 0x3002 |
| 0x2002 |  | 0x02 | Unusable | — | — |
| ... |  | ... | ... | ... | ... |
| 0x3000 | H13 | 0x00 | Unallocated | — | 0x4001 |
| 0x3001 |  | 0x01 | Unusable | — | — |
| 0x3002 |  | 0x02 | Unallocated | — | 0x4003 |
| ... |  | ... | ... | ... | ... |
| 0x4000 | H14 | 0x00 | Unusable | — | — |
| 0x4001 |  | 0x01 | Unallocated | — | 0x5000 |
| 0x4002 |  | 0x02 | Unusable | — | — |
| ... |  | ... | ... | ... | ... |
| 0x5000 | H15 | 0x00 | Unallocated | — | 0x0001 |
| 0x5001 |  | 0x01 | Unusable | — | — |
| 0x5002 |  | 0x02 | Unallocated | — | 0x0003 |
| ... |  | ... | ... | ... | ... |

FIG. 59A

Top-of-queue management table (#H0)

| First pointer |
|---|
| 0x0000 |

FIG. 59B

Top-of-queue management table (#H1)

| First pointer |
|---|
| 0x3000 |

| Number of unallocated pages | Previous number of unallocated pages | Unallocated page usage |
|---|---|---|
| 8500 | 9500 | 1000 |

| Number of unallocated pages | Previous number of unallocated pages | Unallocated page usage |
|---|---|---|
| 6500 | 7000 | 500 |

5101 — 5102 — 5103

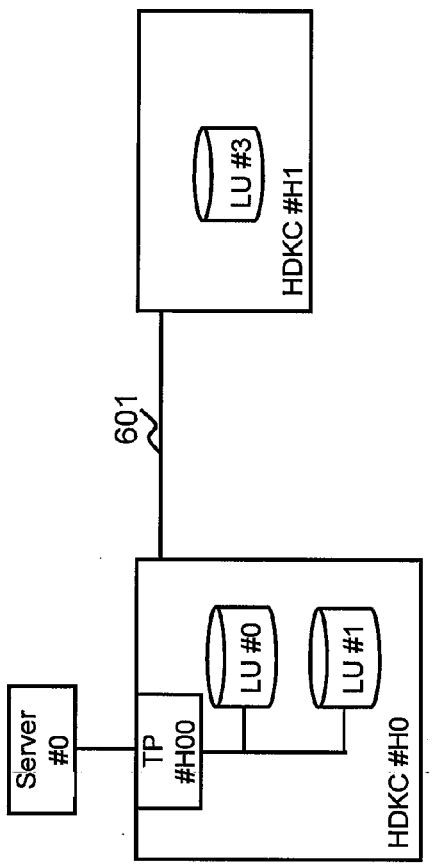
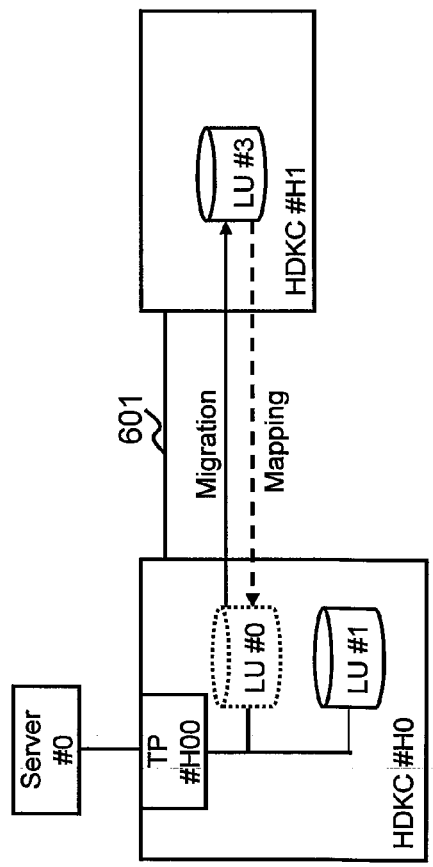

FIG. 66

Virtual page management table (#H0)

325

| DP-LU ID | Virtual page address | Allocation status | Pool-RG ID | Actual page address |
|---|---|---|---|---|
| 160 | 0x00 | Allocated | H00 | 0x00 |
| | 0x01 | Allocated | H13 | 0x01 |
| | 0x02 | Allocated | H15 | 0x01 |
| | ... | ... | ... | ... |
| 162 | 0x00 | Allocated | H01 | 0x01 |
| | 0x01 | Allocated | H02 | 0x00 |
| | 0x02 | Allocated | H14 | 0x00 |
| | ... | ... | ... | ... |

| Table pointer 1401 | Pool-RG ID 1402 | Actual page address 1403 | #H0 Allocation status 1404 | DP-LU ID 1405 | Unallocated queue pointer 1406 |
|---|---|---|---|---|---|
| 0x0000 | H00 | 0x00 | Allocated | 160 | — |
| 0x0001 | | 0x01 | Unusable | — | — |
| 0x0002 | | 0x02 | Unallocated | — | 0x1003 |
| ... | | ... | ... | ... | ... |
| 0x1000 | H01 | 0x00 | Unusable | — | — |
| 0x1001 | | 0x01 | Allocated | 162 | — |
| 0x1002 | | 0x02 | Unusable | — | — |
| ... | | ... | ... | ... | ... |
| 0x2000 | H02 | 0x00 | Allocated | 162 | — |
| 0x2001 | | 0x01 | Unusable | — | — |
| 0x2002 | | 0x02 | Unallocated | — | 0x3003 |
| ... | | ... | ... | ... | ... |
| 0x3000 | H13 | 0x00 | Unusable | — | — |
| 0x3001 | | 0x01 | Allocated | 160 | — |
| 0x3002 | | 0x02 | Unusable | — | — |
| ... | | ... | ... | ... | ... |
| 0x4000 | H14 | 0x00 | Unallocated | 162 | — |
| 0x4001 | | 0x01 | Unusable | — | — |
| 0x4002 | | 0x02 | Unallocated | — | 0x5003 |
| ... | | ... | ... | ... | ... |
| 0x5000 | H15 | 0x00 | Unusable | — | — |
| 0x5001 | | 0x01 | Allocated | 160 | — |
| 0x5002 | | 0x02 | Unusable | — | — |
| ... | | ... | ... | ... | ... |

FIG. 68

Virtual page management table (#H1) 325

| DP-LU ID 1301 | Virtual page address 1302 | Allocation status 1303 | Pool-RG ID 1304 | Actual page address 1305 |
|---|---|---|---|---|
| 161 | 0x00 | Unallocated | — | — |
| | 0x01 | Allocated | H13 | 0x00 |
| | 0x02 | Unallocated | — | — |
| | ... | ... | ... | ... |
| 163 | 0x00 | Unallocated | — | — |
| | 0x01 | Unallocated | — | — |
| | 0x02 | Unallocated | — | — |
| | ... | ... | ... | ... |

| Table pointer 1401 | Pool-RG ID 1402 | Actual page address 1403 | Allocation status 1404 | DP-LU ID 1405 | Unallocated queue pointer 1406 |
|---|---|---|---|---|---|
| 0x0000 | H00 | 0x00 | Unusable | — | — |
| 0x0001 |  | 0x01 | Unallocated | — | 0x1000 |
| 0x0002 |  | 0x02 | Unusable | — | — |
| ... |  | ... | ... | ... | ... |
| 0x1000 | H01 | 0x00 | Unallocated | — | 0x2001 |
| 0x1001 |  | 0x01 | Unusable | — | — |
| 0x1002 |  | 0x02 | Unallocated | — | 0x2003 |
| ... |  | ... | ... | ... | ... |
| 0x2000 | H02 | 0x00 | Unusable | — | — |
| 0x2001 |  | 0x01 | Unallocated | — | 0x3002 |
| 0x2002 |  | 0x02 | Unusable | — | — |
| ... |  | ... | ... | ... | ... |
| 0x3000 | H13 | 0x00 | Allocated | 161 | — |
| 0x3001 |  | 0x01 | Unusable | — | — |
| 0x3002 |  | 0x02 | Unallocated | — | 0x4003 |
| ... |  | ... | ... | ... | ... |
| 0x4000 | H14 | 0x00 | Unusable | — | — |
| 0x4001 |  | 0x01 | Unallocated | — | 0x5000 |
| 0x4002 |  | 0x02 | Unusable | — | — |
| ... |  | ... | ... | ... | ... |
| 0x5000 | H15 | 0x00 | Unallocated | — | 0x0001 |
| 0x5001 |  | 0x01 | Unusable | — | — |
| 0x5002 |  | 0x02 | Unallocated | — | 0x0003 |
| ... |  | ... | ... | ... | ... |

STORAGE CONTROL APPARATUS AND STORAGE SYSTEM COMPRISING MULTIPLE STORAGE CONTROL APPARATUSES

TECHNICAL FIELD

The present invention relates to a storage control apparatus, and a storage system that comprises multiple storage control apparatuses.

BACKGROUND ART

For example, in Patent Literature 1, there is disclosed a technology in which a low-performance disk array system is coupled to a high-performance disk array system, the high-performance disk array system virtualizes a logical volume inside the low-performance disk array system and provides this logical volume to a host device.

Furthermore, in Patent Literature 2, there is disclosed multiple intercoupled RAID (Redundant Array of Independent (or Inexpensive) Disks) controllers, and a technique for transferring data between multiple RAID controllers

CITATION LIST

[Patent Literature]
[PTL 1]
U.S. Pat. No. 7,441,095
[PTL 2]
U.S. Pat. No. 6,658,478

SUMMARY OF INVENTION

Technical Problem

But this literature does not take into account the differences in performance between multiple storage apparatuses, the distance between multiple storage apparatuses, and so forth.

Moreover, for example, using the same design for expansion in a case where a storage control apparatus comprising the same level of performance and/or functionality as an existing storage control apparatus (hereinafter, the existing apparatus) is added to this existing apparatus and in a case where a storage control apparatus comprising a different level of performance and/or functionality from this existing apparatus is added to this existing apparatus results in unnecessary load and waste being placed on the performance and/or functionality of the individual storage control apparatuses, raising the likelihood of a situation in which it is not possible to realize the performance and/or functionality appropriate for the system comprising the multiple storage control apparatuses as a whole.

Furthermore, for example, when installation space restrictions are taken into account, there also arises the need to construct a second data center by adding a storage control apparatus to a site other than a first data center where the existing apparatus is disposed. Since the distance between the sites can impact performance in this case, expansion that uses the same design as a case in which a storage control apparatus is added to the same site is likely to result in user-required performance not being met.

This is not only a problem at expansion time, but rather is a common problem that must also be taken into account at the time of an initial configuration that utilizes multiple storage control apparatuses.

Further, flexibly and efficiently linking multiple storage control apparatuses installed at either the same or different sites is seen as important for the construction, control and/or management of flexible and efficient storage systems in cloud environments as well.

Therefore, an object of the present invention is to provide a storage system that takes into account differences in the performance and/or functionality between multiple storage control apparatuses, the distance between multiple storage control apparatuses, and so forth.

Solution to Problem

A storage system comprises multiple storage control apparatus units. Each storage control apparatus unit is configured from one or more storage control apparatuses coupled to one or more hosts, and these one or more storage control apparatuses comprise multiple volumes that comprise multiple logical volumes, which are provided to these one or more hosts. The storage control apparatus units are coupled together in accordance with a third coupling mode, which is a coupling mode that satisfies the following (a1) through (a3):

(a1) One storage control apparatus inside one storage control apparatus unit and one storage control apparatus inside another storage control apparatus unit are coupled via a second type of coupling medium, which differs from the internal bus of the storage control apparatus and has a longer maximum communication distance than a first type of coupling medium that is the same type of coupling medium as the internal bus of the storage control apparatus;

(a2) the above-mentioned one storage control apparatus unit virtualizes a logical volume of the above-mentioned one other storage control apparatus unit and provides this virtualized logical volume to one or more hosts coupled to the one storage control apparatus unit; and (a3) the above-mentioned one other storage control apparatus unit virtualizes a logical volume of the above-mentioned one storage control apparatus unit and provides this virtualized logical volume to one or more hosts coupled to the one other storage control apparatus unit.

The volume of the storage control apparatus may be a logical volume or a physical storage device.

There may be tier management information denoting multiple tiers to which multiple logical volumes belong. The tier management information may be for each storage control apparatus unit. The tier management information for each storage control apparatus unit may be in the storage control apparatus unit, or in an external storage control apparatus unit (for example, a shared storage device coupled to multiple storage control apparatus units.)

The tier may be defined on the basis of one or more types of factors that are able to affect the I/O performance of the logical volume. The one or more types of factors may include a coupling mode type factor. A third coupling and a non-third coupling may be coupling mode types. A logical volume corresponding to the third coupling may be a virtual logical volume. The "virtual logical volume" referred to here is the logical volume to which is mapped the logical volume inside the storage control apparatus unit that is coupled using the third coupling mode to the storage control apparatus unit that provides this logical volume. A logical volume corresponding to the non-third coupling may be a logical volume other than the logical volume corresponding to the third coupling. The logical volume corresponding to the non-third coupling may be a logical volume to which Thin Provisioning is applied or a logical volume based on a physical storage device.

BRIEF DESCRIPTION OF DRAWINGS

FIG. 2 shows two HDKCs (high-performance and/or high-functionality storage control apparatuses (DKC (Disk Control Apparatus)) in a first coupling mode.

FIG. 8 shows the configuration of a coupling management table.

FIG. 9A shows the configuration of a tier management table. FIG. 9B shows an example of the relationships between performance factors that are used in the table shown in FIG. 9A and their points (tier level element).

FIG. 10 shows an expanded tier level table.

FIG. 11 shows the relationships between the performance factors used in the table shown in FIG. 10 and their points.

FIG. 12 shows the configuration of a LU/PDEV (Physical DEVice) conversion table.

FIG. 13 shows the configuration of a virtual page management table.

FIG. 14A shows the configuration of an actual page management table. FIG. 14B shows the configuration of a top-of-queue management table.

FIG. 31 shows the configuration of a CPU-in-charge table.

FIG. 34A shows the configuration of a CPU-in-charge table related to a second embodiment. FIG. 34B shows the configuration of load threshold management table.

FIG. 35 shows the configuration of a port load management table.

FIG. 36 shows the configuration of a temporary LU management table.

FIG. 45A shows the port load management table #H0 prior to the start of the second type load distribution process. FIG. 45B shows the port load management table #H1 prior to the start of the second type load distribution process.

FIG. 46A shows the CPU-in-charge table #H0 prior to the start of the second type load distribution process. FIG. 46B shows the CPU-in-charge table #H1 prior to the start of the second type load distribution process.

FIG. 47A shows a post-update port load management table #H0 in the second type load distribution process. FIG. 47B shows a post-update port load management table #H1 in the second type load distribution process.

FIG. 48A shows a post-update CPU-in-charge table #H0 in the second type load distribution process. FIG. 48B shows a post-update CPU-in-charge table #H1 in the second type load distribution process.

FIG. 49A shows a pre-update temporary LU management table #H1 in the second type load distribution process. FIG.

49B shows a post-update temporary LU management table #H1 in the second type load distribution process.

Figure 50:
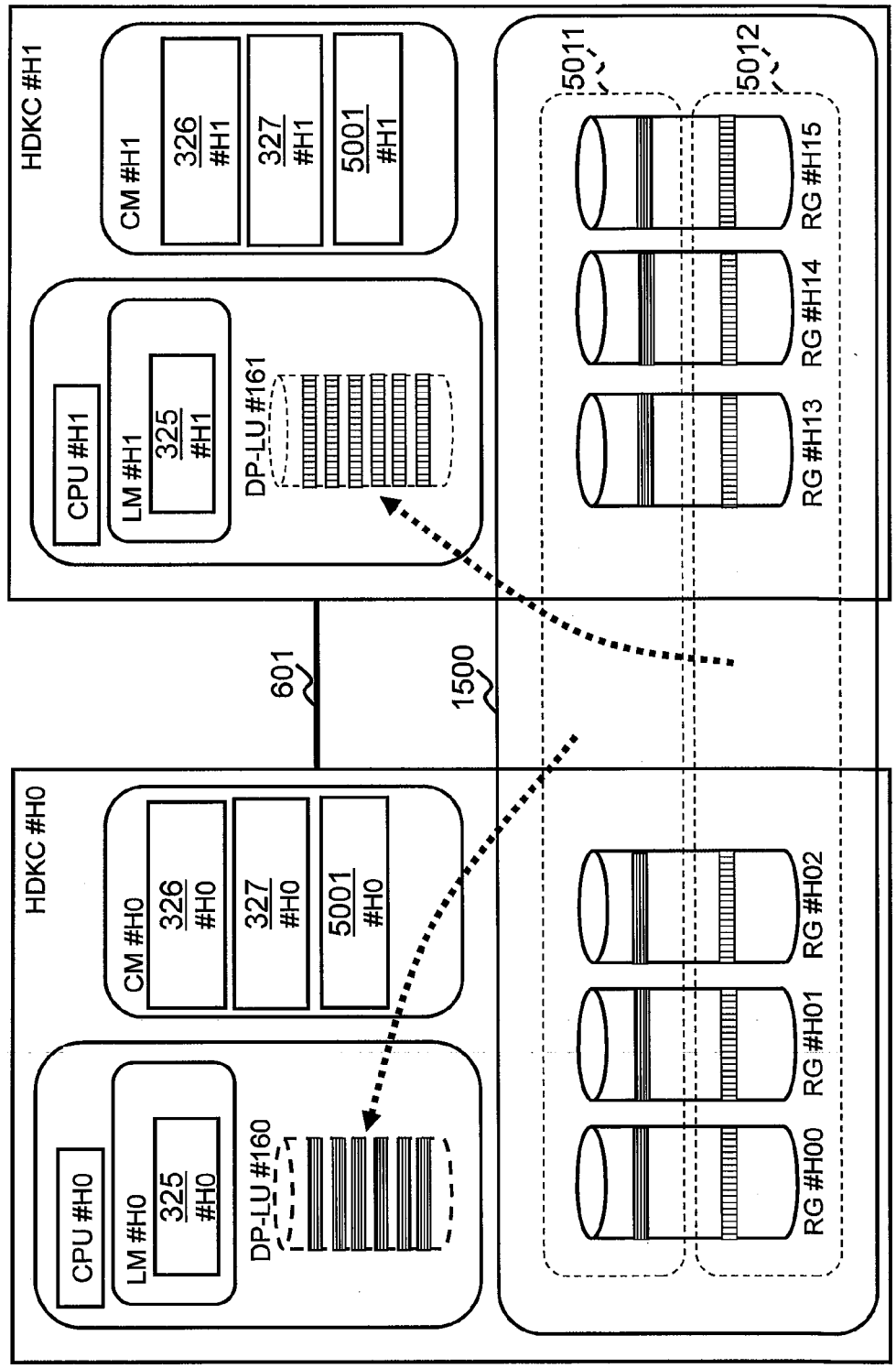

FIG. 50 shows an example of pool sharing between HDKC units related to a third embodiment of the present invention.

FIG. 51 shows the configuration of an unallocated page usage management table.

FIG. 52A shows a tier management table #H0 related to a situation in which a pool may be shared by HDKCs #H0 and #H1. FIG. 52B shows a tier management table #H0 related to a situation in which it is not desirable for a pool may be shared by HDKCs #H0 and #H1.

Figure 53:
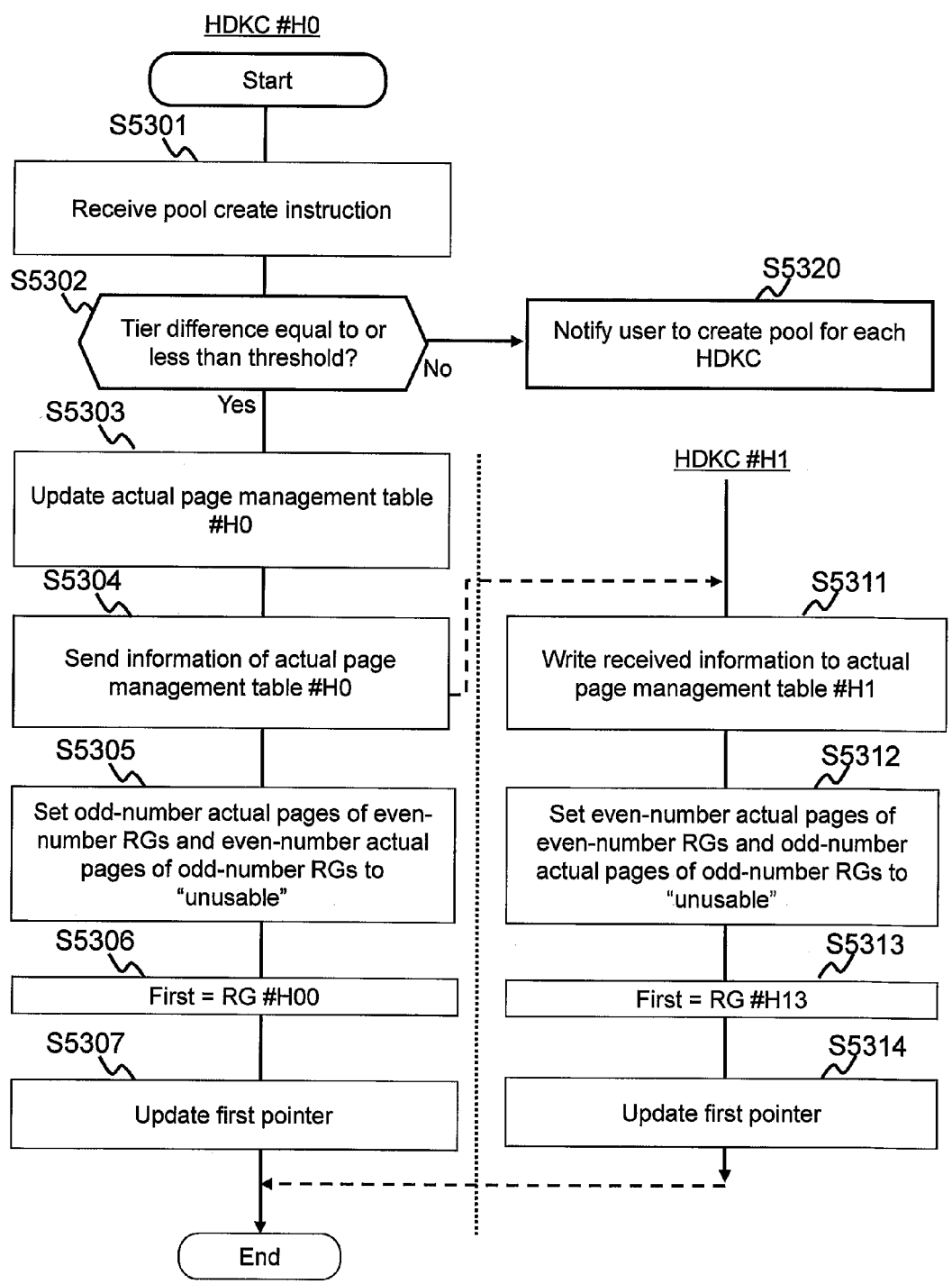

FIG. 53 shows the flow of a pool creation process related to the third embodiment.

FIG. 54 shows an actual page management table #H0 subsequent to being updated in S5303 of FIG. 53.

FIG. 55 shows an actual page management table #H1 subsequent to being updated in S5311 of FIG. 53.

Figure 56A:
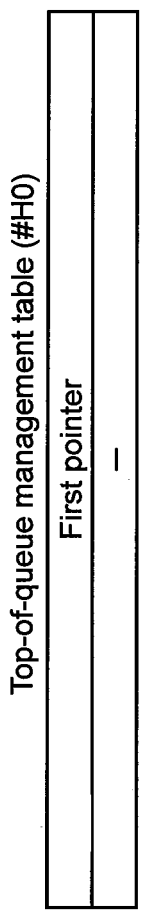
Figure 56B:

FIG. 56A shows a top-of-queue management table #H0 prior to being updated in S5307 of FIG. 53. FIG. 56B shows a top-of-queue management table #H1 prior to being updated in S5314 of FIG. 53.

FIG. 57 shows an actual page management table #H0 subsequent to being updated in S5306 of FIG. 53.

FIG. 58 shows an actual page management table #H1 subsequent to being updated in S5313 of FIG. 53.

FIG. 59A shows a top-of-queue management table #H0 subsequent to being updated in S5307 of FIG. 53. FIG. 59B shows a top-of-queue management table #H1 subsequent to being updated in S5314 of FIG. 53.

Figure 60:
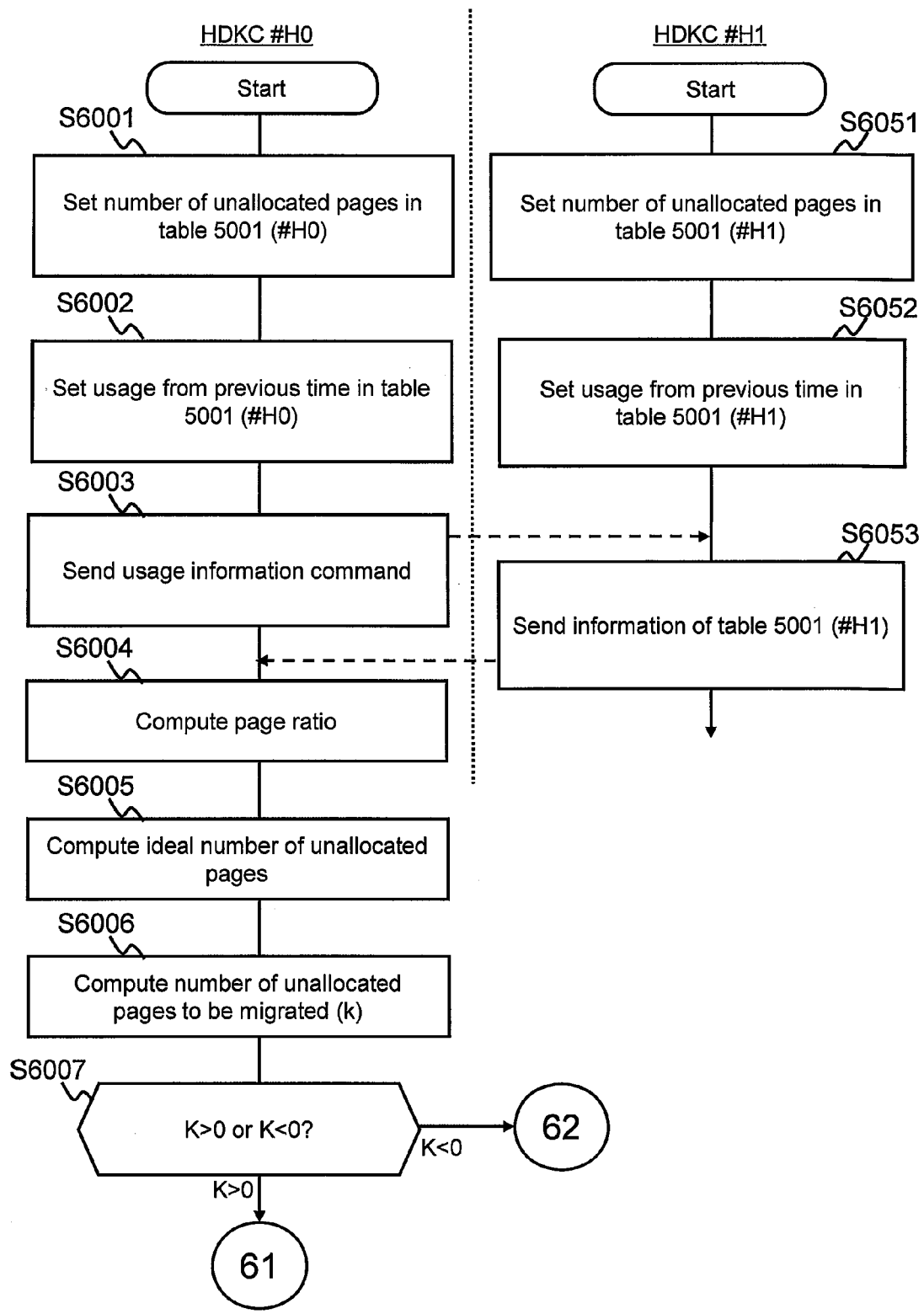

FIG. 60 shows a portion of the flow of a pool maintenance process.

Figure 61:
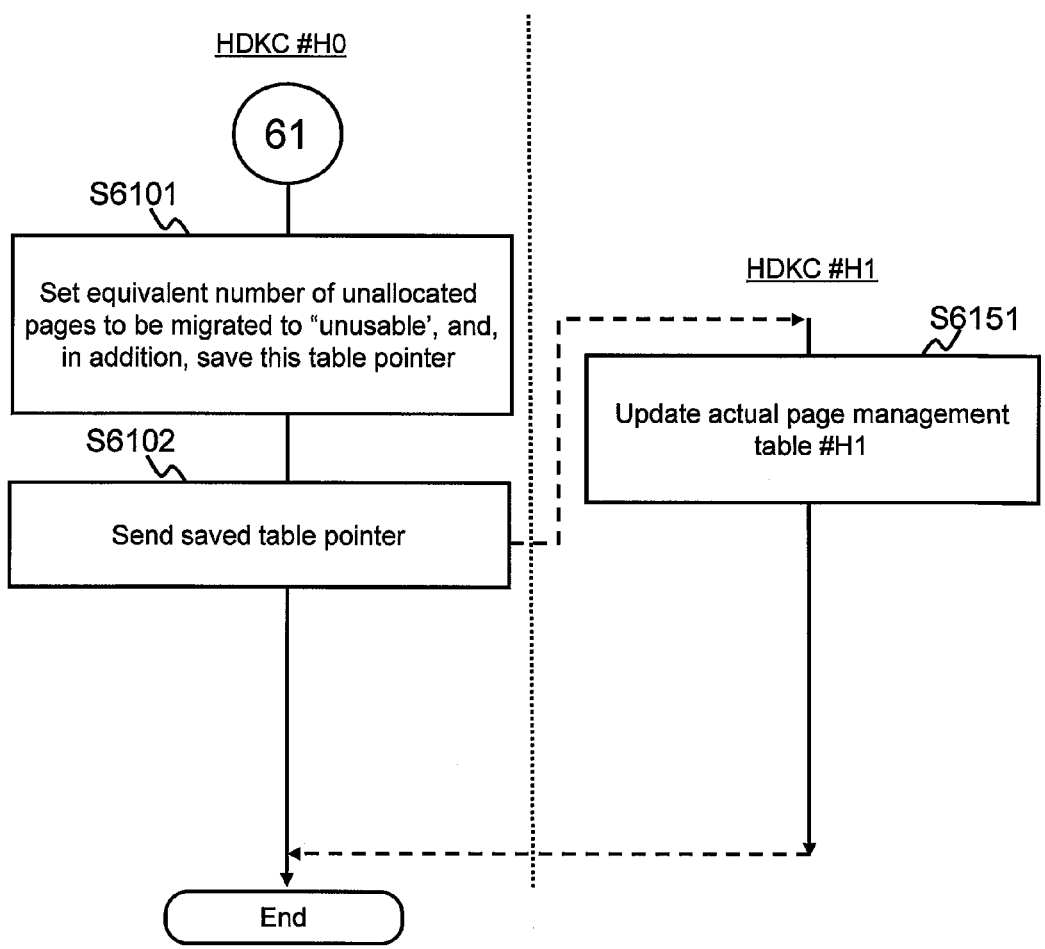

FIG. 61 shows a portion of the flow of a pool maintenance process.

Figure 62:
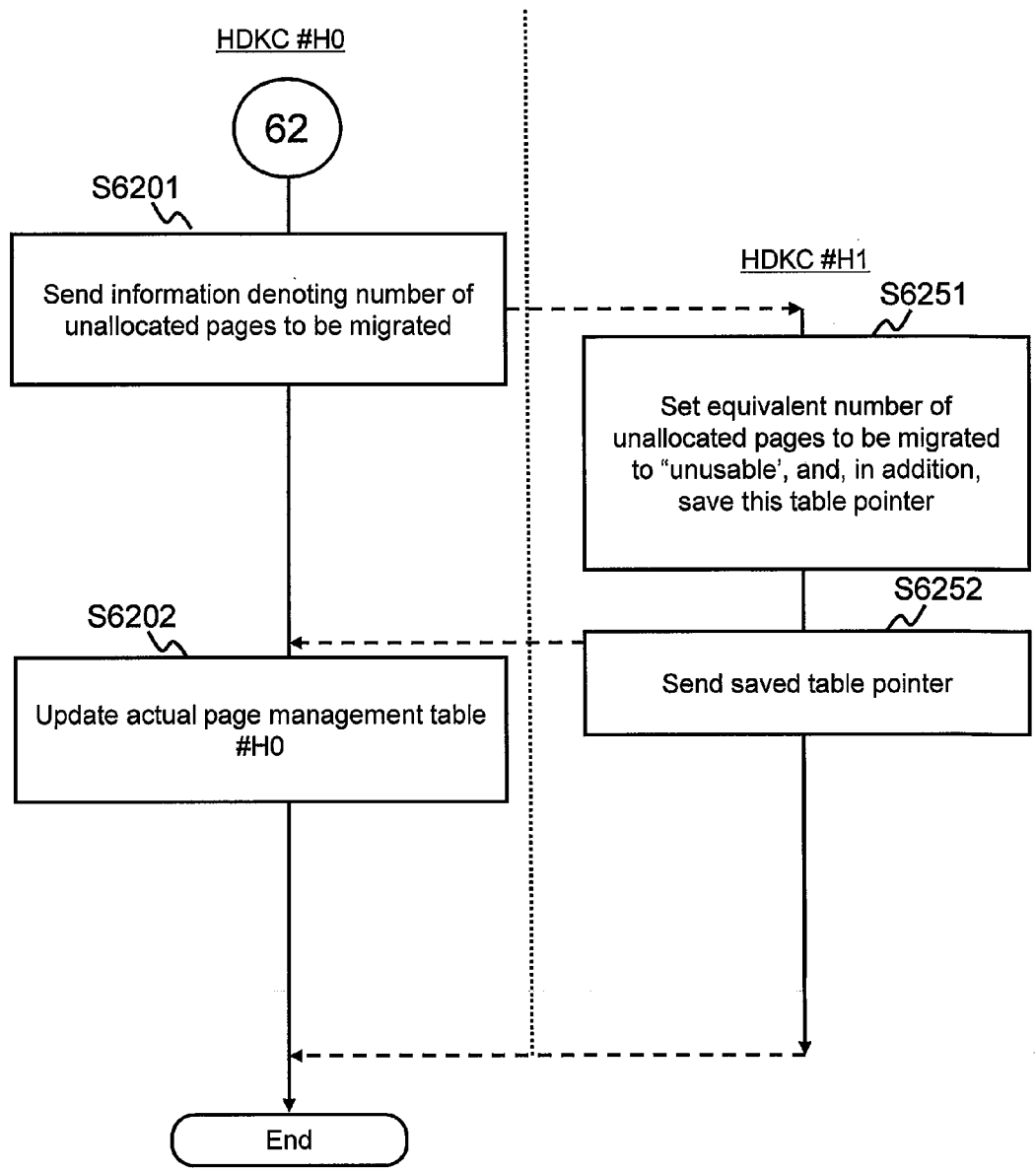

FIG. 62 shows a portion of the flow of a pool maintenance process.

FIG. 63A shows an unallocated page usage management table #H0 subsequent to being updated in S6002 of FIG. 60. FIG. 63B shows an unallocated page usage management table #H1 subsequent to being updated in S6052 of FIG. 60.

Figure 64:
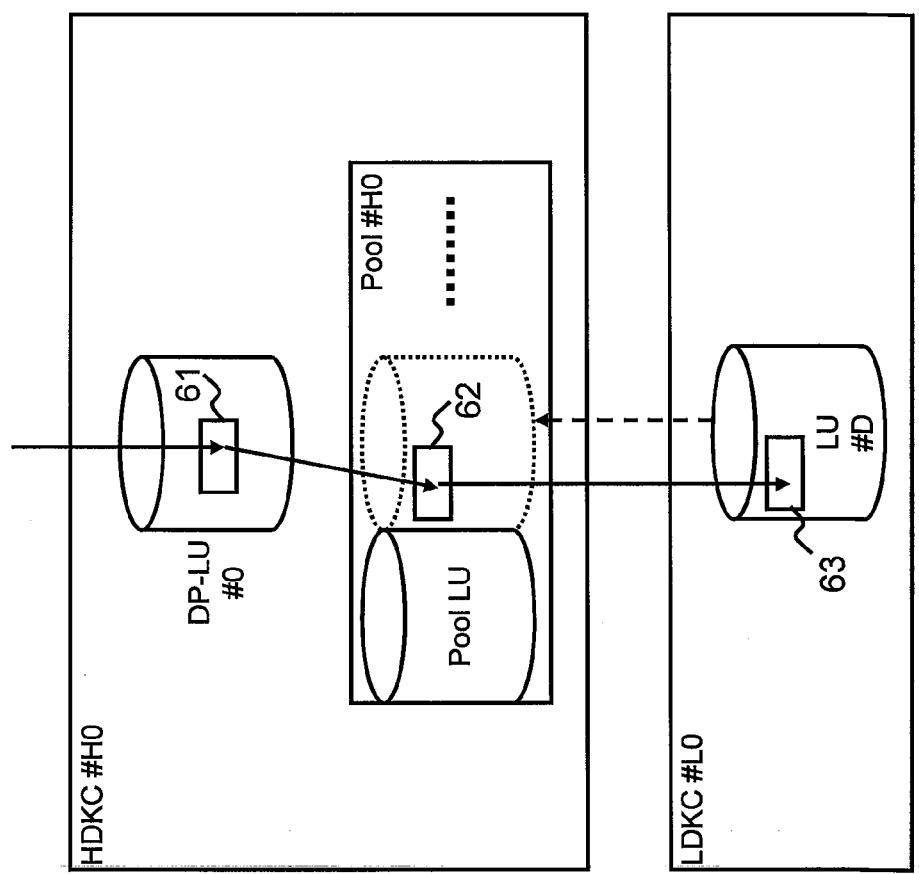

FIG. 64 shows an example of a variation of LU mapping according to the second coupling mode.

FIG. 65A shows an example of the configuration prior to the migration of the LU from the HDKC #H0 to a third-coupling HDKC #H1. FIG. 65B shows that the tier to which LU #0 belongs will change when LU #0 is migrated from the HDKC #H0 to the third-coupling HDKC #H1.

FIG. 66 shows the virtual page management table #H0 when an actual page (0x01) based on RAID group #H15 is allocated from the pool area 5011 to the virtual page (0x02) of the DP-LU #160 after the pool area 5011 was created by the pool create process in the third embodiment.

FIG. 67 shows the actual page management table #H0 when an actual page (0x01) based on RAID group #H15 is allocated from the pool area 5011 to the virtual page (0x02) of the DP-LU #160 after the pool area 5011 was created by the pool create process in the third embodiment.

FIG. 68 shows the virtual page management table #H1 in a case where data has been written for the first time to the DP-LU related to the pool area 5012 after this pool area 5012 was created by the pool create process in the third embodiment.

FIG. 69 shows the actual page management table #H1 in a case where data has been written for the first time to the DP-LU related to the pool area 5012 after this pool area 5012 was created by the pool create process in the third embodiment.

DESCRIPTION OF EMBODIMENTS

A number of embodiments of the present invention will be explained below.

In the following explanation, various types of information will be explained using the expression "xxx table", but these various types of information may be expressed using a data structure other than a table. To show that the information is not dependent on the data structure, "xxx table" may be called "xxx information".

Further, an ID (identifier), a number or the like will be used as information for identifying some target in the following explanation, but identification is not limited to this, and other types of identification information may also be used.

In the following explanation, there may be instances when "program" is used as the subject in explaining a process, but since a prescribed process is performed in accordance with a program being executed by a processor (for example, a CPU (Central Processing Unit)) while using a storage resource (for example, a memory) and/or a communication interface device (for example, a communication port) as needed, the subject of the processing may also be the processor. The processor may comprise a hardware circuit for processing either all or a portion of a process performed by the processor. A computer program may be installed in respective computers from a program source. The program source, for example, may be a program delivery server or a storage medium.

[First Embodiment]

<Configuration Storage System Related to First Embodiment of Present Invention>

Figure 1:
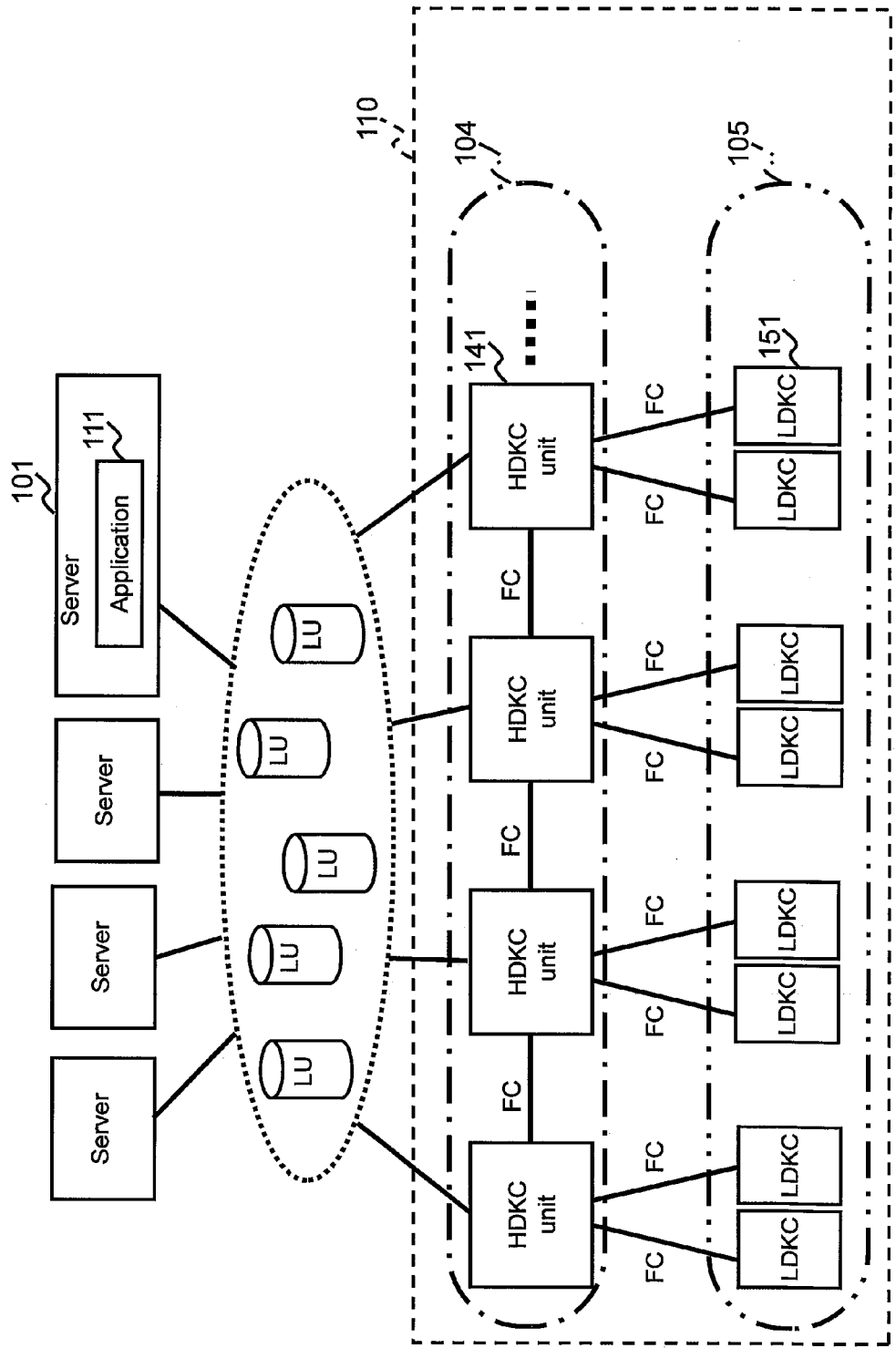
FIG. 1 shows the configuration of a storage system related to a first embodiment of the present invention.

FIG. 1 shows the configuration of a storage system related to a first embodiment of the present invention.

One or more servers 101 are coupled to a storage system 110. Each server 101, for example, is coupled to the storage system 110 via a communication network. The communication network, for example, is a FC (Fibre Channel) network, a LAN (Local Area Network), or the Internet.

The server 101 is one example of a host apparatus. The server 101, for example, comprises a communication interface device, which is coupled to the storage system 110, a storage resource, which stores a computer program, and a processor (typically a CPU (Central Processing Unit)), which is coupled to the communication interface device and the storage resource. The processor reads a computer program from the storage resource and executes this program. The computer programs are typically an OS (Operating System) and an application program 111. The application program 111 accesses a LU (Logical Unit) provided from the storage system 110. The LU is a logical storage device, and may be called a logical volume. Furthermore, either one or multiple servers 101 may comprise either one or multiple virtual servers inside the either one or multiple servers 101.

The storage system 110 comprises multiple storage control apparatuses. The storage control apparatus, for example, is an apparatus (for example, a disk array apparatus), which comprises a controller (hereinafter, the internal controller) that controls the storage of data in multiple physical storage mediums using RAID (Redundant Array of Inexpensive Disks) control. Since the physical storage medium may also be called a physical storage device, hereinafter this may be abbreviated as "PDEV" (Physical Device). The PDEV, for example, is a disk-type storage medium (for example, a HDD (Hard Disk Drive)). Accordingly, in the following explanation, the storage control apparatus may be called a disk control apparatus, and abbreviated as "DKC" (Disk Control Apparatus). In particular, a high-performance and/or high-functionality DKC may be called "HDKC" (High Performance and/or High Functionality DKC), a low-performance and/or low-functionality DKC (for example, a DKC with lower performance and/or lower functionality than the HDKC) may be called "LDKC" (Low Performance and/or Low Functionality DKC), and in a case where no particular distinction is made between the HDKC and the LDKC, the disk control apparatus may simply be called "DKC". The PDEV may be built into the HDKC and/or LDKC, or may be attached externally to the HDKC and/or the LDKC. In addition, the disk-type storage medium, for example, may also be a FC (Fibre Channel), a SAS (Serial Attached SCSI), an ATA (Advanced Technology Attachment), a SATA (Serial ATA) or other such drive. Furthermore, instead of a disk-type storage medium, the PDEV may also be another type of physical storage medium, such as, for example, a SSD (Solid State Drive), a semiconductor memory storage device/board, or the like.

The storage system 110 comprises a HDKC unit group 104, and a LDKC group 105, which is at a lower level than the HDKC unit group 104.

The HDKC unit group 104 comprises multiple HDKC units 141.

The HDKC unit 141 is configured from one or more HDKC. That is, the HDKC unit 141 may be the HDKC itself, or a set of multiple HDKCs. In the case of a HDKC unit 141 that is a set of multiple HDKCs, these multiple HDKCs, for example, are coupled in series. Two HDKCs are coupled to one another via a coupling medium (hereinafter, the internal bus) that enables short-distance coupling inside the HDKC unit 141. The internal bus, for example, is short, measuring a maximum of several meters in length. The internal bus, for example, is either a PCI bus or a PCI-Express (PCIe) bus. In this embodiment, the HDKC-to-HDKC coupling mode in the HDKC unit 141 is called the "first coupling mode". An internal bus according to the first coupling mode may be called the "first coupling medium" (or the first data transfer line).

Multiple HDKC units 141, for example, are coupled in series. An HDKC inside the HDKC unit 141 and an HDKC inside another HDKC unit 141 are coupled to one another via the long-distance coupling medium (hereinafter, the external bus). The external bus in this embodiment is a FC (Fibre Channel) cable, but a different coupling medium like FCoE (Fibre Channel over Ethernet) may be used instead. The coupling mode of an HDKC inside the HDKC unit 141 and an HDKC inside another HDKC unit 141 is called the "third coupling mode" in this embodiment. An external bus according to the third coupling mode may be called a "third coupling medium" (or a third data transfer line). Hereinbelow, in a case where a first HDKC is coupled to a second HDKC via the external bus (the third coupling medium) without going through another HDKC, the first HDKC is directly coupled to the second HDKC, and in a case where the first HDKC is coupled to the second HDKC via another HDKC and the external bus (the third coupling mode), the first HDKC and the second HDKC are indirectly coupled.

The LDKC group 105 comprises one or more LDKC 151. The LDKC 151 is coupled to the HDKC via the external bus. The coupling mode of the LDKC 151 and the HDKC in this embodiment is called the "second coupling mode". The external bus according to the second coupling mode may be called the "second coupling medium" (or the second data transfer line). The LDKC 151, for example, comprises multiple PDEV, and manages one or more LUs (Logical Units) based thereon. The LU is a logical storage device (a logical volume). The LU inside the LDKC is managed virtually as a LU inside the HDKC.

The server 101 is coupled to either one or multiple HDKCs via the external bus (a communication network), but the storage system 110 is able to perceive this as a single DKC that is virtually coupled to this server 101. Multiple LUs are provided to the server 101 from the HDKC (called the "target HDKC" in the explanation of FIG. 1) that is coupled to this server 101, but these multiple LUs, for example, may include at least one of (x1) through (x5) below.

(x1) A LU of the target HDKC
(x2) A LU provided via the first coupling medium. That is, a LU of another HDKC inside the HDKC unit (the "target HDKC unit" in the explanation of FIG. 1) that comprises the target HDKC.
(x3) A LU provided via the third coupling medium. That is, a virtual LU mapped to a LU of another HDKC unit that is coupled-either directly or indirectly to the target HDKC unit.
(x4) A LU provided via the second coupling medium. That is, a virtual LU mapped to a LU of a LDKC unit that is coupled to the target HDKC unit.
(x5) A LU provided via the second coupling medium and the third coupling medium. That is, a virtual LU mapped to a virtual LU (a virtual LU that is mapped to a LU of a LDKC unit that is coupled to another HDKC unit) of another HDKC unit.

The capacity and/or number of units of PDEV mounted to the DKC generally increases. For this reason, the storage capacity that the DKC supports also generally increases.

However, the performance and/or functionality of the DKC internal controller do/does not improve proportional to the increase in the DKC-supported storage capacity.

There are also discrepancies in the requirements (storage capacity, performance, number of ports) placed on the DKC by the users who utilize the storage system.

In a case where the storage system is constructed to meet the needs of a high-end user, the storage system comprises too much performance and/or functionality, and, in addition, is too high priced for the low-end user. Even in a case where the storage system is gradually built up from a small-scale system to a larger one, there is still a tendency for the initial installation costs to be high.

According to Patent Literature 2 mentioned above, coupling multiple DKCs or internal controllers together via an internal bus makes it possible to enhance scalability. However, for example, this gives rise to the following problems.

(1) The distance between the DKCs and/or between the internal controllers must be short (for example, no longer than several meters). A case in which the storage system is to be scaled up requires a large space on the same site. Insufficient space means the system will not be able to be expanded.
(2) The number of DKCs and/or internal controllers capable of being coupled together is restricted by the type of interface.

In this embodiment, either instead of or in addition to the first coupling medium, the HDKCs are coupled using the third coupling medium (the external bus), which enables long-distance coupling, and multiple HDKCs coupled via the third coupling medium are treated virtually as a single DKC. For this reason, it is possible to install multiple HDKCs in respectively separate locations, doing away with the need for a large amount of space on the same site. Furthermore, since there are no particular restrictions on the number of DKCs that can be coupled together, scalability improves.

This makes it possible to provide a technology that enables an non-expensive price for the initial installation costs and enables the realization of a flexible and efficient scale-out from a small-scale configuration to a large-scale configuration. Furthermore, flexibly and efficiently linking multiple storage control apparatuses (for example, a HDKC unit 141, a HDKC and/or a LDKC 151) installed at either the same or different sites is a necessary and important technology for constructing, controlling and/or managing flexible and efficient storage systems in a cloud environment.

The storage system 110 comprises either HDKCs or LDKCs, but can be perceived by the server 101 as a single DKC comprising multiple LUs. In accordance with this, even when an additional HDKC is added, the higher-level device with respect to the HDKC (for example, the server or a switch configuring a communication network) do not recognize the addition of the HDKC, but rather only the addition of a front-end communication port (hereinafter, the FE port). The FE port is a communication port of a HDKC and is coupled to a front-end device. The front-end device means a device located outside the HDKC and, for example, is a server, a switch inside a communication network, a HDKC coupled using the first coupling mode, a HDKC coupled using the third coupling mode, or a LDKC coupled using the second coupling mode.

Furthermore, the storage system may be perceived by the server 101 not as a single DKC, but rather as multiple DKCs. Also, in a case where a HDKC has been added, the server 101 may be aware of the fact that the HDKC has been added.

For the HDKC, "high performance and/or high functionality" may be performance that is higher than a first performance threshold and/or a prescribed type of functionality, or performance and/or functionality that are higher than the performance and/or functionality of another DKC (performance and/or functionality that are practically the same level as those of another DKC). Furthermore, the HDKC is not limited to a disk array apparatus, and may be another type of storage control apparatus (for example, an intelligent switch that comprises a storage virtualization function).

Technical objects related to the HDKC, for example, are (a) through (d) below
- (a) To provide a control method and a post-coupling utilization method for when multiple HDKCs are coupled;
- (b) to provide a control method and a post-coupling utilization method for when a HDKC is similarly coupled to a site that differs from that of a certain HDKC;
- (c) when coupling multiple HDKCs, to appropriately manage the tier levels and other such attributes of the LUs created in the HDKCs that are to be coupled and to provide an appropriate post-coupling utilization method in accordance with the coupling relationship and distance between the respective DKCs (a "tier" will be explained hereinbelow); and
- (d) when coupling a certain HDKC to other multiple HDKCs, to appropriately manage the tier levels and other such attributes of the LUs created for each of the other HDKCs and to provide an appropriate post-coupling utilization method in accordance with the differences in performance between these other multiple HDKCs and the distance from this certain HDKC.

For the LDKC, "low performance and/or low functionality" may be performance that is lower than a second performance threshold and/or a prescribed type of functionality, or performance and/or functionality that is lower than the performance and/or functionality of the other DKC (practically the same levels of performance and/or functionality as the other DKC). The second performance threshold may be equal to or lower than the first performance threshold. Furthermore, the LDKC is not limited to a disk array apparatus, but rather may be another type of storage control apparatus.

Technical objects related to the LDKC, for example, are (p) and (q) below.
- (p) When coupling a certain HDKC and a LDKC, to appropriately manage the tier level and other such attributes of the LU created in the LDKC and to provide an appropriate post-coupling utilization method in accordance with the difference in performance and distance between the respective DKCs; and
- (q) when coupling a certain HDKC to multiple LDKC, to appropriately manage the tier levels and other such attributes of the LUs created for each LDKC and to provide an appropriate post-coupling utilization method in accordance with the difference in performance between these multiple LDKC and the distance from the HDKC.

The respective coupling modes will be explained next.

<First Coupling Mode>

FIG. 2 shows two HDKCs that have been coupled using the first coupling mode.

Reference signs and IDs have been assigned to the hardware elements in FIG. 2. In the following explanation, when making a distinction between elements of the same type, the elements will be represented by using the ID (for example, HDKC #H0), and when no particular distinction is made between same type elements, the elements will be represented using the reference signs (for example, HDKC 201).

The ID of the HDKC is a combination (a two-part sign) of an alphabet letter "H" and a single digit numeral, but in a case where the HDKC includes multiple hardware elements of the same type, the multiple hardware elements of the same type may be distinguished using a three-part sign (ID) that includes this HDKC ID in the higher level. Specifically, for example, the IDs of the two CPUs of the HDKC #H0 are H00 and H01. Furthermore, in a case where "CPU #H0" is used as an inclusive code, CPU #H0 is at least one of CPU #H00 and #H01. This is not limited to the CPU, but rather holds true for the other types of hardware elements as well.

The HDKC 201 can be broadly divided into a PDEV group and an internal controller.

The PDEV group comprises one or more RG 231. The RG 231 is a RAID (Redundant Array of Independent (or Inexpensive) Disks) group, and is configured from two or more PDEV.

The internal controller, for example, is configured from two controller modules 211. There may also be one, or three or more controller modules 211 in a single HDKC 201.

The controller module 211 comprises a front interface (F-I/F) 221, a backend interface (B-I/F) 225, a cache memory (CM) 224, a CPU 222, a switch (SW) 226, and a local memory (LM) 223.

The F-I/F 221 is a communication interface device that couples to the server 101. The F-I/F 221 comprises either one or multiple higher-level ports. The higher-level port is a communication port that couples to a higher-level device, such as a server or a switch.

The B-I/F 225 is a communication interface device that couples to one or more RG 231.

The CM 224 temporarily stores data that is to be written to the RG 231 and data that has been read from the RG 231. At least one CM 224 may comprise a storage area that is used as the shared memory (SM) of multiple controller modules (an SM area) in addition to a storage area that is used as the cache memory (CM area).

The LM 223 may store information to be used in the CPU 222 and a computer program to be executed by the CPU 222.

The LM 223 is coupled to the CPU 222 and is not coupled to the SW 226, but the LM 223 may also be coupled to the SW 226.

The CPU 222 is able to execute a computer program (hereinafter, the control program) that is stored in the LM 223. The control program may be stored in another storage resource either instead of or in addition to the LM 223.

The SW 226 is coupled to the F-I/F 221, the CPU 222, the CM 224, the B-I/F 225, and the SW 226 inside the nearest other controller module 211. The SW 226 switches the connections between these elements. The interface between the SW 226 and the respective elements, for example, is PCI-Express (PCIe).

Two SWs 226 (for example SW #H00 and #H01) inside two controller modules 211 are coupled via an internal bus 227 in a single HDKC. Similarly, two SWs 226 (SW #H01 and #H10) inside separate HDKCs #H0 and #1, which are coupled using the first coupling mode, are coupled via the internal bus 227.

In accordance with this configuration, it is possible to make shared use of the hardware elements inside multiple controller modules 211 and the RG 231 inside multiple HDKCs 201 in the HDKC unit 141. In addition, management information (for example, one or more tables that will be explained hereinbelow) inside the multiple HDKCs 201 may also be shared. For this reason, it is possible to manage the information of multiple HDKCs 201 using a single internal controller (or one controller module), and the HDKC unit 141 is able to behave like a single HDKC. For example, the CPU #H01 is able to access any of the CMs #H00, #H10 and #H11 the same as accessing the CM #H01. In addition, the CPU #H01 is also able to perform I/O (Input/Output) with respect to any of RGs #H10 through #H14 the same as it performs I/O with respect to the RGs #H00 through #14.

Specifically, for example, in a case where the controller module 211, which receives a write command with respect to the LU corresponding to a specified LUN (Logical Unit Number) from the server 101, and the write-destination RG 231 according to this write command are inside the same HDKC 201, data may be written to the RG 231 using the flow indicated by the dashed-dotted line. That is, the controller module #H00 that received the write command (it may also be a different controller module) writes the data to the CM #H00 (may also be a different CM), and writes the data inside the CM #H00 to the write-destination RG #H01. Furthermore, the present invention is not limited to this process, and a different controller module than the controller module that received the I/O command may perform the I/O with respect to the I/O-destination RG.

Further, for example, in a case where the controller module 211, which receives the write command, and this write-destination RG 231 are inside different HDKCs 201, the data may be written to the RG 231 using the flow indicated by the dotted line. That is, the controller module #H01 that received the write command (may also be another controller module) may write the data to the CM #H10 (may also be another CM) by way of the SWs #H01 and #H10, and the controller module #H10 (may also be another controller module) may write the data inside the CM #H10 to the write-destination RG #H13 by way of the SWs #H10 and #11.

Furthermore, the LU that provides the HDKC unit 141 to the server 101 may be a virtual LU according to Thin Provisioning.

When a controller module inside one HDKC accesses a controller module or RG inside another HDKC, there is no need to reference the LU mapping table, which will be explained hereinbelow. This is because each controller module in the HDKC unit is able to access the hardware elements (for example, the CM and the RG) inside a different HDKC from the HDKC that comprises this controller module the same as if the hardware elements were inside this controller module's HDKC.

As described above, since the controller modules and HDKCs in the HDKC unit 141 are coupled via an internal bus, the distance between the controller modules and the distance between the HDKCs are short compared with a case of external bus coupling.

The preceding has been an explanation of the first coupling mode. Furthermore, the LDKC may also comprise an internal controller and a PDEV group. The configuration of the LDKC may be same configuration as that of the HDKC. The configuration of the internal controller of the LDKC may differ from the configuration of the HDKC internal controller.

<Second Coupling Mode>

Figure 3:
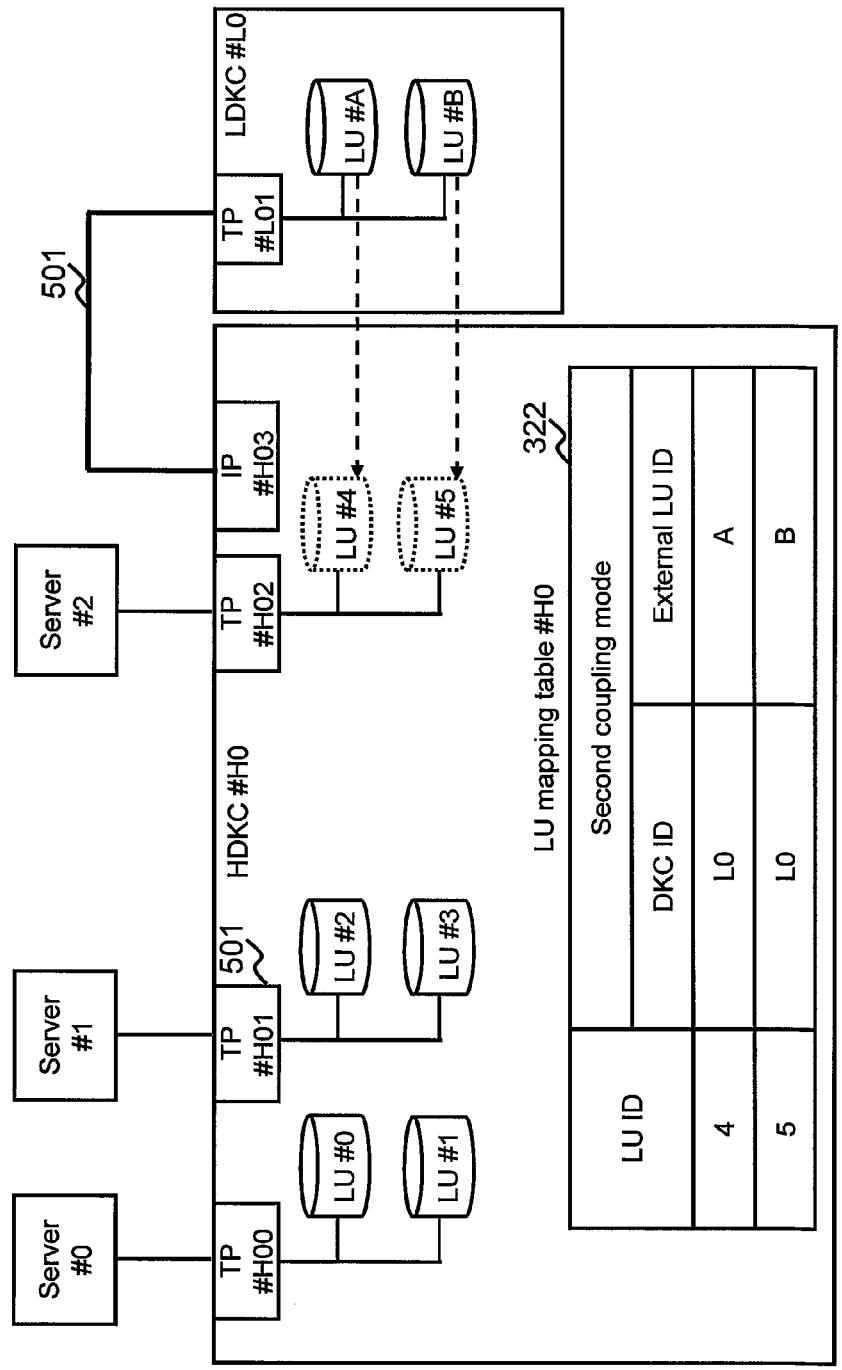
FIG. 3 shows an example of LU (Logical Unit) mapping according to a second coupling mode.

FIG. 3 shows an example of LU mapping according to the second coupling mode. Hereinbelow, the HDKC and its elements and the LDKC and its elements may be explained using element IDs instead of reference signs. Also, in the following explanation, the internal controller of the DKC #x may be referred to as "internal controller #x".

The DKC internal controller comprises multiple FE ports (Front-end communication ports) 501. The multiple FE ports 501 may comprise at least one of an FE port that becomes an initiator (the initiator port), an FE port that becomes the target (the target port), and an FE port that becomes both the initiator and the target (the initiator/target port). Hereinbelow, the initiator port may be expressed as "IP", the target port may be expressed as "TP", and the initiator/target port may be expressed as "ITP" as in the drawings. The FE port is in the F-I/F (refer to FIG. 2) of the HDKC.

A server (for example, #0) couples to the target port (for example, #H00) of the HDKC #H0. Two or more servers may be coupled to one target port.

The initiator port #H03 of the HDKC #H0 couples to the LDKC #L0 (#L01 is the target port thereof). The LDKC #L0 comprises LUs #A and #B. At least one of the LUs #A and #B may be a virtual LU according to Thin Provisioning. Thin Provisioning may also be called Dynamic Provisioning. Accordingly, a virtual LU according to Thin Provisioning may be referred to as "DP-LU" hereinbelow.

The LUs #4 and #5 are associated with the target port #H02, and the server #02 is coupled to the target port #H02. The server #02 is able to issue an I/O command that specifies LU #4 and/or #5.

External LU #A is mapped to LU #4, and external LU #B is mapped to LU #5. That is, LUs #4 and #B are virtual LUs.

According to the second coupling mode, the HDKC #H0 is able to treat the external LUs #A and #B inside the LDKC #L0 that is coupled to the initiator port #H03 virtually as LUs #4 and #5. The corresponding relationship between virtual LU #4 (#5) and external LU #A (#B) can be identified from the LU mapping table 322 (#H0). The LU mapping table 322 (#H0) comprises information related to the external LUs that are mapped to the virtual LUs inside the HDKCs that comprise this table. Specifically, the LU mapping table #0 comprises the following information for each virtual LU:
  the ID of the DKC that comprises an external LU mapped to a virtual LU; and
  the ID of this external LU.

The LU mapping table #H0 is stored in a storage resource (for example, the LM or the CM) inside the internal controller #H0. In a case where the LU #4 has been specified by an I/O command from the server #2, the internal controller #H0 (CPU#H0 (either CPU #H00 or #H01)) identifies the fact that the LU #A is mapped to the LU #4 from the LU mapping table #H0, and sends the I/O command specifying the identified LU #A to the LDKC #L0. This enables the I/O to be performed with respect to the LU #4 (LU #A).

Furthermore, the external LU mapped to one virtual LU is not limited to one external LU of one LDKC, but rather multiple external LUs of one LDKC, and either one or multiple external LUs provided from respective LDKCs (multiple external LUs provided across multiple LDKCs) may be mapped to a single virtual LU. In these cases, multiple external LU IDs are included in the ID of the above-mentioned external LU.

According to the second coupling mode, the HDKC #H0 may treat the LDKC #L0 the same as the PDEV of the HDKC #H0. A server may or may not be coupled to the FE port of the LDKC #L0. According to the second coupling mode, although the HDKC #H0 comprises a virtual LU to which the LU inside the LDKC #L0 is mapped, the LDKC #L0 does not comprises a virtual LU to which the LU inside the HDKC #H0 is mapped.

According to the second coupling mode, the virtual LUs #4 and #5 have more overhead than the LU (for example, LU#0) based on the RG inside the HDKC #H0 due to the fact that access is by way of the external bus 501 (the external bus 501 may go by way of an external switch (for example, a FC (Fibre Channel)) switch). For this reason, the virtual LUs #4 and #5 may be used as a lower tier (for example, either a mid-level tier or a lower-level tier) that is lower than the LU based on the RG inside the HDKC #H0 . Furthermore, in the second embodiment, which will be explained below, load distribution is performed, but a virtual LU according to the second coupling mode, for example, may be a load distribution-source LU (a data migration-source LU) belonging to the mid-level tier and/or the lower-level tier, and/or a load distribution-destination LU (a data migration-destination LU) belonging to the mid-level tier and/or the lower-level tier. In a load distribution, for example, in a case where a virtual LU has been migrated from a first HDKC to a second HDKC by way of the third coupling medium, the data inside a first external LU (the LU inside a first LDKC) that is mapped to this virtual LU may be migrated to a second LU (the LU mapped to the virtual LU inside the second HDKC) inside a second LDKC that is coupled to the second HDKC.

Also, for example, an external LU (a LU inside the LDKC), which has been mapped according to the second coupling mode, may be mapped to at least one of the LU configuring a pool #H0 inside the HDKC #H0 as shown in FIG. 64. Therefore, at least one of the one or more LUs (pool LUs) configuring the pool #H0 may be a virtual LU. The HDKC #H0 comprises a DP-LU (a virtual LU according to Dynamic Provisioning) #0. In a case where data is to be written to a certain virtual page 61 inside the DP-LU #0, the HDKC #H0 is able to allocate an actual page 62 from the pool #0 to this virtual page 61. The HDKC #H0 is able to write the data to the actual page 62. In a case where the virtual LU mapped to the external LU #D inside the LDKC #L0 comprises this actual page 62, the data to be written to the actual page 62 is written to a storage area 63 inside the external LU #D corresponding to this actual page 62.

Furthermore, a HDKC may be coupled to a HDKC by way of the second coupling medium either instead of or in addition to the LDKC. Furthermore, the same one or multiple LDKCs may be coupled to multiple HDKCs 201 in one HDKC unit 141. In accordance with this, each of the multiple HDKCs in the one HDKC unit 141 may provide to either one or multiple servers 101 multiple virtual volumes (the first virtual LU and the second virtual LU) to which is mapped this same LU (the first LU) by using the same LU (first LU) in the same either one or multiple LDKCs. Each of the multiple HDKCs in the one HDKC unit 141 may also provide to either one or multiple servers 101 different virtual volumes (the third virtual LU and the fourth virtual LU) to which are respectively mapped different LUs (the second LU and the third LU) by using these different LUs (the second LU and the third LU) in the same either one or multiple LDKCs.

Of these, in a case where each of the multiple HDKCs in the one HDKC unit 141 provide to either one or multiple servers 101 multiple virtual volumes (the first virtual LU and the second virtual LU) to which the same LU (the first LU) is mapped, these multiple virtual volumes (the first virtual LU and the second virtual LU) are used for either a failover or a load distribution.

As a concrete example of the use of these multiple virtual volumes in a failover, the multiple HDKCs in the one HDKC unit 141 and/or the management device 301 manage (s) both an active ordinary path for reading and/or writing the data of the first LU from either one or multiple servers 101 via the first virtual LU, and either an active or a passive alternate path for reading and/or writing the data of the first LU from the either one or multiple servers 101 via the second virtual LU, implement (s) a data write to the first LU and/or a data read from the first LU by processing a write command and/or a read command sent from the either one or multiple servers 101 using the above-mentioned alternate path in accordance with the failure of the above-mentioned ordinary path, and return (s) a write-complete response and/or a read-complete response to either the one or multiple servers 101. Since each of the multiple HDKCs in the one HDKC unit 141 comprises a cache memory 224, at this time, after writing the write-data and/or reading the data to the cache memory 224 inside the HDKC by processing the write command and/or the read command and returning the write-complete response and/or the read-complete response to the either one or multiple servers 101 via the above-mentioned ordinary path and/or alternate path, the multiple HDKCs in the one HDKC unit 141 may implement a data write to the first LU and/or a data read from the first LU. In the US, the specifications and drawings of U.S. Pat. No. 7,337,350 (Mimatsu et al.) may be cited with respect to this specific processing. In this case, the technology of the present application is applied such that the Host Computer of these specifications and drawings corresponds to the either one or multiple servers 101 of the present application, the Storage System 2 and the Storage System 3 of these specifications and drawings respectively correspond to the multiple HDKCs in the one HDKC unit 141 of the present application, and the Storage System 1 of these specifications and drawings corresponds to the LDKC comprising the same LU (the first LU) of the present application.

Further, the following can be cited as a concrete example of the use of these multiple virtual volumes in a load distribution. The multiple HDKCs in the one HDKC unit 141 and/or the management device 301 manage (s) both a path for reading and/or writing the data of the first LU from either one or multiple servers 101 by way of the first virtual LU and a path for reading and/or writing the data of the first LU from either one or multiple servers 101 by way of the second virtual LU, and in accordance with the respective loads of the multiple HDKCs in the one HDKC unit 141, change(s) the processing that had been implemented using the one path of the above-mentioned multiple paths such that the processing is implemented using the other path of the above-mentioned multiple paths. The processing referred to here is for implementing a data write to the first LU and/or a data read from the first LU by processing a write command and/or a read command sent from the either one or multiple servers 101 and returning a write-complete response and/or a read-complete response to either the one or multiple servers 101. Since each of the multiple HDKCs in the one HDKC unit 141 comprises a cache memory 224, at this time, after writing the write-data and/or reading the data to the cache memory 224 inside the HDKC by processing the write command and/or the read command and returning the write-complete response and/or the read-complete response to the either one or multiple servers 101 by way of the above-mentioned multiple paths, the multiple HDKCs in the one HDKC unit 141 may implement a data write to the first LU and/or a data read from the first LU. In the US, the specifications and drawings of US Patent Application Publication No. 2006/0271758 (Innan et al.) may be cited with respect to this specific processing. In this case, the technology of the present application is applied such that the Host Device of these specifications and drawings corresponds to the either one or multiple servers 101 of the present application, the Virtualization Storage Device 1 and the Virtualization Storage Device 2 of these specifications and drawings respectively correspond to the multiple HDKCs in the one HDKC unit 141 of the present application, and the External Storage Device of these specifications and drawings corresponds to the LDKC comprising the same LU (the first LU) of the present application. Furthermore, in a case where multiple servers 101 are used in the specific examples of using the multiple virtual volumes in either a failover or a load distribution, these multiple servers 101 may correspond to servers included in a cluster relationship, in which case the processing is passed between the multiple servers 101 when either using the above-mentioned failover alternate path or using the above-mentioned load distribution other path.

At this time, either the one or multiple servers 101 may correspond to either the one or multiple virtual servers in the either one or multiple servers 101. In a case where one virtual server is used between the either one or multiple servers 101, the virtual server is migrated between the either one or multiple servers 101 when either using the above-mentioned failover alternate path or using the above-mentioned load distribution other path. In a case where multiple virtual servers are used between the either one or multiple servers 101, processing is passed between the multiple virtual servers of the either one or multiple servers 101 when either using the above-mentioned failover alternate path or using the above-mentioned load distribution other path. In this case, the failover or the load distribution may be implemented by the HDKC unit 141 or the management device 301 determining or deciding which of the multiple HDKCs is to be the Source or the Destination of the failover or the load distribution in accordance with the performance, status (presence or absence of a failure, extent of a failure, and so forth) and/or the load of each of the multiple HDKCs in the one HDKC unit 141, or the differences in the performance, the differences in the status (presence or absence of a failure, the extent of the failure, and so forth) and the differences in the distance and/or load between the multiple HDKCs. Furthermore, the above-mentioned distance is not limited to an actual distance, but rather may be a command transceiving time, a command response time and/or a command processing time (to be explained in detail using the portion of the specifications corresponding to FIG. 10). These techniques are one of the technologies being disclosed for the first time in the present application.

Furthermore, either the same one or multiple LDKCs may be coupled to multiple HDKC units 141. In this case as well, the same mode, concrete example, and citations will be applied as in the case where either the same one or multiple LDKCs is/are coupled to the multiple HDKCs 201 in the one HDKC unit 141. However, the multiple HDKCs in the one HDKC unit 141 are re-read and applied to multiple HDKC units 141. In this case, the failover or load distribution is implemented by the multiple HDKC units 141 or the management device 301 determining or deciding which one of the multiple HDKC units 141 is to be the Source (a failover source or a load distribution source) or the Destination (the failover destination or the load distribution destination) of the failover or the load distribution in accordance with the performance, status (presence or absence of a failure, extent of a failure, and so forth) and/or the load of each of the multiple HDKC units 141, or the differences in the performance, the differences in the status (presence or absence of a failure, the extent of the failure, and so forth) and the differences in the distance and/or load between the multiple HDKC units 141. Furthermore, the above-mentioned distance is not limited to an actual distance, but rather may be a command transceiving time, a command response time and/or a command processing time (these will be explained in detail using the portion of the specifications corresponding to FIG. 10). Furthermore, in a case where the above-mentioned either one or multiple LDKCs is/are coupled to the multiple HDKCs 201 in the one HDKC unit 141, whereas the HDKC unit 141 or the management device 301 determines or decides (does not take into account the performance or distance) which one of the multiple HDKCs is to be the Source or the Destination of the failover or the load distribution in accordance with the status (presence or absence of a failure, extent of a failure, and so forth) and/or the load of each of the multiple HDKCs in the one HDKC unit 141, or the differences in the status (presence or absence of a failure, the extent of the failure, and so forth) and/or the differences in the load between the multiple HDKCs, in a case where either the same one or multiple LDKCs is/are coupled to multiple HDKC units 141, the HDKC unit 141 or the management device 301 may exercise control so as to determine or decide which one of the multiple HDKCs is to be the Source or the Destination of the failover or the load distribution in accordance with the performance, the status (presence or absence of a failure, extent of a failure, and so forth) and/or the load of each of the multiple HDKC units 141, or the differences in the performance, and the differences in the status (presence or absence of a failure, the extent of the failure, and so forth) and/or the differences in the load between the multiple HDKC units 141. This technology is one of the technologies being disclosed for the first time in the present application.

<Third Coupling Mode>

Figure 4:
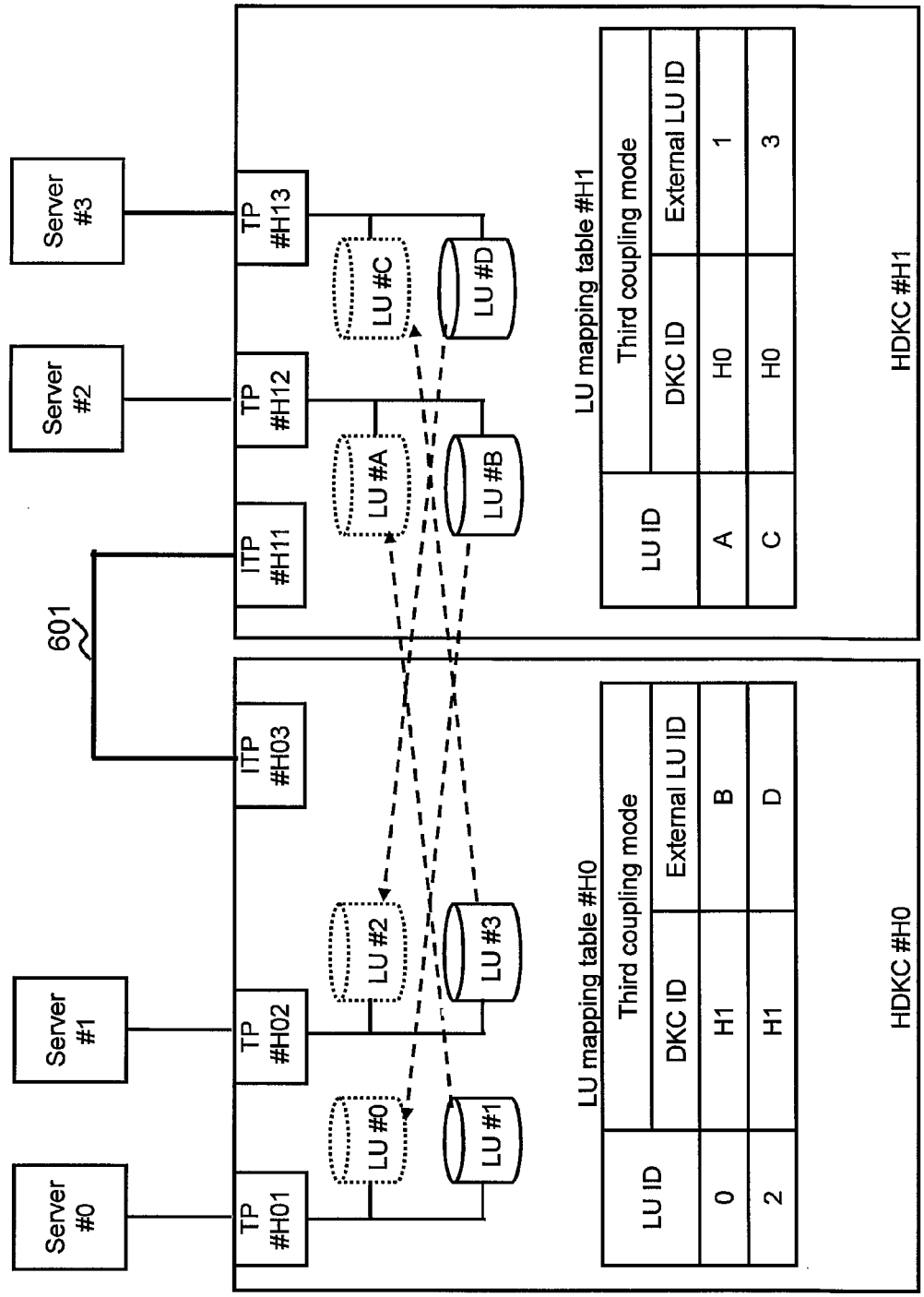
FIG. 4 shows a first example of LU mapping according to a third coupling mode.

FIG. 4 shows a first example of LU mapping according to the third coupling mode.

The HDKCs #H0 and #1 comprise target ports and initiator/target ports as the FE ports. The FE port is in the F-I/F (refer to FIG. 2) as described hereinabove.

A server (for example, #0) is coupled to the target port (for example, #H01) of the HDKC #H0, and a server (for example, #2) is coupled to the target port (for example, #H12) of the HDKC #H1.

The initiator/target port #H03 of the HDKC #H0 and the initiator/target port #H11 of the HDKC #H1 are coupled via an external bus 601 (the external bus 601 may go by way of an external switch (for example, a FC (Fibre Channel)) switch). That is, according to the third coupling mode, the HDKC #H0 may issue an I/O command to the HDKC #H1, and the HDKC #H1 may issue an I/O command to the HDKC #H0. This is because, when a LU inside the HDKC #H0 is mapped to a virtual LU inside the HDKC #H1, a LU inside the HDKC #H1 is also mapped to a virtual LU inside the HDKC #H0. According to FIG. 4, the LU #1 is mapped to the virtual LU #A, and the LU #B is mapped to the virtual LU #C. In addition, the LU #B is mapped to the virtual LU #0, and the LU #D is mapped to the virtual LU #2. According to FIG. 4, the virtual LUs and the LUs mapped to the virtual LUs are associated with the target ports.

The HDKC #H0 comprises the LU mapping table #H0, and the HDKC #H1 comprises the LU mapping table #H1. The LU mapping table #H0 comprises information related to the external LU #B (#D), which is mapped to the virtual LU #0 (#2) of the HDKC #H0. The LU mapping table #H1 comprises information related to the external LU #1 (#3), which is mapped to the virtual LU #A (#C) of the HDKC #H1. The external LU #B (#D), which is mapped to the virtual LU #0 (#2), is identifiable from the LU mapping table #H0, and the external LU #A (#C), which is mapped to the virtual LU #1 (#3), is also identifiable from the LU mapping table #H1.

The server to which the HDKCs #H0 and #H1 are coupled is able to perceive these HDKCs as if they were a single HDKC. For example, the server #0 is able to recognize the LUs #0 and #1 inside the HDKC #H0, but the LU #0 entity is actually LU #B, and it exists in HDKC #H1 rather than HDKC #H0. However, the server #0 recognizes LU #0 and does not recognize the LU #B, which is inside the HDKC #H1 and which is mapped to this LU #0. For example, in a case where the LU #0 is specified by an I/O command from the server #0, the internal controller #H0 (CPU #H0) identifies the fact that the LU #B is mapped to the LU #0 from the LU mapping table #H0, and sends the I/O command specifying the identified LU #B to the LDKC #H1. This enables the I/O to be performed with respect to the LU #0 (LU #B).

The virtual LUs #0, #2, #A and #C according to the third coupling mode may belong to a higher-level tier since they are mapped to the LUs inside the HDKC. The virtual LU according to the third coupling mode, for example, may be a load distribution-source LU (a data migration-source LU) belonging to the higher-level tier and/or a load distribution-destination LU (a data migration-destination LU) belonging to the higher-level tier. In the load distribution, for example, the data inside the LU that is mapped to the virtual LU may be migrated from the HDKC that comprises this LU to the LU of another HDKC by way of the third coupling medium.

Figure 5:
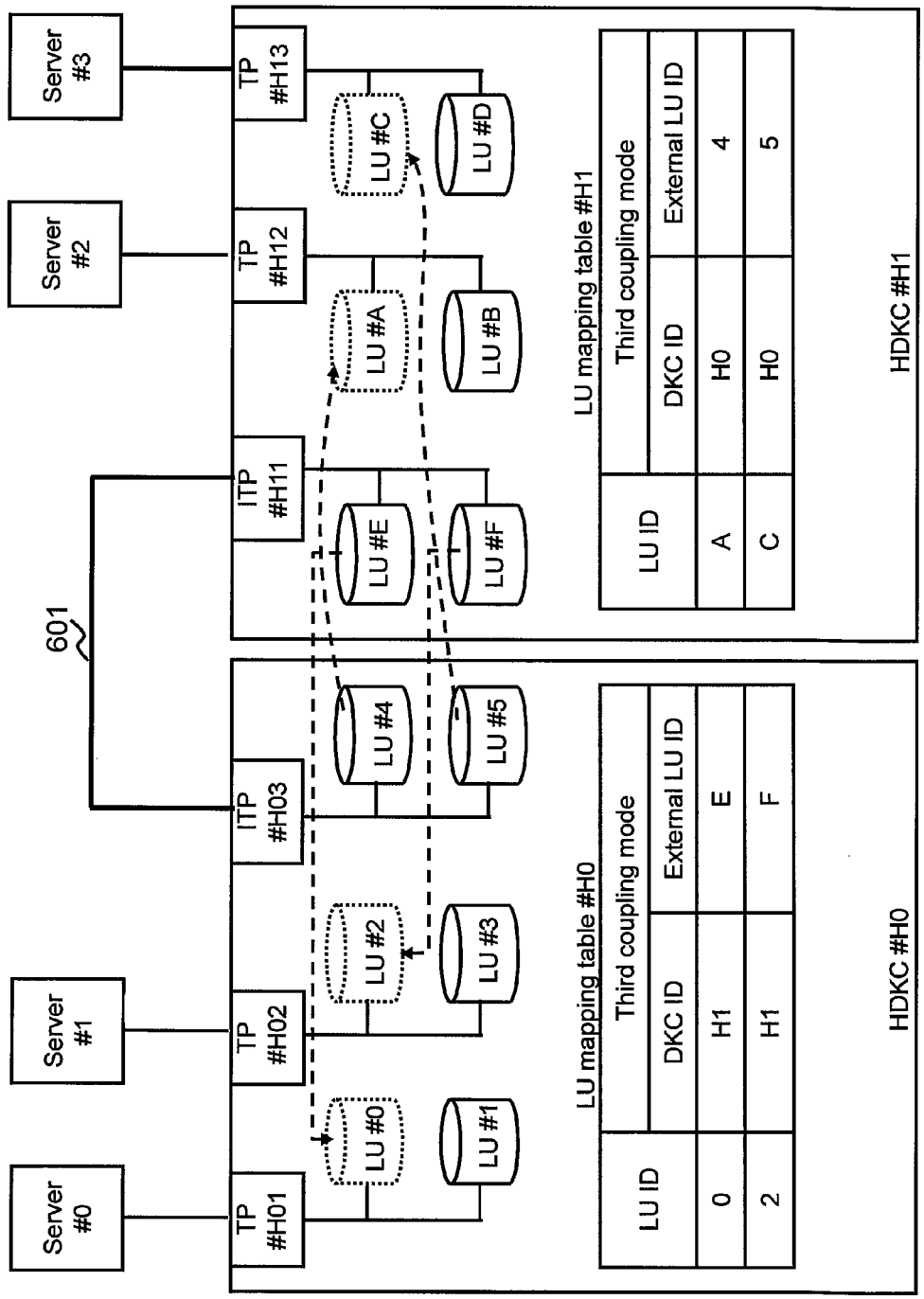
FIG. 5 shows a second example of LU mapping according to the third coupling mode.

FIG. 5 shows a second example of LU mapping according to the third coupling mode.

As shown in FIG. 5, the external LU (for example, LU #A), which is mapped to the virtual LU (for example, LU #A), may be the LU that is associated with the FE port (the initiator/target port) (for example, #H03), which is not coupled to a server, rather than the LU that is associated with the FE port (the target port), which is coupled to a server.
<HDKC Coupled to All of the First Coupling Medium, the Second Coupling Medium, and the Third Coupling Medium>

Figure 6:
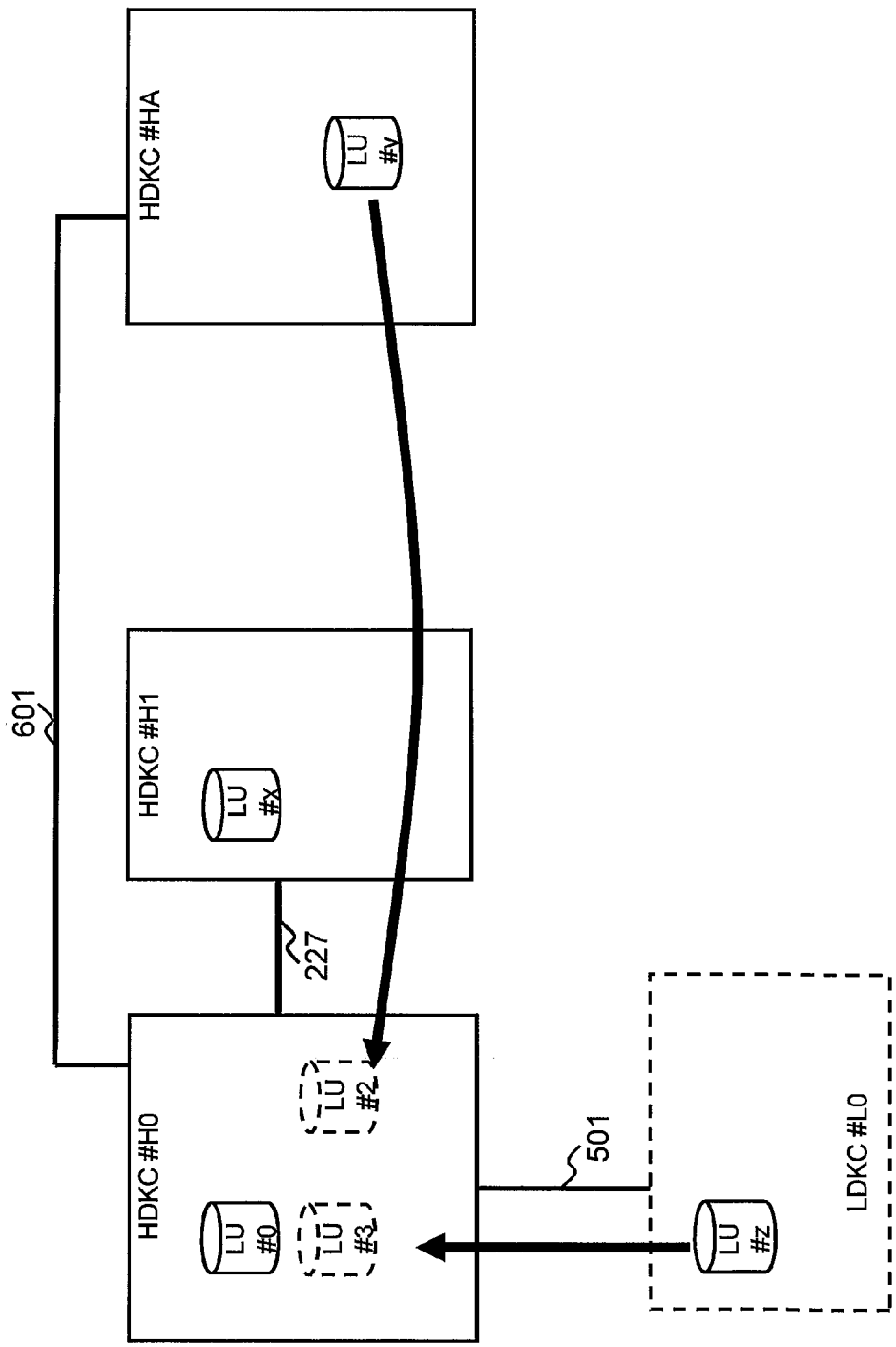
FIG. 6 shows HDKCs to which a first coupling medium, a second coupling medium, and a third coupling medium are all coupled.

FIG. 6 shows the HDKC #H0, which is coupled to all of the first coupling medium, the second coupling medium, and the third coupling medium.

The HDKC #H1 is coupled to the HDKC #H0 via the first coupling medium (the internal bus) 227, the LDKC #L0 is coupled to the HDKC #H0 via the second coupling medium (the external bus) 501, and the HDKC #HA is coupled to the HDKC #H0 via the third coupling medium (the external bus) 601.

The HDKC #H0 comprises the following LUs.
LU #0 based on the RG of the HDKC #H0.
LU #x according to the first coupling mode (the HDKC #H0 can directly access the LU #x inside the HDKC #H1) is mapped in accordance with the first coupling mode).

Virtual LU #3 according to the second coupling mode (the virtual LU to which an external LU #z (the external LU inside the LDKC #L0) is mapped in accordance with the second coupling mode)

Virtual LU #2 according to the third coupling mode (the virtual LU to which an external LU #y (the external LU inside the HDKC #HA) is mapped in accordance with the third coupling mode).

For example, the following can be said with respect to the multiple LUs described above.

At least one of the LUs #0; x, #2 and #3 may be the LU (for example, the DP-LU) that is recognized from the server and the LU (for example, a pool LU) that is not recognized from the server.

At least one of the LUs #x, #y and #z may be the DP-LU.

At least one of the LUs #x and #y may be the virtual LU according to the second coupling mode (the virtual LU to which the external LU is mapped in accordance with the second coupling mode).

<Management Information>

Figure 7:
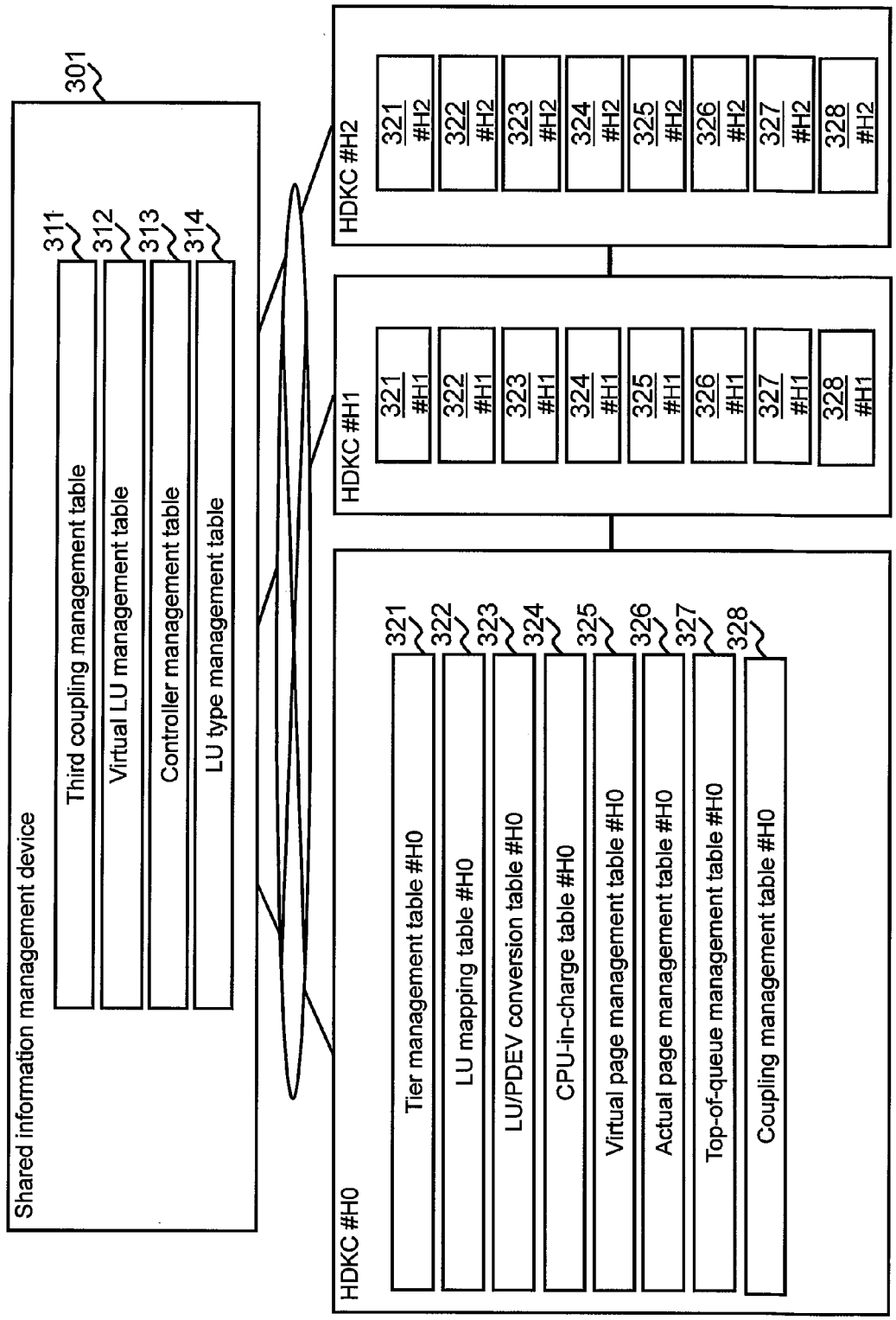
FIG. 7 shows an example of storage system-held management information.

FIG. 7 shows an example of management information of the storage system 110.

The management information is information that the storage system 110 manages. All of the HDKCs may store all the types of management information. The contents of the management information may be the same for all the HDKCs or it may differ for each HDKC. For example, a first type of management information stored by a first HDKC may comprise only information related to the first HDKC, and it need not comprise information that is not related to the first HDKC.

There may be management information that a storage area capable of being shared by multiple HDKCs may store, and there may be management information that individual HDKCs may store to prevent a drop in access performance.

According to FIG. 7, a device (a shared information management device) 301, which comprises a storage resource that multiple HDKCs are able to share, is coupled to multiple HDKCs. The shared information management device 301 is able to store the following management information.

A third coupling management information table 311, which comprises third coupling mode-related information (for example, the order of the HDKCs, the distance between each HDKC, and the status of each HDKC (normal or blocked)).

A virtual LU management table 312, which comprises virtual LU-related information (for example, information comprising whether the external LU is mapped according to the second or the third coupling mode, and the ID of the DKC that comprises this external LU for each virtual LU).

A controller management table 313, which comprises information related to the internal controller of each HDKC (for example, information denoting the performance of the internal controller (for example, high speed, medium speed or low speed))

An LU type management table 314, which comprises information related to multiple LU types (for example, information denoting the type of PDEV that constitutes the basis of a LU (for example, SSD, SAS, or SATA)) for each LU The shared information management device 301 has a management software which manages and controls the various management information. Each HDKC may only access the shared information management device 301 when necessary (for example, when a LU has been added to the HDKC, when a virtual LU according to either the second or the third coupling mode has been added to the HDKC, and when the number of HDKC that are coupled using either the second or the third coupling mode has increased).

In addition, according to FIG. 7, individual HDKCs, for example, are able to store the following management information:

A tier management table 321, which comprises tier-related information;
a LU mapping table 322, which comprises information denoting the corresponding relationship of the LUs;
a LU/PDEV conversion table 323, which comprises information denoting the corresponding relationship between the LUs and PDEVs;
a CPU-in-charge table 324, which comprises information denoting which CPU is in charge of I/O with respect to which LU;
a virtual page management table 325, which comprises information related to a virtual page that configures a DP-LU;
an actual page management table 326, which comprises information related to an actual page that configures a pool;
a top-of-queue management table 327, which comprises a pointer for the initial entry in the queue that manages unallocated actual pages; and
a coupling management table 328, which comprises information related to the coupling of DKCs.

These tables 321 through 328 may be accessed by the CPU inside a HDKC more frequently than the tables 311 through 314 that the shared information management device 301 stores. The CPU inside a HDKC is able to access the tables 321 through 328 that this HDKC stores. In addition, the CPU inside a HDKC may be able to access a table inside a HDKC that is coupled to this HDKC via the first coupling medium, but may not be able to access a table inside a HDKC that is coupled to this HDKC via the third coupling medium.

Although not shown in the drawing, each HDKC may also store a LU management table, which comprises information related to the LU of this HDKC (for example, a LU ID, a LU type, and a storage capacity for each LU). As LU types, for example, there may be an ordinary LU (a LU based on the RG inside the HDKC), a virtual LU, and a DP-LU (a LU according to Dynamic Provisioning (Thin Provisioning)). The LU ID, for example, may be a LUN (Logical Unit Number), which is the identification information that a server uses, identification information that the server does not use (a volume ID), or a combination of these.

In the case of a HDKC that does not comprise a DP-LU, the storage resource inside this HDKC need not store the tables 325 through 327.

All of the tables 321 through 328 may be stored in the same storage resource (for example, the CM (the SM area)), or tables 321 through 328 may be distributed among multiple storage resources (for example, the LM and the CM (the SM area)). In addition, in the HDKC unit, the storage resource inside a certain HDKC may store a portion of the tables 321 through 328, and the storage resource inside another HDKC may store a portion of the tables 321 through 328.

A storage resource of the LDKC (for example, the LM or CM (SM area)) may also store management information, for example, a LU/PDEV conversion table (a table comprising information that denotes the relationship between the LU inside the LDKC and the PDEV inside the LDKC) that is required for this LDKC. Also, in a case where the external LU inside the LDKC is a DP-LU, the storage resource of this LDKC is able to store a virtual page management table and an actual page management table.

In a case where the DKC comprises multiple pools, there may be an actual page management table for each of the pools in this DKC. Furthermore, the HDKC unit 141 integratively manages multiple internal volumes (a volume configured on the basis of a storage area provided from either one or multiple storage medium(s) inside the device itself) and/or multiple storage areas of a logical volume (a LU provided from the other HDKC unit 141 or the LDKC 151).

Numerous management information will be explained in detail hereinbelow by referring to the drawings.

<Coupling Management Table 328>

FIG. 8 shows the configuration of a coupling management table 328 (for example, #H0).

The coupling management table #H0, for example, comprises the following information for the HDKC #H0 and each DKC that is coupled thereto:

A DKC ID 801, which is the DKC identifier;
a coupling medium 802, which denotes the type of medium via which the HDKC #H0 is to be coupled; DKC type 803, which denotes the type of DKC (performance and/or functionality); and
a coupling mode 804, which denotes the mode of the coupling to the HDKC #H0.

The respective information in this table #H0 may be set by an administrator, or may be set in accordance with processing (Refer to FIG. 16) performed by a control program (a computer program that the CPU #H0 executes).

According to FIG. 8, the coupling medium 802 and the coupling mode 804 corresponding to the HDKC #H0 both denote "own device", which signifies that the DKC corresponding thereto is the HDKC #H0 (the DKC corresponding to the coupling management table #H0 itself).

Furthermore, according to FIG. 8, it is clear that the HDKC #H1 is coupled to the HDKC #H0 using the first coupling mode, and the LDKC #L0 is coupled to the HDKC #H0 using the second coupling mode, and the HDKC #H3 is coupled to the HDKC #H0 using the third coupling mode.

<Tier Management Table 321>

FIG. 9A shows the configuration of the tier management table 321 (for example, #H0).

The tier management table #H0, for example, comprises the following information for each LU:

An RG ID 901, which is the identifier of the RG that constitutes the basis of the LU;
a LU ID 902, which is the LU identifier;
a coupling mode 903, which is a pointer corresponding to the coupling mode to which the LU conforms;
a PDEV type 904, which is a pointer corresponding to the type of PDEV on which the LU is based; and
a tier level 905, which is a value (for example, the total of the coupling mode 903 and the PDEV type 904) computed on the basis of the coupling mode 903 and the PDEV type 904.

The RG ID 901, for example, may be a value signifying the fact that the LU is a DP-LU.

The PDEV type 904, for example, may be a value signifying the fact that the LU is a DP-LU, or it may be a pointer based on the PDEV type 904 corresponding to at least one pool LU of one or more pool LUs that configure the pool with which the DP-LU is associated. In a case where the LU is a virtual LU, the PDEV type 904 may be a pointer according to the type of PDEV that constitutes the basis of the external LU mapped to this virtual LU.

The level of importance of the data and the access characteristics (for example, the I/O frequency) with respect to a LU (for example, an ordinary LU, a DP-LU, or a virtual LU mapped to an external LU) will differ in accordance with the type of the server 101 and/or the application 111. Furthermore, the LU access performance and/or costs of a LU of the present application (for example, an ordinary LU, a DP-LU, or a virtual LU mapped to an external LU) will differ in accordance with the different tiers (for example, either the tier level or the tier level range described hereinbelow). Therefore, in order to realize appropriate access performance and/or costs in accordance with the type of sever 101 and/or application 111, it is preferable that either the administrator or the computer system (for example, the HDKC unit 141, the HDKC and/or the management device 301) selectively allocate a LU (for example, an ordinary LU, a DP-LU, or a virtual LU mapped to an external LU) of a tier (for example, either a tier level or a tier level range) that corresponds to the type of the server 101 and/or the application 111. For example, it is preferable that the administrator select and allocate a LU that belongs to a higher-level tier (for example, a tier level or a tier level range) to an operating mail server or application (for example, an electronic mail server or application) or a server and application that carry out other critical online accesses, select and allocate a LU that belongs to a mid-level tier to a server or application that carry out online accesses that are less critical in nature, and select and allocate a LU that belongs to a lower-level tier (a tier level or a tier level range) to a mail archiving/backup server or application.

Furthermore, the level of importance and/or access characteristics (for example, the I/O frequency) will differ in accordance with the data or file being accessed even when the server 101 and the application 111 are of the same type. Therefore, in order to realize the appropriate access performance and/or costs in accordance with the level of importance and/or access characteristics of the data or file, it is preferable that the administrator and computer system (for example, the HDKC unit 141, the HDKC and/or the management device 301) select and allocate a LU (for example, an ordinary LU, a DP-LU, or a virtual LU mapped to an external LU) that belongs to an appropriate tier (a tier level or a tier level range) that corresponds to the level of importance and/or access characteristics of the data or file. For example, it is preferable to select and allocate a LU that belongs to a higher-level tier for data with a high level of importance and/or a high I/O frequency, it is preferable to select and allocate a LU that belongs to a mid-level tier for data of medium level importance and/or I/O frequency, and it is preferable to select and allocate a LU that belongs to a lower-level tier for data with a low level of importance and/or I/O frequency.

Furthermore, as used here, the higher-level tier and the lower-level tier may be a relatively higher-level or lower-level tier, the higher-level tier may be either a tier level or a tier level range that is higher than either a first tier level or a first tier level range, and the lower-level tier may be either a tier level or a tier level range that is lower than either a second tier level or a second tier level range (where the second tier level may be equal to or lower than the first tier level, and the second tier level range may be equal to or lower than the first tier level range).

According to this table #H0, it is also possible to compute by RG the tier level for each RG by computing the tier level (for example, the total of one or more LU tier levels) based on the tier level of one or more LUs that are based on this RG. Furthermore, the RG tier level may be determined using a method other than the method for using the tier levels of one or more LUs that are based on this RG.

In this embodiment, the "tier" is a LU tier. In this embodiment, a value called a "tier level" is computed for a LU. From among multiple tiers, the tier corresponding to the computer tier level is the tier to which the LU belongs. The tier level, for example, can also be referred to as a value that denotes the magnitude of the LU I/O performance (for example, the size of the data capable of being input/output per unit of time, or the response time).

There may be one tier for one tier level, for one range of tier levels, or a combination thereof. There may be a range of multiple tier levels of the same size, or there may be a range of multiple tier levels of different sizes. In this embodiment, the smaller the tier level, the higher the tier. However, the relationship between the size of the tier level and the height of the tier is not limited thereto. For example, it may also be such that the smaller the tier level, the lower the tier.

The LU tier level depends on one or more factors (hereinafter, performance factors) that affect the I/O performance of this LU. Specifically, for example, in this embodiment, the tier level is a value (for example, a total), which is computed by using one or more points corresponding to one or more performance factors. The one or more performance factors of the LU according to the example given in FIG. 9A are the coupling mode (that is, the mapped LU inside the DKC that is coupled to the HDKC #H0 via which coupling mode) and the PDEV type (the type of PDEV on which the LU is based).

The corresponding relationships between the performance factors given as examples in FIG. 9A and their points are shown in FIG. 9B.

According to FIG. 9B, the more advantageous a performance factor is for I/O performance, the fewer the points. For this reason, the tier level will differ in a case where the coupling mode differs even though the PDEV type is the same, and in a case where the PDEV type differs even though the coupling mode is the same.

According to FIG. 9B, of the first through the third coupling modes, I/O performance is more advantageous in the first coupling mode, followed by the third coupling mode and the second coupling mode in that order. However, for example, in a case where the performance and/or functionality of the DKC that is coupled to the HDKC using the second coupling mode is/are the same as that/those of the HDKC, the points for the second coupling mode may be the same as the points for the third coupling mode.

According to FIG. 9B, the PDEV type 904 is also a value that corresponds to the I/O performance of the PDEV. For example, there are less points for the SSD than there are for the SAS-HDD, and there are less points for the SAS-HDD than there are for the SATA-HDD.

Furthermore, the PDEV type 904 may be determined on the basis of the RAID level (this may also include a combination such as 3D+1P) of this RG in addition to the type of the PDEV that configures the RG constituting the basis of the LU corresponding thereto. In this case, for example, since the RAID 5 performance level is higher than that of the RAID 3, RAID 5 has fewer points than RAID 3. Furthermore, the PDEV type 904 may be determined on the basis of the RAID level (may also include a combination, such as 3D+1P) of an RG instead of the type of media configuring this RG, which is based on the LU corresponding thereto.

In a case where (a) there is not enough of a difference to change the tier level with respect to a performance factor other than the coupling mode (may include the DKC performance) and the PDEV type, or (b) the tier level is determined based solely on the coupling mode (may include the DKC performance) and the PDEV type, the LU tier level decreases in the order stated below. That is, of the following LUs (1) through (3), LU (1) has the lowest tier level and is defined as a higher-level tier, LU (2) has the next lowest tier level and is defined as a mid-level tier, and LU (3) has the highest tier level and is defined as a lower-level tier. The example used here is one in which the DKC that comprises the following LUs (1) through (3) is the HDKC #H0 shown in FIG. 6.
  (1) A LU, which is based on the RG inside the DKC itself (HDKC #H0), and which is provided to the server from the DKC itself (for example, LU #0).
  (2) A LU, which is a virtualization of a LU (for example, LU #y) inside another HDKC (for example, HDKC #HA), and which is provided to the server from the DKC itself (for example, LU #2).
  (3) A LU, which is a virtualization of a LU (for example, LU #z) inside the LDKC (for example, LDKC #L0), and which is provided to the server from the DKC itself (for example, LU #3).

In FIG. 6, because the HDKCs #H0 and #H1 configure the same HDKC unit, the LU #0 and the LU #1, which is the virtualization of LU #x, are the same tier level when either of the above-mentioned conditions (a) or (b) are satisfied.

Furthermore, the reason why the tier level for LU (2) is lower than that for LU (3) (the reason why LU (2) is advantageous from the standpoint of I/O performance) is because the DKC that comprises the external LU mapped to the LU (2) (virtual LU) has higher performance and/or functionality than the DKC the comprises the external LU mapped to the LU (3) (virtual LU).

In a case where either of the above-mentioned conditions (a) or (b) is satisfied, the present invention, for example, may by applicable to at least one of the cases of the following (A) through (G). Also, due to the fact that at least one HDKC executes the characteristic processing that will be described hereinbelow (for example, the processing described using FIG. 16), the present invention may be applicable to at least one case of the following (H) through (M) either instead of or in addition to at least one case of the following (A) through (G).

(A) In FIG. 6, a case in which it is possible for any of the HDKC #H0-provided LU #0, LU #3 and LU #2 (the above-mentioned LUs (1) through (3)) to become the I/O destination (the target of a data read and/or write) in accordance with an I/O command from the server.
  (B) In FIG. 6, a case in which the HDKC #H0 does not comprise a LU like LU #0 (a LU based on the RG inside the HDKC #H0). In case (B), for example, the HDKC #H0 does not comprise the LU #0 of the LUs #0 through #3. Furthermore, in this case (B) and at least one of the cases described hereinbelow (for example, at least one case in which a LU like LU #0 is not included), the HDKC #H0 may be a storage control apparatus that does not comprise a PDEV, for example, an intelligent switch comprising a storage virtualization function.
  (C) In FIG. 6, a case in which the HDKC #H0 either is not coupled to the HDKC #H1, or does not comprise a virtual LU like the LU #1 (a virtual LU that is mapped to the LU inside the HDKC coupled using the first coupling mode) even though it is coupled to the HDKC #H1. In case (C), for example, the HDKC #H0 does not comprise the LU #1 of the LUs #0 through #3.
  (D) In FIG. 6, a case which corresponds to the following (d1) and (d2). (d1) The HDKC #H0 does not comprise a LU like the LU #0. (d2) The HDKC #H0 either is not coupled to the HDKC #H1, or does not comprise a virtual LU like the LU #1 even though it is coupled to the HDKC #H1. In case (D), fat example, the HDKC #H0 does not comprise the LUs #0 and #1 of the LUs #0 through #3.
  (E) In FIG. 6, a case in which the HDKC #H0 either is not coupled to the LDKC #L0 or does not comprise a virtual LU like the LU #3 (a virtual LU that is mapped to the LU inside the LDKC coupled using the second coupling mode) even though it is coupled to the LDKC #L0. In case (E), for example, the HDKC #H0 does not comprise the LU #3 of the LUs #0 through #3.
  (F) In FIG. 6, a case that corresponds to the following (f1) and (f2). (f1) The HDKC #H0 does not comprise a LU like the LU #0. (f2) The HDKC #H0 either is not coupled to the LDKC #L0 or does not comprise a virtual LU like the LU #3 even though it is coupled to the LDKC #L0. In case (F), for example, the HDKC #H0 does not comprise the LUs #0 and #3 of the LUs #0 through #3.
  (G) In FIG. 6, a case that corresponds to the following (g1) and (g2). (g1) The HDKC #H0 either is not coupled to the HDKC #L1 or does not comprise a virtual LU like the LU #1 even though it is coupled to the HDKC #H1. (g2) The HDKC #H0 either is not coupled to the LDKC #L0 or does not comprise a virtual LU like the LU #3 even though it is coupled to the LDKC #L0. In case (G), for example, the HDKC #H0 does not comprise the LUs #1 and #3 of the LUs #0 through #3.
  (H) In FIG. 6, a case in which the HDKC #H0 either is not coupled to the HDKC #HA, or does not comprise a virtual LU like the LU #2 (a virtual LU that is mapped to the LU inside the HDKC coupled using the third coupling mode) even though it is coupled to the HDKC #HA. In case (H), for example, the HDKC #H0 does not comprise the LU #2 of the LUs #0 through #3.
  (I) In FIG. 6, a case which corresponds to the following (i1) and (i2). (i1) The HDKC #H0 either is not coupled to the HDKC #HA, or does not comprise a virtual LU like the LU #2 even though it is coupled to the HDKC #HA. (i2) The HDKC #H0 either is not coupled to the HDKC #H1, or does not comprise a virtual LU like the LU #1 even though it is coupled to the HDKC #H1. In case (I), for example, the HDKC #H0 does not comprise the LUs #1 and #2 of the LUs #0 through #3.
  (J) In FIG. 6, a case which corresponds to the following (j1) and (j2). (j1) The HDKC #H0 either is not coupled to the HDKC #HA, or does not comprise a virtual LU like the LU #2 even though it is coupled to the HDKC #HA. (j2) The HDKC #H0 either is not coupled to the LDKC #L0, or does not comprise a virtual LU like the LU #3 even though it is coupled to the LDKC #L0. In case (J), for example, the HDKC #H0 does not comprise the LUs #2 and #3 of the LUs #0 through #3.
  (K) In FIG. 6, a case that corresponds to the following (k1) through (k3). (k1) The HDKC #H0 either is not coupled to the HDKC #HA, or does not comprise a virtual LU like the LU #2 even though it is coupled to the HDKC #HA. (k2) The HDKC #H0 either is not coupled to the HDKC #H1, or does not comprise a virtual LU like the LU #1 even though it is coupled to the HDKC #H1. (k3) The HDKC #H0 either is not coupled to the LDKC #L0 or does not comprise a virtual LU like the LU #3 even though it is coupled to the LDKC #L0. In case (K), for example, the HDKC #H0 does not comprise the LUs #1, #2 and #3 of the LUs #0 through #3.
  (L) In FIG. 6, a case that corresponds to the following (l1) and (l2). (l1) The HDKC #H0 does not comprise a LU like LU #0. (l2) The HDKC #H0 either is not coupled to the HDKC #HA or does not comprise a virtual LU like LU #2 even though it is coupled to the HDKC #HA. In case (L), for example, the HDKC #H0 does not comprise the LUs #0 and #2 of the LUs #0 through #3.
  (M) In FIG. 6, a case that corresponds to the following (m1) and (m2). (m1) The HDKC #H0 does not comprise a LU like the LU #0. (m2) The HDKC #H0 either is not coupled to any two of the DKCs #H1, #HA and #L0, or does not comprise two virtual LUs like any two of the LUs #1 through #3 even though it is coupled to any two of the DKCs #H1, #HA and #L0. Incase (M), for example, the HDKC #H0 does not comprise the LU #0 of the LUs #0 through #3, and, in addition, does not comprise any two of the LUs #1 through #3.

Therefore, according to this embodiment, it is possible to provide the following storage system, first storage controller and/or first storage control unit anew. This storage system comprises either a first storage controller (for example, the processor 222, the controller 211 or the HDKC 201) or a first storage control unit (for example, the HDKC unit 141), and either a second storage controller (for example, the processor 222, the controller 211 or the HDKC 201) or a second storage control unit (for example, the HDKC unit 141). This first storage control unit comprises the above-mentioned first storage controller for controlling data received from a higher-level device and addressed to a first logical unit (LU). Furthermore, the above-mentioned second storage control unit comprises the above-mentioned second storage controller for controlling data received from either the above-mentioned first storage controller or first storage control unit and addressed to a second LU address, and multiple storage mediums (for example, RG 231) for storing the data in accordance with the control of this second storage controller. The above-mentioned first storage controller exercises control so as to manage the tier level of the above-mentioned first LU in accordance with the performance of the above-mentioned second storage controller, and to send the data received from the above-mentioned higher-level device and addressed to the above-mentioned first LU, to the above-mentioned second LU in accordance with processing such as the referencing and/or updating of the data by an application of a type suitable for the tier level of the above-mentioned first LU.

In FIG. 6, at least one of the LUs #0 through #3 that the HDKC #H0 provides to the server may be an ordinary LU or a DP-LU.

The "ordinary LU" may be a LU for which a storage area, which has a capacity equivalent to the capacity of the LU when the LU was created, is allocated from the RG. The ordinary LU may be also be a virtual LU to which an external LU is mapped.

The "DP-LU" is a virtual LU that is partitioned into multiple virtual pages. In a case where the DKC has received a write command specifying an address belonging to an unallocated virtual page (a virtual page to which an actual page has not been allocated), the DKC is able to allocate an unallocated actual page (an actual page that has not been allocated to a virtual page) from the pool to this unallocated virtual page. The pool, for example, may be configured from an ordinary LU (a pool LU) that is based on one or more RG. The pool may exist in plurality. Each pool LU may be partitioned into two or more actual pages. The virtual page is a virtual storage area, and the actual page is a storage area that configures the pool.

Therefore, with the exception of a state in which respective actual pages have been allocated to all virtual pages configuring the DP-LU, the total capacity of the actual page allocated to the DP-LU is smaller than the capacity of the DP-LU (the virtual capacity). The DKC is able to consolidate the management of multiple actual pages in the form of a pool. One actual page may be based on multiple PDEVs that configure one or more RGs. Data written to the actual page may be written to the multiple PDEVs configuring this RG in accordance with the RAID level of the RG constituting the basis of this actual page.

Furthermore, either one or multiple DP-LUs may be associated with a single pool, and an actual page may be allocated to the DP-LU from the pool that is associated with this DP-LU. Also, the actual page to be allocated from the pool may be an actual page based on a RG that differs from the RG constituting the basis of the actual page that was allocated n-times before (where n is a natural number) (for example, n may equal 1). Specifically, for example, the RG that constitutes the basis of the actual page to be allocated may be switched in round-robin style. In accordance with this, it is possible to avoid the convergence of I/Os with respect to a specific RG, thereby promising enhanced I/O performance in the DKC. In a case where the multiple LUs that configure one pool belong to multiple different tiers, actual pages may be allocated by tier from a RG that differs from the RG constituting the basis of the actual page that was allocated n-times before. In a case where either a DP-LU or a group of DP-LUs (DP-LU group) associated with one pool belongs to tiers that differ for each either DP-LU or DP-LU group (for example, a case in which either a first DP-LU or a first DP-LU group belongs to a first tier, and either a second DP-LU or a second DP-LU group belongs to a second tier), an actual page may be allocated by tier from a RG that differs from a RG that is the basis of an actual page that was allocated n-times before (For example, for either the first DP-LU or the first DP-LU group, the RG that is the basis of an actual page to be allocated is shifted using the round robin mode within a range of multiple RGs configuring a first tier, and for either the second DP-LU or the second DP-LU group, the RG that is the basis of an actual page to be allocated is shifted using the round robin mode within a range of multiple RGs configuring a second tier.) Furthermore, when applying the round robin mode, the shifting of the RG that constitutes the basis of the actual page to be allocated is not limited to a single RG, but rather may be shifted in either partial RG units or multiple RG units (RG group units). In a case where shifting is in multiple RG units, it is possible to avoid I/Os being concentrated on specific multiple RG units (RG group units) in accordance with the processor 222 of the HDKC unit 141, the HDKC or the LDKC 151 allocating either one or multiple actual pages from other multiple RG units (RG group units) subsequent to having allocated either one or multiple actual pages from certain multiple RG units (RG group units), thereby making it possible to enhance the I/O performance of the DKC.

Furthermore, each virtual page of one or multiple DP-LUs is able to be mapped in accordance with the access characteristic of each virtual page to an actual page that corresponds to a storage medium that is suitable for this access characteristic. Or, it is also possible to change the mapping in accordance with the access characteristic of each virtual page from an actual page that corresponds to a storage medium that is unsuitable for this access characteristic to an actual page that corresponds to a storage medium that is suitable for this access characteristic. As used here, the access characteristic, for example, is the type of access of each virtual page (either a random access or a sequential access, or a type such as the access source server 101 or application 111 described hereinabove), either the I/O frequency or the write frequency of each virtual page, or the frequency at which data written to each virtual page is written from the cache memory 224 to a storage medium corresponding to an actual page mapped to the virtual page, or the frequency at which the data, which is to be written or read to each virtual page, is either written or read between the cache memory 224 and the storage medium corresponding to the actual page that is mapped to the virtual page. In accordance with this, the multiple tiers of this embodiment (for example, either the tier level or the tier level range) are managed for each virtual page of either one or multiple DP-LUs, and can be seen as tier technology for each virtual page of either one or multiple DP-LUs rather than the LU tier technology as described hereinabove. However, in a case where each virtual page is mapped in accordance with the access characteristic of each virtual page to an actual page corresponding to a storage medium that is suitable for this access characteristic, the tier technology is for each virtual page, but in a case where the actual page mapped to a virtual page in accordance with the access characteristic of each virtual page changes, since the relationship between the LU and the tier has been set beforehand, the LU tier technology is applied when creating a DP-LU, and thereafter the tier technology for each virtual page is applied in accordance with changing the actual page that is mapped to the virtual page in accordance with the access characteristic.

Furthermore, in this embodiment, an actual page is allocated, according to a write command from the server, to the virtual page to which the address specified in this write command belongs, but the present invention is not limited to an example in which actual pages are not allocated to all the areas of DP-LU when, for example, the DP-LU is created. For example, the examples given below may also apply to the present invention. The capacity that is actually used in any of the examples cited below can be reduced.

FIRST EXAMPLE

A storage area (for example, a physical page) may be allocated beforehand (prior to a write command with respect to the DP-LU being received from the server) to at least one virtual page (or a portion of the area comprising the virtual page) of multiple virtual pages configuring the DP-LU. That is, pre-allocation may be performed. In a case where the already allocated storage area is insufficient and additional storage area is needed to store data according to a write command, the DKC (internal controller) may additionally allocate a storage area to the DP-LU from the pool.

SECOND EXAMPLE

Either an actual page or a control area in which is stored zero data (for example, data that is configured from the bit value "0") may be tentatively allocated beforehand (prior to a write command being received from the server with respect to a DP-LU) to at least one virtual page of the multiple virtual pages that configure this DP-LU. That is, a tentative allocation may be performed. The zero area (the actual page or control area in which the zero data is stored), for example, may be an area on a storage device such as a SSD. The DKC (internal controller), upon receiving a write command, may change the storage area to be allocated to the write-destination virtual page from the zero area to the actual page in which the data is to be stored. That is, an actual allocation may be performed. The DKC (internal controller), upon having received from the server a read command specifying an address belonging to a virtual page for which this actual allocation has not been completed, may respond to the server with the zero data inside the zero area allocated to this virtual page.

<Variation of the Tier Management Table>

As a performance factor affecting the tier level, one or more other performance factors may be used either instead of or in addition to at least one of the coupling mode and the PDEV type. These one or more other performance factors will be explained hereinbelow.

FIG. 10 shows an expanded tier management table 321 (for example, #H0). The table 321 shown in FIG. 10 is a variation of the table 321 shown in FIG. 9A. In this embodiment, the table 321 referenced by the HDKC may be the table 321 shown in FIG. 9A, the table 321 shown in FIG. 10, or a table according to another variation of the table 321 shown in FIG. 9A.

According to FIG. 10, the expanded tier management table #H0, for example, comprises information 1001 through 1010 for each LU of the HDKC #H0. The information 1001, 1002 and 1006 is the same as the information 901, 902 and 904 shown in FIG. 9A. The information 1003 through 1005, and 1007 through 1010 is as follows. The corresponding relationship between the performance factors given as examples in FIG. 10 and the points with respect thereto is shown in FIG. 11.

A third coupling mode 1003 is points based on whether or not the LU is a virtual LU according to the third coupling mode.

A second coupling mode 1004 is points based on whether or not the LU is a virtual LU according to the second coupling mode.

A pre-cache 1005 is points based on whether or not the HDKC #H0 uses the pre-cache function.

A cascade difference 1007 is points based on the number of HDKC units (number of steps) through which data must pass for an I/O with respect to the LU.

A distance (a command response time) 1008 is points based on a total distance (the total length of one or more second and/or third coupling mediums through which data passes for an I/O to the LU), a command sending time (the time it takes from when the HDKC #H0 issues a command to another DKC until the other DKC receives the command), a command response time (the time it takes from when the HDKC #H0 issues a command to another DKC until a response thereto is received), and/or a command processing time (the time it takes from when the HDKC #H0 issues a command to another DKC until the other DKC executes processing of the command and receives a completion response thereto).

A controller performance 1009 is points based on the performance and/or functionality of the internal controller.

A tier level 1010 is a value computed on the basis of the information 1003 through 1009 (for example, the total of the information 1003 through 1009).

The information 1003 and 1004 is an extension of the coupling mode 903 shown in FIG. 9A. In a case where the LU identified from the I/O command received by the HDKC #H0 is a virtual LU, I/O-target data for an I/O with respect to the external LU (in a case where this external LU is also a virtual LU, the LU that is mapped to this external LU), which is mapped to this virtual LU, may pass through one or more coupling mediums (one or more first coupling mediums, one or more second coupling mediums, one or more third coupling mediums, or two or more different types of coupling mediums from thereamong). The I/O performance will differ in accordance with the type (and/or number) of coupling mediums through which the data passes. For this reason, the information 1003 and 1004 is provided.

The third coupling mode 1003 (points) in a case where the data either does not pass through any coupling medium (the DKC itself) or passes through the first coupling medium is smaller than the third coupling medium 1003 (points) in a case where the data passes through the third coupling medium. The third coupling medium 1003 (points) may be large in a case where the data passes through both the first and the third coupling mediums.

The second coupling mode 1004 (points) in a case where the data does not pass through the second coupling medium is also smaller than the second coupling medium 1004 (points) in a case where the data passes through the second coupling medium. Also the second coupling medium 1004 (points) in a case where the data passes through the second coupling medium may be larger that the third coupling medium 1003 (points) in a case where the data passes through the third coupling medium.

In the case of the read command, the "pre-cache function" is a function, which, with respect to a read command from the server specifying the virtual LU (the LU inside the HDKC #H0) according to the third coupling mode, returns to the server data that is inside the CM #H0 of the HDKC #H0 without receiving the read-target data from the HDKC comprising the external LU that is mapped to this virtual LU. Furthermore, in the case of the write command, the function is such that a write-complete response is returned to the server in response to a write command from the server specifying a virtual LU (the LU in the HDKC #H0) according to the third coupling mode by writing the data into the CM #H0 of the HDKC #H0 without writing the write-target data to the HDKC comprising the external LU that is mapped to this virtual LU. In a case where the pre-cache function is utilized, write performance and/or read performance is high. For this reason, the pre-cache 1005 (points) in a case where there is a pre-cache function is smaller than the pre-cache 1005 (points) in a case where there is no pre-cache function.

The LU I/O performance (for example, the read performance) may decrease the larger the number of HDKC units (number of steps) through which the data for the I/O passes. For this reason, the cascade difference 1007 (points) may be larger the more numerous the number of HDKC units (number of steps) through which the data passes.

The LU I/O performance (for example, the read performance) may be lower the longer the total distance or command response time is. For this reason, the distance (command response time) 1009 (points) may be larger the longer the total distance (and/or the longer the command response time) is.

To determine the tier level of a LU based on one or more performance factors of this LU, it is necessary to manage information such as that shown in either FIG. 9B or FIG. 11 (that is, information denoting the points corresponding to the value of the performance factor for each type of performance factor). However, in a case where each HDKC manages information related to all the DKCs in the storage system 110, each HDKC manages a large amount of information, and, in addition, updating the information could take up a lot of overhead.

For this reason, information may be divided into information (shared information), which preferably is shared by all HDKCs, and information (individual information), which preferably is managed individually by an HDKC. As described above, the shared information management device 301 (for example, a specific HDKC, a server, or an HDKC management system (a system configured from one or more management computers)) may store the shared information. The HDKC may acquire required shared information from the shared information management device 301 only when the shared information is needed.

For example, in FIG. 6, there may be a case in which, when the distance between the HDKC #H0 and the HDKC #HA is longer than the distance between the HDKC #H0 and the LDKC #L0, the I/O performance of the virtual LU mapped to the external LU inside the LDKC #L0 is the same as or higher than the I/O performance of the virtual LU mapped to the external LU inside the HDKC #HA. According to the expanded tier management table 321, an appropriate tier level can be computed in this case as well.

In FIG. 6, for example, there may also be a case in which, when the distance between the HDKC #H0 and the HDKC #HA is not quite as long as the distance between the HDKC #H0 and the HDKC #H1, and, in addition, the HDKC #HA has extremely higher performance and/or higher functionality than the HDKC #H1, the I/O performance of the virtual LU mapped to the external LU inside the HDKC #HA is the same as or higher than the I/O performance of the virtual LU mapped to the external LU inside the HDKC #H1. According to the expanded tier management table 321, an appropriate tier level can be computed in this case as well.

The variation of the tier management table is not limited to the example shown in FIG. 10. For example, the tier management table may comprise all of a pre-cache 1005, a cascade difference 1007, a distance (command response time) 1008, and a controller performance 1009 in addition to the basic items coupling mode (may include DKC performance) 903 and PDEV type 904.

The tier level may be computed on the basis of only one or two of the pre-cache 1005, the cascade difference 1007, and the distance (command response time) 1008.

The tier level may also be computed solely on a combination of at least one (for example, any one) of the pre-cache 1005, the cascade difference 1007, and the distance (command response time) 1008, and the PDEV type 904.

The tier level may also be computed solely on a combination of at least one (for example, any one) of the pre-cache 1005, the cascade difference 1007, and the distance (command response time) 1008, and at least one (for example, any one) of the coupling mode 903, the controller performance 1009, and the PDEV type 904.

In addition, no matter how the tier level is computed, the present invention may apply to at least one of the above-described cases (A) through (M). For example, in case (M), even though the tier level is computed based solely on the distance (command response time) 1008, it is possible to provide the server with a virtual LU like at least one of the LU #1, the LU #2 or the LU #3 of the appropriate tier level corresponding to the distance (command response time) 1008 as the data read and/or write target.

Furthermore, in a case where a certain HDKC and multiple other HDKCs are coupled, for example, it may be possible for the processor inside this certain HDKC (or, for example, the processor inside the management system coupled to this certain HDKC) to appropriately manage the attribute of the LU tier level and so forth for each other HDKC in accordance with the performance differences between these multiple other HDKCs or the distances from this certain HDKC to the other HDKCs.

Furthermore, in a case where a certain HDKC and multiple LDKCs are coupled, for example, it may be possible for the processor inside this certain HDKC (or, for example, the processor inside a management system coupled to this certain HDKC) to appropriately manage the attribute of the LU tier level and so forth for each LDKC in accordance with the performance differences between these multiple LDKCs or the distances from this certain HDKC to the LDKCs.

For example, at least one of the following may be used as the performance factor:

Whether or not the LU is a DP-LU; and
   the attribute related to the pool that is associated with this
      DP-LU (for example, the PDEV type of the tier (for example, either the tier level or the tier level range) to which the internal volume that configures the pool belongs and the internal volume).

<LU/PDEV Conversion Table 323>

FIG. 12 shows the configuration of the LU/PDEV conversion table 323 (for example, #H0).

The LU/PDEV conversion table #H0, for example, comprises the following information for each LU (typically ordinary LUs) of the HDKC #H0:

A LU ID 1201, which is the identifier of a LU;
a RG ID 1202, which is the identifier of the RG that constitutes the basis of the LU;
a RAID level (combination) 1203, which denotes the RAID level (and combination) of the RG that constitutes the basis of the LU;
a storage capacity 1204 of the LU;
a start address 1205, which denotes the LU start address (the address at the start of this LU) in the storage area of the RG that constitutes the basis of the LU;
a PDEV type 1206, which denotes the type of PDEV configuring the RG that constitutes the basis of the LU; and
a PDEV ID 1207, which is a list of identifiers of one or more PDEVs configuring the RG that constitutes the basis of the LU.

<CPU-in-Charge Table 324>

FIG. 31 shows the configuration of the CPU-in-charge table 324 (for example, #H0).

The CPU-in-charge table #H0, for example, comprises the following information for each LU of the HDKC #H0 (or the HDKC unit that includes the HDKC #0):

A CPU-in-charge ID 3101, which denotes the identifier of the CPU (the CPU-in-charge) that is in charge of processing an I/O command with respect to a LU;
a CPU utilization rate 3102, which denotes the utilization rate (extent of the load) of the CPU-in-charge of the LU; and
a LU ID 3103, which is the LU identifier. The CPU utilization rate 3102, for example, may be updated either regularly or irregularly by each CPU #H0 or by a specific CPU #H0.

<Virtual Page Management Table 325>

FIG. 13 shows the configuration of the virtual page management table 325 (for example, #H0).

The virtual page management table #H0, for example, comprises the following information for each virtual page of the HDKC #H0:

A DP-LU ID 1301, which is the identifier of the DP-LU that comprises a virtual page;
a virtual page address 1302, which denotes the address of the virtual page;
an allocation status 1303, which denotes whether or not a physical page is allocated to the virtual page;
a pool RG ID 1304, which is the identifier of the RG (the pool RG) that constitutes the basis of the actual page allocated to the virtual page; and
an actual page address 1305, which denotes the address of the actual page allocated to the virtual page.

<Actual Page Management Table 326>

FIG. 14A shows the configuration of the actual page management table 326 (for example, #H0).

The actual page management table #H0, for example, comprises the following information for each actual page of the HDKC #H0:

A table pointer 1401, which denotes the address to the row that comprises information related to an actual page;
a pool RG ID 1402, which is the identifier of the pool RG that constitutes the basis of the actual page;
an actual page address 1403, which denotes the address of the actual page;
an allocation status 1404, which denotes Whether or not the actual page is allocated to a virtual page;
a DP-LU 1405, which is the identifier of the DP-LU comprising the allocation-destination virtual page of the actual page; and
an unallocated queue pointer 1406, which denotes the table pointer 1401 of a row related to another unallocated actual page.

The unallocated actual page is managed by a queue (hereinafter, the unallocated queue). The unallocated queue pointer 1406 denotes the table pointer 1401 of the row that corresponds to the unallocated actual page subsequent to the actual page corresponding to this pointer 1406. The CPU #H0 (control program #H0) finds the actual page (the actual page corresponding to the table pointer 1401 that coincides with the pointer of the top-of-queue management table 327 (#H0) shown in FIG. 14B) at the top of the unallocated queue as the actual page to be allocated to the virtual page.

Furthermore, in the unallocated queue, multiple unallocated actual pages may be lined up such that the internal volume (RG) becomes round-robin (refer to the multiple unallocated queue pointers 1406 of FIG. 14A). I/O is performed uniformly with respect to all of the internal volumes, and this makes it possible to avoid the concentration of I/O in only a specific internal volume.

<Dynamic Provisioning (Thin Provisioning)>

Figure 15:
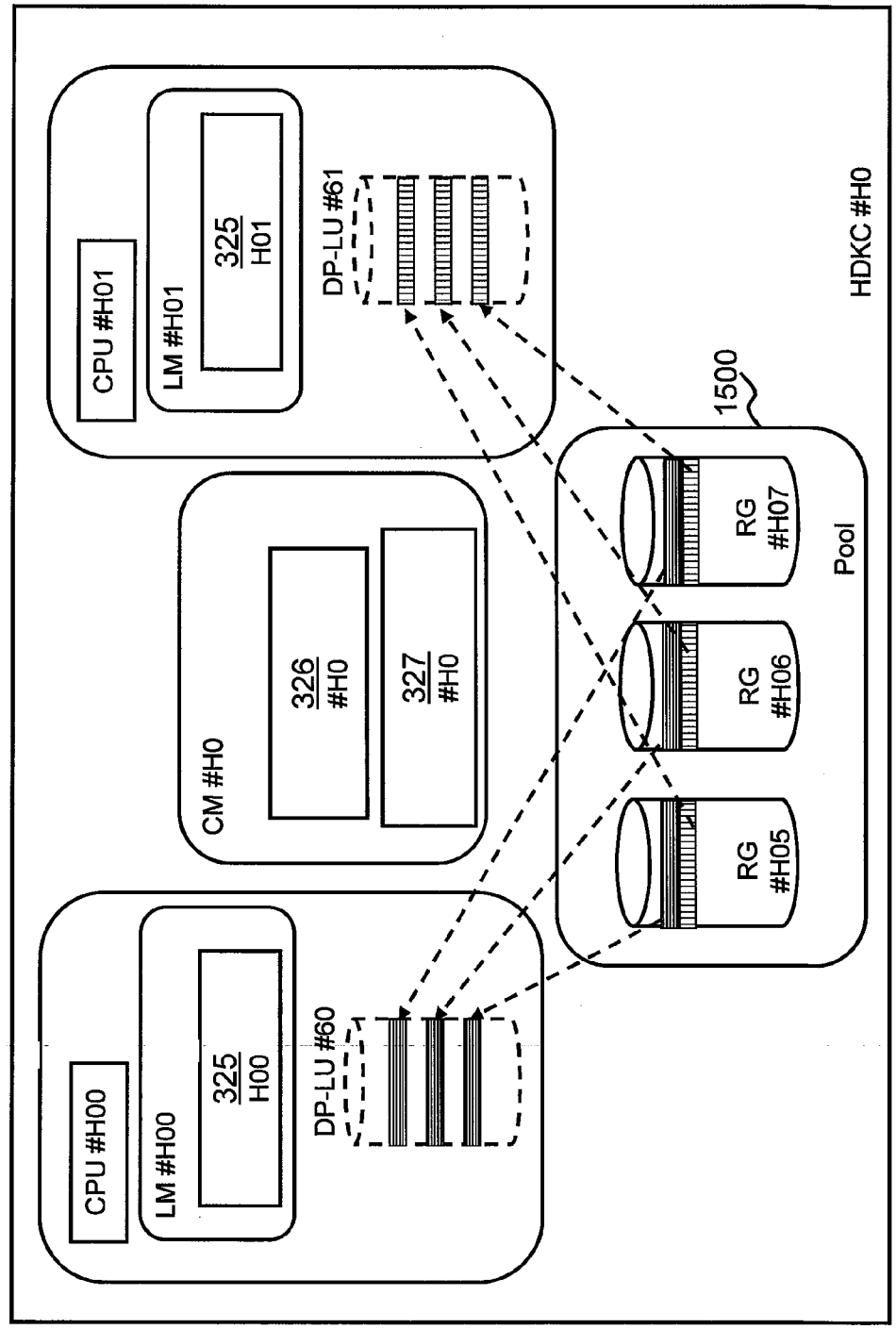
FIG. 15 shows a HDKC in which Dynamic Provisioning (Thin Provisioning) is applied.

FIG. 15 shows a HDKC (#H0) to which Dynamic Provisioning (This Provisioning) is applied.

The HDKC #H0, as also shown in FIG. 2, comprises a CPU #H00 and a CPU #H01. A LM #H00 is coupled to the CPU #H00, and a LM #H01 is coupled to the CPU #H01. Furthermore, both the CPU #H00 and the CPU #H01 are able to access the CM #H0. The CM #H0 is the CMs #H00 and/or #H01 shown in FIG. 2.

A pool 1500 (#H00) is configured from multiple internal volumes. As used here, the "internal volume" is a volume in which physical storage capacity exists, and, for example, may be an ordinary LU, a virtual LU according to the second coupling mode, or a portion or all of a RG. Furthermore, the internal volume is not accessible from the server (is not recognize by the server). In this explanation, it is supposed that the internal volume is a RG.

The DP-LU is a LU that is accessible from the server, the same as an ordinary LU. There is a CPU-in-charge for the DP-LU. According to the example shown in FIG. 15, the CPU #H00 is in charge of the DP-LU #60, and the CPU #H01 is charge of the DP-LU #61.

The LM #H00 stores the virtual page management table 325 (#H00), and similarly, the LM #H01 stores the virtual page management table 325 (#H01). Because the virtual page management table #H00 (#H01) is accessed frequently, it is preferable that only the CPU-in-charge #H00 (#H01) perform referencing and updating, and that exclusive access control not be required to access the table. The virtual page management table #H00 comprises only information related to the DP-LU that is under the charge of the CPU #H00 and the virtual page management table #H01 comprises only information related to the DP-LU that is under the charge of the CPU #H01.

The CM #H0 stores the actual page management table 326 (#H0) and the top-of-queue management table 327 (#H0). In this example, since the pool #H00 is associated with both the DP-LU #60 that is under the charge of the CPU #H00 and the DP-LU #61 that is under the charge of the CPU #H01, the actual page management table #H0 must be able to be referenced and upgraded from all the CPUs (in this example, the CPUs #H00 and #H01). For this reason, the CM #H0 stores the actual page management table #H0 rather than the LMs #H00 and #H01. Furthermore, exclusive access control is exercised with respect to the actual page management table #H0.

<Processing Performed by First Embodiment>

The various processing performed by the first embodiment will be explained hereinbelow.

<<DKC Expansion Process>>

As shown in FIG. 6, HDKC #H01 can be coupled to HDKC #H0 by way of the first coupling medium (the internal bus) 227, HDKC #HA can be coupled to HDKC #H0 by way of the third coupling medium (the external bus) 601, and LDKC #L0 can be coupled to HDKC #H0 by way of the second coupling medium (the external bus) 501. In a case where a new DKC has been coupled to the HDKC #H0, the management information of the HDKC #H0 is updated. The management information may be updated by the administrator, but in this embodiment, this information is updated by the HDKC #H0 as shown in FIG. 16.

Figure 16:
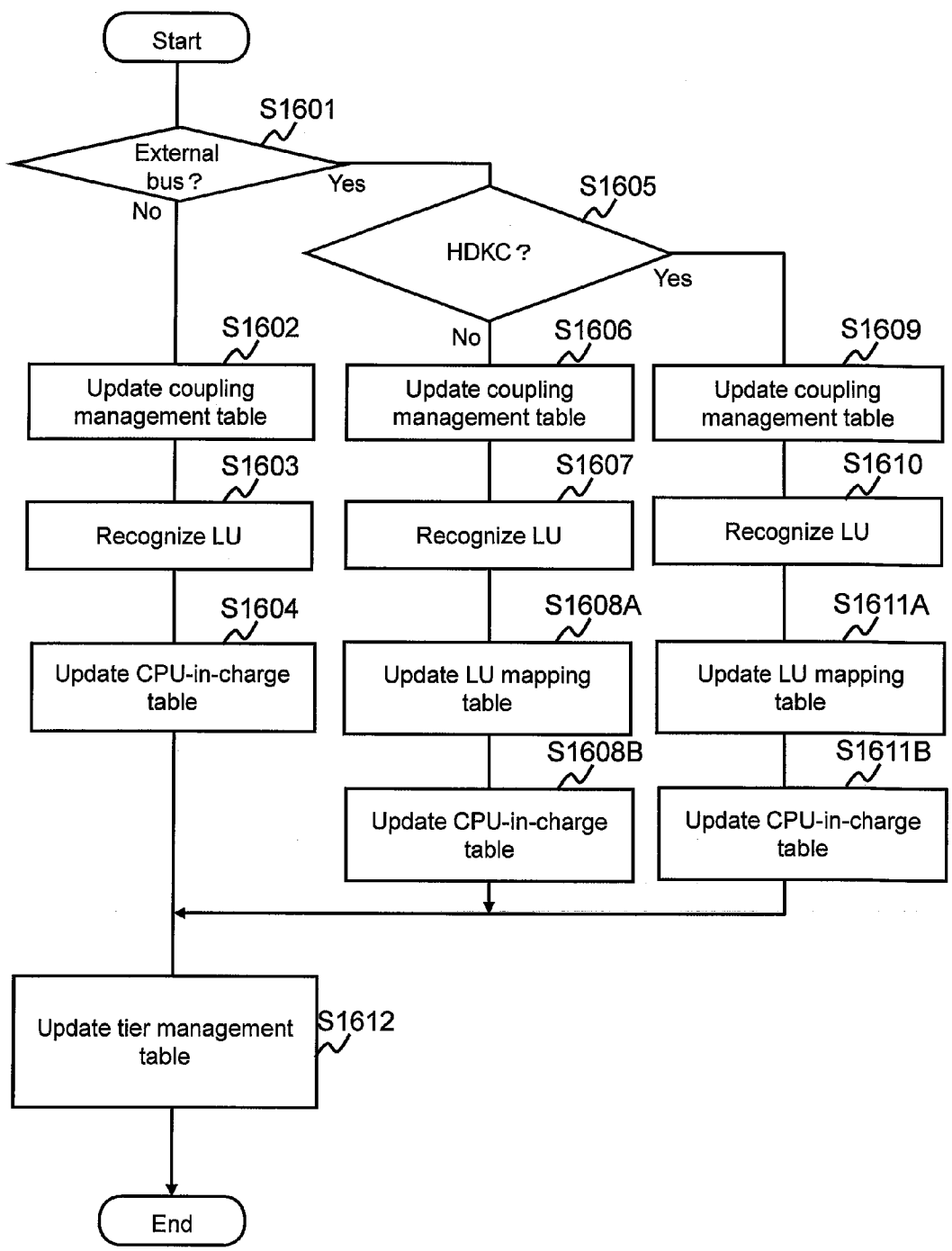
FIG. 16 shows the processing flow of a HDKC-performed DKC expansion process.

FIG. 16 shows the flow of a DKC expansion process performed by the HDKC #H0.

The DKC expansion process may be triggered by a new DKC being coupled to the HDKC #H0 in accordance with any of the first through the third coupling modes. Further, the DKC expansion process may also be performed by the internal controller #H0 (specifically, for example, one or more of the CPUs of the multiple CPUs inside the HDKC #H0). In the explanation of FIG. 16, the newly added DKC will be referred to as the "additional DKC".

In S1601, the internal controller #H0 determines whether or not the medium, which couples the HDKC #H0 and the additional DKC is an external bus. The type of this coupling medium may be identified on the bases of information inputted by the administrator, or this coupling medium type may be detected based on an electrical signal from the port to which this coupling medium is coupled. Furthermore, in S1601, the internal controller #H0 may acquire information denoting the performance and/or functionality of the additional DKC. This information may be inputted by the administrator, or may be received from the additional DKC.

In a case where the result of the determination in S1601 is negative (that is, a case in which the coupling medium is the internal bus) (S1601: No), in Step S1602, the internal controller #H0 updates the coupling management table #H0. Specifically, for example, the internal controller #H0 registers, in the coupling management table #H0 , the additional DKC ID 801, registers "internal bus" as the coupling medium 802, registers "HDKC" as the DKC type 803, and registers "first coupling" as the coupling mode 804.

Next, in S1603, the internal controller #H0 recognizes the LU inside the additional DKC (HDKC). For example, the internal controller #H0 may perform recognition based on the LU management table (not shown in the drawing) that is stored in the memory (for example, either the LM or the CM) inside the additional DKC. Furthermore, in a case where the additional DKC does not comprise a LU, a new LU may be created in the additional DKC, and after the LU has been created, the LU of the additional DKC may be recognized.

Next, in S1604, the internal controller #H0 updates the CPU-in-charge table #H0. Specifically, for example, the internal controller #H0 associates the ID of the LU recognized in S1603 with the ID of the CPU in charge of this LU. The CPU-in-charge of the recognized LU may be the CPU inside the HDKC #H0, or the CPU-in-charge may be the CPU inside the additional DKC. Furthermore, the CPU in charge of the recognized LU may be specified by the administrator, or may be a CPU that is arbitrarily determined by the CPU #H0.

Now then, in a case where the result of the determination of S1601 is affirmative (that is, a case in which the coupling medium is the external bus) (S1601: Yes), the internal controller #H0 determines whether or not the additional DKC is a HDKC in Step S1605. This determination may be made based on information denoting the performance and/or functionality of the additional DKC. This information may be inputted by the administrator, or may be received from the additional DKC.

In a case where the result of the determination of S1605 is negative (that is, a case in which the additional DKC is a LDKC) (S1605: No), in Step S1606, the internal controller #H0 upgrades the coupling management table #H0. Specifically, for example, the internal controller #H0 registers, in the coupling management table #H0, the ID 801 of the additional DKC, registers "external bus" as the coupling medium 802, registers "LDKC" as the DKC type 803, and registers "second coupling" as the coupling mode 804.

Next, in S1607, the internal controller #H0 recognizes the LU inside the additional DKC (LDKC). For example, the internal controller #H0 may receive information related to the LU of the additional DKC from the additional DKC by sending one or more query commands (for example, a report LUN command and/or an inquiry command) to the additional DKC. In a case where the additional DKC does not comprise a LU, a new LU may be created in the additional DKC, and after the LU has been created, the LU of the additional DKC may be recognized.

Next, in S1608A, the internal controller #H0 is able to register information (a combination of the virtual LU ID, the additional DKC ID, and the recognized LU ID) related to a virtual LU to which the recognized LU is mapped in the LU mapping table #H0.

Next, in S1608B, the internal controller #H0 updates the CPU-in-charge table #H0. Specifically, for example, the internal controller #H0 associates the ID of the LU recognized in S1607 with the ID of the CPU in charge of this LU. The CPU-in-charge of the recognized LU may be the CPU inside the HDKC #H0, or the CPU-in-charge may be another CPU inside the HDKC unit comprising the HDKC #0. Furthermore, the CPU in charge of the recognized LU may be specified by the administrator, or may be a CPU that is arbitrarily determined by the CPU #H0.

In a case where the result of the determination of S1605 is affirmative (that is, a case in which the additional DKC is a HDKC) (S1605: Yes), in Step S1609, the internal controller #H0 upgrades the coupling management table #H0. Specifically, for example, the internal controller #H0 registers, in the coupling management table #H0, the ID 801 of the additional DKC, registers "external bus" as the coupling medium 802, registers "HDKC" as the DKC type 803, and registers "third coupling" as the coupling mode 804.

Next, in S1610, the internal controller #H0 recognizes the LU inside the additional DKC (HDKC). For example, the internal controller #H0 may receive information related to the LU of the additional DKC from the additional DKC by sending one or more query commands (for example, a report LUN command and/or an inquiry command) to the additional DKC. In a case where the additional DKC does not comprise a LU, a new LU may be created in the additional DKC, and after the LU has been created, the LU of the additional DKC may be recognized.

Next, in S1611A, the internal controller #H0 is able to register information (a combination of the virtual LU ID, the additional DKC ID, and the recognized LU ID) related to the virtual LU to which the recognized LU is mapped in the LU mapping table #H0.

Next, in S1611B, the internal controller #H0 upgrades the CPU-in-charge table #H0. Specifically, for example, the internal controller #H0 associates the ID of the LU recognized in S1610 with the ID of the CPU in charge of this LU. The CPU-in-charge of the recognized LU may be the CPU inside the HDKC #H0, or the CPU-in-charge may be another CPU inside the HDKC unit comprising the HDKC #H0. Furthermore, the CPU in charge of the recognized LU may be specified by the administrator, or may be a CPU that is arbitrarily determined by the CPU #H0.

S1612 is performed subsequent to S1604, S1608B, or S1611B. In S1612, the internal controller #H0 updates the tier management table #H0. Specifically, for example, the internal controller #H0 registers the additional DKC ID and the ID of the LU recognized in Step S1603, S1607 or S1610 in the tier management table #H0 (for example, the table 321 shown in either FIG. 9A or FIG. 10). Furthermore, the internal controller #H0 performs the following processing for each recognized LU with respect to each type of performance factor item of the tier management table #0:

Identifies each type of performance factor;

computes points in accordance with point determination rule information (for example, the table shown in either FIG. 9B or FIG. 11) based on the identified performance factor;

computes the total (the tier level) of the computed points; and registers the computed points and tier levels in the tier management table #H0.

That is, a tier level is computed for each recognized LU.

Furthermore, in this embodiment, the processing shown in FIG. 16 was described as being implemented by the HDKC #H0, but this embodiment is not limited to this. Since any HDKC unit 141 and/or HDKC can be provided to another HDKC unit 141, HDKC and/or an ordinary LU of the LDKC 151, and a DP-LU and/or a virtual LU mapped to a DP-LU and/or a virtual LU in this embodiment, the processing shown in FIG. 16 may be implemented in any HDKC unit 141 and/or HDKC. In accordance with this, the tier management tables of FIG. 9 and/or FIG. 10 will be managed by the respective HDCK unit 141 and/or HDKC.

<I/O Command Processing>

I/O command processing will be explained by referring to FIGS. 17 through 30.

Figure 17:
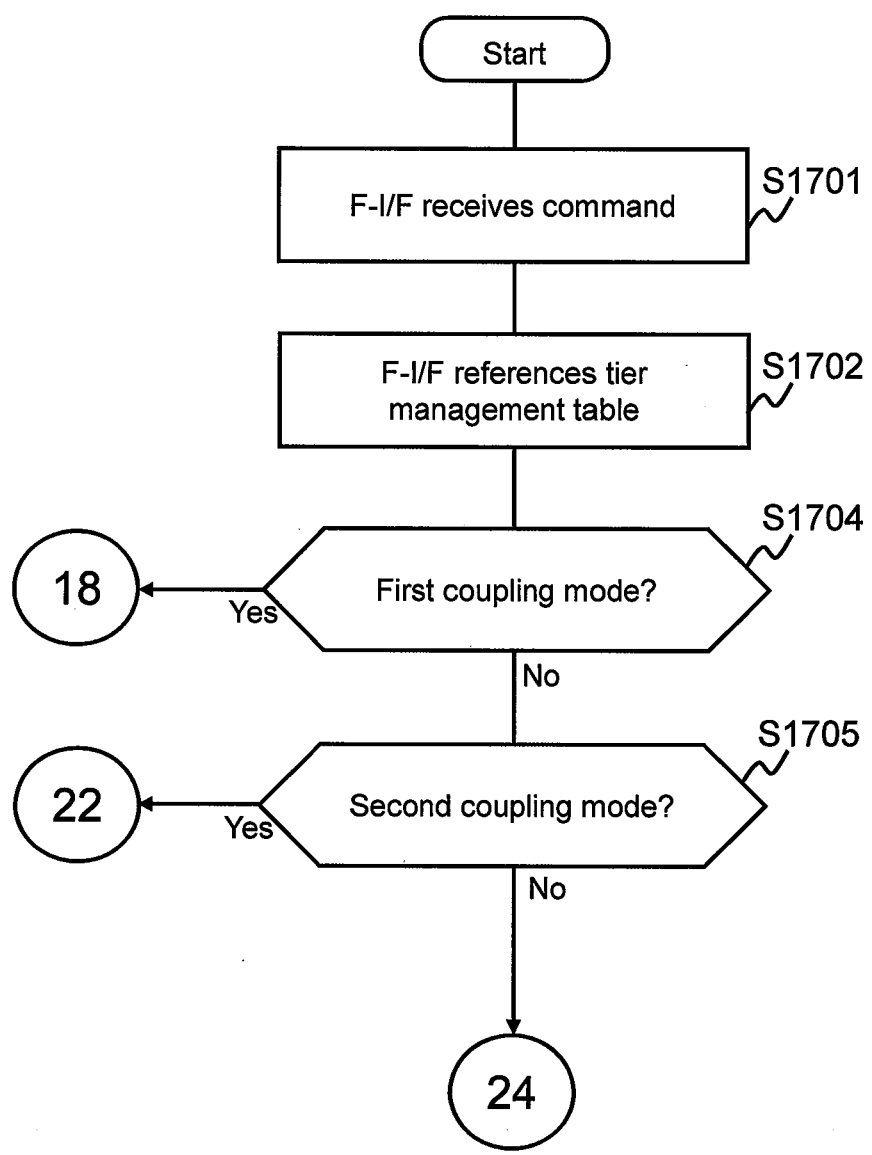
FIG. 17 shows the processing flow of a portion of an I/O command process (the processing when the HDKC receives an I/O command from a server).

As shown in FIG. 17, in S1701, the internal controller #H0 of the HDKC #H0 (for example, the F-I/F #H0 (for example, F-I/F #H00, #H01, #H10, or #H11)) receives an I/O command from the server. The I/O command comprises information related to the I/O-destination LU, for example, the LUN and I/O destination information. The I/O destination information, for example, comprises the address of the I/O-destination area (for example, the LBA (Logical Block Address)). In a case where the I/O command is a write command, the I/O destination information may include information denoting the length of the write-target data. The internal controller #H0 (for example, the F-I/F #H0 and/or the CPU #H0) is able to identify the I/O-destination LU and the I/O-destination area from the I/O command.

Next, in S1702, the internal controller #H0 (for example, the F-I/F #H0 that received the I/O command in S1701) references the tier management table #H0. The internal controller #H0 identifies the coupling mode for the I/O-destination LU on the basis of the coupling mode 903 corresponding to the I/O-destination LU (or the third coupling mode 1003 and the second coupling mode 1004). In other words, the I/O destination LU is identified as being the LU according to any of the coupling modes. Specifically, for example, the I/O-destination LU may be identified as follows.

In a case where the coupling mode 903 (or the third coupling mode 1003 and the second coupling mode 1004) is a point corresponding to either the DKC itself or the first coupling, the coupling mode may be identified as either "own DKC" or "first coupling mode". Specifically, for example, in a case where either the coupling mode 903 is "0" or the third coupling mode 1003 is "0", and, in addition, the second coupling mode 1004 is "0", the coupling mode may be identified as either the "own DKC" or the "first coupling mode".

In a case where the coupling mode 903 (or the third coupling mode 1003 and the second coupling mode 1004) is a point corresponding to the second coupling, the coupling mode may be identified as being the "second coupling mode". Specifically, for example, in a case where either the coupling mode 903 is "5" or the third coupling mode 1003 is "0", and, in addition, the second coupling mode 1004 is "5", the coupling mode may be identified as the "second coupling mode".

In a case where the coupling mode 903 (or the third coupling mode 1003 and the second coupling mode 1004) is a point corresponding to the third coupling, the coupling mode may be identified as being the "third coupling mode". Specifically, for example, in a case where the coupling mode 903 is "1", the coupling mode may be specified as being the "third coupling mode". Furthermore, for example, in a case where either the coupling mode 903 is "1" or the third coupling mode 1003 is "1", and, in addition, the second coupling mode 1004 is "0", the coupling mode may be identified as the "third coupling mode".

Figure 19:
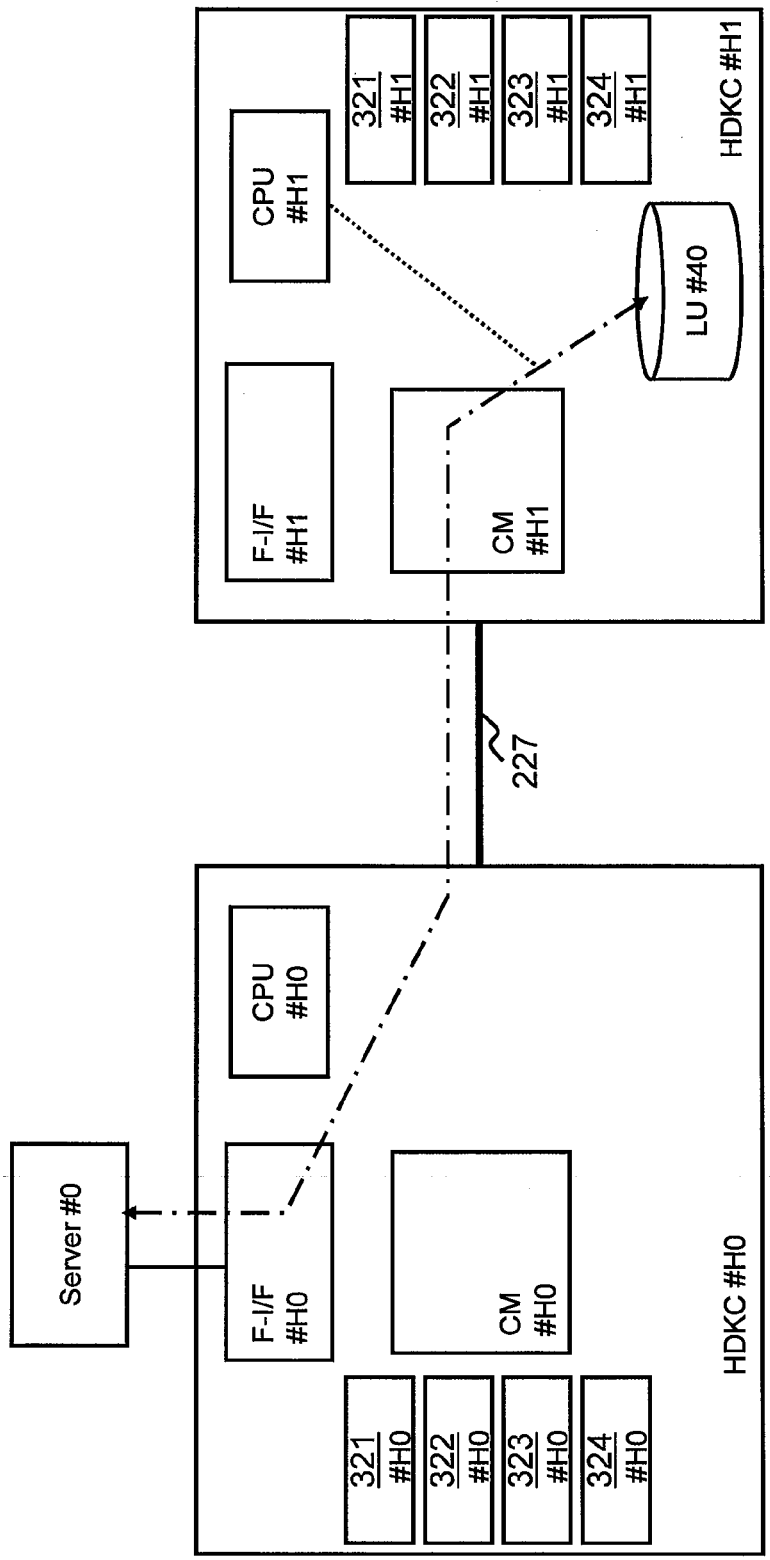
FIG. 19 shows an example of an overview of the configuration according to the first coupling mode.

In a case where the coupling medium is either "own DKC" or "first coupling medium" (S1703: Yes), the processing shown in FIG. 19 is performed.

Figure 22:
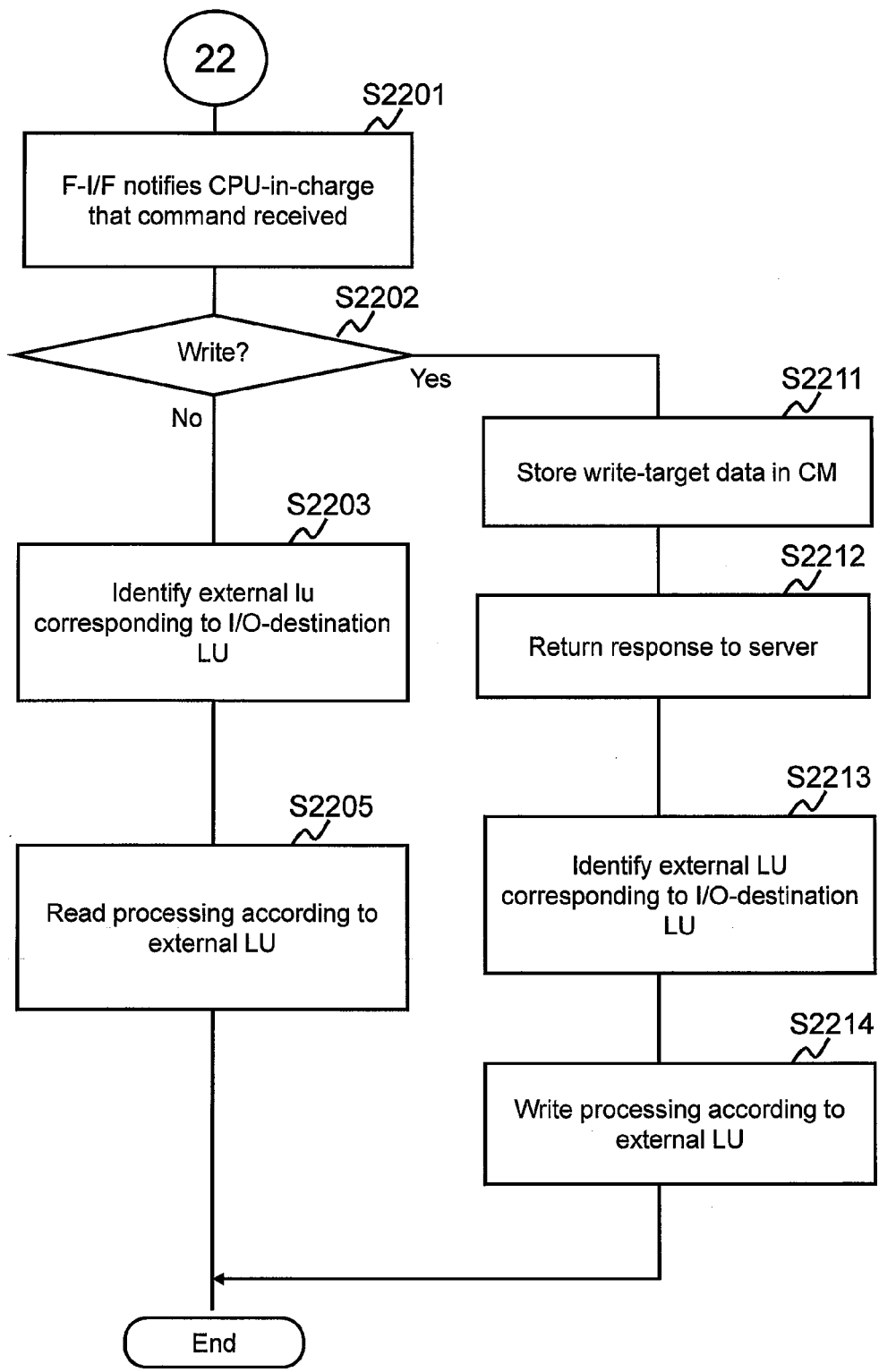
FIG. 22 shows the processing flow of a portion of an I/O command process (the processing of an I/O with respect to a LU according to the second coupling mode).

In a case where the coupling medium is the "second coupling medium" (S1703: No, S1704: Yes), the processing shown in FIG. 22 is performed.

Figure 24:
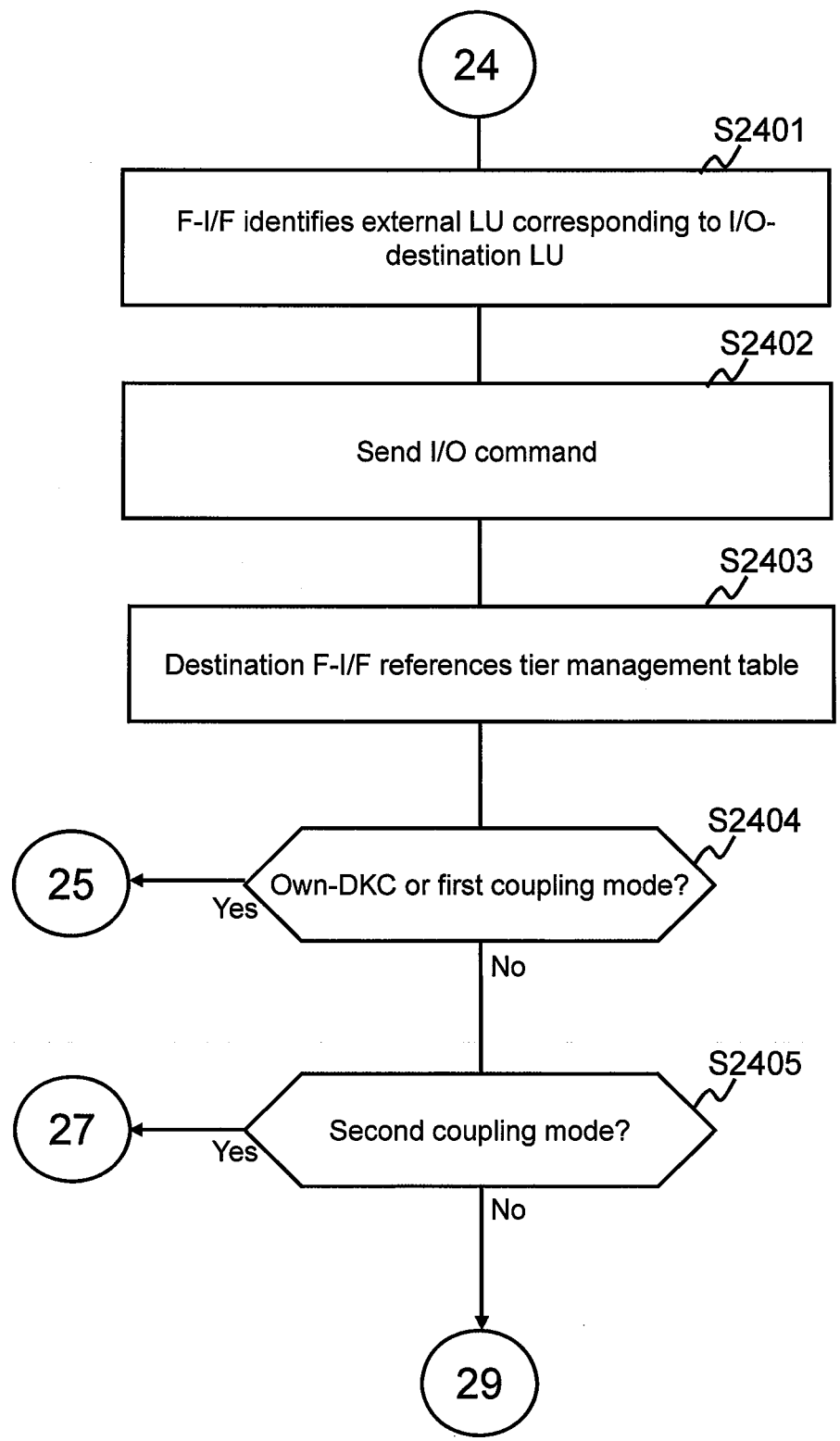
FIG. 24 shows the processing flow of a portion of an I/O command process (the processing when the HDKC receives an I/O command from another HDKC by way of the third coupling medium).

In a case where the coupling medium is the "third coupling medium" (S1703: No, S1704: No), the processing shown in FIG. 24 is performed.

<<I/O with Respect to LU According to First Coupling Mode>>

This will be explained be referring to FIGS. 18 through 21.

Figure 18:
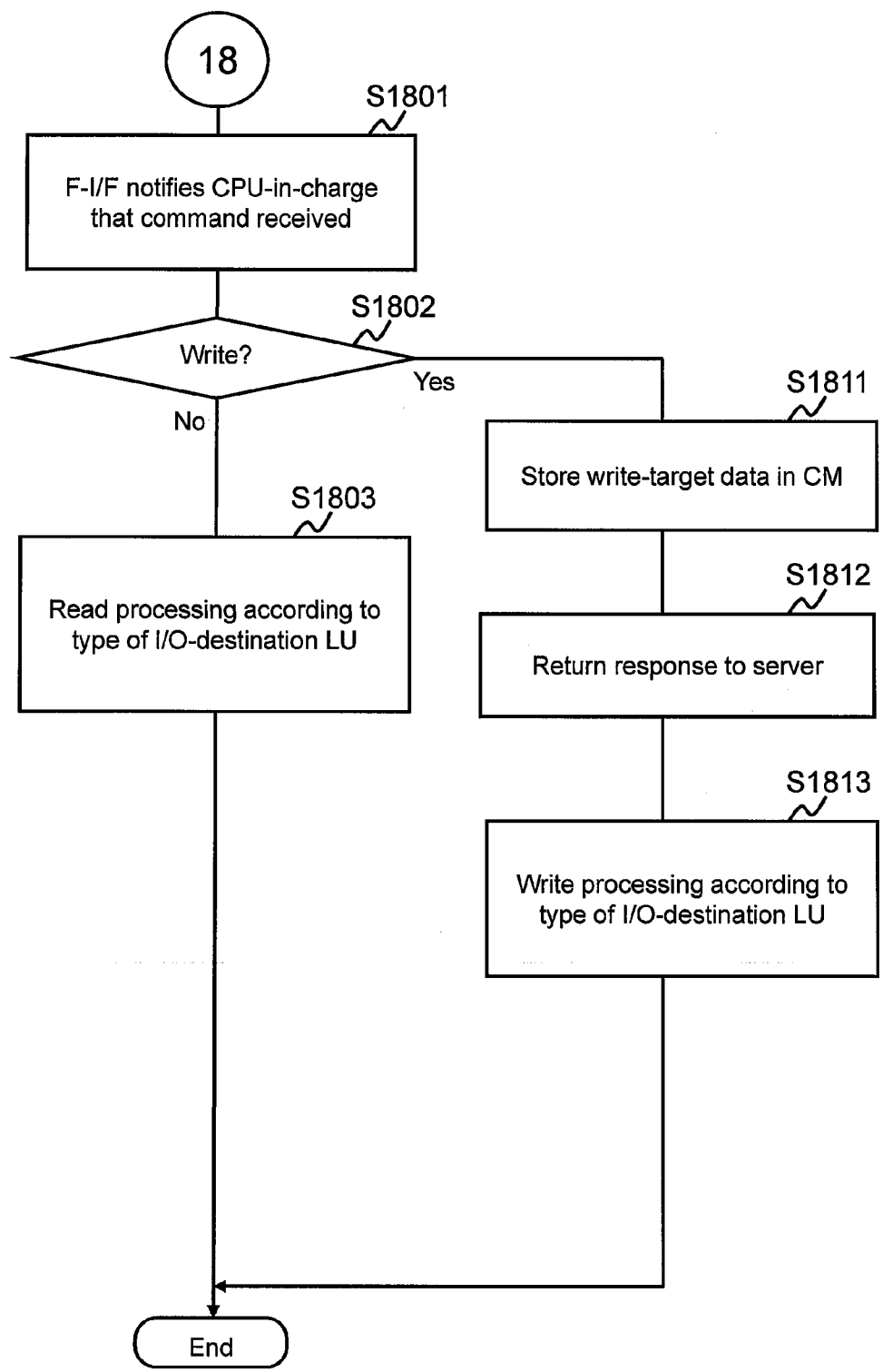
FIG. 18 shows the processing flow of a portion of an I/O command process (the processing of an I/O with respect to a LU according to the first coupling mode).

FIG. 18 shows the flow of I/O processing with respect to a LU according to the first coupling mode. FIG. 19 shows an example of an overview of the configuration according to the first coupling mode. FIG. 19 will be referred to as needed in the explanation of FIG. 18. Furthermore, the dashed-dotted line of FIG. 19 shows an example of the data flow.

As described hereinabove, one HDKC inside the HDKC unit is able to use a resource inside any other HDKC in the HDKC unit.

For example, as shown in FIG. 19, the medium that couples the HDKC #H0 and the HDKC #H1 is the internal bus 227. According to the example of FIG. 19, the I/O-targeted data goes between the server #0 and the LU #40 by way of the CM #H1 as indicated by the dashed-dotted line. The CPU-in-charge of the LU #40 is the CPU #H1. That is, the data for the LU #40, which was received by the HDKC #H0, is transferred from the F-I/F #H0 to the CM #H1, and the CPU #H1 writes this data to the LU #40 from the CM #H1. However, the I/O-targeted data may also go by way of the CM #H0, and the CPU-in-charge of the LU #40 may be the CPU #H0 (In accordance with this, the CPU #H0 is able to write the data for the LU #40 to the LU #40 via the internal bus 227.). Furthermore, the CPU that performs the data I/O between the CM and the server and the CPU that performs the data I/O between the CM and the LU may be the same or may be different.

The LM #H0 (#1) and/or a portion of the CM #H0 (#H1) stores the tier management table 321, the LU mapping table 322, the LU/PDEV conversion table 323, and the CPU-in-charge table 324. The CPUs #H0 and #H1 are able to access these tables.

As shown in FIG. 18, in S1801, the F-I/F #H0 (the F-I/F that received the I/O command in S1701 of FIG. 17) identifies the CPU-in-charge #H1 of the I/O-destination LU (the CPU inside the HDKC coupled using the first coupling mode) from the CPU-in-charge table #H0 (refer to FIG. 31). The F-I/F #H0 notifies the identified CPU-in-charge #H1 that the I/O command has been received. This I/O command may be transferred to the CPU-in-charge #H1 via the internal bus 227 at this point.

In S1802, the CPU-in-charge #H1 determined whether or not the I/O command is a write command.

In a case where the result of the determination of S1802 is negative (a case in which the I/O command is a read command) (S1802: No), in S1803, the CPU-in-charge #H1 performs read processing in accordance with the type of the I/O-destination LU. Specifically, for example, in a case where the I/O-destination LU is an ordinary LU, the CPU-in-charge #H1 performs the following processing:

Identifies the physical area (area in the RG) corresponding to the read-source logical area (the area of the read-specified address in the I/O-destination LU #40) based on the LU/PDEV conversion table #H1;

reads the read-target data from the identified physical area (the PDEV comprising this physical area) and writes the read-target data to the CM #H1; and sends the read-target data inside the CM #H1 to the server #0 through the internal bus 227 and the F-I/F #H0. In a case where the I/O-destination LU is a DP-LU, in S1803, the CPU-in-charge #H1 performs the read process shown in FIG. 20.

In a case where the result of the determination of S1802 is affirmative (a case in which the I/O command is a write command) (S1802: Yes), in S1811, the CPU-in-charge #H1 instructs the F-I/F to write the write-target data to the CM #H1.

Next, in S1812, the CPU-in-charge #H1 returns a response (for example, a write-complete notification) to the server #0 via the internal bus 227 and the F-I/F #H0.

Next, in S1813, the CPU-in-charge #H1 performs write processing in accordance with the type of the I/O-destination LU. Specifically, for example, in a case where the I/O-destination LU is an ordinary LU, the CPU-in-charge #H1 performs the following processing:

Identifies the physical area (area in the RG) corresponding to the write-destination logical area (the area of the write command-specified address in the I/O-destination LU #40) based on the LU/PDEV conversion table #H1; and writes the write-target data inside the CM #H1 to the identified physical area (the PDEV comprising this physical area).

Figure 21:
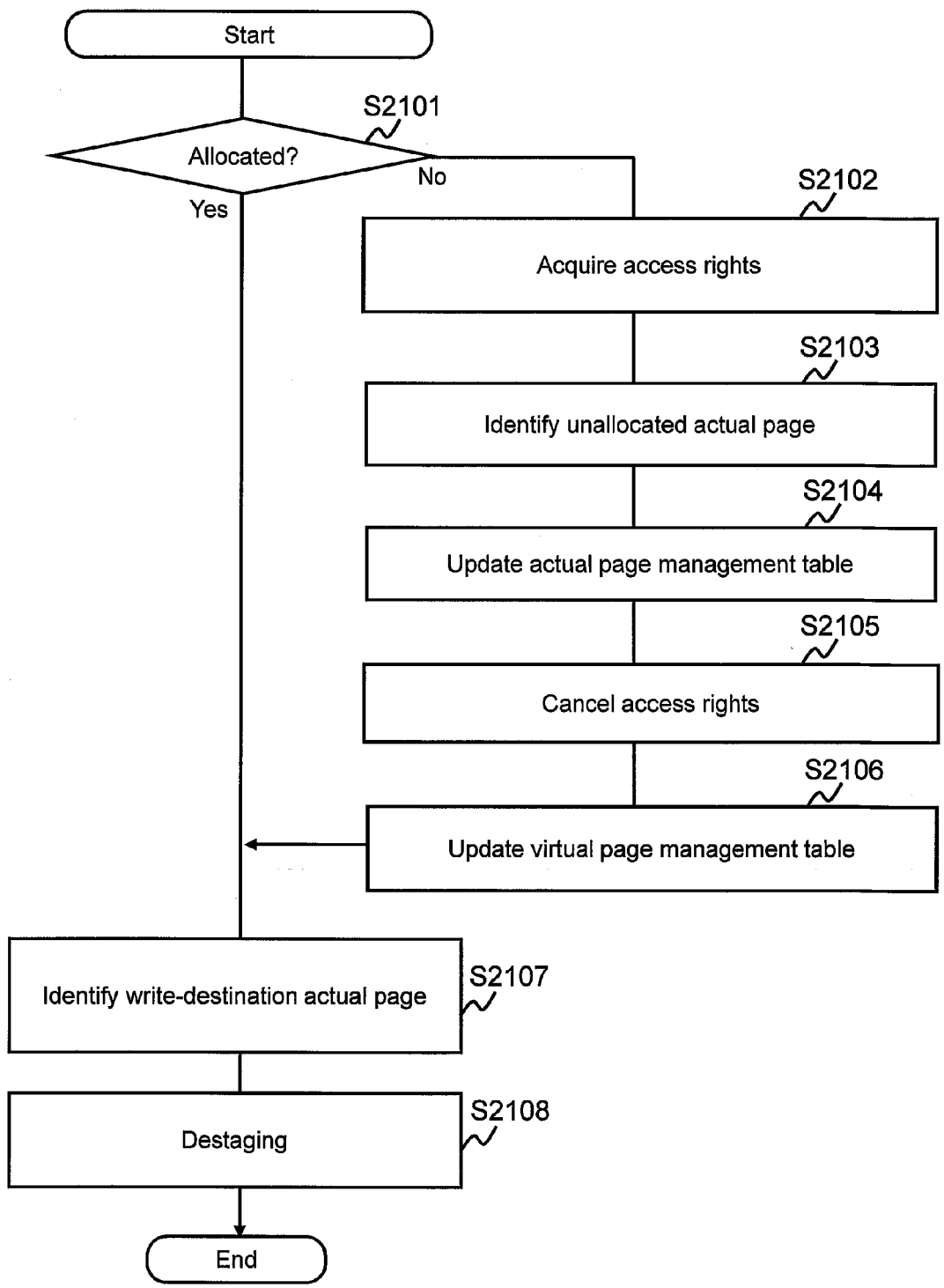
FIG. 21 shows the flow of a write process related to the DP-LU.

In a case where the I/O-destination LU is a DP-LU, in S1813, the CPU-in-charge #H1 performs the write processing shown in FIG. 21.

Furthermore, the processing (this processing will be referred to as "process A" in this paragraph) of the I/O with respect to a LU according to the DKC itself (a LU that is not mapped from a LU inside a DKC other than the HDKC #H0) may be practically the same as the processing (this processing will be referred to as "process B" in this paragraph) of the I/O with respect to a LU according to the first coupling mode. In process A and process B, the CPU-in-charge and the CM that is utilized may be different. For example, in the process A, the CPU-in-charge may be CPU #H0 and the CM that is utilized may be CM #H0. However, in the process A, the CPU-in-charge may also be CPU #H1, and/or the CM that is utilized may be CM #H1. By contrast, in the process B, the CPU-in-charge may be CPU #H0, and/or the CM that is utilized may be CM #H0.

In a case where the LDKC has received an I/O command from the HDKC, the I/O may be preformed with respect to an external LU by performing the same processing as that shown in FIG. 19.

According to the first coupling mode (and/or one HDKC), the LM #H00 (#H10) may store management information comprising information that is required only by the CPU #H00 (#H10) that has this LM #H00. The CPU #H00 (#H10) need not update the management information inside the other LM #H10 (#H00) even though it has updated the management information inside the LM #H00 (#H10). In a case where the CPU #H00 (#H10) requires the management information inside the other LM #H10 (#H00), the CPU #H00 (#H10) may access the management information inside the other LM #H10 (#H00) via the internal bus 227.

Or, according to the first coupling mode (and/or one HDKC), all the LMs that exist in one HDKC unit (and/or one HDKC) may store the same content management information. In accordance with this, each time the management information of any LM is updated by any CPU, the management information inside all of the remaining LMs may be updated by at least one or more CPUs.

In the United States, U.S. Pat. No. 7,587,551 (Fujibayashi et al) and/or US Patent Application Publication No. 2008/0263190 (Serizawa et al) (specification and drawings) are cited in relation to the first coupling mode. The storage apparatus disclosed in at least one of these publications may be applied to the HDKC and/or HDKC unit. However, the concept of a "tier" according to this embodiment is peculiar to the present application.

<<<I/O With Respect to DP-LU>>>

In a case where the I/O-destination LU is a LU according to the first coupling mode (or the own DKC), the DP-LU may be the I/O-destination LU.

In a case where the I/O-destination LU is a virtual LU according to the second coupling mode, the DP-LU may be the external LU (for example, the LU #1 of FIG. 22 (to be explained hereinbelow)) that is mapped to I/O-destination LU.

In a case where the I/O-destination LU is a virtual LU according to the third coupling mode, the DP-LU may be the external LU that is mapped either directly or indirectly to the I/O-destination LU. A DP-LU that is mapped directly to the I/O-destination LU, for example, may be the LU inside the HDKC or the HDKC unit comprising this HDKC) that is coupled via one third coupling medium, for example, the LU #45 of FIG. 26 (to be explained hereinbelow). A DP-LU that is mapped indirectly to the I/O-destination LU, for example, may be the LU that is mapped via one third coupling medium and either one or more second or third coupling mediums, for example, the LU #56 of FIG. 28 (to be explained hereinbelow) or the LU #57 of FIG. 30 (to be explained hereinbelow).

Figure 20:
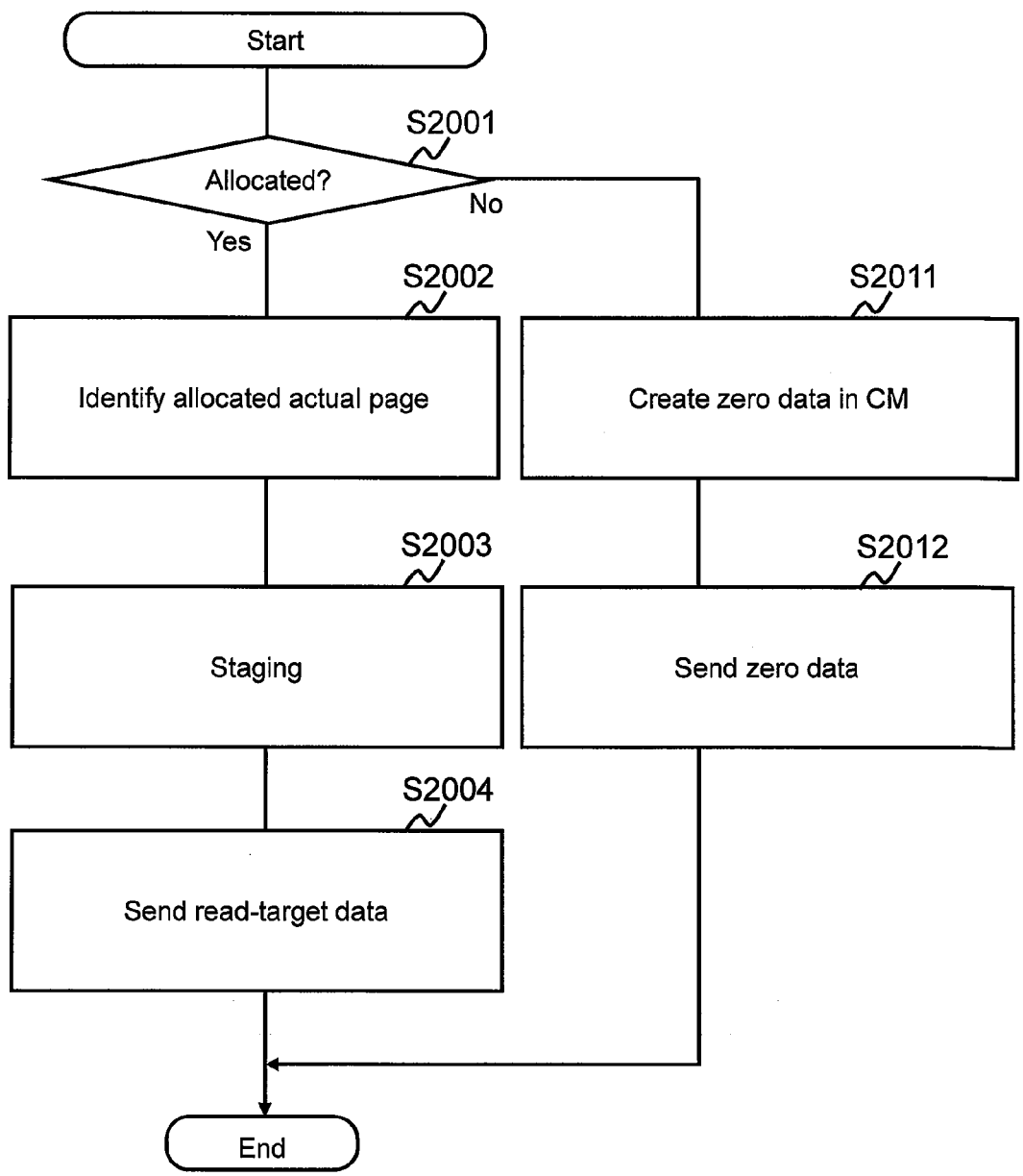
FIG. 20 shows the flow of a read process related to a DP-LU (a LU according to Dynamic Provisioning (Thin Provisioning)).

FIG. 20 shows the flow of a read process related to the DP-LU. Hereinafter, FIG. 19 will be used as an example as needed in explaining this process. In doing so, it is supposed that the DP-LU ID is "40", and that the ID of the CPU in charge of this DP-LU is "H11".

In S2001, the CPU-in-charge (#H11) of the DP-LU (#40) performs the following processing:

Identifies the virtual page (the read-source virtual page) belonging to the address in the read command; and determines, based on the virtual page management table (#H11) inside the LM (#H11), whether or not the allocation status 1303 (refer to FIG. 13) of the identified read-source virtual page is "allocated".

In a case where the result of the determination of S2001 is affirmative (S2001: Yes), in S2002, the CPU-in-charge (#H11) identifies the actual page (the read-source actual page) that is allocated to the read-source virtual page based on the virtual page management table (#H11). For example, the CPU-in-charge (#H11) may compute the address (for example, the LBA) in the pool internal volume (RG) by multiplying the size of the actual page by the page address 1305 corresponding to the read-source virtual page.

Next, in S2003, the CPU-in-charge (#H11) reads the read-target data from the identified read-source actual page (specifically, for example, the area belonging to the computed address), and writes the read data to the CM (#H1).

Next, in S2004, the CPU-in-charge (#H11) sends the read-target data inside the CM (#H1) to the source (the server #0) of the I/O command.

Furthermore, in a case where the result of the determination of S2001 is negative (S2001: No), in S2012, the CPU-in-charge (#H11) creates zero data (for example, data inside the storage area associated with an unallocated virtual page) in the CM (#H1) (S2011), and sends the zero data to the source (server #0) of the I/O command (S2012). Furthermore, the processing performed when the result of the determination of S2001 is negative is not limited to this. For example, zero data may be sent to the source of the I/O command from a specified area (an area other than the CM) in which the zero data (may also be another type of initial value data) was stored beforehand.

FIG. 21 shows the flow of a write process related to the DP-LU. Hereinafter, FIG. 19 will be used as needed as an example in the explanation of this process. In doing so, it is supposed that the DP-LU ID is "40", and that the ID of the CPU in charge of this DP-LU is "H11".

In S2101, the CPU-in-charge (#H11) of the DP-LU (#40) performs the following processing:

Identifies the virtual page (the write-destination virtual page) belonging to the address in the write command; and determines, based on the virtual page management table (#H11) inside the LM (#H11), whether or not the allocation status 1303 (refer to FIG. 13) of the identified write-destination virtual page is "allocated".

In a case where the result of the determination of S2101 is affirmative (S2101: Yes), in S2107, the CPU-in-charge (#H11) identifies on the basis of the virtual page management table (#H11) the actual page (the write-destination actual page) that is allocated to the write-destination virtual page. For example, the CPU-in-charge (#H11) may compute the address (for example, the LBA) in the pool internal volume (RG) by multiplying the size of the actual page by the page address 1305 corresponding to the write-destination virtual page.

Next, in S2108, the CPU-in-charge (#H11) reads the write-target data (for example, the data that was stored in S1811 of FIG. 18) inside the CM (#H1), and writes the read data to the identified write-destination actual page (specifically, for example, the area belonging to the computed address).

In a case where the result of the determination of S2101 is negative (S2101: No), that is, a case in which an actual page has not been allocated to the write-destination virtual page, an actual page must be allocated to the write-destination virtual page. For this reason, it is first necessary to access the actual page management table (#H1). Exclusive access control is required for the actual page management table (#H1). For this reason, in S2102, the CPU-in-charge (#H11) acquires the access rights for accessing the actual page management table (#H1).

Thereafter, in S2103, the CPU-in-charge (#H11) identifies from the actual page management table (#H1) an unallocated actual page that corresponds to a table pointer 1401 that matches the pointer of the top-of-queue management table (#H1).

Next, in S2104, the CPU-in-charge (#H11) updates the actual page management table (#H1) and the top-of-queue management table (#H1). Specifically, for example, the CPU-in-charge (#H11) performs the following processing:

Updates the allocation status 1404 corresponding to the actual page identified in S2103 to "allocated";

updates the DP-LU ID 1405 corresponding to the actual page identified in S2103 to "40" (the ID of the DP-LU (#40)); and copies the unallocated queue pointer 1406 corresponding to the actual page identified in S2103 to the top-of-queue management table (#H1), and, in addition, updates this pointer 1406 to a NULL value "-".

Next, in S2105, the CPU-in-charge (#H11) cancels the access rights acquired in S2102.

Next, in S2106, the CPU-in-charge (#H11) updates the virtual page management table (#H11). Specifically, for example, the CPU-in-charge (#H11) performs the following processing:

Updates the allocation status 1303 corresponding to the write-destination virtual page to "allocated";

updates the pool RG ID 1304 corresponding to the write-destination virtual page to an ID that matches the pool RG ID 1402 corresponding to the actual page identified in S2103; and updates the actual page address 1305 corresponding to the write-destination virtual page to an address that matches the actual page address 1403 corresponding to the actual page identified in S2103.

Thereafter, the CPU-in-charge (#H11) performs the above-mentioned S2107 and S2108. Furthermore, the above-mentioned write-destination actual page is the actual page identified in S2103 (the actual page that was allocated to the write-destination virtual page in S2106).

The preceding has been an explanation of I/O with respect to the DP-LU.

Furthermore, for example, the pool (V) may be configured from internal volumes belonging to the same tier (for example, the same tier level or the same tier level range), and (W) may be configured from internal volumes belonging to multiple different tiers. In the case of (V), for example, the same actual page management table may comprise information denoting the tier (for example, the tier level or the tier level range) to which an internal volume belongs for each internal volume. In the case of (W), the pool may be managed for each tier (For example, there may be management information denoting the tier-corresponding pool for each tier.).

Furthermore, in a case where the external LU inside the LDKC is a DP-LU, the LDKC internal controller (CPU) is able to perform a read process according to FIG. 20 and a write process according to FIG. 21.

Furthermore, for example, in FIG. 19, in a case where the DP-LU is the I/O-destination LU inside the HDKC #H0, which received the I/O command from the server #0, processing may only be performed inside the HDKC #H0, and the I/O-targeted data and/or the I/O command need not be transferred to the another HDKC inside the HDKC unit comprising the HDKC #H0. Or, for example, in FIG. 19, in a case where the DP-LU is the LU (#40) inside the HDKC #H1 as in the example described above, the I/O command (the I/O command received from the server #0) may be transferred from the HDKC #H0 to the HDKC #H1, or the CPU #H0 may perform the I/O with respect to the DP-LU #40 via the internal bus 227 without the I/O command being transferred. Or, the processing of the I/O with respect to the DP-LU #40 may be shared by the CPUs #H0 and #H1.

In the United States, the specification and drawings of U.S. Pat. No. 7,555,601 (Yamagami) are cited in relation to I/O with respect to the DP-LU. In accordance with this, the Storage Control System corresponds to the HDKC unit 141 and LDKC 151 of the present application, and is applied to the I/O processing by the HDKC unit 141 with respect to the DP-LU, and to the I/O processing by the LDKC unit 151 with respect to the DP-LU. Furthermore, this citation is not limited solely to the first coupling mode, but rather can also be cited in relation to I/Os with respect to the DP-LU of the second and third coupling modes and a second embodiment and a third embodiment, which will be explained in detail below. However, the concept of the "tier" according to this embodiment is unique to the present application.

<<I/O with Respect to LU According to Second Coupling Mode>>

This will be explained by referring to FIGS. 22 and 23.

FIG. 22 shows the flow of processing for an I/O with respect to a LU according to the second coupling mode. FIG. 23 shows an example of an overview of the configuration according to the second coupling mode. FIG. 23 will be referred to as needed in the explanation of FIG. 22. Furthermore, the dashed-dotted line in FIG. 23 indicates an example of the data flow.

Figure 23:
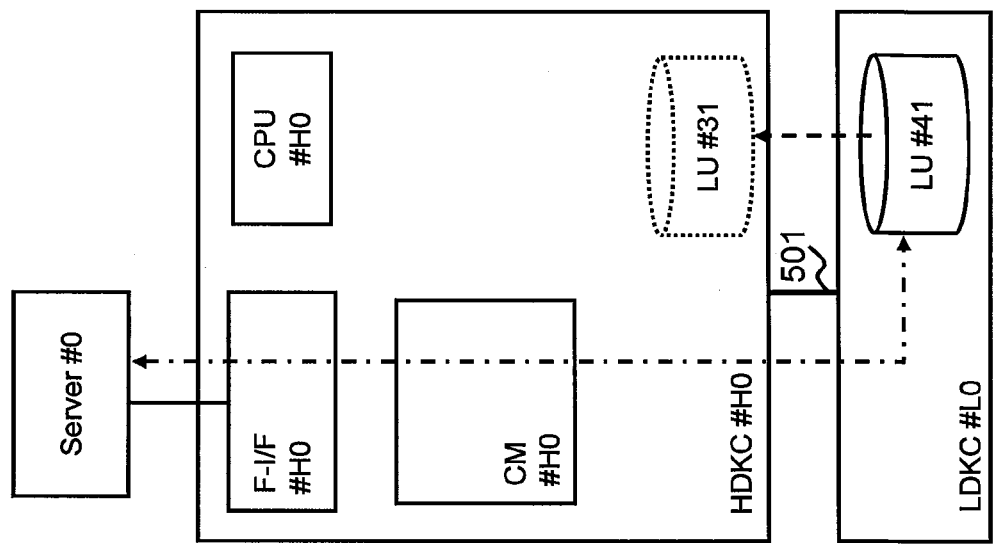
FIG. 23 shows an example of an overview of the configuration according to the second coupling mode.

As shown in FIG. 23, the HDKC #H0 and the LDKC #L0 are coupled via the second coupling medium (the external bus) 501. The storage resource inside the internal controller #H0 of the HDKC #H0 (for example, either the LM #H0 or a portion of the CM #H0) is able to store the above-mentioned tables 321 through 328. Although the CPU #H0 is able to access these tables, the CPU #L0 inside the LDKC #L0 need not be able to access these tables.

As shown in FIG. 22, in S2201, the F-I/F #H0 (the F-I/F that received the I/O command in S1701 of FIG. 17) identifies the CPU-in-charge #H0 for the I/O-destination LU (#31) from the CPU-in-charge table #H0 (Refer to FIG. 31). The F-I/F #H0 notifies the identified CPU-in-charge #H0 that an I/O command has been received.

Next, in S2202, the CPU-in-charge #H0 determines whether or not this I/O command is a write command.

In a case where the result of the determination of S2202 is negative (a case in which the I/O command is a read command) (S2202: No), in S2203, the internal controller #H0 (the CPU-in-charge #H0) identifies the external LU (#41) corresponding to the read-source LU (#31) and the LDKC (#L0) comprising same from the LU mapping table #H0.

Next, in S2204, processing according to the external LU (#41) identified in S2203 is performed. Specifically, for example, the following processing is performed. That is, the CPU-in-charge #H0 sends the read command (the second read command in the explanation of FIG. 22) to the identified LDKC (#L0). This read command, for example, comprises the ID of the identified external LU (#41), and a second address according to a first address (for example, the same address as the first address) specified in the I/O command (the "first read command" in the explanation of FIG. 22) received in S1701. The second read command is sent to the LDKC #L0 via the initiator port and the external bus 501. The internal controller #L0 of the LDKC #L0, for example, performs the processing shown in FIG. 18 (In a case where the external LU is the DP-LU, the processing shown in FIG. 20 is also performed.). That is, the internal controller #L0 reads the read-target data from the external LU (#41), stores this data in the CM #L0, and sends this data from the CM #L0 to the HDKC #H0 via the target port and the external bus 501. The CPU-in-charge #H0 writes the read-target data from the LDKC #L0 to the CM #H0. The CPU-in-charge #H0 sends the read-target data inside the CM #H0 to the server #0.

In a case where the result of the determination of S2202 is affirmative (a case in which the I/O command is a write command) (S2202: Yes), in S2211, the CPU-in-charge #H0 writes the write-target data to the CM #H0.

Next, in S2212, the CPU-in-charge #H0 returns a response (for example, a write-complete notification) to the server #0.

Next, in S2213, the CPU-in-charge #H0 identifies the external LU corresponding to the write-destination LU using the same method as in S2204.

Next, in S2214, processing according to the external LU (#41) identified in S2213 is performed. Specifically, for example, the following processing is performed. That is, the CPU-in-charge #H0 sends the write command (the second write command in the explanation of FIG. 22) to the LDKC (#L0) that comprises the external LU (#41). This write command, for example, comprises the ID of the external LU (#41) and a second address according to a first address (for example, the same address as the first address) specified in the write command (the "first write command" in the explanation of FIG. 22) received in S1701. The second write command and the write-target data inside the CM #H0 are sent to the LDKC #L0 via the initiator port and the external bus 501. The internal controller #L0 of the LDKC #L0, for example, performs the processing shown in FIG. 18 (In a case where the external LU is the DP-LU, the processing shown in FIG. 21 is also performed.). That is, the internal controller #L0 writes the write-target data from the HDKC #H0 to the CM #L0 in accordance with the second write command from the HDKC #H0, returns a response (for example, write-complete notification) to the HDKC #H0, and writes the write-target data inside the CM #L0 to the external LU (#41). Furthermore, in a case where the I/O-destination LU inside the HDKC #H0 is the DP-LU, the processing according to FIG. 18, FIG. 20, or FIG. 21 may be performed. Then, in a case where the internal volume comprising the I/O-destination actual page is an internal volume according to the second coupling mode, the CPU-in-charge #H0, for example, may identify the external LU corresponding to this internal volume (for example, a LU) from the LU mapping table (#H0), and may send the second I/O command to the LDKC that comprises the identified external LU.

Furthermore, for example, the pool inside the HDKC #H0 (V) may be configured from internal volumes belonging to the same tier (for example, the same tier level or the same tier level range), and (W) may be configured from internal volumes belonging to multiple different tiers. In the case of (V), for example, the same actual page management table may comprise information denoting the tier (for example, the tier level or the tier level range) to which an internal volume belongs for each internal volume. In the case of (W), the pool may be managed for each tier (For example, there may be management information denoting the tier-corresponding pool for each tier.).

In addition, for example, the pool inside the HDKC #H0 may be configured from only the same type of internal volume (for example, only internal volumes based on RG inside the HDKC #H0, or only internal volumes according to the second coupling mode), or may be configured from different types of internal volumes.

In the United States, the specification and drawings of U.S. Pat. No. 7,441,095 (Tamura et al) are cited in relation to the second coupling mode. In accordance with this, the First Storage Controller corresponds to the HDKC unit 141 of the present application, and the Second Storage Controller corresponds to the LDKC unit 151 of the present application. However, the concept of a "tier" or the like according to this embodiment is peculiar to this application.

<<I/O with Respect to LU According to Third Coupling Mode>>

This will be explained by referring to FIGS. 24 through 30. Furthermore, in the explanation of FIGS. 24 through 30, the I/O command that the HDKC (#0) receives from the server (#0) may be referred to as the "first I/O command", the I/O command that is sent from the HDKC (#0) may be referred to as the "second I/O command", and the I/O command that is sent from the HDKC (#5) to the LDKC (#L3) (or the HDKC (#7)) may be referred to as the "third I/O command".

As shown in FIG. 17, in a case where the F-I/F (#H0) has determined that the I/O-destination LU (#35, #36, or #37) according to the first I/O command is a virtual LU according to the third coupling mode, the processing shown in FIG. 24 is performed.

That is, as shown in FIG. 24, in S2401, the internal controller #H0 (F-I/F (#H0)) identifies the external LU (#45, #46, or #47) corresponding to the I/O-destination LU and the HDKC (#H5) comprising same from the LU mapping table #H0.

Next, in S2402, the internal controller #H0 (F-I/F (#H0)) sends the second I/O command to the identified HDKC (#5). The second I/O command, for example, comprises information denoting the ID of the identified external LU (#45, #46, or #47), and a second address according to a first address (for example, the same address as the first address) specified in the first I/O command. The second I/O command is sent via the initiator/target port of the HDKC (#H0) and the third coupling medium (external bus) 601, and is received via the initiator/target port of the F-I/F (#H5) of the HDKC (#H5).

Thereafter, processing that is the same as the processing (the processing that was explained by referring to FIG. 17 and so forth) that was performed in the HDKC (#H0) is performed in the HDKC (#H5).

For example, in S2403, the internal controller (#H5) (F-I/F (#H5)) references the tier management table (#H5). The internal controller (#H5) identifies the coupling mode for this LU based on the coupling mode 903 (or the third coupling mode 1003 and the second coupling mode 1004) corresponding to the LU (#45, #46, or #47) that is specified in the second I/O command.

Figure 25:
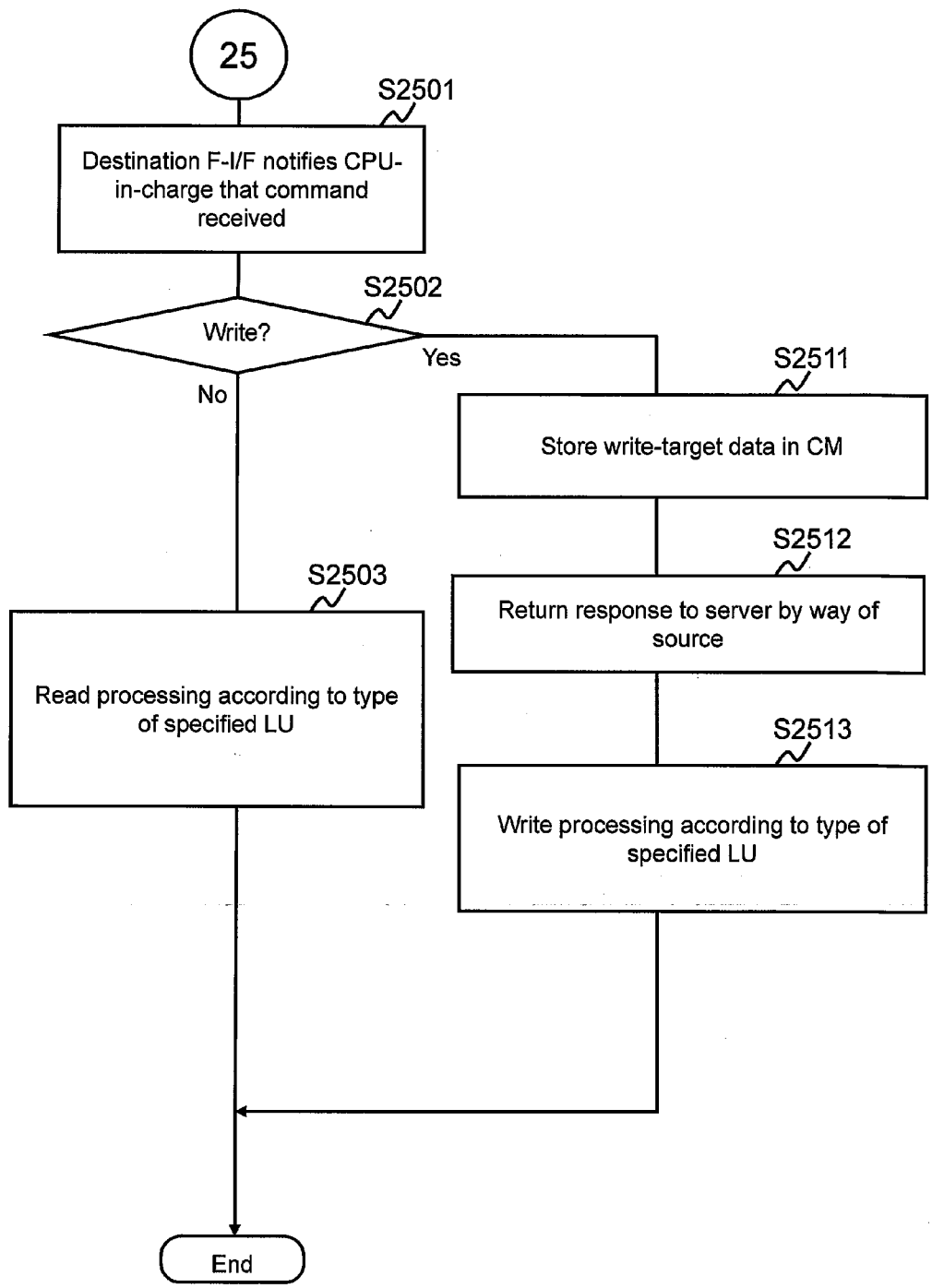
FIG. 25 shows the processing flow of a portion of an I/O command process (the processing of an I/O according to the third coupling mode (Case 3-1))

In a case where the coupling medium is either "own DKC" or "first coupling medium" (S2404: Yes), the processing shown in FIG. 25 is performed.

Figure 27:
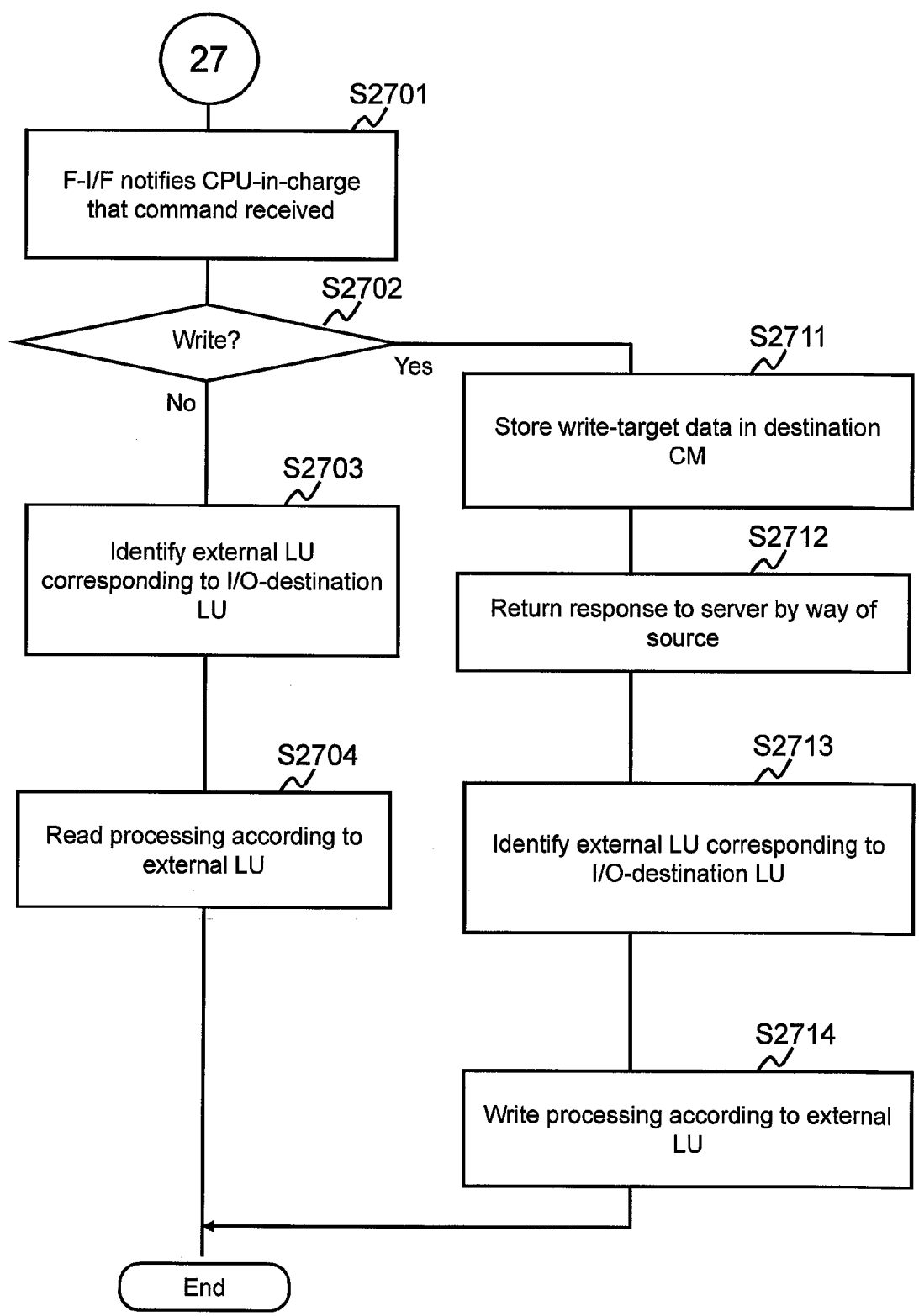
FIG. 27 shows the processing flow of a portion of an I/O command process (the processing of an I/O according to the third coupling mode (Case 3-2)).

In a case where the coupling medium is the "second coupling medium" (S2404: No, S2405: Yes), the processing shown in FIG. 27 is performed.

Figure 29:
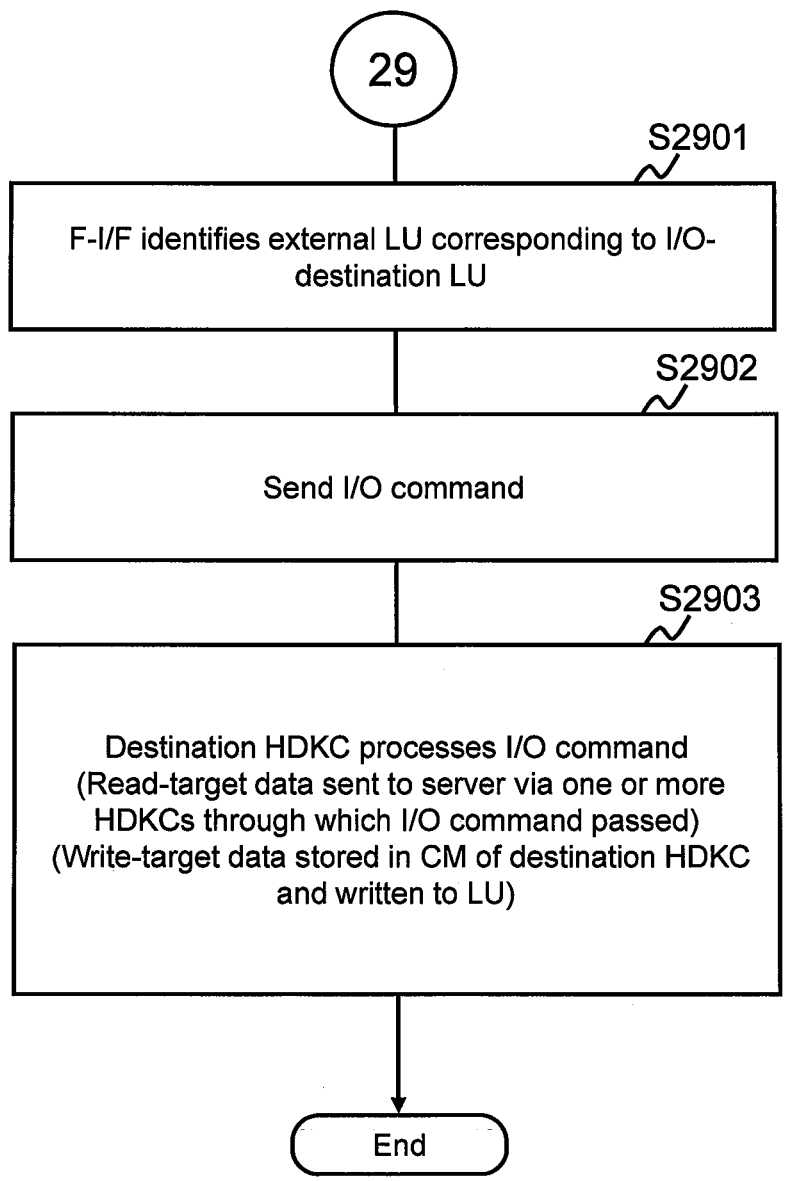
FIG. 29 shows the processing flow of a portion of an I/O command process (the processing of an I/O according to the third coupling mode (Case 3-3)).

In a case where the coupling medium is the "third coupling medium" (S2403: No, S2405: Yes), the processing shown in FIG. 29 is performed.

That is, in a case where the I/O-destination LU (the LU according to the I/O command that the HDKC #H0 received from the server #0) is a LU according to the third coupling mode, there will be cases like the following.

(Case 3-1 (FIGS. 25 and 26)): A case in which the I/O only goes by way of one third coupling medium. Specifically, for example, a LU will not be interposed between the I/O-destination LU (#35) and the last LU (the terminatory LU of the one or more LUs that are associated with the I/O-destination LU in cascade form) (#45). That is, the last LU is the external LU (#45) that is directly mapped to the I/O-destination LU (#35).

(Case 3-2 (FIGS. 27 and 28)): A case in which the I/O goes by way of one third coupling medium and one second coupling medium. Specifically, for example, the last LU is the LU (#56) inside the LDKC (#L3), and the external LU (#46) inside the HDKC (#H5) that is coupled via the third coupling medium is interposed between the I/O-destination LU (#36) and the last LU (#56). That is, the last LU is the external LU (#56) inside the LDKC (#L3), and is indirectly mapped to the I/O-destination LU (#36) via the external LU (#46).

(Case 3-3 (FIGS. 29 and 30)): A case in which the I/O goes by way of two third coupling mediums. Specifically, for example, the external LU (#47) inside the HDKC (#H5) that is coupled via the third coupling medium is interposed between the I/O-destination LU (#37) and the last LU (#57). That is, the last LU is the external LU (#57) inside the HDKC (#H7), and is indirectly mapped to the I/O-destination LU (#37) via the external LU (#47).

That is, for an I/O with respect to a LU (the I/O-destination LU) according to the third coupling mode, in addition to one third coupling medium, there could be cases in which one or more first coupling mediums, one or more second coupling mediums, one or more third coupling mediums, and two or more different types of coupling mediums from thereamong are interposed between the I/O-destination LU and the last LU.

The above-mentioned (Case 3-1), (Case 3-2) and (Case 3-3) will be explained hereinbelow. It will be possible to realize storage systems of various configurations based on the explanations of these cases, the explanation of the "I/O with respect to a LU according to the first coupling mode", and the explanation of the "I/O with respect to a LU according to the second coupling mode".

(Case 3-1: Only One Third Coupling Medium)

Figure 26:
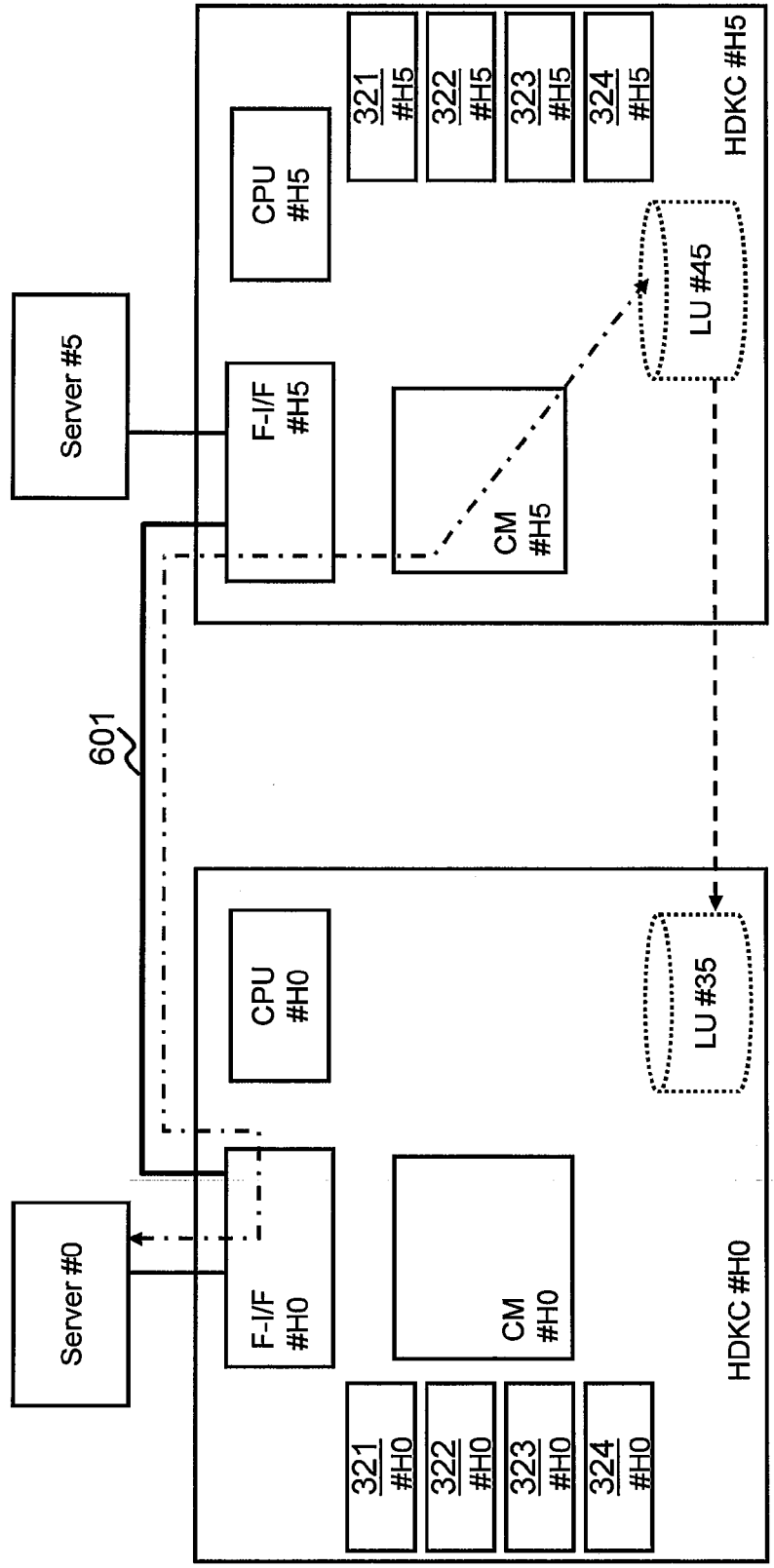
FIG. 26 shows an example of an overview of the configuration according to the third coupling mode (Case 3-1).

This will be explained by referring to FIGS. 25 and 26.

FIG. 25 shows the flow of I/O processing according to the third coupling mode (Case 3-1). FIG. 26 shows an example of an overview of the configuration according to the third coupling mode (Case 3-1). The dashed-dotted line in FIG. 26 indicates the flow of data.

The HDKC #H0 and the HDKC #H5 are coupled via the third coupling medium (the external bus) 601. The LM #H0 (#H5) and a portion of the CM #H0 (#H5) store the tier management table #H0 (#H5), the LU mapping table #H0 (#H5), the LU-PDEV conversion table #H0 (#H5), and the CPU-in-charge table #H0 (#H5). In a case where the HDKC #H5 comprises a DP-LU, the LM #H5 will also store the virtual page management table #H5, and a portion of the CM #H5 will store the actual page management table #H5 and the top-of-queue management table #H5.

The internal controller #H0 (#H5) is not able to access management information inside its counterpart HDKC #H5 (#H0).

The server #0 and the third coupling medium 601 may be coupled to the same F-I/F #H0, or may be coupled to different F-I/Fs #H0.

The external LU #45 inside the HDKC #H5 is directly mapped to the virtual LU #35 inside the HDKC #H0.

According to FIG. 25, processing (S2501, S2502, S2503, S2511, S2512, S2513) that is the same as the processing (S1801, S1802, S1803, S1811, S1812, S1813) explained by referring to FIG. 18 will be performed.

In doing so, for example, a response (read-target data, write-complete notification) is sent from the HDKC (#H5) to the server #0 via the HDKC (#H0) in S2503 and S2512.

For example, the LU/PDEV conversion table #H5 is referenced in S2503 and S2513.

Furthermore, for example, in a case where the external LU #45 is the DP-LU, in S2503, the internal controller #H5 is able to perform the processing that was explained by referring to FIG. 20, and in S2513, is able to perform the processing that was explained by referring to FIG. 21. The virtual page management table #H5, the actual page management table #H5 and the top-of-queue management table #H5 are referenced and updated at this time.

Furthermore, in an I/O with respect to a LU according to the third coupling mode (any of Case 3-1 through Case 3-3), the CM #H0 of the HDKC #H0 is not used.

Specifically, for example, in a case where the internal controller #H0 has received a read command from the server #0, even though data (read-target data) inside the area belonging to the address specified in the read command exists in the CM #H0, the read-target data inside the CM #H0 is not sent to the server #0. This is because the read-target data inside the last LU (#45) could be being updated from the other server (#5), thereby making it likely that the read-target data inside the CM #H0 will not match the read-target data inside the last LU (#45). In accordance with this, the data stored in the CM inside the HDKC comprising the last LU is sent to the server #0 rather than the data inside the CM #H0.

Furthermore, for example, in a case where the internal controller #H0 receives a write command from the server #0, the data according to the write command may be transferred to the CM #H1 without being stored in the CM #H0.

Incidentally, in a case where the last LU stores only data used by the server #0, the CM #H0 may be used. That is, when the read-target data according to a first read command from the server #0 (the data inside a LU associated with a LU according to the third coupling mode) is in the CM #H0, the internal controller #H0 may return the read-target data inside the CM #H0 to the server #0 without transferring the second read command to the other HDKC via the third coupling medium. Furthermore, in a case where the internal controller #H0 receives a write command from the server #0, the data according to this write command (the write-target data) is written to the CM #H0 and a write-complete response is returned to the server #0. This function is the pre-cache function mentioned above. This function enhances write performance and/or read performance.

(Case 3-2: One Third Coupling Medium and One Second Coupling Medium)

Figure 28:
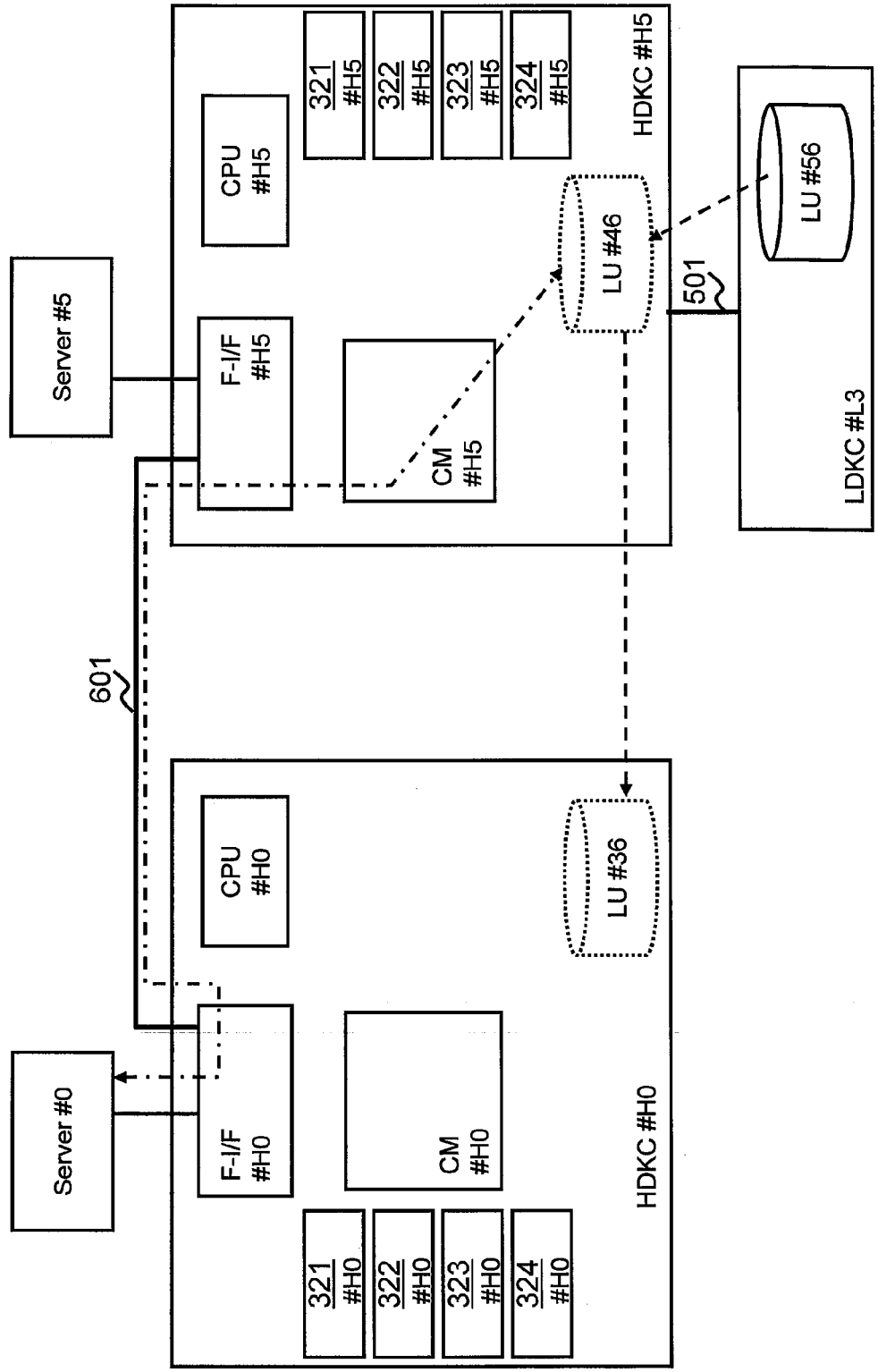
FIG. 28 shows an example of an overview of the configuration according to the third coupling mode (Case 3-2).

This will be explained by referring to FIGS. 27 and 28.

FIG. 27 shows the flow of I/O processing according to the third coupling mode (Case 3-2). FIG. 28 shows an example of an overview of the configuration according to the third coupling mode (Case 3-2). The dashed-dotted line in FIG. 28 indicates the flow of data.

The HDKC #H0 and the HDKC #H5 are coupled via the third coupling medium (external bus) 601. The LM #H0 (#H5) and a portion of the CM #H0 (#H5) store the tier management table #H0 (#H5), the LU mapping table #H0 (#H5), the LU/PDEV conversion table #H0 (#H5), and the CPU-in-charge table #H0 (#H5).

The HDKC #H5 and the LDKC #L3 are coupled via the second coupling medium (external bus) 501. The target port (not shown in the drawing) of the LDKC #L3 is coupled to the initiator port of the HDKC #H5. This initiator port may be either the same or a different F-I/F than the F-I/F of the initiator/target port coupled to the HDKC #H0.

In a case where the LDKC #L3 comprises a DP-LU (for example, when the LU #56 is the DP-LU), the internal controller #L3 is able to store the virtual page management table #L3, the actual page management table #L3, and the top-of-queue management table #L3.

The internal controller #H0 (#H5) is not able to access the management information inside the counterpart HDKC #H5 (#H0). Similarly, the internal controller #H5 (#L3) is not able to access the management information inside the counterpart DKC #L3 (#H5).

The server #0 and the third coupling medium 601 may be coupled to the same F-I/F #H0, or may be coupled to a different F-I/F #H0. Similarly, the server #5 and the third coupling medium 601 may be coupled to the same F-I/F #H5, or may be coupled to a different F-I/F #H5. The server #5 need not be coupled to the HDKC #H5.

The external LU #56 inside the LDKC #L3 is indirectly mapped to the virtual LU #36 inside the HDKC #H0. Specifically, the external LU #56 inside the LDKC #L3 is directly mapped to the external LU (virtual LU) #46 inside the HDKC #H5. This external LU (virtual LU) #46 is directly mapped to the virtual LU #36 inside the HDKC #H0.

According to FIG. 27, processing (S2701, S2702, S2703, S2704, S2711, S2712, S2713, S2714) that is the same as the processing (S2201, S2202, S2203, S2204, S2211, S2212, S2213, S2214) explained by referring to FIG. 22 is performed.

At this time, for example, a response (read-target data read from the last LU #56 or a write-complete notification) is sent from the HDKC (#H5) to the server (#0) via the HDKC (#H0) in S2704 and S2712.

Furthermore, for example, the LU mapping table #H5 is referenced in S2703 and S2713.

Also, in S2714, the write-target data is written to the last LU #56.

Furthermore, for example, in S2704 and S2714, the third I/O command is sent from the HDKC #H5 to the LDKC #L3, and the LU/PDEV conversion table #L3 in the LKC #L3 is referenced. The third I/O command, for example, comprises information denoting the ID of the LU #56 and a third address according to a second address (for example, the same address as the second address) specified in the second I/O command.

Furthermore, for example, in a case where the external LU #56 is the DP-LU, in S2704, the internal controller #L3 is able to perform the processing explained by referring to FIG. 20, and in S2714, is able to perform the processing explained by referring to FIG. 21. The virtual page management table #L3, the actual page management table #L3, and the top-of-queue management table #L3 are referenced and updated at this time.

(Case 3-3: Two Third Coupling Mediums)

Figure 30:
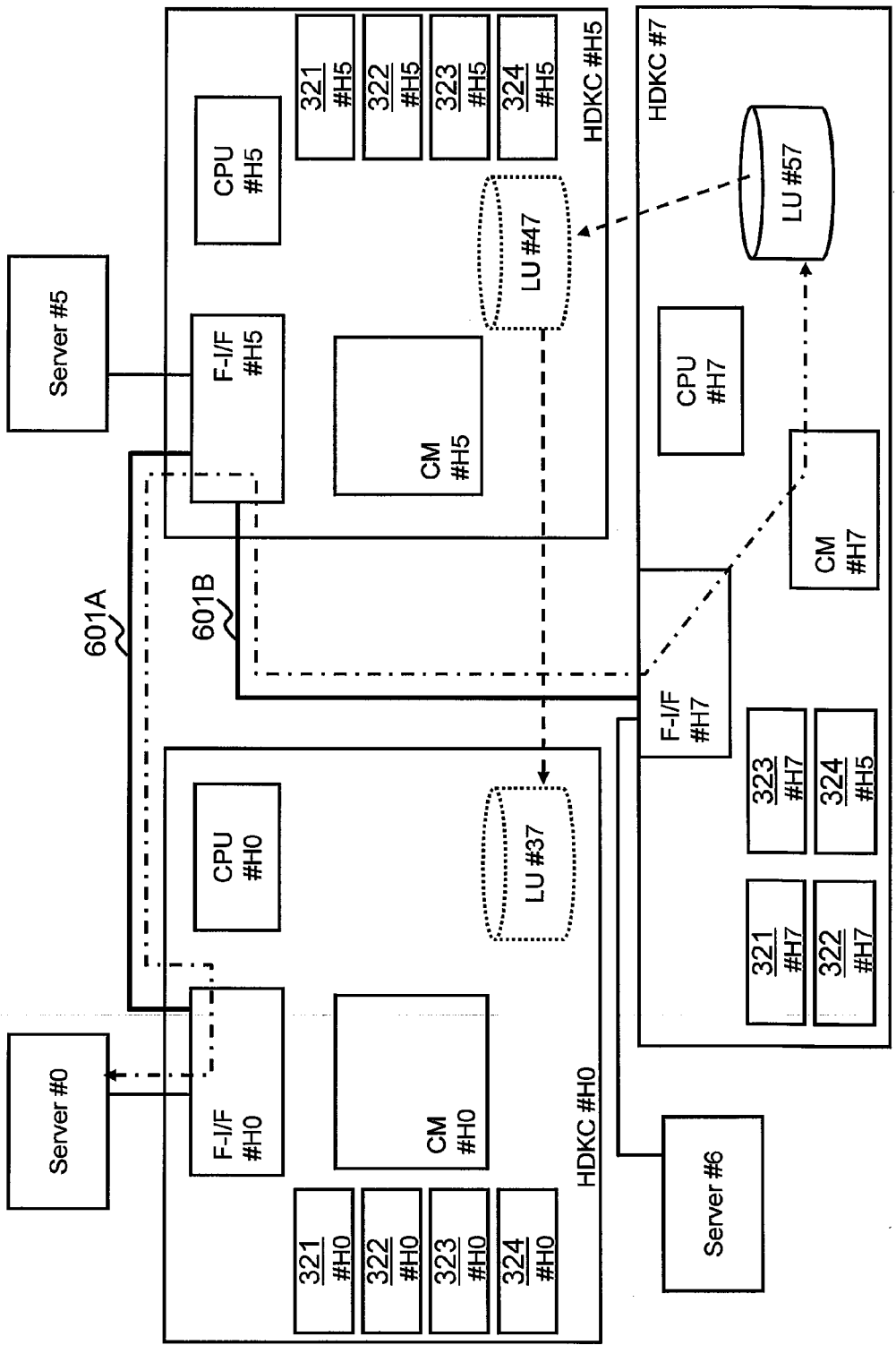
FIG. 30 shows an example of an overview of the configuration according to the third coupling mode (Case 3-3).

This will be explained by referring to FIGS. 29 and 30.

FIG. 29 shows the flow of I/O processing according to the third coupling mode (Case 3-3). FIG. 30 shows an example of an overview of the configuration according to the third coupling mode (Case 3-3). The dashed-dotted line in FIG. 30 indicates the flow of data.

The HDKC #H0 and the HDKC #H5 are coupled via the third coupling medium (external bus) 601A. The LM #H0 (#H5) and a portion of the CM #H0 (#H5) store the tier management table #H0 (#H5), the LU mapping table #H0

(#H5), the LU/PDEV conversion table #H0 (#H5), and the CPU-in-charge table #H0 (#H5).

The HDKC #H5 and the HDKC #H7 are coupled via the third coupling medium (external bus) 601B. The LM #H7 and a portion of the CM #H7 store the tier management table #H7, the LU mapping table #H7, the LU/PDEV conversion table #H7, and the CPU-in-charge table #H7. In a case where the HDKC #H7 comprises a DP-LU (for example, when the LU #57 is the DP-LU), the LM #H7 is able to store the virtual page management table #H7, and a portion of the CM #H7 is able to store the actual page management table #H7 and the top-of-queue management table #H7.

The internal controller #H0 (#H5) is not able to access the management information inside the counterpart HDKC #H5 (#H0). Similarly, the internal controller #H5 (#H7) is not able to access the management information inside the counterpart HDKC #H7 (#H5).

The server #0 and the third coupling medium 601 may be coupled to the same F-I/F #H0, or may be coupled to a different F-I/F #H0. Similarly, the server #5 and the third coupling mediums 601A and 601B may be coupled to the same F-I/F #H5, or may be coupled to a different F-I/F #H5. Similarly, the server #6 and the third coupling medium 601B may be coupled to the same F-I/F #H5, or may be coupled to a different F-I/F #H5.

The external LU #57 inside the HDKC #H7 is indirectly mapped to the virtual LU #37 inside the HDKC #H0. Specifically, the external LU #57 inside the HDKC #H7 is directly mapped to the external LU (virtual LU) #47 inside the HDKC #H5. This external LU (virtual LU) #47 is directly mapped to the virtual LU #37 inside the HDKC #H0.

In FIG. 29, S2901 and S2902 are the same processing as S2401 and S2402 explained by referring to FIG. 24. That is, the internal controller #H5 (F-I/F #H5) identifies the ID of LU #57 corresponding to the LU #47 specified in the second I/O command and the ID of the HDKC #H7 comprising this LU #57 (S2901). Then, the internal controller #H5 (F-I/F #H5) sends the third I/O command to the identified HDKC #H7. The third I/O command, for example, comprises information denoting the ID of the identified LU #57 and a third address according to a second address (for example, the same address as the second address) specified in the second I/O command.

In S2903, the third I/O command is processed by the HDKC #H7. In the HDKC #H7, for example, S2403 of FIG. 24 is performed, and thereafter, because S2404 is Yes, the same processing as the processing shown in FIG. 25 may be performed. At this time, for example, a response (read-target data or a write-complete notification) may be sent from the HDKC #H7 to the HDKC #H5 and sent from the HDKC #H5 to the server #0 via the HDKC #H0. Furthermore, in S2513, the write-target data is written to the last LU #57. Also, for example, in S2503 and S2513, the LU/PDEV conversion table #H7 is referenced. Furthermore, for example, in a case where the last LU #57 is a DP-LU, in S2503, the internal controller #H7 is able to perform the processing explained by referring to FIG. 20, and in S2513, is able to perform the processing explained by referring to FIG. 21. The virtual page management table #H7, the actual page management table #H7 and the top-of-queue management table #H7 are referenced and updated at this time.

The preceding has been explanations of Cases 3-1 through 3-3.

Furthermore, the HDKC #H0 may relay data to the LU of another HDKC in relation to a coupling according to the third coupling mode. In a case where the PDEV type is the same, of the LUs (A) through (C) of the HDKC #H0, the tier level of LU (A) may be the highest, the tier level of LU (B) may be the second highest, and the tier level of LU (C) may be the lowest. However, for this reason, for example, there may be a need for conditions, such as enough of a difference in the distance (the command response time) between the DKC comprising the LU (A) and the DKC comprising the LU (B) to serve as the basis for changing the tier level, and not enough of a difference in the distance (the command response time) between the DKC comprising the LU (B) and the DKC comprising the LU (C) to serve as the basis for changing the tier level.

(A) is a LU, which is based on the RG inside the HDKC #H0 and is provided to the server #0.

(B) is a LU, which is provided to the server #0 by being relayed through another HDKC.

(C) is a virtual LU that is the virtualization of the LDKC LU.

In accordance with the first embodiment described above, either instead of or in addition to a first coupling medium, an HDKC is coupled using a third coupling medium (an external bus) that enables long-distance coupling, and multiple HDKCs that are coupled using the third coupling medium are regarded virtually as a single DKC. For this reason, it is possible to install multiple HDKCs in respectively separate locations, thereby eliminating the need for a large space at the same site. Furthermore, since there are no particular restrictions on the number of DKCs that can be coupled, scalability is enhanced.

[Second Embodiment]

A second embodiment of the present invention will be explained. In so doing, the differences with the first embodiment will mainly be explained, and the points in common with the first embodiment will be either simplified or omitted.

As mentioned above, according to a storage system comprising a HDKC and a HDKC that is coupled to this HDKC using the third coupling mode, the server can be made to perceive the multiple HDKCs virtually as a single DKC.

In a storage system like this, the HDKC (for example, the CPU) that tends to have a high load is either the HDKC that actually executes the I/O with respect to the LU (hereinafter, the "HDKC-in-charge" in the second embodiment), for example, the HDKC that comprises the last LU, or the HDKC that is coupled to the LDKC via the second coupling mode. For this reason, in a case where the load on the LU inside the HDKC-in-charge is high (for example, a case in which I/Os are converging on this LU), the I/O performance of the HDKC-in-charge drops, and the HDKC-in-charge constitutes a bottleneck with respect to the I/O performance of the storage system.

Accordingly, in the second embodiment, load distribution is performed among the HDKCs. This makes it possible to avoid a drop in storage system I/O performance.

The load may be distributed from the HDKC to a HDKC that is coupled to this HDKC via the first coupling mode (hereinafter, the first coupling HDKC), and it may be distributed from the HDKC to a HDKC that is coupled to this HDKC via the third coupling mode (hereinafter, the third coupling HDKC). Hereinafter, the explanation will focus on the HDKC #H0 and the HDKC unit comprising same (hereinafter, HDKC unit #0 in the explanation of this embodiment). It is supposed that the HDKC unit #0 is configured from HDKC units #H0 and #H9.

Each HDKC may store the management information shown in FIGS. 34A, 34B, 35 and 36.

FIG. 34A shows the configuration of a CPU-in-charge table 3211 (#H0) related to the second embodiment.

The CPU-in-charge table 3211 comprises information denoting the percentages of the CPU-in-charge utilization rate accounted for by the relevant LUs for each LU. Specifically, for example, in addition to the information 3101 through 3103 (refer to FIG. 31), the CPU-in-charge table 3211 (#H0) comprises the CPU utilization rate by LU 3404 for each LU. The CPU utilization rates 3102 and 3404 may be updated either regularly or irregularly by either the CPU corresponding thereto or a specific CPU inside the HDKC unit #0 (the master CPU).

The following is clear according to the table #H0 of FIG. 34A. That is, the utilization rate of the CPU #H00 is 60%. Of this, the utilization rate with respect to the LU #0 is 40%, the utilization rate with respect to the LU #4 is 20%, and the utilization rate with respect to the LU #8 is 0%.

This table #H0 may be updated regularly (or irregularly) by at least one of the CPUs of the HDKC unit #0 (or the HDKC #H0). In this embodiment, the updating is performed by the master CPU. The master CPU is the CPU that is in charge of specified processing other than I/O processing (for example, the load distribution related to the second embodiment) with respect to the LU. The master CPU may also perform I/O processing with respect to the LU.

Furthermore, the load on the LU may be expressed using a different type of load index, for example, the number of I/Os per unit of time (for example, the number of reads, the number of writes, or the total thereof) either instead of or in addition to the CPU utilization rate with respect to this LU.

FIG. 34B shows the configuration of a load threshold management table 3214 (#H0).

The load threshold management table 3214 shows the criteria for determining whether the load is high or low. According to the table 3214, these criteria are prepared for both the CPU and the DKC. However, these criteria may be prepared for another type of element (for example, the FE port). Furthermore, the contents of the table 3214 may either be the same or different for multiple HDKCs.

The following is clear according to the table #H0 of FIG. 34B. For example, the CPU #H0 is the high-load CPU in a case where the CPU utilization rate is equal to or larger than 70%, and is the low-load CPU in a case where the CPU utilization rate is equal to or smaller than 50%. Furthermore, the HDKC #H0 is the low-load DKC in a case where the utilization rate based on the CPU utilization rates of all the CPUs #H0 (for example, the average CPU utilization rate) is equal to or smaller than 40%.

The thresholds described in the table #H0 of FIG. 34B may be changed by the administrator via a user interface (for example, a GUI (Graphical User Interface)).

The high-load CPU (and/or the low-load CPU) in the HDKC may be the CPU in this HDKC for which the load is relatively high (or low). For example, the high-load CPU (or the low-load CPU) in the HDKC may be determined on the basis of the distribution of the load (CPU utilization rate) of multiple CPUs in this HDKC.

FIG. 35 shows the configuration of a port load management table 3212 (#H0).

The port load management table 3212 comprises information related to the load on each FE port. Specifically, for example, the port load management table #H0 comprises the following information for each LU belonging to the FE port:
A port ID 3501, which is the identifier of the FE port to which the LU belongs;
a CPU utilization rate by port 3502, which is a value (for example, a total) based on the CPU utilization rate 3504 with respect to all LUs belonging to the FE ports to which the LUs belong;
a LU ID 3503, which is the identifier of the LU belonging to the FE port;
a CPU utilization rate by LU 3504; and
a CPU-in-charge ID 3505, which is the identifier of the CPU-in-charge of the LU.

The respective CPU utilization rates 3502 and 3504 may be updated either regularly or irregularly by either the CPU corresponding thereto or the master CPU inside the HDKC unit #0.

The following is clear according to the table #H0 of FIG. 35. That is, the LUs #0 and #1 belong to the FE port #HOA. The CPU utilization rate with respect to the LU #0 is 40%, the CPU utilization rate with respect to the LU #1 is 30%, and therefore the CPU utilization rate with respect to the FE port #HOA is 70% (40%+30%). Furthermore, the CPU-in-charge of the LU #0 is CPU #H00, and the CPU-in-charge of the LU #1 is CPU #H01.

FIG. 36 shows the configuration of a temporary LU management table 3213 (#H0).

The temporary LU management table 3213 comprises information related to a temporary LU. The "temporary LU" is a LU that is created beforehand (or at load distribution) and is used in load distribution. Specifically, for example, the temporary LU is a LU that is capable of being selected as the migration destination of data inside the LU of which the high-load CPU is in charge (hereinafter, the migration-source LU). A tier level is also computed for the temporary LU. When the load is being distributed from a certain HDKC to the third coupling HDKC, a temporary LU, which belongs to the same tier (either the tier level or the tier level range) as the tier (either the tier level or the tier level range) to which the migration-source LU (the LU inside the certain HDKC) belongs, is selected.

Specifically, for example, the temporary LU management table 3213 comprises the following information for each temporary LU:
A PDEV type 3601, which denotes the type of PDEV that constitutes the basis of the temporary LU;
a total capacity 3602, which is the total of the storage capacities of one or more temporary LUs based on the PDEV type constituting the basis of the temporary LU;
a temporary LU ID 3603, which is the identifier of the temporary LU; and
a temporary LU capacity 3604, which is the storage capacity of the temporary LU.

The following is clear according to the table #H0 of FIG. 36. The total capacity of one or more temporary LUs based on one or more SSD is 3584 GB. The temporary LU #1000 is one LU based on the SSD, and the storage capacity thereof is 1024 GB.

All of the multiple tables #H0 shown in FIGS. 34A through 36 may be arranged in the CM (#H00) inside a specific controller module (#H00) in the HDKC #H0 (or may be arranged in the shared information management device 301) so as to be able to be referenced/updated by all the CPUs #H0. In a case where the LM #H0 of a specific CPU #H0 (for example, the master CPU) is capable of being referenced/updated from all the other CPUs #H0, the multiple tables #H0 shown in the FIGS. 34A through 36 may be arranged in the LM (#H00) coupled to the specific CPU (#H00). In addition, of the multiple tables #H0 shown in the FIGS. 34A through 36, the LM and/or CM inside each controller module may only store that portion of the tables related to the relevant controller module.

A load distribution control process performed by this embodiment will be explained below. This process, for example, is started either regularly or irregularly. In the following explanation, load distribution control processing performed by the HDKC #H0 will be given as an example. However, load distribution control processing is capable of being performed by all the HDKCs. Further, in the following explanation, the processing is performed mainly by the master CPU, but this processing is performed by the master CPU executing a prescribed computer program.

The load distribution control process related to this embodiment is configured from the following three processes:

(1) A process for determining whether or not load distribution is to be executed (the load distribution determination process);
(2) a process for distributing the load to the first coupling HDKC (or a process for distributing the load within one HDKC) (hereinafter, the first type load distribution process); and
(3) a process for distributing the load to the third coupling HDKC (hereinafter, the second type load distribution process).

Figure 37:
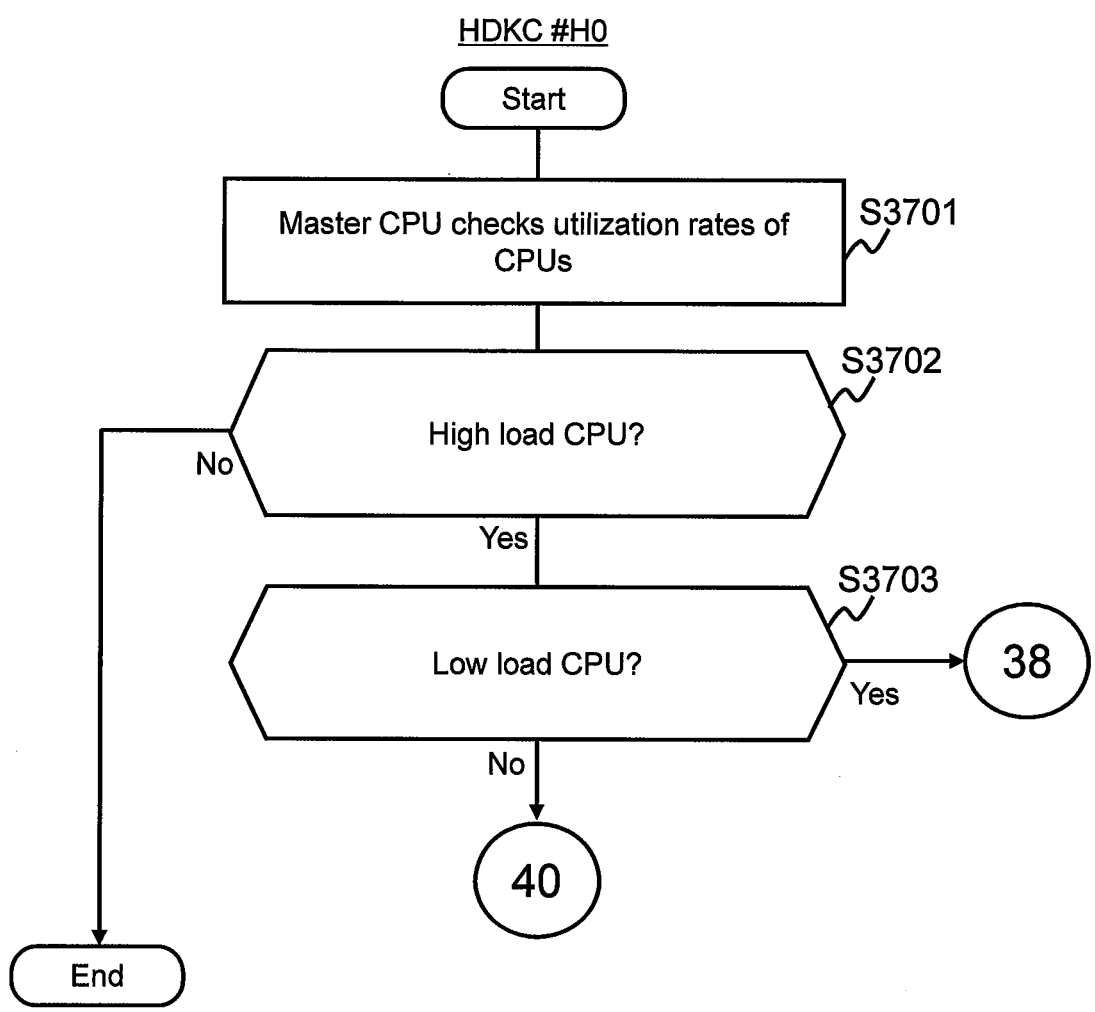
FIG. 37 shows the processing flow of a portion of a load distribution control process (a load distribution determination process).

FIG. 37 shows the flow of the load distribution determination process.

In S3701, the master CPU identifies the CPU utilization rate 3102 of each CPU based on all the CPU-in-charge tables (#0 and #9) inside the HDKC unit #0. Furthermore, instead of the master CPU, the respective CPUs inside the HDKC unit #0 (or respective HDKCs) may each start a load distribution control process. However, in a case where each CPU performs load distribution control processing, operational exclusivity may be required. This is because performing load distribution control processing in accordance with multiple CPUs simultaneously could redundantly update the same management information. For this reason, the master CPU performs the load distribution control process in this embodiment.

In S3702, the master CPU determines whether or not the high-load CPU is in the HDKC unit #0 based on the CPU utilization rate 3102 of each CPU inside the HDKC unit #0 and the load threshold management tables (#H0 and #H9). The CPU (either #H0 or #H9) for which the CPU utilization rate 3102 exceeds the high-load threshold of the CPU is the high-load CPU.

In a case where the result of the determination of S3702 is negative (a case in which there is no high-load CPU) (S3702: No), the master CPU ends the processing for determining load distribution.

In a case where the result of the determination of S3702 is affirmative (a case in which there is a high-load CPU) (S3702: Yes), in S3703, the master CPU determines whether or not there is a low-load CPU in the HDKC unit #0 based on the CPU utilization rate 3102 of each CPU inside the HDKC unit #0 and the low-load threshold tables (#H0 and #H9). The CPU (either the #H0 or the #H9) for which the CPU utilization rate 3102 is less than the CPU low-load threshold is the low-load CPU.

In a case where the result of the determination of S3703 is affirmative (a case in which there is a low-load CPU) (S3703: Yes), the processing shown in FIG. 38, that is, the first type load distribution processing is performed.

In a case where the result of the determination of S3703 is negative (a case in which there is no low-load CPU) (S3703: No), the processing shown in FIG. 40, that is, the second type load distribution processing is performed.

According to FIG. 37, the first type load distribution process is not performed in the HDKC unit #0 in a case where there is no low-load CPU in this HDKC unit #0 even when there is a high-load CPU in this HDKC unit #0. Furthermore, whether the CPU load (CPU utilization rate) is a high load or a low load, for example, is determined based on the high-load threshold and the low-load threshold (both of which are CPU utilization rate thresholds) described in the load threshold management table 3214 (refer to FIG. 34B). The high-load threshold is higher than the low-load threshold.

Furthermore, according to FIG. 37, even in a case where another HDKC unit is coupled either directly or indirectly to the HDKC unit #0, the low-load CPU performs load distribution to a first coupling HDKC (or load distribution within a single HDKC) on a priority basis rather than load distribution to a third coupling HDKC when there is a HDKC unit #0. That is, priority is placed on load distribution via the internal bus rather than load distribution via the external bus. This makes it possible to shorten the time it takes for load distribution. Furthermore, priority does not always have to be placed on load distribution to the first coupling HDKC (or load distribution inside a single HDKC).

The first type load distribution and the second type load distribution will be explained hereinbelow.

<First Type Load Distribution>

Figure 38:
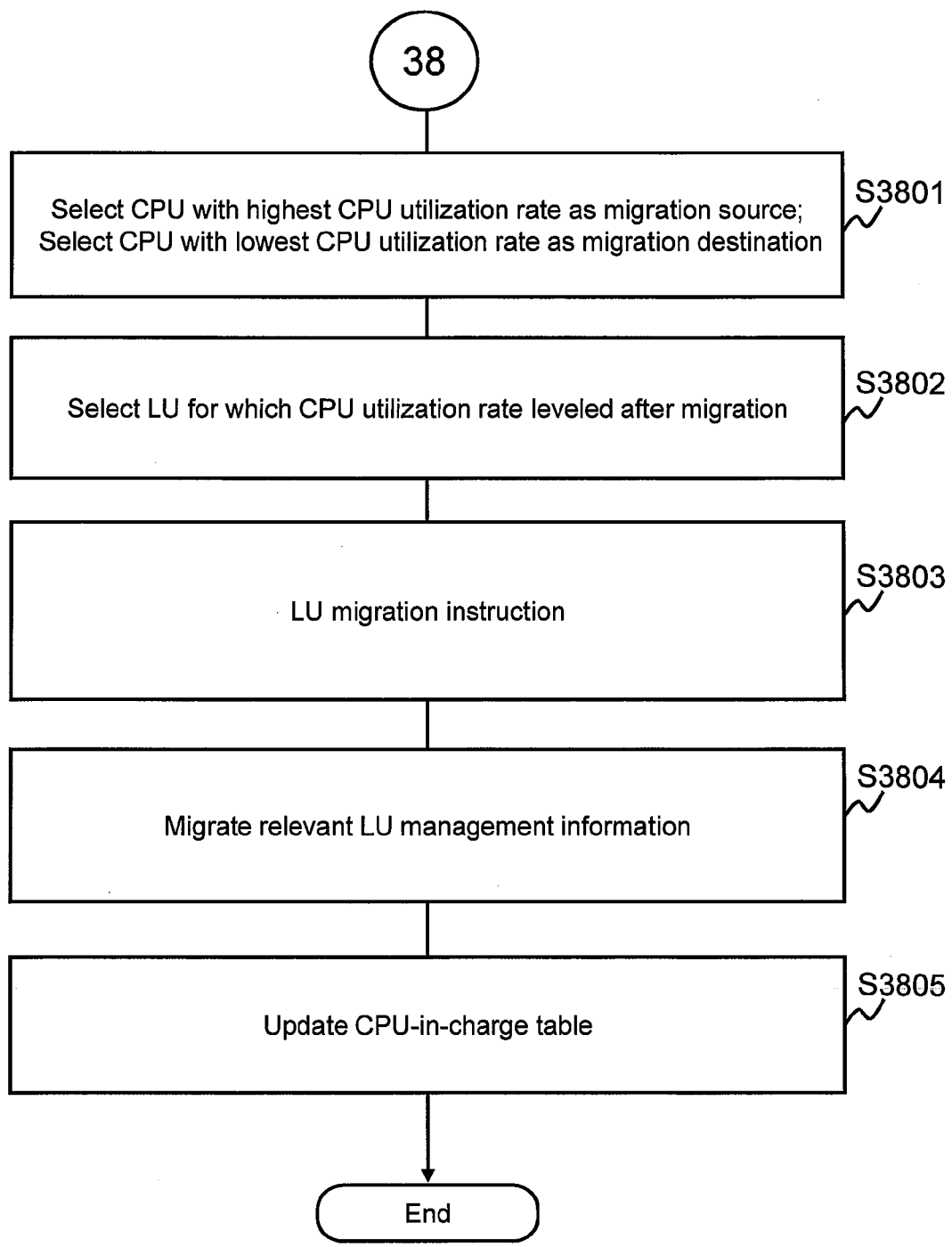
FIG. 38 shows the processing flow of a portion of the load distribution control process (a first type load distribution process).

FIG. 38 shows the flow of the first type load distribution process.

Figures 39A, 39B:
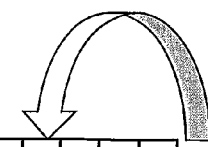
FIG. 39A shows an example of a pre-load distribution CPU-in-charge table in the first type load distribution process.
FIG. 39B shows an example of a post-load distribution CPU-in-charge table in the first type load distribution process

In S3801, the master CPU selects from among the one or more high-load CPUs inside the HDKC unit #0 the CPU with the highest CPU utilization rate 3102 as the migration source, and, in addition, selects from among the one or more low-load CPUs inside the HDKC unit #0 the CPU with the lowest CPU utilization rate 3102 as the migration destination. According to the example of FIG. 39A, the CPU #H02 is selected as the migration-source CPU, and the CPU #H01 is selected as the migration-destination CPU. Also, according to the example of FIG. 39A, both the migration-source CPU and the migration-destination CPU reside in the HDKC #H0, but at least one of these CPUs could be a CPU that resides in the other HDKC inside the HDKC unit #0.

In S3802, the master CPU selects a LU that will level the CPU utilization rate 3102 of the migration-source CPU (#H02) and the CPU utilization rate 3102 of the migration-destination CPU (#H01) subsequent to migration (subsequent to completion of the first type load distribution process) based on all the CPU-in-charge tables inside the HDKC unit #0. In other words, the master CPU selects from multiple LUs (#2, #3, #6, #7), for which the migration-source CPU (#H02) is the CPU-in-charge, a LU such that the CPU utilization rate 3102 of the migration-source CPU (#H02) and the CPU utilization rate 3102 of the migration-destination CPU (#H01) become substantially equal by changing the CPU-in-charge from the migration-source CPU (#H02) to the migration-destination CPU (#H01). The "CPU utilization rate 3102 is substantially equal", for example, signifies that the difference between the CPU utilization rates 3102 is equal to or less than x % (where x=5 for example). According to the example of FIG. 39A, in a case where the CPU-in-charge of the LU #7, for which the CPU utilization rate 3404 is "20%", is changed from the CPU #H02 to the CPU #H01, it is assumed that the CPU utilization rate 3102 of the CPU #H01 will increase from "40%" to "60%", and, in addition, it is assumed that the CPU utilization rate 3102 of the CPU #H02 will decrease from "85%" to "65%". That is, it is assumed that the CPU utilization rate 3102 of the migration-source CPU #H02 and the CPU utilization rate 3102 of the migration-destination CPU #H01 become substantially equal. Therefore, according to the example of FIG. 39A, LU #7 is selected in this S3802.

In S3803, the master CPU issues a LU migrate instruction (an instruction to migrate the migration-target LU (#7)) to the migration-source CPU (#H02) and the migration-destination CPU (#H01).

In S3804, the migration-destination CPU (#H01) receives this instruction and copies the information specific to the migration-target LU (#7) within the management information stored in the LM (#H02) of the migration-source CPU (#H02) from the migration-source LM (#H02) to the LM (#H01) of the migration-destination CPU (#H01). When copying is complete, the migration-destination CPU (#H01) reports to the migration-source CPU (#H02) that copying has ended. The migration-source CPU (#H02), upon receiving the report that copying has ended, deletes the above-mentioned copied specific information from the migration-source LM (#H02). This completes the migration of the information specific to the migration-target LU (#7). As used here, "information specific to the migration-target LU", for example, is information, for example, the CM management information or the virtual page management table corresponding to the LU (#7), which is only capable of being referenced/updated by the CPU-in-charge of the migration-target LU.

In S3805, the master CPU changes the CPU-in-charge of the migration-target LU (#7) from the migration-source CPU (#H02) to the migration-destination CPU (#H01). According to the example of FIG. 39B, the master CPU performs the following processing:

Associates the CPU utilization rate 3404 and the LU-ID 3103 corresponding to the migration-target LU (#7) with the CPU-in-charge #H01 instead of the CPU-in-charge #H02; and subtracts the CPU utilization rate 3404 corresponding to the migration-target LU (#7) from the CPU utilization rate 3102 corresponding to the migration-source CPU #H02, and, in addition, adds the CPU utilization rate 3404 corresponding to the migration-target LU (#7) from the CPU utilization rate 3102 corresponding to the migration-destination CPU #H01.

According to this first type load distribution process, each CPU in the HDKC unit #0 is able to use the hardware resources inside another HDKC that does not comprise this CPU the same as the hardware resources inside the HDKC that does comprise this CPU. According to the first type load distribution process, the CPU-in-charge of a LU can be changed (the load distribution can be performed) by simply migrating the management information or a portion thereof.

<Second Type Load Distribution Process>

The second type load distribution process will be explained hereinbelow. Furthermore, in the following explanation, it will be supposed that the HDKC that is coupled to the HDKC #H0 using the third coupling mode is the HDKC #H1.

One conceivable method for distributing the load of the high-load CPU inside the HDKC #H0 is a method that migrates the LU of which the high-load CPU is in charge to the third coupling HDKC #H1.

Even in a case where a LU migration is performed like this, it is preferable that the server be able to access this LU the same as it has up until now. For example, port identification information (for example, a WWN (World Wide Name), N_Port_Name, N_Port_ID, S_ID), and LU identification information (for example, a LUN) are specified in a server-issued login command or I/O command, or other commands in accordance with the SCSI (Small Computer System Interface), FC or the like. For this reason, it is preferable that the port identification information and LU identification information remain the same before and after a LU migration.

Furthermore, since multiple third-coupling HDKC units 141 and HDKCs, for example, are coupled using an external bus and are installed at sites that are either a medium or long distance away, frequently repeating the meticulous LU-unit load distributions as in the first coupling will result in an increased processing load. Therefore, in a case where a state (threshold) requiring a load distribution has been fundamentally reached in the multiple HDKC units 141 and HDKCs installed at the medium- and long-distance sites, it is better to carry out load distribution processing collectively for multiple LUs (multiple LU units, for example, port units). Processing for carrying out load distribution in port units is described hereinbelow, but the fact that load distribution may be performed collectively for multiple LUs is a higher-level concept of the present application.

Specifically, for example, as shown in FIG. 65A, it is supposed that the server #0 recognizes the two LUs #0 and #1 belonging to the target port #H00.

At this point, it is supposed that the internal controller #H0 migrates the LU #0 by migrating the data inside the LU #0 to the LU #3 inside the HDKC #H1 as shown in FIG. 65B. In accordance with this, to make sure that the port identification information and LU identification information remain the same before and after the migration of the LU #0, it is preferable that the LU #0 be converted to a virtual LU #0, and that the LU #3 be mapped to the virtual LU #0. This is because, when the server #0 issues an I/O command specifying the port identification information that has been allocated to the target port #H00 and the LU identification information that has been allocated to the LU #0, an I/O is performed with respect to the virtual LU #0, and therefore the I/O is performed with respect to the LU (the LU that will store the data, which had been stored in the LU #0) #3 that is mapped to the virtual LU #0.

However, in this case, the coupling mode related to the LU #0 before the migration of the LU #0 will change after the migration of the LU #0. That is, before the migration of the LU #0, there is no need for an I/O by way of the external bus 601, but after the migration of the LU #0, an I/O via the external bus 601 will become necessary. That is, the tier (either the tier level or the tier level range) to which the LU #0 belongs before the migration of the LU #0 will change after the migration of the LU #0. When the tier to which the LU #0 belongs changes, the I/O performance with respect to the LU #0 changes.

One conceivable method for keeping the tier the same, for example, is to allocate (affiliate) the LU #3 to the FE port inside the HDKC #H1, and to have the HDKC #H1 receive the I/O command from the server #0 with respect to the LU #3. In the case of this method, there is no need to go through the external bus 601. However, according to this method, the server #0 must recognize the identification information of a port other than the target port #H00.

So, according to the second type load distribution process related to this embodiment, the tier (either the tier level or the tier level range) to which the LU belongs is the same before and after the migration of this LU, and, in addition, the port identification information and LU identification information is also the same before and after the migration of the LU. Specifically, for example, the load distribution is performed in port units in the second type load distribution process.

A port-unit load distribution will be explained by referring to FIGS. 32 and 33.

Figure 32:
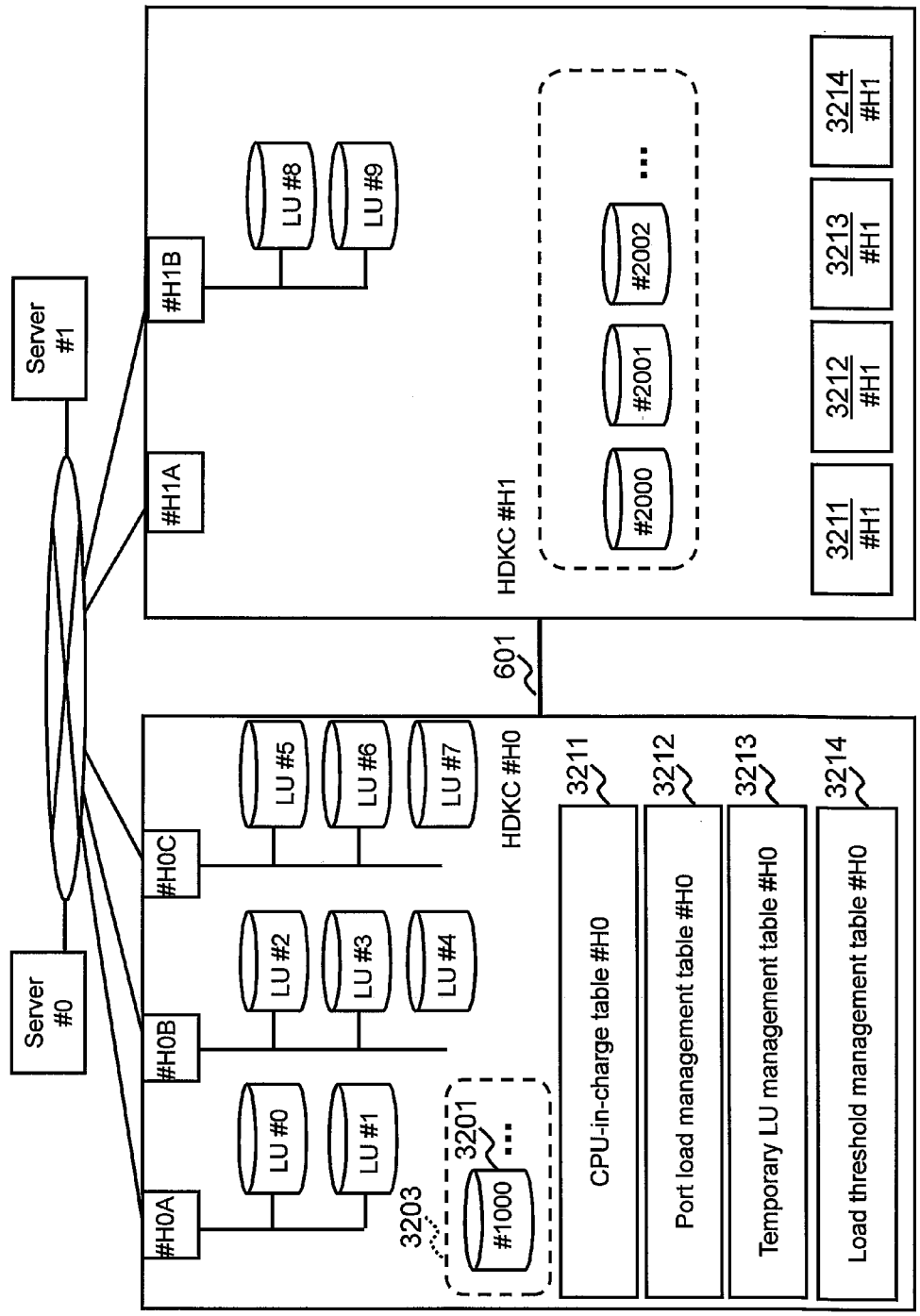
FIG. 32 shows an example of the configuration prior to the start of port-unit load distribution (a second type load distribution process).
Figure 33:
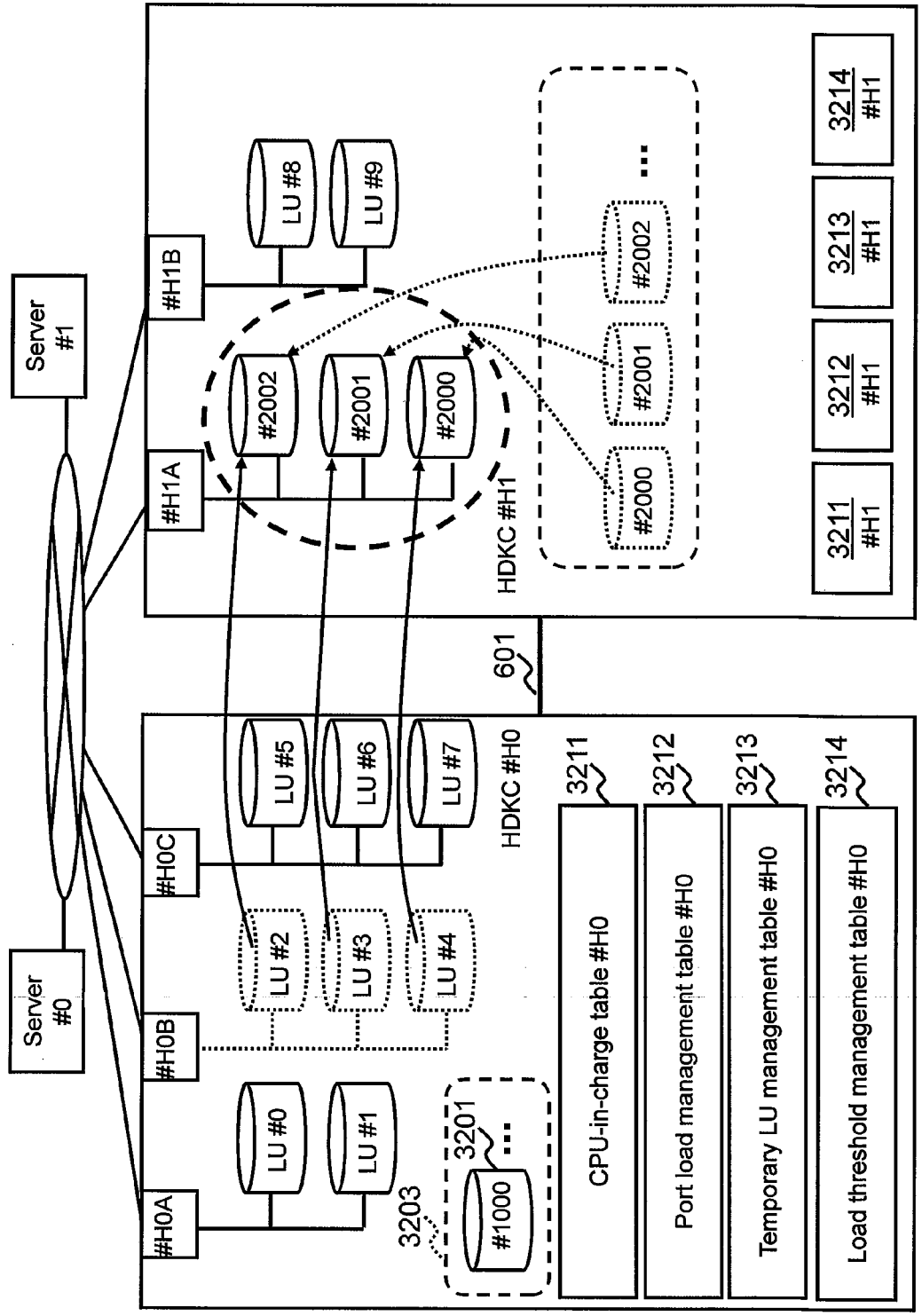
FIG. 33 shows an overview of a port-unit load distribution (the second type load distribution process).

As shown in FIG. 32, each HDKC comprises a temporary LU group 3203. The group 3203 is configured from multiple temporary LUs 3201. The temporary LU 3201 is a LU that has not been allocated to the FE port, and, in addition, is a LU in which data input/output by the server is not being stored.

The temporary LU group 3203 may be configured from multiple temporary LUs of the same tier (for example, either the tier level or the tier level range) or may be configured from multiple temporary LUs from different tiers. In the case of the former, there may be a temporary LU group 3203 for each tier.

It is preferable that there be various types of temporary LUs. For example, there may be multiple temporary LUs with different PDEV types, and multiple temporary LUs with different LU types (for example, an ordinary LU, a DP-LU, and a virtual LU according to the second coupling mode). In a case where there are various types of temporary LUs, there exist the multiple LUs belonging to different tiers, thereby raising the likelihood of finding a temporary LU that will serve as the migration destination of the migration-source LU (a temporary LU belonging to the same tier as the tier to which the migration-source LU belongs) in the second type load distribution process.

An LU (an ordinary LU, a virtual LU or a DP-LU) is mapped to the FE port. In 0376order to simplify the explanation that follows, it is supposed that the LU allocated to the FE port in FIG. 32 is either a LU according to own-DKC or a LU according to the first coupling mode. However, a virtual LU according to the second coupling mode and/or a LU according to the third coupling mode may be allocated to the FE port.

The HDKC comprises a free FE port. The free FE port is a FE port, which is able to be used in the second type load distribution process and to which not one LU has been allocated. According to the example of FIG. 32, the FE port #H1A of the HDKC #H1 is the free FE port. Furthermore, although a free FE port is not shown in the drawing for HDKC #H0, the HDKC #H0 may also comprise a free FE port.

According to the example of FIG. 38, port-unit load distribution, for example, is performed as follows.

(33-1) A target FE port is selected from the multiple FE ports of the HDKC #H0. The target FE port is an FE port such that the DKC load of the HDKC #H0 (the average of the CPU utilization rates 3102 of all the CPUs #H0) and the DKC load of the HDKC #H1 (the average of the CPU utilization rates 3102 of all the CPUs #H1) are leveled by migrating the data inside all the LUs belonging to this FE port to the HDKC #H1. According to the example of FIG. 33, the FE port #H0B is selected. In a case where the data of all the LUs #2, #3, #4 belonging to the FE port #H0B is migrated to the HDKC #H1, the DKC load of the HDKC #H0 and the DKC load of the HDKC #H1 are leveled.

(33-2) The free FE port #H1A is selected from the HDKC #H1.

(33-3) The temporary LU #2002, which belongs to the same tier (either the tier level or the tier level range) as the tier to which LU #2 belongs, is selected as the migration-destination LU of the LU #2. The storage capacity of the temporary LU #2002 is equal to or larger than the storage capacity of the LU #2.

(33-4) Similarly, the temporary LU #2001 (#2000), which belongs to the same tier as the tier to which LU #3 (#4) belongs, is selected as the migration-destination LU of the LU #3 (#4). The storage capacity of the temporary LU #2001 (#2000) is equal to or larger than the storage capacity of the LU #3 (#4).

(33-5) The data is migrated from the LU #2 to the temporary LU #2002. Similarly, the data is migrated from the LU #3 (#4) to the temporary LU #2001 (#2000).

(33-6) The temporary LUs #2000, #2001 and #2002 are allocated to the free FE port #H1A.

(33-7) The port identification information that had been allocated to the target FE port #H0B is allocated to the free FE port #H1A instead of the target FE port H0B. The LU identification information (for example, the LUN) that had been allocated to the migration-source LU #2 is allocated to the LU #2002 instead of the LU #2. Similarly, the LU identification information that had been allocated to the migration-source LU #3 (#4) is allocated to the LU #2001 (#2000) instead of the LU #3 (#4).

After completion of this second type load distribution process, the server #0 is able to perform I/O with respect to the LU using the same method as before the start of the second type load distribution process. For example, the server #0 is able to perform I/O with respect to the LU #2000, which has been allocated to the FE port #H1A, by issuing an I/O command comprising the port identification information that had been allocated to the FE port #H0B and the LU identification information that had been allocated to the LU #2.

The flow of the second type load distribution process will be explained by referring to FIGS. 40 through 42. FIGS. 32 and 33 will be referenced as needed at this time. Furthermore, FIGS. 45A, 45B, 46A and 46B show tables prior to the start of the second type load distribution process, and FIGS. 47A, 47B, 48A and 48B show tables subsequent to the updating in the second type load distribution process.

Figure 40:
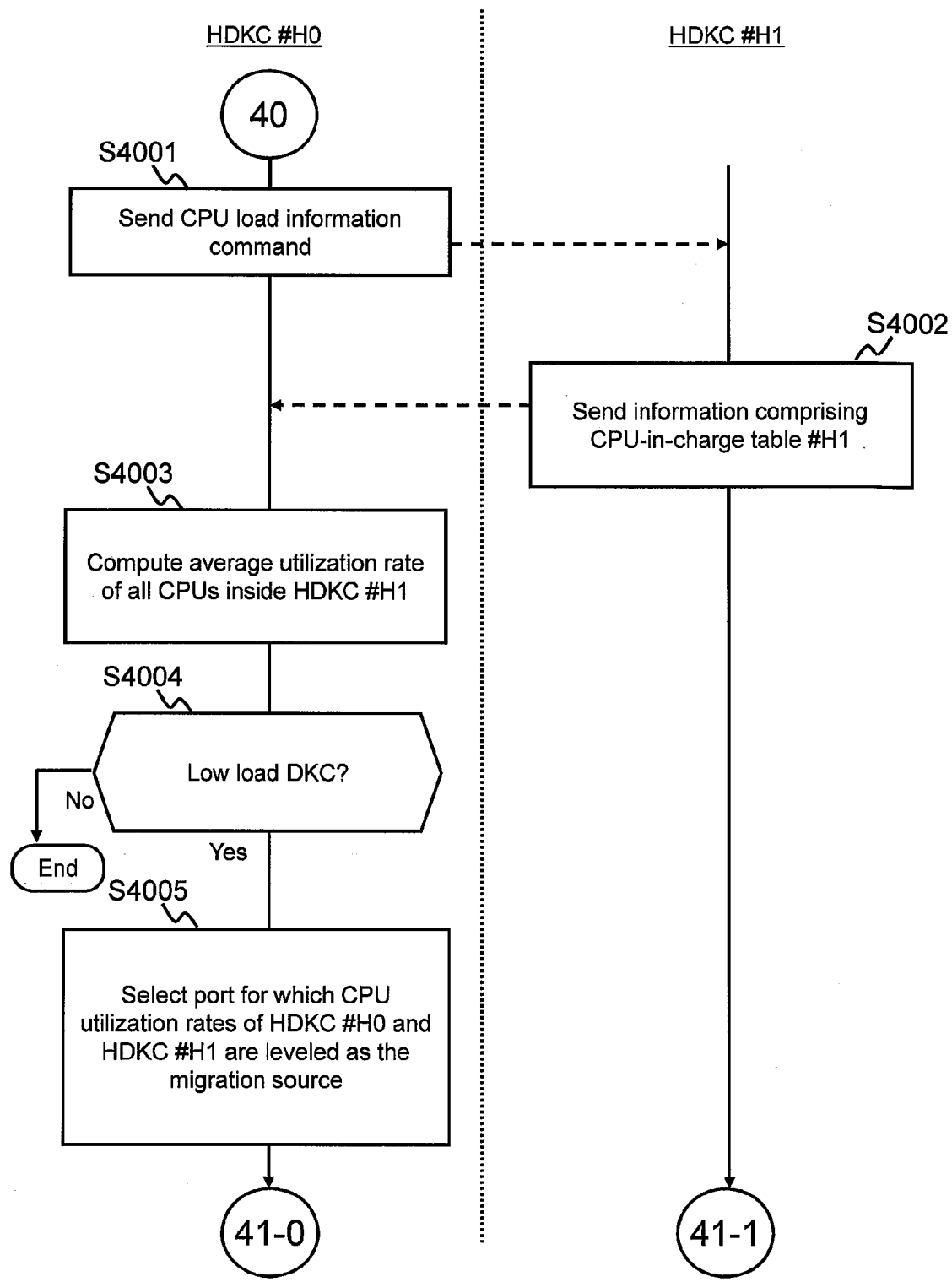
FIG. 40 shows the processing flow of a portion of the load distribution control process (a portion of the second type load distribution process).

As shown in FIG. 40, in S4001, the master CPU #H0 sends a CPU load information command to the HDKC #H1. In the HDKC #H1, the F-I/F #H1 receives the CPU load information command and transfers this command to the master CPU #H1. The CPU load information command is for acquiring information that is in the CPU-in-charge table.

That is, since the HDKC #H0 and the HDKC #H1 are coupled using the third coupling mode, the CPU #H0 is not able to directly reference the management information inside the HDKC #H1 (it is not able to carry out referencing via an access by way of the internal bus 227). For this reason, the CPU #H0 acquires the information of the management information inside the HDKC #H1 using a command (or another method).

Furthermore, in the following explanation, it is supposed that the command related to the second type load distribution process is carried out between the master CPUs #H0 and #H1. However, this kind of command may be exchanged with a CPU other than the master CPU. The command is sent and received by way of the HDKC #H0 initiator/target port and the HDKC #H1 initiator/target port.

In S4002, the master CPU #H1 receives the CPU load information command, acquires the information (the information of all the CPUs #H1 inside the HDKC #H1) 3101, 3102, 3103 and 3104 of the CPU-in-charge table #H1, and sends this information to the HDKC #H0.

In S4003, the master CPU #H0 receives the information sent from the HDKC #H1 in S4002, and based on this information, computes the average of the CPU utilization rates 3102 of all the CPUs #H1 inside the HDKC #H1 (that is, the DKC load of the HDKC #H1).

In S4004, the master CPU #H0 determines whether or not the HDKC #H1 is a low-load DKC based on the DKC load computed in S4003. In a case where the DKC load computed in S4003 is less than the DKC low-load threshold (refer to FIG. 34B), the HDKC #H1 is a low-load DKC.

In a case where the result of the determination of S4004 is negative (S4004: No), the second type load distribution processing ends. Furthermore, in a case where there are multiple third coupling HDKCs, the master CPU #H0 may send the CPU load information command to the multiple third coupling HDKCs in S4001. In a case where none of the third coupling HDKCs is a low-load DKC, the result of the determination in S4004 may be No.

In a case where the result of the determination of S4004 is affirmative (that is, a case in which the HDKC #H1 is a low-load DKC) (S4004: Yes), the below-mentioned S4005 and subsequent steps are performed. Furthermore, in a case where there are multiple low-load DKCs (third coupling HDKCs) the HDKC having the lowest DKC load of these multiple low-load DKCs may be regarded as the target of the below-mentioned S4005 and subsequent steps. Furthermore, in this example, the only third coupling HDKC of the HDKC

H0 is the HDKC #H1, and, in addition, according to the examples shown in FIGS. 46A and 46B, since the DKC load of the HDKC #H1 is 13%, and this DKC load is less than the DKC low-load threshold "40%" (refer to FIG. 34B), the HDKC #H1 is the low-load DKC that will be targeted in S4005 and subsequent steps.

In S4005, the master CPU #H0 selects as the migration source from among the multiple FE ports of the HDKC #H0 the FE port that satisfies at least one of the below-listed port conditions (x1) and (x2) (for example the FE port that satisfies at least (x1)):

(x1) Levels the HDKC #H0 DKC load and the HDKC #H1 DKC load in a case where all the allocated LUs are migrated to the HDKC #H1; and (x2) the high-load CPU #H0 ceases to be high load in a case where the LU that is under the charge of the high-load CPU #H02 (the CPU for which the CPU utilization rate 3102 exceeds the CPU high-load threshold) (refer to FIG. 46A) has been allocated and all the allocated LUs are migrated to the HDKC #H1.

Specifically, for example, the following processing is performed.

The master CPU #H0, based on the CPU-in-charge table #0 (refer to FIG. 46A), computes the DKC load of the HDKC #H0 (the average of the CPU utilization rates 3102 of all the CPUs #H0 inside the HDKC #H0). According to the example of FIG. 46A, this DKC load is "71%".

The master CPU #H0, based on the port load management table #H0 (refer to FIG. 45A), the "71%" DKC load of the HDKC #H0, and the "13%" DKC load of the HDKC #H1, selects from among the multiple FE ports of the HDKC #H0 the FE port that satisfies at least one of the above-mentioned (x1) and (x2) as the migration source. FE port #H0B (CPU utilization rate by port 3502 of "85%") (refer to FIG. 45A) is selected here as this FE port. In a case where all of the LUs allocated to the FE port #H0B are migrated to the HDKC #H1, the DKC loads of the HDKC #H0 and the HDKC #H1 are leveled, and, in addition, the high-load CPU #H02 ceases to be high load (refer to FIGS. 46A, 46B, 48A, and 48B). Specifically, the DKC load of the HDKC #H0 drops from "71%" to "43%", and the DKC load of the HDKC #H1 rises from "13%" to "41%", thereby leveling the DKC loads (the difference between the DKC loads is less than x % (where x is an integer (for example, 5))). Also, the load on the CPU #H02 drops from "85%" to "25%" (a CPU utilizatron rate 3102 of less than the CPU high-load threshold (refer to FIG. 34B)).

Figure 41:
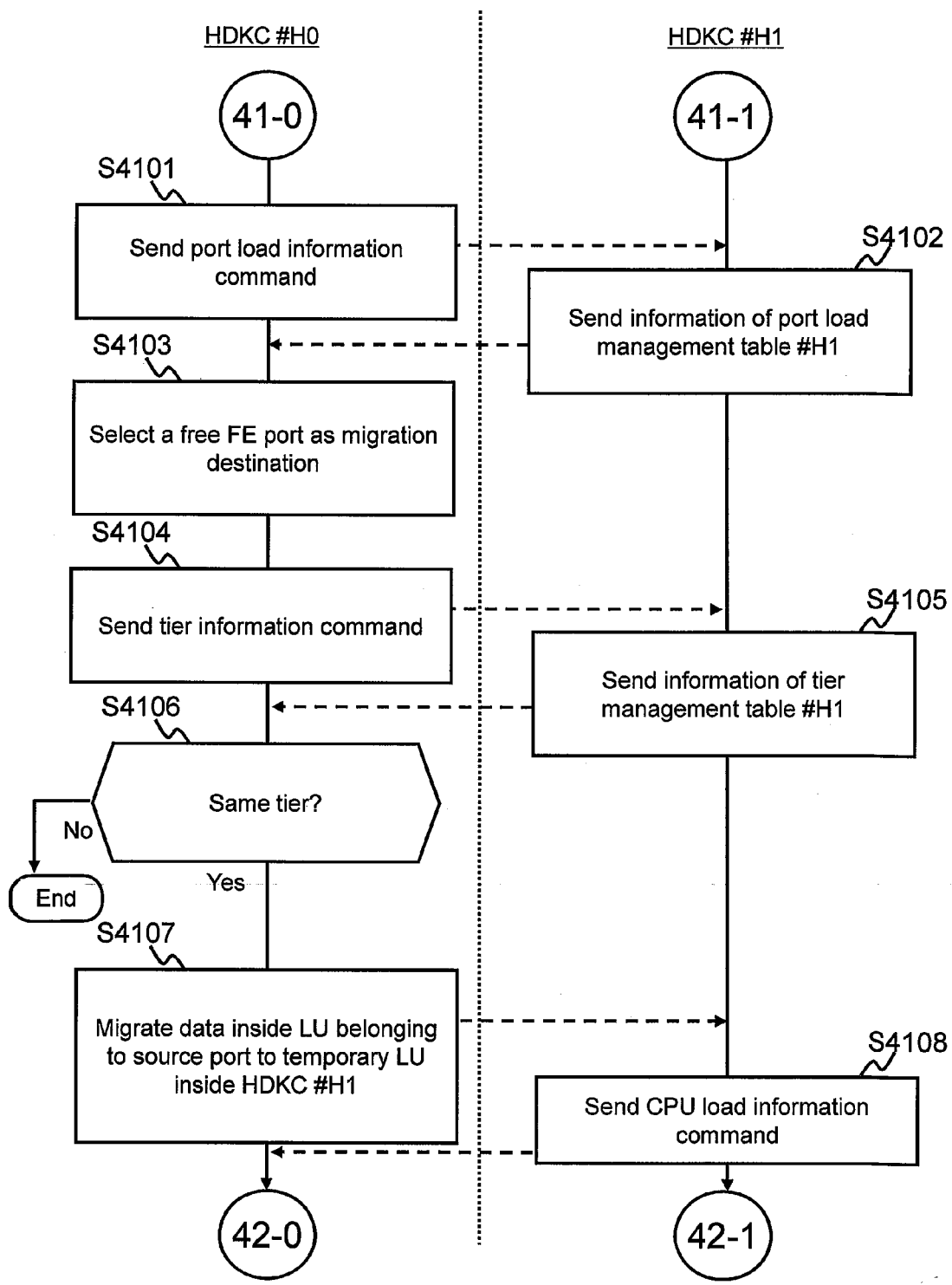
FIG. 41 shows the processing flow of a portion of the load distribution control process (a portion of the second type load distribution process).

Next, as shown in FIG. 41, in S4101, the master CPU #H0 sends a port load information command to the HDKC #H1. The F-I/F #H1 in the HDKC #H1 receives the port load information command, and transfers this command to the master CPU #H1. The port load information command is for acquiring information that is in the port load management table.

Next, in S4102, the master CPU #H1 receives the port load information command, acquires the information that is in the port load management table #H1 (the information of all the FE ports #H1 inside the HDKC #H1) 3501 through 3505, and sends this information to the HDKC #H0.

Next, in S4103, the master CPU #H0 receives the information sent from the HDKC #H1 in S4102, and based on this information, identifies a free FE port of the HDKC #H1 (an FE port to which no LUs are allocated), and selects the identified free FE port as the migration destination. According to the port load management table #H1 of FIG. 45B, the FE port #H1A is the free FE port.

Next, in S4104, the master CPU #H0 sends a tier information command to the HDKC #H1. In the HDKC #H1, the F-I/F #H1 receives the tier information command and transfers this command to the master CPU #H1. The tier information command is for acquiring information that is in the tier management table.

Next, in S4105, the master CPU #H1 receives the tier information command, acquires the information that is in the tier management table #H1 (for example, information 901 through 905, or information 1001 through 1010), and sends this information to the HDKC #H0. The master CPU #H1 may also send only that information in the tier management table #H1 that is related to the temporary LU (a LU identified from the temporary LU management table #H1).

Next, in S4106, the master CPU #H0 receives the information sent from the HDKC #H1 in S4105. The master CPU #H0, based on this information, identifies the temporary LU and the tier level thereof in the HDKC #H1. The master CPU #H0 determines whether or not there is a temporary LU belonging to the same tier as the tier to which the migration-source LU belongs in the HDKC #H1 for each LU (migration-source LU) that is allocated to the migration-destination FE port #H0B selected in S4005. This temporary LU forms a pair with the migration-source LU and is the migration destination of the data from the migration-source LU. Furthermore, "a temporary LU that belongs to the same tier as the tier to which the migration-source LU belongs", for example, is a temporary LU corresponding the either of the following:

The tier level of the temporary LU is the same as the tier level of the migration-source LU.

The difference between the temporary LU tier level and the migration-source LU tier level is equal to or less than a fixed value (the tier level range to which the temporary LU tier level belongs is the same as the tier level range to which the migration-source LU tier level belongs).

In S4106, in a case where there is no temporary LU belonging to the same tier as the tier to which the migration-source LU belongs with respect to at least one of the migration-source LUs belonging to the migration-source FE port #H0B (S4106: No), the master CPU #H0 ends the second type load distribution processing.

Furthermore, in a case where there is another low-load DKC (third coupling HDKC) when the result of S4106 is No, the master CPU #H0 may perform S4105 and subsequent steps with respect to the other low-load DKC.

In S4106, in a case where there are temporary LUs belonging to the same tier as the tier to which the migration-source LU belongs for all the migration-source LUs belonging to the migration-source FE port #H0B (S4106: Yes), in S4107, the master CPU #H0 migrates data from the migration-source LU to the migration-destination LU (temporary LU) for each migration-source LU.

Thereafter, in S4108, the master CPU #H1 sends a CPU load information command to the HDKC #H0 (the migration-source HDKC). In the HDKC #H0, the F-I/F #H0 receives the CPU load information command and transfers this command to the master CPU #H0.

Figure 42:
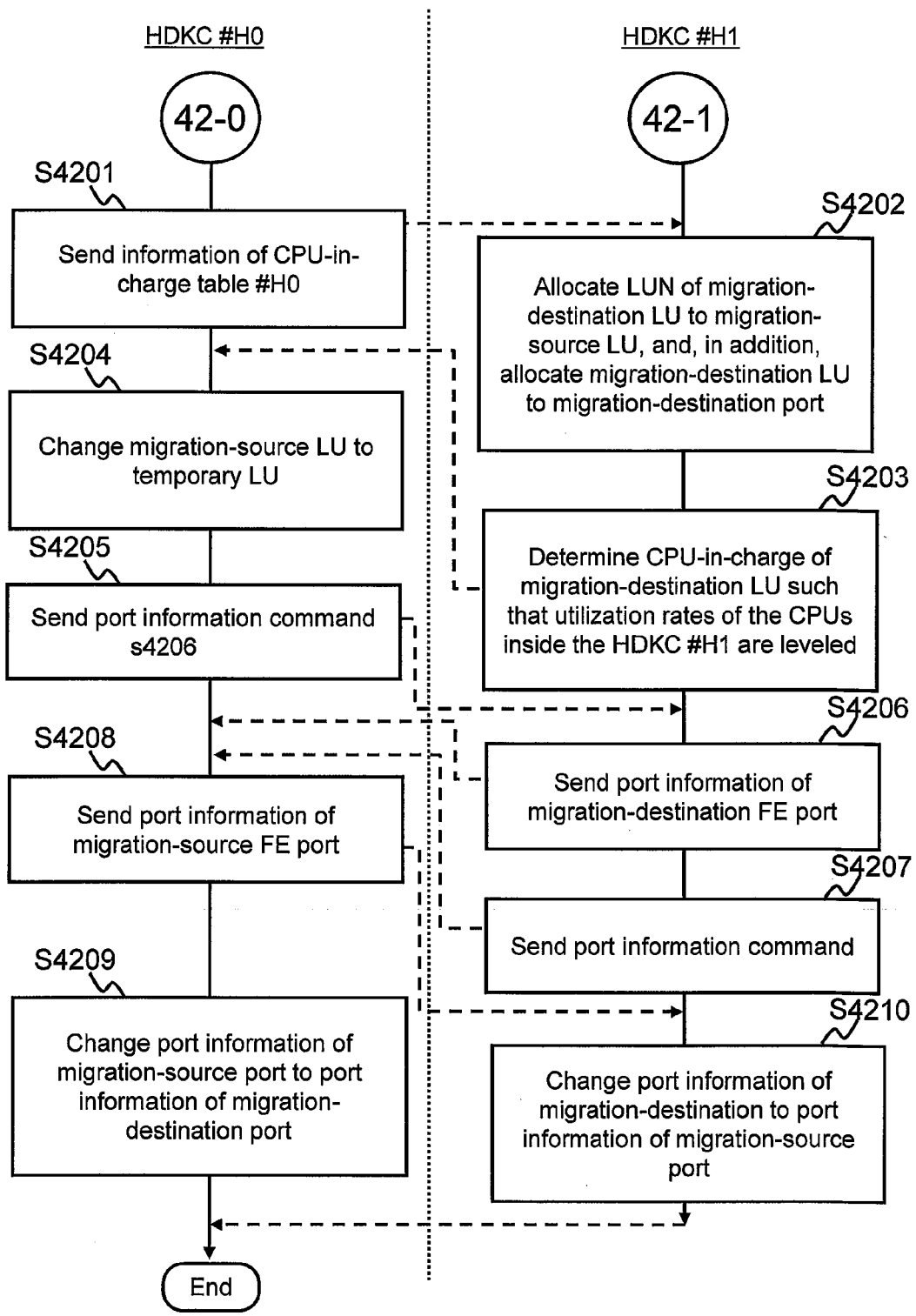
FIG. 42 shows the processing flow of a portion of the load distribution control process (a portion of the second type load distribution process).

Next, as shown in FIG. 42, in S4201, the master CPU #H0 receives the CPU load information command, acquires the information that is in the CPU-in-charge table #H0 (the information of all the CPUs #H0 in the HDKC #H0) 3101, 3102, 3103 and 3404, and sends this information to the HDKC #H1.

Next, in S4202, the master CPU #H1 receives the information sent from the HDKC #H0 in S4201, and based on this information, performs the following processing for each migration-destination LU (temporary LU).

The master CPU #H1 allocates the LUN that had been allocated to the migration-source LU (for example, #2) to the migration-destination LU (for example, #2002).

The master CPU #H1 allocates (affiliates) the migration-destination LU (for example, #2002) to the migration-destination FE port (the free FE port) #H1A.

Next, in S4203, the master CPU #H1, based on the CPU-in-charge table #H1, and the information (the information received in S4202) that is in the CPU-in-charge table #H0, determines the CPU-in-charge #H1 of the migration-destination LU so that the CPU utilization rates 3102 of all the CPUs in the HDKC #H1 will be leveled. Specifically, for example, the following is carried out.

The master CPU #H1 identifies the CPU utilization rate 3102 of the migration-source LU based on the information in the CPU-in-charge table #H0 (refer to FIG. 45A).

The master CPU #H1 identifies the CPU utilization rate 3102 of each CPU #H1 based on the CPU-in-charge table #H1 (refer to FIG. 45B).

The master CPU #H1, based on the CPU utilization rate 3102 of the migration-source LU corresponding to the migration-destination LU, and the CPU utilization rate 3102 of each CPU #H1, determines the CPU-in-charge of the migration-destination LU so that the CPU utilization rates 3102 of all the CPUs #H1 will be leveled.

The master CPU #H1 updates the CPU-in-charge table #H1 (refer to FIG. 48B). Specifically, for example, the master CPU #H1 registers the ID 3103 of the migration-destination LU and the CPU utilization rate 3404 of the migration-destination LU in the row corresponding to the ID 3101 of the CPU-in-charge of the migration-destination LU, and, in addition, adds the CPU utilization rate 3404 of the migration-destination LU to the CPU utilization rate 3102 of this CPU-in-charge.

Meanwhile, in S4204, the master CPU #H0 in the HDKC #H0 cancels the pair between the migration-destination LU and the migration-source LU, and, in addition, makes the migration-source LU a temporary LU. For example, the master CPU #H0 destroys the information specific to the migration-source LU (for example, the CPU utilization rate 3404 and so forth), and adds information related to the migration-source LU (for example, information 3603 and 3604) to the temporary LU management table #H0.

Lastly, the port information of the migration-destination FE port #H1A is exchanged with the port information of the migration-source FE port #H0B (for example, the WWN and the inquiry information).

Specifically, in S4205, the master CPU #H0 sends a port information command to the HDKC #H1. The port information command is for acquiring port information. The ID of the migration-destination FE port #H1A may be specified in this port information command.

In S4206, the master CPU #H1 receives the port information command, acquires the port information corresponding to the migration-destination FE port #H1A (for example, the WWN and the inquiry information), and sends this port information to the HDKC #H0. This port information, for example, may be in either the port load management table #H1 or other management information.

In S4207, the master CPU #H1 sends a port information command to the HDKC #H0. The ID of the migration-source FE port #H0B may be specified in the port information command.

In S4208, the master CPU #H0 receives the port information command, acquires the port information corresponding to the migration-source FE port #H0B (for example, the WWN and the inquiry information), and sends this port information to the HDKC #H1. This port information, for example, may be in either the port load management table #H0 or other management information.

In S4209, the master CPU #H0 changes the port information corresponding to the migration-source FE port #H0B to the port information corresponding to the migration-destination FE port #H1A.

In S4210, the master CPU #H1 changes the port information corresponding to the migration-destination FE port #H1A to the port information corresponding to the migration-source FE port #H0B.

According to the second type load distribution process above, it is possible to change the FE port that receives the I/O command from the server from the migration-source FE port #H0B to the migration-destination FE port #H1A without changing the port identification information and the LU identification information that are used at the time of a server I/O. Furthermore, because the tier to which the temporary LU that becomes the migration destination of the migration-source LU belongs is the same tier as the tier to which the migration-source LU belongs, load distribution is possible without changing the tier level.

Furthermore, the destination of the command of S4001 may sequentially transition farther away from the third coupling HDKC that is closest to the HDKC #H0. Specifically, in a case where the result of the determination (for example, either S4004 or S4106, or S4304 or S4305 to be explained below) in the second type load distribution process is negative, the master CPU #H0 may select the HDKC that is the closest to the HDKC #H0 (the third coupling HDKC with the smallest number of interposed third coupling HDKCs) from among the one or more third coupling HDKCs that were not the target of the determination of S4004, and may start the second type load distribution processing with the selected third coupling HDKC as a partner.

Figure 43:
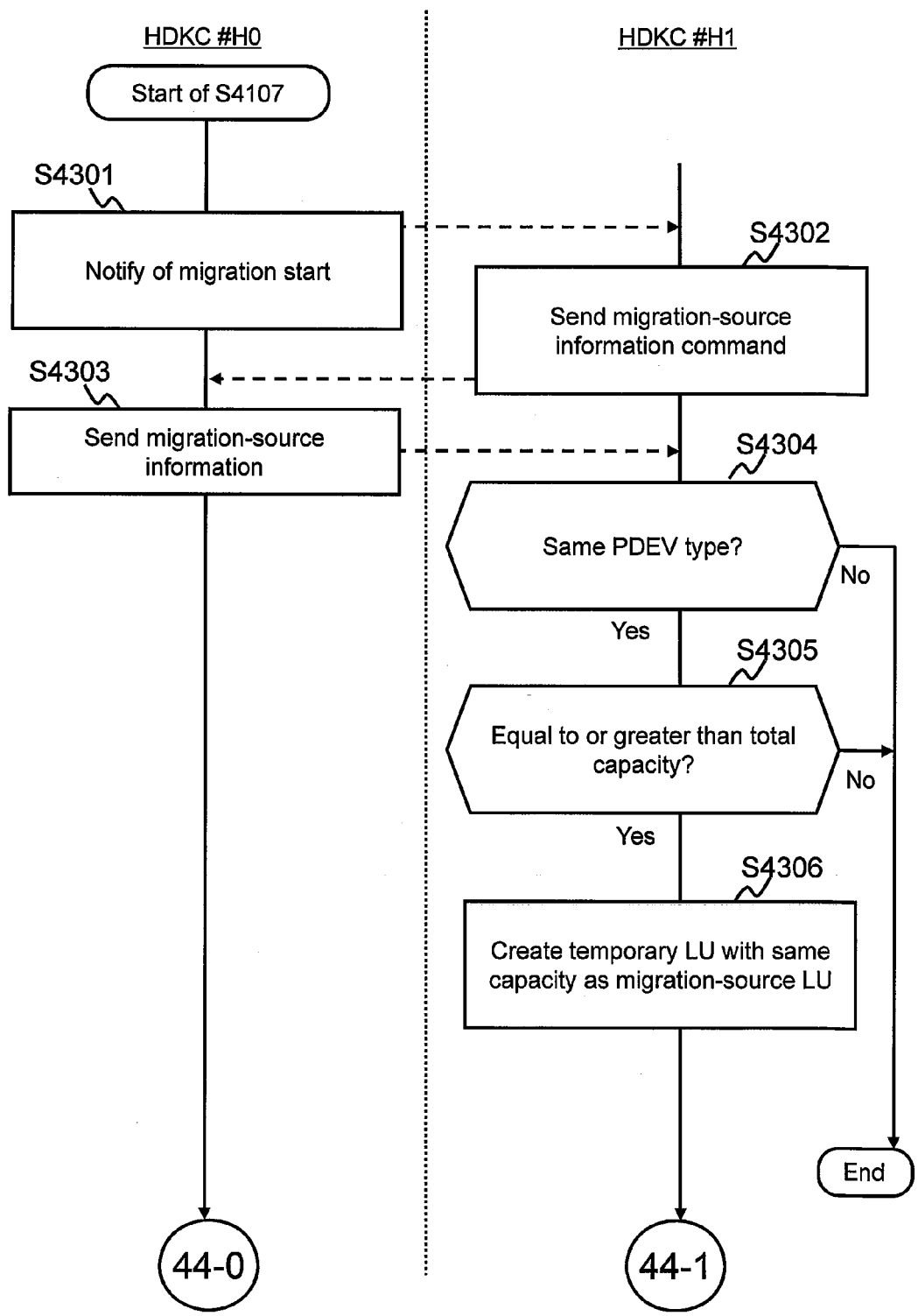
FIG. 43 shows a portion of the processing of S4107 of FIG. 41.
Figure 44:
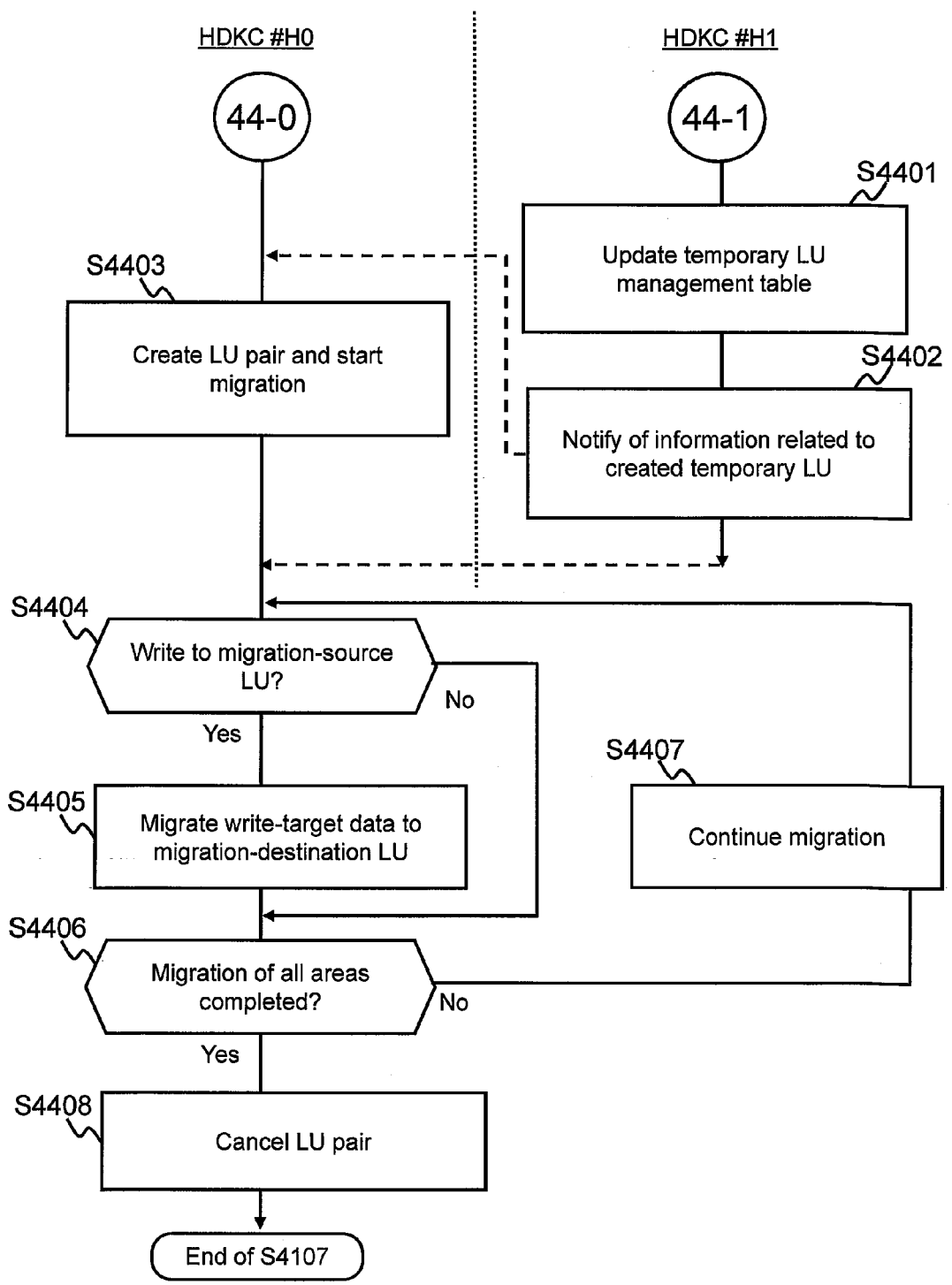
FIG. 44 shows the remainder of the processing of S4107 of FIG. 41.

FIGS. 43 and 44 show the flow of S4107 of FIG. 41.

In S4301, the master CPU #H0 sends a migration start notification to the HDKC #H1. The master CPU #H1 of the HDKC #H1 receives the migration start notification.

In S4302, the master CPU #H1 sends a migration source information command to HDKC #H1. The migration source information command is for acquiring migration source information related to a migration-source LU (for example, information denoting the number of migration-source LUs, the capacity of each migration-source LU, and the PDEV type of each migration-source LU). The master CPU #H0 receives the migration source information command.

In S4303, the master CPU #H0 sends the migration source information (for example, information denoting the number of migration-source LUs, the capacity of each migration-source LU, and the PDEV type of each migration-source LU) to the HDKC #H1. The master CPU #H1 receives the migration source information.

In S4304, the master CPU #H1 determines whether or not there is a temporary LU with the same PDEV type as the PDEV type of the migration-source LU for each migration-source LU. The PDEV type of the migration-source LU is identified from the migration source information. The PDEV type of the temporary LU is identified from the PDEV type 3601 in the temporary LU management table #H1.

In a case where a temporary LU with the same PDEV type as the PDEV type of the migration-source LU does not exist for at least one of the migration-source LUs (S4304: No), the master CPU #H1 ends the second type load distribution processing. The master CPU #H1, for example, may notify the HDKC #H0 that the second type load distribution process has ended. This may be the same even when S4305 is No.

In a case where a temporary LU with the same PDEV type as the PDEV type of the migration-source LU exists for all of the migration-source LUs (S4304: Yes), in S4305, the master CPU #H1, based on the temporary LU management table #H1, determines whether or not the total capacity 3602 corresponding to this PDEV type is equal to or greater than the total capacity of one or more migration-source LUs corresponding to this PDEV type for each PDEV type.

In a case where the total capacity 3602 is less than the total capacity of the one or more migration-source LUs for at least one PDEV type related to all the migration-source LUs (S4305: No), the master CPU #H1 ends the second type load distribution processing.

In a case where the total capacity 3602 is equal to or greater than the total capacity of the one or more migration-source LUs for all of the PDEV types related to all of the migration-source LUs (S4305: Yes), in S4306, the master CPU #H1 creates a temporary LU with the same capacity as the migration-source LU. At this point, for example, (y1) the existing temporary LUs may be partitioned into a temporary LU with the same capacity as the migration-source LU and another temporary LU, (y2) the temporary LU with the same capacity as the migration-source LU may be created by combining multiple temporary LUs, or (y3) the temporary LU with the same capacity as the migration-source LU may be created by carrying out both (y1) and (y2).

Next, as shown in FIG. 44, in S4401, the master CPU #H1 updates the temporary LU management table #H1 based on the processing result of S4306. An example of a pre-update temporary LU management table #H1 is shown in FIG. 49A, and an example of a post-update temporary LU management table #H1 is shown in FIG. 49B. According to the examples of FIGS. 49A and 49B, for PDEV type "SSD", the capacity of the temporary LU #1000 is expanded to "3072 GB" by the "2048 GB" temporary LU #1001 being merged with the "1024 GB" temporary LU #1000. Furthermore, for PDEV type "SAS", the "4096 GB" temporary LU #1003 is partitioned into the "2048 GB" temporary LU #1003 and the "2048 GB" temporary LU #1100.

The capacity of the migration-destination LU must be the same (or more than) the capacity of the migration-source LU. However, a temporary LU with the same capacity as the capacity of the migration-source LU does not always exist. For this reason, as mentioned hereinabove, a temporary LU with the same capacity of the migration-source LU is created in accordance with the merging/partitioning of temporary LUs. The temporary LU management table #H1 is then updated. Furthermore, in a case where a temporary LU with the same capacity as the migration-source LU already exists, the process for creating a temporary LU may be skipped.

Thereafter, in S4402, the master CPU #H1 sends the information of the created temporary LU (for example, the information that is in the post-update temporary LU management table #H1) to the HDKC #H0. The sent information, for example, at the least comprises information of the temporary LU that has the same capacity and PDEV type as the migration-source LU. The master CPU #H0 receives the temporary LU information.

In S4403, the master CPU #H0, based on the temporary LU information, carries out the following for each migration-source LU:

Creates a pair from the migration-source LU and the temporary LU with the same capacity and PDEV type as this migration-source LU; and starts migrating data from the migration-source LU to the temporary LU that forms the pair with this migration-source LU.

Furthermore, the data "migration" referred to here may be done without deleting the migrated data from the migration-source LU. That is, the "migration" referred to here may be synonymous with "copy".

In a case where the server writes new data to the migration-source LU during the data migration from the migration-source LU to the temporary LU (S4404: Yes), the master CPU #H0 migrates the data written to the migration-source LU to the migration-destination temporary LU (S4405). The master CPU #H0 continues the data migration until the data has finished migrating from inside all the areas configuring the migration-source LU (S4406: No, S4407).

In a case where the data has finished migrating from inside all the areas configuring the migration-source LU (S4406: Yes), the master CPU #H0 cancels the pairing of the migration-source LU and the temporary LU (S4408).

This completes S4107 of FIG. 41.

Furthermore, in a case where all of the LUs (#2, #3, #4) belonging to the migration-source FE port #H0B have been migrated to the free FE port #H1A (a case in which port-unit load distribution has been performed), the migration-source HDKC #H0 (or the migration-destination HDKC #H1) may send prescribed information to a higher-level device (for example, a server or a switch (for example a FC switch) interposed between the server and the HDKC #H0 (#H1)). The switch comprises multiple ports (hereinafter, SW port) and routing control information as to which port to output from upon receipt of a command that specifies a certain address. In a case where the higher-level device is a switch, for example, the following processing may be performed. For example, the migration-source HDKC #H0 (or the migration-destination HDKC #H1) sends to the switch prescribed information comprising a pre-exchange WWN and a post-exchange WWN. The switch updates the routing control information based on the WWNs included in this prescribed information. Specifically, for example, the switch updates the routing control information such that the pre-exchange WWN corresponding to the migration-source FE port #H0B corresponds to the SW port coupled to the migration-destination FE port #H1A. In accordance with this, in a case where an I/O command comprising the pre-exchange WWN corresponding to the migration-source FE port #H0B is received thereafter, the switch is able to transfer this I/O command to the migration-destination FE port #H1A.

As described above, in a case where the multiple third-coupling HDKC units 141 and HDKCs have fundamentally reached the state (threshold) that requires a load distribution, the load distribution process (to include the migration process) may be performed collectively for multiple LUs (for multiple LU units, for example, port units). For example, a case in which load distribution is carried out collectively for multiple LUs without applying load distribution in port units may be realized by changing the path for each of the multiple migration-target LUs from the migration-source LU path to the migration-destination LU path either when or after the path management software has been loaded onto either one or multiple servers coupled to the FE port or switches, and configuration information related to each of multiple LUs and/or the right to take charge of access processing for multiple LUs (the owner rights for each of the multiple LUs) is either migrated or notifications are issued between the multiple third-coupling HDKC units 141 and HDKCs. In accordance with this, it is better to either create or set a path from either one or multiple servers 101 or switches with respect to each of the multiple migration-destination LUs based on the configuration information related to each of the multiple migration-destination LUs before the path migration. This path is either created or set using the identification information (for example, the LUN) of the migration-destination LU, and the port identification information (for example, the WWN (World Wide Name), N_Port_Name, N_Port_ID and/or S_ID) of the FE port to which the migration-destination LU corresponds. Furthermore, the migration of data from the multiple migration-source LUs to the multiple migration-destination LUs may be implemented synchronously (at the same time as) or asynchronously (subsequent) to the migration of the above-mentioned configuration information and owner rights. Furthermore, in a case where this is implemented asynchronously, there is a need for processing to ensure the integrity of the data, such as the processor 222 in the HDKC unit 141 and HDKC comprising the multiple migration-destination LUs temporarily holding the write data corresponding to the write access from the one or multiple servers 101 or switches with respect to the migration-destination LU, and using this write data to perform an overwrite after the data has been migrated from the migration-source LU to the migration-destination LU. For a read access from either one or multiple servers 101 or switches with respect to the migration-destination LU, it is preferable that the data from the migration-source LU be read, and that the read data be sent to the either one or multiple servers 101 or switches. Also, any of the following methods may be used to change from the path of the migration-source LU to that of the migration-destination LU. First of all, as a first method, the processors of the multiple third-coupling HDKC units 141, the HDKCs thereinside and/or the management device 301 determine and identify the migration-source LU path and the migration-destination LU path, and notify the path management software of the one or multiple servers 101 or switches of the migration-source LU path and the migration-destination LU path information for each of the multiple migration-target LUs. In accordance with this, the path management software changes the path with respect to each of the multiple migration-target LUs to the path of the migration-destination LU. As a second method, either when or after the processors of the multiple third-coupling HDKC units 141, the HDKCs thereinside and/or the management device 301 determine and identify the migration-source LU path and the migration-destination LU path, and either migrate or issue a notification about the configuration information related to multiple LUs between the multiple third-coupling HDKC units 141 and HDKCs, the processors of either the multiple third-coupling HDKC units 141 or the HDKCs thereinside wait for a command (for example, the Inquiry command or another regularly issued query command) to be issued from the path management software of the one or multiple servers 101 or switches, and respond with required information (for example, the migration-source LU path information and/or the migration-destination LU path information, and/or active-passive status information) related to each of the multiple migration-target LUs in response to this command so as to use the identified multiple migration-destination LU paths to access the corresponding LUs. In accordance with this, the path management software changes the path with respect to each of the multiple migration-target LUs to the path of the migration-destination LU. A third method is based on the HDKC unit 141 and the HDKC comprising the multiple migration-source LUs either refusing or failing to respond to an access from one or multiple servers 101 or switches with respect to any of the multiple migration-target LUs either when or after the processors of the multiple third-coupling HDKC units 141, the HDKCs thereinside and/or the management device 301 determine and identify multiple migration-source LU paths and multiple migration-destination LU paths, and either migrate or issue a notification about the configuration information related to the multiple LUs between the multiple third-coupling HDKC units 141 and HDKCs. In accordance with this, the path management software changes the path with respect to each of the multiple migration-target LUs to the path of the migration-destination LU. In the US, the specifications and drawings of US Patent Application Publication No. 2006/0271758 (Innan et al.) may be cited regarding technology for refusing access from one or multiple servers 101 or switches with respect to a migration-target LU. In this case, the technology of the present application is applied such that the Host Device of these specifications and drawings corresponds to either the one or multiple servers 101 or the switch of the present application, and the Virtualization Storage Device 1 and the Virtualization Storage Device 2 of these specifications and drawings respectively correspond to one HDKC unit 141 and HDKC, and to another HDKC unit 141 and HDKC of the present application.

Furthermore, in a case where a load distribution is carried out collectively for multiple LUs, this load distribution is not limited to a case in which multiple load distributions are performed from one HDKC unit 141 or HDKC to one HDKC unit 141 or HDKC as explained hereinabove, but rather multiple migration-target LUs may be migrated by distributing the load from the HDKC unit 141 or HDKC comprising multiple migration-source LUs to multiple HDKC units 141 or HDKCs.

Furthermore, the technology of the present application is not limited to a case in which a load distribution process (to include a migration process) is performed collectively for multiple LUs between multiple third-coupling HDKC units 141 or HDKCs, but rather a load distribution process (to include a migration process) may be performed for only one LU (one LU unit) between the multiple third-coupling HDKC units 141 or HDKCs. This is because the case of a load distribution process (to include a migration process) for one LU unit in a state that maintains the "tier" according to the present application is a completely new technology not found in existing technologies. In this case, the processor of the HDKC unit 141, the HDKC, or the management device 301, for example, performs a new process, one example of which is selecting, determining and deciding on a LU comprising an appropriate "tier", which does not change the tier level (may be a tier level range), from among the LUs (logical volumes or virtual volumes) corresponding to each of multiple "tiers" according to the present application.

The preceding has been an explanation of the second embodiment. For example, the shared information management device 301 manages operations of one or multiple servers 101, one or multiple virtual servers below, one or multiple switches, one ore multiple HDKC units 141 and one ore multiple LDKC units 151 and so on related to the second embodiment in an integrated manner, so that a management cost of a total system can be decreased and a performance of the total system can be increased. This technique and merit are same as the first and third embodiments. Furthermore, LUN security information of one or more LUs distributed in the load distribution process can be also moved from a distribution source HDKC unit to a distribution destination HDKC unit based on the load distribution process. The LUN security information is a relationship information between a port address of the server and LUN of the LU for prevent an unauthorized access from a server to an unauthorized LU. In the US, the specifications and drawings of U.S. Pat. No. 6,684,209 (Ito et al.) may be cited with respect to the LUN security.

Furthermore, for example, since the first type load distribution process includes load distribution processing inside the own-DKC, the LDKC may also perform the first type load distribution process.

Furthermore, the second embodiment (for example, the determination and decision as to which of LU-unit load distribution (the first type load distribution process) or port-unit load distribution (the second type load distribution process) is to be performed) may be applied in at least one of the following cases by the processor of the HDKC unit 141, the HDKC and/or the management device 301.

(a) A case in which the tier level is computed based also on one or more other items (performance factors), such as "pre-cache", "cascade difference", and/or "distance (command response time)" either instead of or in addition to the basic items (performance factors) of coupling mode (may include DKC performance) and PDEV type.

(b) A case in which the tier level is computed based solely on one or more of the items (performance factors) of "pre-cache", "cascade difference", and/or "distance (command response time)" (refer to FIG. 10).

(c) A case in which the tier level is computed based on a combination of any one or more of the items (performance factors) of "pre-cache", "cascade difference", and/or "distance (command response time)" (refer to FIG. 10) and the PDEV type (performance factor).

(d) A case in which the tier level is computed based on a combination of any one or more of the items (performance factors) of "pre-cache", "cascade difference", and/or "distance (command response time)" (refer to FIG. 10) and any one or more of the items (performance factor) of "coupling mode", "internal controller performance", and "PDEV type".

In addition, in the load distribution control process related to the second embodiment, the processor(s) (CPU(s)) of the migration-source and/or the migration-destination HDKC (s) may remove, from the candidates of the migration-source FE port, the FE port to which a LU (a virtual LU that virtualizes multiple other HDKC LUs) belonging to a mid-level tier (the mid-level tier level or tier level range) is allocated.

Furthermore, the processor (s) of the migration-source and/or the migration-destination HDKC(s) may lower the priority of selecting the migration-source FE port with respect to the FE port to which is allocated a LU belonging to the relevant mid-level tier (the "target FE port" in this paragraph) compared to the FE port to which is allocated only a LU according to either the own-DKC or the first coupling mode. In accordance with this, the migration of the LU belonging to the target FE port (that is, the target FE port being selected as the migration-source FE port) may be implemented only in a case in which there is no FE port to which only a LU according to the own-DKC or the first coupling mode belongs.

This embodiment may be applied to cases other than those in which an actual LU inside the HDKC (a LU according to the own-DKC or the first coupling mode, in other words, a LU other than what in this embodiment is called a virtual LU (either a virtual LU according to the second coupling mode or a virtual LU according to the third coupling mode)) is migrated to another HDKC. For example, this embodiment may be applied, either instead of or in addition to a case in which a migration (a migration of all the actual LUs belonging to this FE port) related to a FE port to which is allocated only a LU that belongs to the higher-level tier (either the higher-level tier level or the higher-level tier level range) is performed, for example, to any of the following cases:

(1) The migration of a FE port to which only a LU belonging to a mid-level tier (for example, either the mid-level tier level or the mid-level tier level range) belongs (As used here, the "LU belonging to mid-level tier", for example, is a virtual LU according to the third coupling mode.);

(2) The migration of a FE port to which is allocated only a LU belonging to the lower-level tier (for example, either the lower-level tier level or the lower-level tier level range) (As used here, the "LU belonging to lower-level tier", for example, is a virtual LU according to the second coupling mode.);

(3) The migration of a FE port to which is allocated only LUs belonging to the higher-level tier (for example, either the higher-level tier level or the higher-level tier level range) and the mid-level tier;

(4) The migration of a FE port to which is allocated only LUs belonging to the mid-level tier and the lower-level tier; and (5) The migration of a FE port to which is allocated any of a LU belonging to the higher-level tier, a LU belonging to the mid-level tier, and a LU belonging to the lower-level tier.

However, the processor(s) of the migration-source and/or migration-destination HDKC(s) must carryout load distribution (LU migration) in port units, and, additionally, the tier (for example, a performance factor that affects the tier) must be the same before and after a migration for any LU belonging to the migration-source port.

In a case where three or more HDKCs are coupled, either a management terminal or a specific HDKC processor may select the load distribution-source HDKC and the load distribution-destination HDKC from among the three or more HDKCs.

Furthermore, as a temporary LU of a HDKC that is coupled using the third coupling mode, there are (a) a LU of this HDKC (a LU according to the own-DKC) (may be a DP-LU), (b) a LU of another HDKC inside the HDKC unit comprising this HDKC (a LU according to the first coupling mode) (may be a DP-LU), (c) a virtual LU according to the second coupling mode, and (d) a virtual LU according to the third coupling mode.

Furthermore, in addition to the fact that the tier (for example, the tier level) of the temporary LU that is selected as the migration destination is the same as that of the migration-source LU, this temporary LU may have at least one of the following (p), (q) and (r):

(p) Different points for the same performance factor;

(q) The same points for the same performance factor; and (r) The same points only for a specific type of performance factor from among multiple types of performance factors.

Furthermore, load distribution has been explained in the second embodiment, but the technology of the present application does not applies solely to load distribution, and may also be applied to other technologies involving the migration of LU configuration information and/or owner rights. As other technologies that entail the migration of LU configuration information and/or owner rights, for example, there are a copy between multiple LUs accompanying a data migration, a copy between multiple LUs that does not accompany a data migration, a LU migration that accompanies a data migration, and a LU migration that does not accompany a data migration. In these technologies, the processors of the HDKC unit 141, the HDKC, and/or the management device 301 may either migrate or issue a notification about the configuration information and/or the owner rights of the LU (for example, an ordinary LU, a DP-LU, or a virtual LU) in accordance with the above-mentioned copy or migration (either at the time of or prior to the copy or migration). Furthermore, either the migration or notification of the owner rights may be performed after the above-mentioned copy or migration.

Furthermore, as was already described in the explanation of FIG. 6, in a copy between multiple LUs or a LU migration that does not accompany a data migration, a state in which the same one or multiple LDKCs is/are coupled to multiple HDKC units 141 is applicable. This state is not limited to a case of a failover or load distribution like those described in the explanation of FIG. 6, but rather may be applied to another situation for a copy between multiple LUs or a LU migration that does not accompany a data migration. In this case, in a state in which the same one or multiple LDKCs is/are coupled beforehand to multiple HDKC units or HDKCs (a case in which there are three or more is most effective), in accordance with a copy or migration, or an exchange of either one or multiple servers 101, a virtual server in either one or multiple servers 101, either one or multiple switches, or a virtual switch in either one or multiple servers 101, a copy between multiple LUs or a LU migration that does not accompany a data migration is implemented with respect to a specific HDKC unit 141 or HDKC of an optimum site or location that corresponds to the site or location of the post-exchange, post-copy or post migration either one or multiple servers 101, virtual server in either one or multiple servers 101, either one or multiple switches, or virtual switch in either one or multiple servers 101. In accordance with this, the processors of the HDKC unit 141, the HDKC and/or the management device 301 determine the site or location of the post-exchange, post-copy or post migration either one or multiple servers 101, virtual server in either one or multiple servers 101, either one or multiple switches, or virtual switch in either one or multiple servers 101 in accordance with the above-mentioned exchange, copy or migration (either at the time of or before the copy or migration), determine and decide on the optimum site or location corresponding to this site or location, and determine and decide on a specific HDKC unit 141 or HDKC, and thereafter may either migrate or issue a notification about the configuration information related to the LU (virtual volume) and/or the right (the owner rights related to the LU of the LDKC) to take charge of a process for accessing a LU (either an ordinary LU or a DP-LU mapped to the virtual volume) of the LDKC corresponding to the LU (virtual volume) (Furthermore, the migration or issuing of a notification about the owner rights may be done after the above-mentioned copy or migration). In accordance with this, after loading the path management software into either one or multiple servers 101 or switches in which either one or multiple LDKCs are coupled to the FE ports of multiple HDKC units 141 or HDKCs (a case in which there are three or more is most effective), the processor either migrates or issues a notification about the configuration information related to each of the multiple LUs (virtual volumes) and/or the owner rights related to the LU (either an ordinary LU or a DP-LU mapped to the virtual volume) of the LDKC corresponding to each of the multiple LUs (virtual volumes) between the HDKC unit 141 or the HDKC of the source of the copy between multiple LUs or the LU migration that does not accompany a data migration, and HDKC unit 141 or the HDKC specified by the above determination and decision. Then, either at the time of or prior to the implementation of either the migration or the notification, the processor changes the path from the path from the one or multiple servers 101 or switches to the LU (virtual volume) of the migration-source HDKC unit 141 or HDKC to the path from the one or multiple servers 101 or switches to the LU of the specified (migration destination) HDKC unit 141 or HDKC (Furthermore, the migration or notification of the owner rights may be done after the above-mentioned copy or migration). In the US, the specifications and drawings of US Patent Application Publication No. 2006/0271758 (Innan et al.) may be cited with respect to this specific processing. In this ease, the technology of the present application is applied such that the Host Device of these specifications and drawings corresponds to the either one or multiple servers 101 or switches of the present application, the Virtualization Storage Device 1 and the Virtualization Storage Device 2 of these specifications and drawings respectively correspond to one HDKC unit 141 or HDKC, and to another HDKC unit 141 or HDKC of the present application, and the External Storage Device of these specifications and drawings corresponds to the LDKC comprising the same LU (the first LU) of the present application. However, the identification of the HDKC unit 141 or HDKC of the migration destination, and the collective migration of multiple LUs (virtual volumes) are contents peculiar to the present application for a "tier" according to the present application, and is a completely new technology.

Furthermore, the second embodiment does not apply only to technology that entails either the migration or notification of the configuration information and/or owner rights of a LU that does not accompany an exchange or migration of either one or multiple servers 101 or switches, but rather may be applied to technology that entails either the migration or notification of the configuration information and/or owner rights of a LU that does accompany an exchange or migration of either one or multiple servers 101 or switches. In accordance with this, the processors of the HDKC unit 141, the HDKC and/or the management device 301 may either migrate or issue a notification about the configuration information and/or the owner rights of the LU (for example, an ordinary LU, a DP-LU, or a virtual LU) in accordance with the above-mentioned exchange or migration (either at the time of or prior to the exchange or migration) of the either one or multiple servers 101 or switches. Furthermore, either the migration or notification of the owner rights may be performed after the above-mentioned exchange or migration. Furthermore, the second embodiment may also be applied to technology that accompanies either a copy or a migration of either one or multiple virtual servers in either one or multiple servers 101 or either one or multiple virtual switches in either one or multiple switches. In accordance with this, the processors of the HDKC unit 141, the HDKC and/or the management device 301 may either migrate or issue a notification about the configuration information and/or the owner rights of the LU (for example, an ordinary LU, a DP-LU, or a virtual LU) in accordance with the copy or migration (either at the time of or prior to the copy or migration) of the either one or multiple virtual servers or virtual switches. Furthermore, either the migration or notification of the owner rights may be performed after the above-mentioned copy or migration.

Furthermore, the second embodiment is not limited to a case in which a path is either created or set in accordance with a process, such as the migration of multiple LUs, but rather multiple LUs (for example, an ordinary LU, a DP-LU, or a virtual LU) of multiple HDKC units 141 or HDKCs (a case in which there are three or more is also effective), and either one or multiple servers 101, either one or multiple virtual servers, either one or multiple switches, or either one or multiple virtual switches exist in a state in which a path has been either created or set beforehand, and in accordance with a failover, a load distribution, or an exchange, a copy or a migration of the either one or multiple servers 101, the either one or multiple virtual servers, the either one or multiple switches, or the either one or multiple virtual switches may determine and decide on a specific HDKC unit 141 or HDKC of an optimum site or location, and may either migrate or issue a notification about configuration information related to the multiple LUs and/or rights (LU-related owner rights) for taking charge of the process of accessing each of the multiple LUs. Furthermore, the processors of the HDKC unit 141, the HDKC and/or the management device 301 determine and decide on a specific HDKC unit 141 or HDKC of each optimum site or location in accordance with a path failure with respect to a failover, and in accordance with load analysis results in a load distribution. Furthermore, the processors of the HDKC unit 141, the HDKC and/or the management device 301 determine, in relation to the exchange, copy or migration of either one or multiple servers 101, either one or multiple virtual servers, either one or multiple switches, or either one or multiple virtual switches, the site or location of the post-exchange, post-copy or post migration either one or multiple servers 101, either one or multiple virtual servers, either one or multiple switches, or either one or multiple virtual switches, and determine and decide on the specific HDKC unit 141 or HDKC of the optimum site or location corresponding to this site or location.

Furthermore, a technology of any unit of either one LU unit or multiple LU units (for example, port units) may also be applied to any technology of this embodiment (to include alternative solutions). In addition, a technology of any unit of either one LU unit or multiple LU units (for example, port units) may also be applied to any HDKC unit 141, HDKC, or LDKC of the first coupling mode, the second coupling mode or the third coupling mode. This is because in the case of processing in a state that maintains the "tier" according to the present application, not only the third coupling mode, but the first coupling mode and second coupling mode as well are completely new technologies not found in existing technologies. In accordance with this, the processors of the HDKC unit 141, the HDKC, the LDKC, and the management device 301, for example, perform new processing, one example Of which being the selecting, determining and deciding, from among LUs (for example ordinary LUs, DP-LUs, or virtual LUs) corresponding to each of multiple "tiers" according to the present application, a LU comprising an appropriate "tier" that does not change the tier level (may also be the tier level range).

Furthermore, in this embodiment, in a case where a virtual LU is migrated, information such as the ID of the external LU mapped to this virtual LU is also passed along to the migration-destination HDKC unit 141, HDKC, or LDKC 151, but in accordance with this, in a case where the external LU mapped to the virtual LU is one external LU of one LDKC, information such as the ID of this one external LU is passed along, and in a case where the external LU mapped to the virtual LU is an external LU that is provided either singly or in multiples from each LDKC (multiple external LUs that are provided spanning multiple LDKCs), information such as the IDs of the multiple external LUs is passed along.

[Third Embodiment]

A third embodiment of the present invention will be explained. In so doing, the differences with either the first embodiment or the second embodiment will mainly be explained, and points in common with either the first embodiment or the second embodiment will be simplified or omitted.

In a storage system in which Dynamic Provisioning (Thin Provisioning) is applied to a HDKC group (a collection of multiple HDKC units) according to the third coupling mode, the sharing of a pool (a collection of actual pages) among all the HDKCs enables enhanced capacity efficiency and improved performance in accordance with being able to use a larger number of PDEVs. Sharing the pool means that the multiple HDKC units share the unallocated queue of the pool, and all of the HDKC units must share the actual page management table.

However, in a case where the actual page management table is arranged in the CM inside a specific HDKC (or in the shared information management device 301 (refer to FIG. 7)), the I/O performance with respect to a DP-LU will drop due to the need to refer to the actual page management table via an external bus at the time of an I/O with respect to the DP-LU.

According to the third embodiment, the drop in I/O performance with respect to the DP-LU can be lessened even though the pool is being shared by the HDKC units. Further, this makes it possible to provide a technology that enables a non-expensive price for an initial installation cost and enables the realization of a flexible and efficient scale-out from a small-scale configuration to a large-scale configuration.

The third embodiment will be explained in detail below.

FIG. 50 shows an example of pool sharing between HDKC units. To make the explanation easier to understand, it is supposed hereinbelow that two HDKC units share the pool, but three or more HDKC units may share the pool. Furthermore, it is supposed that the HDKC unit is configured from one HDKC. Specifically, it is supposed that HDKC #H1 is coupled to HDKC #H0 by way of the third coupling medium (external bus) 601. At least one of the HDKCs #H0 and #H1 may be coupled to a LDKC via the second coupling medium (external bus). However, there may be two or more HDKCs configuring the pool-sharing HDKC unit. Furthermore, one or more LDKCs may be coupled using the second coupling mode to one or more HDKCs in at least one HDKC unit of the two or more HDKC units that share the pool.

The pool 1500 is shared by the HDKC #H0 and the HDKC #H1. The pool 1500 is configured from one or more internal volumes of the HDKC #H0 and one or more internal volumes of the HDKC #H1. The "internal volume", as has already been explained, is a volume having a physical storage capacity, and, for example, may be one ordinary LU, a portion of an ordinary LU, a group of multiple ordinary LUs, one virtual LU according to the second coupling mode, a portion of a virtual LU, a group of multiple virtual LUs, one RG, a portion of an RG, or a group of multiple RGs. The concept of tier (for example, either the tier revel or the tier level range explained in the first embodiment) is applied for the "internal volume". For example, if the "internal volume" is managed by the one RG basis, the tier (for example, either the tier revel or the tier level range explained in the first embodiment) is managed for the one RG basis.

In this embodiment, the one or more internal volumes of the HDKC #H0 configuring the pool 1500 are RGs #H00, #H01, and #H02, and the one or more internal volumes of the HDKC #H1 configuring the pool 1500 are RGs #H13, #H14, and #H15 (That is, in this embodiment, the internal volume is a RG.). According to this configuration, the HDKC #H0 (the internal controller #H0 (CPU #H0)) is able to access the RGs #H13, #H14, and #H15 via the third coupling medium 601. Similarly, the HDKC #H1 (the internal controller #H1 (CPU #H1)) is able to access the RGs #H00, #H01, and #H02 via the third coupling medium 601. Identification information that is unique to the multiple HDKC units that share the pool may be set in the respective multiple volumes of these multiple HDKC units. Furthermore, the HDKC #H0 is able to acquire and save information related to the RGs #H13 through #H15 inside the third coupling mode-coupled HDKC #H1 in addition to the information related to the RGs #H00 through #H02 when the HDKC #H1 is coupled using the third coupling mode.

Furthermore, the pool 1500 is partitioned into the number of storage areas (hereinafter, pool areas) in accordance with the number of HDKC units 141 that share this pool 1500. For example, the number of pool areas is the same as the number of HDKC units that share the pool 1500. In the example shown in FIG. 50, since the pool 1500 is shared by two HDKC units 141 (HDKCs #H0 and #H1), the pool 1500 is partitioned into the two pool areas 5011 and 5012. The pool area 5011 is associated with the HDKC #H0, and the pool area 5012 is associated with the HDKC #H1. Specifically, for example, all of the actual pages configuring the pool area 5011 are managed as usable in the actual page management table #H0, and are managed as unusable in the actual page management table #H1. Alternatively, all of the actual pages configuring the pool area 5012 are managed as usable in the actual page management table #H1, and are managed as unusable in the actual page management table #H0.

An actual page is allocated from the pool area 5011 to a virtual page of the DP-LU (for example, #160) of the HDKC #H0. Alternatively, an actual page is allocated from the pool area 5012 to a virtual page of the DP-LU (for example, #161) of the HDKC #H1.

This makes it possible for the pool 1500 to be shared by the multiple HDKCs #H0 and #H1, but for each actual page configuring the pool 1500, only one HDKC is able to use this actual page. For this reason, I/Os from multiple HDKCs do not compete for one actual page.

In the explanation of this embodiment, each pool area (5011, 5012) spans multiple or all of the RGs that configure the pool 1500. That is, each of the pool areas comprises a portion of the storage area of each RG configuring the pool 1500. In other words, each pool area is configured from a portion of the storage area of each RG that configures the pool 1500. To prevent I/Os from converging on one RG, the source (hereinafter, allocation-source RG) of the actual page that is allocated to the virtual page may be selected as follows.

For example, in a case where there are N (where N is an integer equal to or larger than 3) RGs configuring the pool, and, in addition, M (where M is an integer equal to or larger than 2, and, in addition, N>M) HDKC units are sharing this pool, the M allocation-source RGs (for example, the number (for example, a serial number) of the PI allocation-source RGs), which are initially selected from the M HDKCs may be evenly separated. According to the example of FIG. 50, N=6 and M=2. For this reason, in a case where the allocation-source RG initially selected by the HDKC #H0 (the internal controller #H0 (CPU #H0)) is RG #H00, the allocation-source RG initially selected by the HDKC #H1 (the internal controller #H1 (CPU #H1)) may be RG #H13.

Thereafter, at least one HDKC may switch the selected allocation-source RG in accordance with a prescribed rule, such as round robin (for example, the selected allocation-source RG may be changed uniformly). For example, the HDKC #H0 may sequentially switch the allocation-source RG from RG #H00 to RG #H01, RG #H02, RG #H13, RG #H14, and RG #H15, and the HDKC #H1 may sequentially switch the allocation-source RG from RG #H13 to RG #H14, RG #H15, RG #H00, RG #H01, and RG #H02.

When the allocation-source RG is selected in accordance with a prescribed rule, such as round robin, it is possible that the allocation-source RG selected by two or more HDKCs will be the same K times (where K is a natural number) (For example, the allocation-source RG could be the same K times in a row.). In accordance with this, at least one of these two or more HDKCs may select an allocation-source RG that differs from the allocation-source RG selected in accordance with the prescribed rule, and from that point forward, may once again select the allocation-source RG in accordance with the prescribed rule.

Furthermore, these selection controls are managed by any one or more processors 222 of the multiple HDKC units 141 that manage the shared pool, or the processor inside the management device 301, and in a case where an allocation or a change occurs in the allocation-source RG, are implemented by this control instruction command being executed from any of these processors with respect to the HDKC unit 141 or HDKC processor 222 that actually controls the allocation or the change of the allocation-source RG.

The LM #H0 (#H1) stores the virtual page management table 325 (#H0 (#H1)). The CM (SM area) #H0 (#H1) stores the actual page management table 32(#H0 (#H1)), the top-of-queue management table 327 (#H0 (#H1)), and the unallocated page usage management table 5001 (#H0 (#H1)). The various management information including the various tables can be put either into the pool 1500 or into one or more storage areas of one or more storage mediums outside the pool 1500. Furthermore, each of the multiple HDKC units 141 can have the one or more storage areas of one or more storage mediums outside the pool 1500 and control to store not only the various management information into the one or more storage areas of one or more storage mediums outside the pool 1500, but also data of one or more write command sent from the server 101 to a LU outside the pool 1500 into the one or more storage areas of one or more storage mediums outside the pool 1500.

The unallocated page usage management table #H0 (#H1) comprises information related to an unallocated actual page (an actual page that has not been allocated to a virtual page) inside the pool area 5011 (5012) that has been allocated to the HDKC #H0 (#H1). The unallocated page usage management table #H0 (#H1), specifically, for example, comprises the following information as shown in FIG. 51:

The number of unallocated pages 5101, which is the number of unallocated actual pages inside the pool area 5011 (5012);

The previous number of unallocated pages 5102, which is the number of unallocated pages 5101 that was calculated using the previous pool maintenance process (to be explained below); and The unallocated page usage 5103, which is a value obtained by subtracting the number of unallocated pages 5101 from the previous number of unallocated pages 5102.

Furthermore, the technology being explained in this embodiment is a technology for managing and/or controlling a pool 1500 that manages multiple actual pages that are capable of being used in an allocation to either one or multiple DP-LUs by logically partitioning this pool 1500 into multiple pool areas (5011, 5012), and is completely different from a technology (for example, pre-caching technology) for logically partitioning the storage area of the cache memory 224 and using same to allocate and store data in each of either one or multiple HDKC units 141, HDKCs, and/or LDKCs 151, and/or a technology (for example, a cache memory logical partitioning technology for ensuring the level of service for each of either one or multiple ordinary LUs, DP-LUs, and/or virtual LUs) for logically partitioning the storage area of the cache memory 224 and using same to allocate and store data in each of either one or multiple ordinary LUs, DP-LUs and/or virtual LUs. This embodiment may utilize these technologies independently, or may utilize either any or both of these technologies together.

In the Thin Provisioning of the third coupling mode, a pool with a large number of RGs is advantageous for I/O performance. However, when there is a big difference between the tier (either the tier level or the tier level range) to which a certain RG belongs and the tier to which another RG belongs in this pool, the I/O performance with respect to a DP-LU will be dragged down to the performance of the RG belonging to the lower-level tier. In particular, having "distance (command response time)" as the performance factor greatly affects the I/O performance with respect to the DP-LU in this embodiment.

Accordingly, the tier management table related to this embodiment, for example, comprises distance (command response time) 1008 for each internal volume (RG) as shown in FIGS. 52A and 52B.

FIG. 52A shows a tier management table #H0 related to a situation in which the pool 1500 may be shared by the HDKCs #H0 and #H1, and FIG. 52B shows a tier management table #H0 related to a situation in which it is not desirable for the pool 1500 to be shared by the HDKCs #H0 and #H1. Furthermore, FIG. 11 does not disclose an example in which the distance (command response time) 1008 is "5", but in a case where the distance between the HDKCs is from 400 km to 500 km, for example, the distance (command response time) 1008 may be "5".

According to FIG. 52A, "1", which is the maximum value of the difference between the tier level of the RGs #H00 through #H02 inside the HDKC #H0 and the tier level of the RGs #H13 through #H15 inside the HDKC #H1, is equal to or less than the prescribed threshold. In accordance with this, the HDKCs #H0 and #H1 are permitted to use the pool 1500.

According to FIG. 52B, "6", which is the maximum value of the difference between the tier level of the RGs #H00 through #H02 inside the HDKC #H0 and the tier level of the RGs #H13 through #H15 inside the HDKC #H1, exceeds the prescribed threshold. In accordance with this, the HDKCs #H0 and #H1 are forbidden to use the pool 1500.

The processing performed by this embodiment will be explained below.

FIG. 53 shows the flow of a pool create process related to the third embodiment. Furthermore, it is supposed hereinbelow that the master CPU performs the processing, but this processing may be performed by another CPU.

In S5301, the master CPU #H0 receives a pool create instruction. This instruction may be received via the administrator GUI, or may be received from the management computer. The pool create instruction is for creating a pool to be shared by multiple HDKC units. The pool create instruction, for example, may comprise the DKC IDs of the HDKCs #H0 and #H1 as the multiple HDKC units. Additionally, the pool create instruction may comprise the identification information of the RGs configuring the pool, for example, the RG IDs of the RGs #H00, #H01, #H02, #H13, #H14, and #H15.

Furthermore, the master CPU #H0 may automatically perform the processing of S5302 and subsequent steps when the satisfaction of a specific condition has been detected instead of when the pool create instruction has been received.

In S5302, the master CPU #H0 determines based on the tier management table #H0 whether or not the maximum value of the differences in the tier levels of the multiple pool-RGs (#H00, #H01, #H02, #H13, #H14, and #H15) is equal to or less than a prescribed threshold.

The tier management table #H0 is able to comprise information related to the tier of the RG (the tier of the RG inside the HDKC #H1 that is coupled using the third coupling mode), which is based on an external LU mapped to a virtual LU according to the third coupling mode. This tier management table #H0 not only reveals the tier level of the RG inside the HDKC #H0, but also the tier level of the RG inside the HDKC #H1.

Furthermore, the master CPU #H0 receives the information of the tier management table #H1 from the HDKC #H1 (for example, the tier level of the external LU that is mapped to the virtual LU inside the HDKC #H0 (the virtual LU according to the third coupling mode)), and, based on this information and the tier level of the virtual LU according to the third coupling mode, may compute the tier level for each pool-RG inside the HDKC #H1.

In a case where the result of the determination of S5302 above is negative (S5302: No), that is, in a case where the maximum value of the difference of the tier levels of the multiple pool-RGs exceeds the prescribed threshold, it is not desirable to create a shared pool (a pool shared by HDKCs #H0 and #H1) that is configured using these multiple pool-RGs. Accordingly, in S5320, the master CPU #H0 may notify the administrator so that a pool is recreated for each HDKC. Or, the master CPUs #H0 and #H1 may automatically construct a pool (either with or) without notifying the administrator. For example, the master CPU #H0 may create, from among the multiple pool-RGs, a pool that is configured from the RGs #H00 through #H02 of the HDKC #H0 as a pool inside the HDKC #H0 either in accordance with an instruction from the administrator, or automatically without receiving an instruction from the administrator. Additionally, the master CPU #H1 may create, from among the multiple pool-RGs, a pool that is configured from the RGs #H13 through #H15 of the HDKC #H1 as a pool inside the HDKC #H1 either in accordance with an instruction from the administrator, or automatically without receiving an instruction from the administrator. Even if in this case, this embodiment can apply the following example. If the HDKC #H0 used own unallocated page for allocation of DP-LU of the HDKC #H0, the HDKC #H0 can use unallocated page in HDKC #H1. And if the HDKC #H1 used own unallocated page for allocation of DP-LU of the HDKC #H1, the HDKC #H1 can use unallocated page in HDKC #H0. In the US, the specifications and drawings of US Patent Application Publication No. 2008/0184000 (Kawaguchi et al.) may be cited regarding technology for the use of the unallocated page. In this case, the HDKC #H0 controls operations of a storage module 11100 of the Kawaguchi et al. and the HDKC #H1 controls operations of another storage module 11200 of the Kawaguchi et al.

In a case where the result of the determination in S5302 above is affirmative (S5302: Yes), that is, a case in which the maximum value of the difference of the tier levels of the multiple pool-RGs is equal to or less than the prescribed threshold, it is alright to create a shared pool that is configured from these multiple pool-RGs. The following processing is performed in this case.

That is, in S5303, the master CPU #H0 updates the actual page management table #H0. Specifically, for example, the master CPU #H0 sets the table pointer 1401, the pool-RG ID 1402 and the actual page address 1403 with respect to the pool-RGs (#H00, #H01, #H02, #H13, #H14, and #H15), and, in addition, sets "unallocated" as the allocation status 1404 (refer to FIG. 54).

In S5304, the master CPU #H0 sends the HDKC #H1 the information that is in the actual page management table #H0 (the information 1401 through 1404 with respect to the pool- RGs). This information reaches the HDKC #H1 via the third coupling medium (the external bus).

In S5311, the master CPU #H1 receives the information that is in the actual page management table #H0 (the information 1401 through 1404 with respect to the pool-RGs) from the HDKC #H0, and writes the received information to the actual page management table #H1 (refer to FIG. 55). The contents of the actual page management table #H1 are the same as those of the actual page management table #H0 at this time, (refer to FIGS. 54 and 55).

In S5305, the master CPU #H0 updates the allocation status 1404 corresponding to the odd-number pages of the even-number RGs to "unusable", and, in addition, updates the allocation status 1404 corresponding to the even-number pages of the odd-number RGs to "unusable" in the actual page management table #H0 (refer to FIG. 57). Alternatively, in S5312, the master CPU #H1 updates the allocation status 1404 corresponding to the even-number pages of the even-number RGs to "unusable", and, in addition, updates the allocation status 1404 corresponding to the odd-number pages of the odd-number RGs to "unusable" in the actual page management table #H1 (refer to FIG. 58). The "even-number RG" is one for which the pool-RG ID 1402 ends in an even number (to include 0), and the "odd-number RG" is one for which the pool-RG ID 1402 ends in an odd number. The "even-number page" is an actual page for which the actual page address 1403 ends in an even number (to include 0), and the "odd-number page" is an actual page for which the actual page address 1403 ends in an odd number.

According to S5305 and S5312, the pool configured from multiple pool-RGs (#H00, #H01, #H02, #H13, #H14, and #H15) is divided in half to form two pool areas (refer to FIGS. 50, 57 and 58). The one pool area is usable by the HDKC #H0, but unusable by the HDKC #H1, and the other pool area is usable by the HDKC #H1, but unusable by the HDKC #H0. That is, the pool is evenly partitioned into two pool areas, and only one of the HDKCs #H0 and #H1 is able to use each actual page.

Furthermore, according to S5305 and S5312, the allocation status 1404 of two or more noncontiguous actual pages is regarded as "unusable", but the allocation status 1404 of two or more contiguous actual pages may also be regarded as "unusable". For example, the actual page group of the first half of the pool (the actual page group (the pool area) for which the addresses are contiguous) may be allocated to the HDKC #H0, and the actual page group of the latter half of the pool (the actual page group (the pool area) for which the addresses are contiguous) may be allocated to the HDKC #H1. That is, the pool may be partitioned any way desirable as long as it is possible to obtain pool areas that span all the RGs that configure the pool.

Furthermore, the capacities of the multiple pool areas each of which is respectively assigned to one of the multiple HDKC units need not be uniform. For example, a first pool area of the multiple pool areas may be allocated to a first HDKC unit of the multiple HDKC units, and a second pool area of the multiple pool areas, which has a smaller capacity than the first pool area, may be allocated to a second HDKC unit, which receives I/O commands at a lower frequency than the first HDKC unit. The example is also suitable for a condition that the controller performance of the first HDKC unit is higher than the controller performance of a second HDKC unit based on the value of the controller performance in the tier management table of FIG. 10, instead of/and the condition that the second HDKC unit receives I/O commands at a lower frequency than the first HDKC unit. Furthermore, a capacity of multiple actual storage areas included in each of the multiple HDKC units 141 is divided and distributed to the multiple HDKC units 141 according to at least one weighting parameter decided based on one or more elements of the coupling management table of FIG. 8 and/or one or more elements of the tier management table of FIGS. 9 and/or 10 etc. For example, if the distance (command response time) between a first HDKC unit and a second HDKC unit of the multiple HDKC units is a long distance (it takes a long response time) based on the value of the distance (command response time) in the tier management table of FIG. 10, a first capacity in the capacity of multiple actual storage areas included in the first HDKC unit is allocated to the first HDKC unit and a second capacity in the capacity of the multiple actual storage areas included in the first HDKC unit is allocated to the second HDKC unit, the second capacity having a smaller capacity than the first capacity. In this example, a third capacity in the capacity of multiple actual storage areas included in the second HDKC unit of the multiple HDKC units is allocated to the second HDKC unit and a fourth capacity in the capacity of the multiple actual storage areas included in the second HDKC unit is allocated to the first HDKC unit, the fourth capacity having a smaller capacity than the third capacity. These technologies are controlled by one or more processors of multiple HDKC units 141, HDKCs, and/or the management device 301. These technologies can be applied for more than three HDKC units 141 sharing one consolidated pool. Each of the more than three HDKC units 141 can be allocated a capacity which has a different size from one another HDKC unit.

Thereafter, the HDKCs #H0 and #H1 respectively create an unallocated queue with respect to actual pages having an allocation status 1404 of "unallocated". The arrangement of the actual pages in the unallocated queue, for example, is one in which the RGs are arranged round robin for each actual page (that is, RGs comprising actual pages are arranged in different sequences).

Specifically, for example, in S5306, the master CPU #H0 makes RG #H00 the source of the initially allocated actual page, and, in addition, updates the unallocated queue pointer 1406 corresponding to the allocation status 1404 "unallocated" such that the arrangement of the actual pages in the unallocated queue makes the RGs round robin for each actual page. In S5307, the master CPU #H0 registers the table pointer 1401 corresponding to the top of the unallocated queue of the HDKC #H0 in the top-of-queue management table #H0. That is, the information (the first pointer) of the top-of-queue management table #H0 changes from the first pointer shown in FIG. 56A to the first pointer shown in FIG. 59A.

Alternatively, for example, in S5313, the master CPU #H1 makes RG #H13 the source of the initially allocated actual page, and, in addition, updates the unallocated queue pointer 1406 corresponding to the allocation status 1404 "unallocated" such that the arrangement of the actual pages in the unallocated queue makes the RGs round robin for each actual page. In S5314, the master CPU #H1 registers the table pointer 1401 corresponding to the top of the unallocated queue of the HDKC #H1 in the top-of-queue management table #H1. That is, the information (the first pointer) of the top-of-queue management table #H1 changes from the first pointer shown in FIG. 56B to the first pointer shown in FIG. 59B.

According to S5306 and S5313, the RG corresponding to the top of the unallocated queue is different for the HDKCs #H0 and #H1. It is preferable that the HDKCs #H0 and #H1 each select an actual page to be allocated to a virtual page in round robin fashion in accordance with the unallocated queue. As a result, it is possible to use the RGs inside the pool uniformly, and, in addition, to avoid convergence in which actual pages are selected from the same RG by the HDKCs #H0 and #H1.

That is, an actual page, which is allocated to a virtual page in the respective partitioned pool areas 5011 (or 5012) inside the pool 1500, may be an actual page that is based on a RG that differs from a RG that is the basis of an actual page that was allocated n-times before (where n is a natural number) (for example, n may equal 1). Specifically, for example, the RG that constitutes the basis of the actual page to be allocated may be shifted using the round robin mode. This makes it possible to avoid the concentration of I/Os accompanying an allocation to a specific RG, thereby making it possible to enhance the I/O performance of the DKC. In a case where either a DP-LU or a group of multiple DP-LUs (a DP-LU group) associated with one pool 1500 belong to a different tier for each either DP-LU or DP-LU group (for example, a case in which either a first DP-LU or a first DP-LU group belongs to a first tier, and either a second DP-LU or a second DP-LU group belongs to a second tier), an actual page may be allocated by tier from an RG that differs from the RG that constitutes the basis of an actual page allocated n-times before (For example, for either the first DP-LU or the first DP-LU group, the RG that is the basis of an actual page to be allocated is shifted using the round robin mode within a range of multiple RGs configuring a first tier, and for either the second DP-LU or the second DP-LU group, the RG that is the basis of an actual page to be allocated is shifted using the round robin mode within a range of multiple RGs configuring a second tier.)

The preceding has been the flow of the pool create process. The HDKCs #H0 and #H1 are able to uniformly allocate unallocated actual pages from all the RGs that configure the pool 1500 by performing I/O processing (I/Os with respect to the DP-LU) based on the actual page management tables #H0 and #H1 created in this pool create process. As a result, the deterioration of the I/O performance with respect to the DP-LU can be reduced. Further, the multiple HDKC units 141 can balance a load of each of the multiple HDKC units 141 by the pool 1500 as one consolidated/unified pool in this embodiment. Furthermore, by using this embodiment and the second embodiment together, the load balancing between the multiple HDKC units 141 is more efficient. Furthermore, the pool create process can decrease a waste of actual storage area and a cost for a storage system including the multiple HDKC units 141, because the pool create process can cause the multiple HDKC units 141 to share a plurality of unallocated storage areas of the multiple HDKC units 141.

The "unallocated actual page" referred to in this embodiment is an actual page, which has not been allocated to a virtual page, but which is able to be allocated to a virtual page (an actual page whose allocation status 1404 is not "unusable").

The flow of an I/O process (a data I/O process with respect to a DP-LU) subsequent to a pool create process will be explained below. FIGS. 66 through 69 will be referenced as needed at this time. Furthermore, in the following explanation, the following premises are supposed. Both HDKC #H0 and #H1 may comprise two more DP-LUs.

The HDKC #H0 comprises the two DP-LUs #160 and #162.

The HDKC #H1 comprises the two DP-LUs #161 and #163.

The pool area 5011 is associated with the DP-LUs #160 and #162.

The pool area 5012 is associated with the DP-LUs #161 and #163.

For example, it is supposed that the HDKC #H0 has received a write command specifying the DP-LU #160. In accordance with this, the internal controller #H0 of the HDKC #H0 is able to perform the following processing.

(s1) The internal controller #H0 identifies the virtual page to which the address specified in the received write command belongs (hereinafter, virtual page (0x02)).

(s2) The internal controller #H0 determines whether or not an actual page is allocated to the virtual page (0x02) based on the virtual page management table #H0.

(s3) The internal controller #H0, in a case where the result of the determination in the above-mentioned (s2) is negative, allocates the actual page (the actual page (0x01) based on the RAID group #H15) corresponding to the unallocated queue pointer that matches the first pointer of the top-of-queue management table #H0 from the pool area 5011 to which the DP-LU #160 is associated to the virtual page (0x02). Specifically, for example, the internal controller #H0 performs the following processing:

updates the allocation status 1404 corresponding to the actual page (0x01) based on the RAID group #H15 to "allocated", and updates the DP-LU ID 1405 corresponding to this actual page (0x01) to "160" (refer to FIG. 67);

updates the allocation status 1303 corresponding to the virtual page (0x02) of the DP-LU #160 to "allocated", updates the pool RG ID 1304 corresponding to this virtual page (0x02) to "H15", and, in addition, updates the actual page address 1305 corresponding to this virtual page (0x02) to "0x01" (refer to FIG. 66); and updates the first pointer of the top-of-queue management table #H0 to "0x0002".

Furthermore, for example, it is supposed that after the pool area 5012 has been created, the HDKC #H1 receives the write command first. This makes it possible for the internal controller #H1 of the HDKC #H1 to perform the following processing.

(s11) The internal controller #H1 identifies the virtual page to which the address specified in the received write command belongs (hereinafter, virtual page (0x02) of DP-LU #161).

(s12) The internal controller #H1 determines whether or not an actual page is allocated to the virtual page (0x02) based on the virtual page management table #H1.

(s13) The internal controller #H0, in a case where the result of the determination in the above-mentioned (s12) is negative, allocates the actual page (the actual page (0x00) based on the RAID group #H13) corresponding to the unallocated queue pointer that matches the first pointer of the top-of-queue management table #H1 from the pool area 5012 to which the DP-LU #161 is associated to the DP-LU #161 virtual page (0x02).

Specifically, for example, the internal controller #H1 performs the following processing:

updates the allocation status 1404 corresponding to the actual page (0x00) based on the RAID group #H13 to "allocated", and updates the DP-LU ID 1405 corresponding to this actual page (0x00) to "161" (refer to FIG. 69);

updates the allocation status 1304 corresponding to the virtual page (0x02) of the DP-LU #161 to "allocated", updates the pool RG ID 1304 corresponding to this virtual page (0x02) to "H13", and, in addition, updates the actual page address 1305 corresponding to this virtual page (0x02) "0x00" (refer to FIG. 68); and updates the first pointer of the top-of-queue management table #H1 to "0x4001".

Now then, in this embodiment, the unallocated actual pages are consumed by pool area inside the pool that is being shared (the unallocated actual pages are allocated to virtual pages). For this reason, the unallocated page usage 5103 (that is, the number of unallocated pages that have been consumed) (refer to FIG. 51) can differ for each pool area. Therefore, for example, there may be times when there is a shortage of unallocated actual pages in the pool area 5011 and there is a surplus of unallocated actual pages in the pool area 5012.

Accordingly, in this embodiment, additional mechanisms are employed. Specifically, a maintenance process (hereinafter, the pool maintenance process) is performed for the pool 1500 that is being shared. This process is performed either regularly or irregularly. In accordance with this, the unallocated page usage 5103 (usage of the remaining actual storage areas) of multiple pool areas is controlled so as to become uniform. The pool maintenance process can achieve a high reliability, because the pool maintenance process can effectively prevent from an appearance of a specific HDKC unit having a shortage of unallocated actual pages. Furthermore, the pool maintenance process can decrease a waste of actual storage area and a cost for a storage system including the multiple HDKC units 141, because the pool maintenance process can cause the multiple HDKC units 141 to share a plurality of unallocated storage areas of the multiple HDKC units 141.

Ordinarily, the number of unallocated actual pages seldom fluctuates a great deal over a period of several hours. For this reason, the frequency with which the pool maintenance process is implemented, for example, may be between once every several days to once every several weeks. At this rate, pool maintenance processing should not impact significantly on the performance of I/Os with respect to the DP-LU. The pool maintenance process may be started in accordance with an arbitrary frequency of the administrator (an administrator-set parameter), or may be started each time there is a clear instruction provided manually from the administrator.

FIGS. 60 and 61 show the flow of the pool maintenance process. It is supposed hereinbelow that the master CPU performs the processing, but another CPU may also perform this processing. That is, one or more processors of multiple HDKC units 141, HDKCs, and/or the management device 301 may control this processing. This feature can apply to every processing in this specification.

For example, when the pool maintenance process commences, the master CPU #H0 starts S6001, and the master CPU #H01 starts S6051.

In S6001, the master CPU #H0 performs the following processing:

(6001*a*) Based on the actual page management table #H0, counts the number of actual pages belonging to the unallocated queue of the HDKC #H0 (that is, the number of unallocated actual pages inside the pool area 5011);

(6001*b*) Sets the number of unallocated pages 5101 inside the unallocated page usage management table #H0 as the previous number of unallocated pages 5102 in the unallocated page usage management table #H0; and (6001*c*) Sets information denoting the number counted in the above-mentioned (6001*a*) in the unallocated page usage management table #H0 as the number of unallocated pages 5101.

Then, in S6002, the master CPU #H0 sets the unallocated page usage 5103, which is the value obtained by subtracting the number of unallocated pages 5101 (the value set in the above-mentioned (6001*c*)) from the previous number of unallocated pages 5102 (the value set in the above-mentioned (6001*b*)) in the unallocated page usage management table #H0.

Similarly, in S6051, the master CPU #H1 performs the following processing:

(6051*a*) Based on the actual page management table #H1, counts the number of actual pages belonging to the unallocated queue of the HDKC #H1 (that is, the number of unallocated actual pages inside the pool area 5012);

(6051*b*) Sets the number of unallocated pages 5101 inside the unallocated page usage management table #H1 as the previous number of unallocated pages 5102 in the unallocated page usage management table #H1; and (6051*c*) Sets information denoting the number counted in the above-mentioned (6051*a*) in the unallocated page usage management table #H1 as the number of unallocated pages 5101.

Then, in S6052, the master CPU #H1 sets the unallocated page usage 5103, which is the value obtained by subtracting the number of unallocated pages 5101 (the value set in the above-mentioned (6051*c*)) from the previous number of unallocated pages 5102 (the value set in the above-mentioned (6051*b*)) in the unallocated page usage management table #H1.

In S6003, the master CPU #H0 sends a usage information command to the HDKC #H1. The usage information command is for acquiring information that is in the unallocated page usage management table #H1.

In S6053, the master CPU #H1 receives the usage information command from the HDKC #H0, and sends the information in the unallocated page usage management table #H1 (for example, information 5101 through 5103) to the HDKC #H0.

The master CPU #H0 receives the information of the unallocated page usage management table #H1 from the HDKC #H1. The master CPU #H0 computes the ideal number of unallocated actual pages based on this received information (the information in the unallocated page usage management table #H1) and the unallocated page usage management table #H0 . The "ideal number of unallocated actual pages", for example, may be a number according to either (Aspect A) or (Aspect B) below, but since the unallocated page usage 5103 will differ for each pool area, (Aspect B) is considered more desirable than (Aspect A). This is because the number of unused actual pages that accords with the consumption rate of unused actual pages in the pool area can be set in each pool area.

(Aspect A) Make the number of unallocated pages the same in all the pool areas.

(Aspect B) The number of unallocated actual pages for the entire pool is apportioned among multiple pool areas such that the unallocated actual pages exist in the pool area in the same ratio as the page ratio of this pool area.

In S6004, the master CPU #H0 computes the page ratio of the pool area 5011 (that is, the pool area used by the HDKC #H0) based on the information in the unallocated page usage management table #H1 and the unallocated page usage management table #H0. The page ratio of the pool area 5011 is the percentage of the unallocated page usage 5103 of the pool area 5011 with respect to the total unallocated page usage 5103 of all the pool areas. Therefore, for example, the page ratio of the pool area 5011 is computed using the following equation:

(Page ratio of pool area 5011)=(unallocated page usage 5103 of pool area 5011)/{(unallocated page usage 5103 of pool area 5011)+(unallocated page usage 5103 of pool area 5012)}

Then, in S6005, the master CPU #H0 computes the ideal number of unallocated pages based on the computer page ratio for the pool area 5011. For example, the ideal number of unallocated pages of the pool area 5011 is the product of the page ratio of the pool area 5011 and the total of the number of unallocated pages 5101 in all the pool areas. Therefore, for example, the ideal number of unallocated pages of the pool area 5011 is computed (numerals after the decimal point may be either rounded off or dropped) using the following equation:

(Ideal number of unallocated pages of pool area 5011)
=(Page ratio of pool area 5011)×{(number of unallocated pages 5101 of pool area 5011)+(number of unallocated pages 5101 of pool area 5012)}

In a case where the unallocated page usage 5103 of the pool area 5011 is extremely low (or extremely high), there is the likelihood that the unallocated actual pages in the pool area 5011 will be made extremely few (or extremely numerous). For this reason, a lowest ratio (and/or a highest ratio) may be provided as a page ratio threshold. In a case where the page ratio computed in S6004 is less than the lowest ratio (or exceeds the highest ratio), the master CPU #H0 may compute the ideal number of unallocated pages in S6004 by making this page ratio the same value as the lowest ratio (or the highest ratio).

In S6006, the master CPU 4#H0 computes the number of unallocated pages to be migrated with respect to the pool area 5011. The number of unallocated pages to be migrated with respect to the pool area 5011 is either the number of unallocated actual pages to be pared from the pool area 5011 or the number of unallocated actual pages to be added to the pool area 5011. Specifically, for example, the number of unallocated pages to be migrated with respect to the pool area 5011 is computed using the following equation:

(Number of unallocated pages to be migrated with respect to the pool area 5011)=(number of unallocated pages 5101 of the pool area 5011)−(ideal number of unallocated pages of the pool area 5011)

According to S6004 through S6006, the pool area 5011 is computed as follows using FIGS. 63A and 63B as examples:

(S6004) Page ratio=1000/(1000+500)=⅔

(S6005) Ideal number of unallocated pages=(8500+6500)×⅔=10000

(S6006) Number of unallocated pages to be migrated=8500−10000=−1500

In a case where the number of unallocated pages to be migrated is a positive value, the processing shown in FIG. 61 is performed, and in a case where the number of unallocated pages to be migrated is a negative value, the processing shown in FIG. 62 is performed. In a case where the number of unallocated pages to be migrated is 0 (zero), neither the processing of FIG. 61 nor the processing of FIG. 62 is performed.

In the case of FIG. 61 (that is, in a case where the number of unallocated pages to be migrated is a positive value), the HDKC #H0 provides an unallocated actual page to the HDKC #H1. In other words, the same number of unallocated actual pages as the number of unallocated pages to be migrated is migrated from the pool area 5011 to the pool area 5012.

Specifically, in S6101, the master CPU #H0 updates the allocation status 1404 of the same number of unallocated actual pages as the number of unallocated pages to be migrated from "unallocated" to "unusable" in the actual page management table #H0. In addition, the master CPU #H0 saves one or more table pointers corresponding to the one or more actual pages for which the allocation status 1404 has been updated to "unusable". "Save" as used here, for example, means that the master CPU #H0 writes these one or more table pointers to a storage area, such as either the LM #H0 or the CM #H0.

In S6102, the master CPU #H0 notifies the HDKC #H1 of the one or more table pointers saved in S6101.

In S6151, the master CPU #H1 receives the one or more table pointers from the HDKC #H0. The one or more allocation statuses 1404 corresponding to these one or more table pointers have all transitioned to "unusable" in the actual page management table #H1. This is because an actual page that the HDKC #H0 can use is managed so as not to be able to be used by the HDKC #H1. Accordingly, the master CPU #H1 updates the actual page management table #H1 as follows. That is, the master CPU #H1 updates the one or more allocation statuses 1404 corresponding to the received one or more table pointers from "unusable" to "unallocated". Furthermore, the master CPU #H1 couples this actual page to the unallocated queue of the HDKC #H1 by updating the unallocated queue pointer 1406 corresponding to the actual page that has been updated to "unallocated".

In the above-mentioned S6101, S6102 and S6151, the migration from the HDKC #H0 to the HDKC #H1 of the same number of actual pages as the number of unallocated pages to be migrated is completed.

Alternatively, according to FIG. 62 (that is, a case in which the number of unallocated pages to be migrated is a negative value), the HDKC #H0 receives an unallocated actual page from the HDKC #H1. In other words, the same number of unallocated actual pages as the number of unallocated pages to be migrated is migrated from the pool area 5012 to the pool area 5011.

Specifically, in S6201, the master CPU #H0 sends information denoting the number of unallocated pages to be migrated to the HDKC #H1.

In S6251, the master CPU #H1 receives the information denoting the number of unallocated pages to be migrated from the HDKC #H0. Then, the master CPU #H1 updates the allocation status 1404 of the same number of unallocated actual pages as the number of unallocated pages to be migrated from "unallocated" to "unusable" in the actual page management table #H1 . In addition, the master CPU #H1 saves one or more table pointers corresponding to the one or more actual pages for which the allocation status 1404 has been updated to "unusable". "Save" as used here, for example, means that the master CPU #H1 writes these one or more table pointers to a storage area, such as either the LM #H1 or the CM #H1.

In S6252, the master CPU #H1 notifies the HDKC #H0 of the one or more table pointers saved in S6251.

In S6202, the master CPU #H0 receives the one or more table pointers from the HDKC #H1. Then, the master CPU #H0 updates the actual page management table #H0 as follows. That is, the master CPU #H01 updates the one or more allocation statuses 1404 corresponding to the received one or more table pointers from "unusable" to "unallocated". Furthermore, the master CPU #H0 couples this actual page to the unallocated queue of the HDKC #H0 by updating the unallocated queue pointer 1406 corresponding to the actual page that has been updated to "unallocated".

In the above-mentioned S6201, S6251, S6252, and S6202, the migration from the HDKC #H1 to the HDKC #H0 of the same number of actual pages as the number of unallocated pages to be migrated is completed.

The preceding has been an explanation of the pool maintenance process. The pool 1500 is one consolidation pool so that if one or more processors of multiple HDKC units 141, HDKCs, and/or the management device 301 determine that the remaining capacity (unallocated total capacity) of the pool 1500 as the one consolidation pool is less than or equal to a threshold, the one or more processors control to cause the management device 301 to display a warning for adding one or more actual storage mediums. Based on the warning, a user and/or management person can add the actual storage mediums to each of the multiple HDKC units 141. However, in this example, the user can add the actual storage mediums to at least one of the multiple HDKC units 141 without each of the multiple HDKC units 141, because the pool maintenance process can distribute/allocate actual storage areas to the multiple HDKC units 141 automatically. Furthermore, this embodiment can have an example that each of the multiple HDKC units 141 does not distribute/allocate own actual storage area to one another HDKC units 141 in the pool create process. In this example, each of the multiple HDKC units 141 manages allocation status, in FIGS. 57 and 58 and corresponding to Pool-RG ID and Actual page address of the other HDKC units 141 other than own HDKC unit, as unusable. Even if in this example, the high reliability and the non-expensive cost can be achieved by using the pool maintenance process.

Furthermore, in the above explanation, an example was used in which one HDKC (third coupling HDKC) is coupled to the HDKC #H0 using the third coupling mode, but the pool create process (refer to FIG. 53) and the pool maintenance process (refer to FIGS. 60 through 63) are also able to be performed in a case where there are multiple third coupling HDKCs. Furthermore, in a case where there are multiple third coupling HDKCs, for example, any of the following may be used in the pool maintenance process.

<<Number of Unallocated Pages to be Migrated is Positive Value>>

The HDKC #H0 provides the same number of unallocated actual pages as the number of unallocated pages to be migrated to the HDKC whose number of unallocated pages 5101 is the smallest of the multiple third coupling HDKCs.

The HDKC #H0 uniformly provides the same number of unallocated actual pages as the number of unallocated page to be migrated to the multiple third coupling HDKCs.

<<Number of Unallocated Pages to be Migrated is Negative Value>>

The HDKC #H0 receives from the HDKC whose number of unallocated pages 5101 is the largest of the multiple third coupling HDKCs the same number of unallocated actual pages as the number of unallocated pages to be migrated.

The HDKC #H0 uniformly receives the same number of unallocated actual pages as the number of unallocated pages to be migrated from the multiple third coupling HDKCs.

Furthermore, the HDKC #0 may compute the page ratio and the ideal number of unallocated pages for each of the HDKC #0 and the multiple third-coupling HDKCs. In these HDKCs, an unallocated actual page may be transferred between a certain HDKC and another HDKC.

It has been explained that in this embodiment the pool 1500 is partitioned into a number of storage areas (hereinafter, pool areas) corresponding to the number of HDKC units 141 that share this pool 1500. In this embodiment, in a case where the pool 1500 is either created or formed in accordance with the HDKC unit 141, one or more processors of multiple HDKC units 141, HDKCs, and/or the management device 301 may configure multiple pool areas by partitioning the total storage area size of the pool 1500 into equal storage area sizes for each HDKC unit 141 sharing the pool 1500. This technology can also apply to the pool maintenance process.

Or, the processors of multiple HDKC units 141, HDKCs, and/or the management device 301 may configure multiple pool areas by partitioning the total number of actual pages of the pool 1500 such that an equal number of actual pages is distributed to each HDKC unit 141 sharing the pool 1500. This technology can also apply to the pool maintenance process.

Or, in a case where the pool 1500 is either created or formed in accordance with multiple HDKC units 141, the processors of multiple HDKC units 141, HDKCs, and/or the management device 301 may also configure multiple pool areas by partitioning either the total storage area size or the total number of actual pages of the pool 1500 so that either the size of the storage areas or the number of actual pages is suitable for the performance of the HDKC unit 141 in accordance with the differences in performance of each HDKC unit 141 sharing the pool 1500. In accordance with this, the processors of multiple HDKC units 141, HDKCs, and/or the management device 301 partition either the total storage area size or the total number of actual pages of the pool 1500 so that either the size of the storage areas is larger or the number of actual pages is more numerous for a high-performance HDKC unit 141 than for a low-performance HDKC unit 141. This technology can also apply to the pool maintenance process.

Or, in a case where the pool 1500 is either created or formed in accordance with multiple HDKC units 141, the processors of the HDKC unit 141, the HDKC, and/or the management device 301 may configure multiple pool areas by partitioning either the total storage area size or the total number of actual pages of the pool 1500 so that either the size of the storage areas or the number of actual pages is suitable for the distance (the command response time) between multiple HDKC units 141 in accordance with the distance (the command response time) between each HDKC unit 141 and another HDKC unit 141 that are sharing the pool 1500. In accordance with this, the processors of HDKC unit 141, the HDKC, and/or the management device 301 partition either the total storage area size or the total number of actual pages of the pool 1500 so that, in a case where the focus is on a certain HDKC unit, the certain HDKC unit provides either a larger size storage area inside its own unit or a larger number of actual pages inside its own unit to another HDKC unit 141 that is closer in distance (command response time) than to another HDKC unit 141 that is farther away in distance (command response time). This technology can also apply to the pool maintenance process.

Furthermore, the distribution of either the total storage area size or the total number of actual pages of the pool 1500 may be carried out by taking into account both (multiple factors) the performance of the HDKC unit 141 and the distance (command response time) between multiple HDKC units 141. This technology can also apply to the pool maintenance process.

Or, the processors of HDKC unit 141, the HDKC, and/or the management device 301 may implement the distribution of either the total storage area size or the total number of actual pages of the pool 1500 so that a certain HDKC unit itself allocates a larger size storage area inside its own unit or a larger number of actual pages inside its own unit to another HDKC unit 141 regardless of whether the performance of the HDKC unit 141 and/or the distance (command response time) between multiple HDKC units 141 is taken into account or not. This technology can also apply to the pool maintenance process.

The creation or formation of a pool 1500 in this embodiment may be implemented by the processors of multiple HDKC units 141, HDKCs and/or the management device 301 in a case where multiple HDKC units 141 have been introduced (these processors may implement this processing in response to an instruction from the administrator), and may be implemented by the processors of multiple HDKC units 141, HDKCs and/or the management device 301 in a case where a portion of the HDKC units 141 or HDKCs have been augmented or added with respect to another HDKC unit 141 or HDKC (these processors may implement this processing in response to an instruction from the administrator). This technology can also apply to the pool maintenance process.

In this embodiment, a case was explained in which multiple HDKC units 141 manage a single pool, and either one or multiple DP-LUs are associated with this one pool. However, this embodiment is not limited to such a case, and the case may also be such that multiple HDKC units 141 manage multiple pools (each corresponding to the above-mentioned one pool), and either one or multiple either common or different DP-LUs are associated with each of these pool.

In this embodiment, the technological content has been explained using a case in which each of the internal volumes that configure the pool 1500 is a RG, but as described hereinabove, this embodiment is not limited to such a case. For example, in a case where each internal volume is a group comprising multiple RGs (a RG group), identification information related to each RG group is inputted to the actual page management tables of each of FIGS. 54, 55, 57 and 58 either instead of or in addition to the Pool-RG ID, and either the actual page address or the allocation status for each RG group is managed the same as FIGS. 54, 55, 57, and 58. In accordance with this, each pool area (5011, 5012) spans the multiple RG groups that configure the pool 1500, but do not span all of the RGs configuring the pool 1500. Furthermore, in this case, an actual page allocated to a virtual page in each pool area 5011 (or 5012) partitioned inside the pool 1500 may be an actual page that is based on a RG group that differs from the RG group that is the basis of an actual page that was allocated n-times before (where n is a natural number) (for example, n may equal 1). Specifically, for example, the RG group that constitutes the basis of the actual page to be allocated may be shifted using the round robin mode. In a case where either one or multiple actual pages are allocated from a certain RG group, the processor (s) of the HDKC unit 141 and/or the HDKC is able to avoid the concentration of I/Os accompanying an allocation to a specific RG group by next allocated either one or multiple actual pages from other multiple RG groups, thereby making it possible to enhance the I/O performance of the DKC. In a case where either a DP-LU or a group of multiple DP-LUs (a DP-LU group) associated with one pool 1500 belong to a different tier for each either DP-LU or DP-LU group (for example, a case in which either a first DP-LU or a first DP-LU group belongs to a first tier, and either a second DP-LU or a second DP-LU group belongs to a second tier), an actual page may be allocated by tier from either a RG group or multiple RG groups that differs from the RG group or multiple RG groups that constitute (s) the basis of an actual page allocated n-times before (for example, for either the first DP-LU or the first DP-LU group, the either RG group or multiple RG groups that is/are the basis of an actual page to be allocated is/are shifted using the round robin mode within the range of the RG group or multiple RG groups configuring a first tier, and for either the second DP-LU or the second DP-LU group, the either RG group or multiple RG groups that is/are the basis of an actual page to be allocated is/are shifted using the round robin mode within the range of the either RG group or multiple RG groups configuring a second tier).

Furthermore, in this embodiment, as has already been explained hereinabove, in a case where each of the internal volumes configuring the pool 1500 is any of one ordinary LU, a portion of an ordinary LU, a group of multiple ordinary LUs, one virtual LU according to the second coupling mode, a portion of a virtual LU, a group of multiple virtual LUs, or a portion of an RG, identification information related to the internal volume type is inputted to the actual page management tables of each of FIGS. 54, 55, 57 and 58 either instead of or in addition to the Pool-RG ID the same as described above, and either the actual page address or the allocation status for each internal volume is managed the same as FIGS. 54, 55, 57, and 58.

In this embodiment, each virtual page of either one or multiple DP-LUs may also be mapped in accordance with the access characteristic of each virtual page to an actual page corresponding to a storage medium that is suitable for this access characteristic. Or, mapping may also be changed in accordance with the access characteristic of each virtual page from an actual page corresponding to a storage medium that is not suitable for this access characteristic to an actual page corresponding to a storage medium that is suitable for this access characteristic. As used here, the access characteristic, for example, is the type of access to each virtual page (either random access or sequential access, or a type such as the access source server 101 or application 111 describe hereinabove), either the I/O frequency or the write frequency to each virtual page, or the frequency at which data written to each virtual page is written from the cache memory 224 to a storage medium corresponding to an actual page mapped to the virtual page, or the frequency at which the data, which is to be written or read to each virtual page, is either written or read between the cache memory 224 and the storage medium corresponding to the actual page that is mapped to the virtual page. In accordance with this, the multiple tiers of this embodiment (for example, either the tier level or the tier level range explained in the first embodiment) are managed for each virtual page of either one or multiple DP-LUs, and can be seen as tier technology for each virtual page of either one or multiple DP-LUs rather than the LU tier technology described hereinabove. However, in a case where each virtual page is mapped in accordance with the access characteristic of each virtual page to an actual page corresponding to a storage medium that is suitable for this access characteristic, the tier technology is for each virtual page, but in a case where the actual page mapped to a virtual page in accordance with the access characteristic of each virtual page changes, since the relationship between the LU and the tier has been set beforehand, the LU tier technology is applied when creating a DP-LU, and thereafter the tier technology for each virtual page is applied in accordance with changing the actual page that is mapped to the virtual page in accordance with the access characteristic.

The third embodiment (for example, the pool create process and/or the pool maintenance process) may be applied in any one of the cases below.

(a) A case in which the tier level is computed based also on one or more other items (performance factors), such as "pre-cache", "cascade difference", and/or "distance (command response time)" either instead of or in addition to the basic items (performance factors) of coupling mode (may include DKC performance) and PDEV type.

(b) A case in which the tier level is computed based solely on one or more of the items (performance factors) of "pre-cache", "cascade difference", and/or "distance (command response time)" (refer to FIG. 10).

(c) A case in which the tier level is computed based on a combination of any one or more of the items (performance factors) of "pre-cache", "cascade difference", and/or "distance (command response time)" (refer to FIG. 10) and the PDEV type (performance factor).

(d) A case in which the tier level is computed based on a combination of any one or more of the items (performance factors) of "pre-cache", "cascade difference", and/or "distance (command response time)" (refer to FIG. 10) and any one or more of the items (performance factors) of "coupling mode", "internal controller performance", and "PDEV type".

The pool create process and/or the pool maintenance process related to this embodiment is not limited to multiple HDKCs, but rather may also be applied between multiple LDKCs.

A number of embodiments of the present invention have been explained hereinabove, but the present invention is not limited to these embodiments, and it goes without saying that various changes can be made within a scope that does not depart from the gist thereof. For example, in this embodiment, the tier management tables #H0 and #H1 explained in FIGS. 53, 54, 55, 57, 58, 67 and 69 etc. have same information in columns of Pool-RG ID 1402 and Actual page address 1403. However, this embodiment is not limited to such a case, and the case may also be such that the tier management table #H0 of the HDKC unit #H0 includes information of actual pages, which the HDKC unit #H0 can use for allocation, and does not include information of actual pages, which the HDKC unit #H0 can not use for allocation. In this case, the tier management table #H1 of the HDKC unit #H1 includes information of actual pages, which the HDKC unit #H1 can use for allocation, and does not include information of actual pages, which the HDKC unit #H1 can not use for allocation.

For example, two or more of the above-described first through third embodiments may be combined. In either each of the first through third embodiments or the combined two or more of the first through third embodiments, the system including multiple HDKC units 141 and/or one or multiple LDKC units 151 can provide same LU (for example, ordinary LU, DP-LU and/or virtual LU) to a plurality of different applications, servers and/or virtual servers via each of a plurality of different HDKC units 141 by using the technology of virtual volume explained in the first embodiment. In this case, for example, the same LU (for example, ordinary LU, DP-LU and/or virtual LU) is provided to the plurality of different applications, servers and/or virtual servers by providing the same LU from one HDKC unit 141 managing the same LU to at least one application, server and/or virtual server and by providing at least one virtual LU mapped to the same LU from at least one another HDKC unit 141 managing the at least one virtual LU to at least one another application, server and/or virtual server. In this case, the one HDKC unit 141 managing the same LU, as a master controlling HDKC unit for the same LU, controls to allocate actual page to virtual page of DP-LU (in the case of the same LU as DP-LU) and/or to read/write data from/to the cache memory 224 in the one HDKC unit 141, so that a coherency of each of the allocation and data caching management for the same LU can be kept.

Furthermore, for example, the LU ID may also be a first ID (for example, a LUN) of a type that the server recognizes, and a second ID of a type that the server is unable to recognize. In accordance with this, a combination of the first ID and the second ID, for example, may be registered in the above-mentioned LU management table. For example, in a case where data is migrated from LU (x) to LU (y), the first ID (x) of the LU (x) and the second ID (y) of the LU (y) may be exchanged without changing the second ID with respect to the LU (x) and the LU (y). After data migration, the server is able to perform I/O with respect to the LU (y) in a case where an I/O command that specifies the first ID (x) has been issued.

Furthermore, the timing at which the response (for example, a write-complete notification) with respect to the write command is returned may be when the write-target data has been written to the LU instead of when the write-target data has been written to the CM.

Furthermore, in the above explanations, the processing performed by the CPU #H0 (#H1) (may be the master CPU) may be processing that is performed by the internal controller #H0 (#H1) as needed. The processing performed by the CPU #H0 (#H1) and the internal controller #H0 (#H1) may be processing that is performed by the HDKC #H0 (#H1) as needed. This is not limited to the HDKC #H0 (#H1), but rather may be the same for another DKC.

Furthermore, for example, in the second embodiment, port-unit load distribution may be performed from the HDKC to a DKC (a second coupling DKC) that is coupled to this HDKC using the second coupling mode. That is, the second coupling DKC may also comprise a free FE port and a temporary LU. Furthermore, in accordance with this, the points (tier level elements) corresponding to the third coupling mode may be the same as the points corresponding to the second coupling mode. Additionally, the second coupling DKC may be a LDKC or a HDKC.

Furthermore, for example, a first DKC that is able to receive an I/O command from a first server and a second DKC that is able to receive an I/O command from a second server may be coupled using the second coupling mode. The first and second DKCs may both be HDKCs or LDKCs. The first server and the second server may be the same server or different servers. According to the second coupling mode, even though a LU inside the second DKC is virtualized by the first DKC and provided to the first server (the LU inside the second DKC is mapped to a virtual LU inside the first DKC (the LU that is provided to the first server)), a LU inside the first DKC is not virtualized by the second DKC and provided to the second server (the LU inside the first DKC is not mapped to a virtual LU inside the second DKC (the LU that is provided to the second server)). Alternatively, for example, in a case where a first DKC that is able to receive an I/O command from a first server and a third DKC that is able to receive a I/O command from a third server are coupled using the third coupling mode, there may be times when a LU inside the third DKC is virtualized by the first DKC and provided to the first server (the LU inside the third DKC is mapped to a virtual LU inside the first DKC (the LU that is provided to the first server))), and there may also be times when a LU inside the first DKC is virtualized by the third DKC and provided to the third server (the LU inside the first DKC is mapped to a virtual LU inside the third DKC (the LU that is provided to the third server)).

Furthermore, the first coupling medium (internal bus) 227 has a shorter maximum communication distance than the second and third coupling mediums (external buses) 501 and 601. The first coupling medium 227 may have a faster maximum communication speed than the second and third coupling mediums 501 and 601. In a case where the first DKC is coupled to the second DKC via the first coupling medium 227, the CPU inside the first DKC is able to access the hardware resources (for example, the storage resources) inside the second DKC the same as it accesses the hardware resources (for example, storage resources) inside the first DKC. The first coupling medium (for example, a PCI-Express bus) 227, for example, is the same type of coupling medium as the internal bus (for example, a PCI-Express bus) that intercouples the multiple hardware resources inside the DKC (in FIG. 2, for example, the SW 226, the CPU 222, the F-I/F 221, the B-I/F 225, and the CM 224).

Alternatively, the maximum communication distances of the second and third coupling mediums (external buses) 501 and 601 are longer than that of the first coupling medium 227. The maximum communication speeds of the second and third coupling mediums 501 and 601 may be slower than that of the first coupling medium 227. In a case where the first DKC is coupled to the second DKC via the third coupling medium 601 (or the second coupling medium 501), the CPU inside the first DKC is not able to access the hardware resources (for example, the storage resources) inside the second DKC the same as it accesses the hardware resources (for example, the storage resources) inside the first DKC. For example, in a case where the CPU inside the first DKC desires information that is stored in the storage resources inside the second DKC, this CPU is able to issue a command to the second DKC, and to receive the information stored in the storage resources inside the second HDKC from the second DKC as a response to this command. The second and third coupling mediums 501 and 601 (for example, Fibre Channel cables), for example, are a different type of coupling medium than the internal bus (for example, a PCI-Express bus) that intercouples the multiple hardware resources inside the DKC (in FIG. 2, for example, the SW 226, the CPU 222, the F-I/F 221, the B-I/F 225, and the CM 224).

Furthermore, in at least one of the first through the third embodiments, in a case where the first HDKC and the second HDKC are coupled in series using the third coupling mode by way of one or more HDKC units (hereinafter, the relay HDKC unit), an exchange between the first HDKC and the second HDKC may be relayed through the one or more relay HDKC units. For example, the processes listed below may be performed. Furthermore, in a case where one relay HDKC unit is configured from multiple HDKCs that are coupled in series using the first coupling mode, a command and data that flow through this one relay HDKC unit may pass through one or more HDKCs of these multiple HDKCs.

A command from the first HDKC to the second HDKC may reach the second HDKC sequentially by way of one or more relay HDKC units.

Data from a LU inside the first HDKC to a LU inside the second HDKC may reach the second HDKC sequentially by way of one or more relay HDKC units.

Furthermore, the external LU that is mapped to the virtual LU corresponding to the third coupling mode may be the LU of the HDKC that is coupled via the first coupling mode to the HDKC that is coupled via the third coupling mode to the HDKC that provides this virtual LU. That is, the external LU that is mapped to the virtual LU corresponding to the third coupling mode may be a LU that is inside any of the HDKCs of an HDKC unit that is coupled using the third coupling mode.

Furthermore, a lower-level DKC unit (for example, a DKC group configured from one or more DKCs that are coupled in series using the first coupling mode (for example, LDKCs)) may be coupled using the second coupling mode to one or more higher-level DKCs (for example, HDKCs) inside one or more higher-level DKC units in a DKC unit group (hereinafter, the higher-level DKC unit group) that is coupled in series using the third coupling mode. One DKC inside the lower-level DKC unit may be coupled using the second coupling mode to multiple DKCs inside one or more higher-level DKC units.

Additionally, multiple tiers may be fixed and defined beforehand. For example, the tiers may be decided beforehand, such as tiers that constitute a tier level from equal to or greater than 0 to less than 5, and a tier level from equal to or greater than 5 to less than 10. Or, for example, tiers that are the same may be tiers for which the tier level difference is equal to or less than a prescribed value.

Furthermore, in the third embodiment, the shared pool may be configured from multiple volume groups belonging to multiple different tiers. In a volume group belonging to the same tier, it is desirable that the difference between the volume whose tier level is the lowest value and the volume whose tier level is the highest value be equal to or less than a prescribed value.

In addition, in a case where the shared pool is configured from multiple volume groups belonging to multiple different tiers, for example, an actual page in a higher-level tier volume group may be allocated to a virtual page with a high access frequency, and an actual page in a lower-level tier volume group may be allocated to a virtual page with a low access frequency. Also, in accordance with a change in the access frequency of a certain virtual page, the HDKC #H0 may migrate the data inside the actual page that is allocated to this virtual page to an actual page inside a volume group belonging to a tier that is suitable for the access frequency of this virtual page. This actual page may be an actual page inside a different HDKC than the HDKC #H0. Further, the volume group belonging to each tier may be configured from multiple volumes in the same HDKC, or may be configured from multiple volumes in multiple different HDKCs.

Furthermore, in the second embodiment, a port-unit load distribution or the like may be configured in accordance with (F) and (G) below.

(F) At least one of one or more controllers selects the used port from multiple communication ports of the above-mentioned first storage control apparatus unit.

(G) At least one of the above-mentioned one or more controllers migrates a logical volume that is allocated to the selected port, which is the used port selected in the (F), from the above-mentioned selected port to a free port of the above-mentioned second storage control apparatus unit.

The above-mentioned (G) may be configured in accordance with the following (G1) through (G5).

(G1) At least one of the above-mentioned one or more controllers identifies the tier to which a migration-source volume, which is the logical volume allocated to the above-mentioned selected port, belongs.

(G2) At least one of the above-mentioned one or more controllers selects from the multiple volumes of the above-mentioned second storage control apparatus unit a migration-destination volume, which is a logical volume belonging to the same tier as the tier identified in the (G1).

(G3) At least one of the above-mentioned one or more controllers copies data from the above-mentioned migration-source volume to the above-mentioned migration-destination volume.

(G4) At least one of the above-mentioned one or more controllers allocates the above-mentioned migration-destination volume to the above-mentioned free port.

(G5) At least one of the above-mentioned one or more controllers allocates the identification information of the above-mentioned selected port to the above-mentioned free port, and, in addition, allocates the identification information of the above-mentioned migration-source volume to the above-mentioned migration-destination volume.

In addition, in the third embodiment, the pool maintenance process may be configured in accordance with (J) through (L) below.

(J) At least one of the above-mentioned one or more controllers identifies for each pool area the number of unallocated pages, which are pages that have not been allocated to a Thin Provisioning volume, but are able to be allocated to a Thin Provisioning volume.

(K) At least one of the above-mentioned one or more controllers, based on the number of unallocated pages identified in the above (J), determines the number of migration pages, which is the number of unallocated pages to be migrated with respect to a target pool area, which is the pool area that is associated with one target unit.

(L) At least one of the above-mentioned one or more controllers migrates the above-mentioned number of migration pages worth of unallocated pages between the above-mentioned target pool area and another pool area.

The following (K1) through (K4) may be carried out in the above-mentioned (K).

(K1) At least one of the above-mentioned one or more controllers may compute the number of used pages obtained by subtracting the current number of unallocated pages from the previous number of unallocated pages for each pool area.

(K2) At least one of the above-mentioned one or more controllers computes the percentage of the number of used pages corresponding to the above-mentioned target pool area with respect to the total of the number of used pages corresponding to the above-mentioned two or more pool areas for the above-mentioned target pool area.

(K3) At least one of the above-mentioned one or more controllers computes the ideal number of unallocated pages, which is the number of pages according to the product of the total of the number of unallocated pages corresponding to the above-mentioned two or more pool areas and the above-mentioned percentage, for the above-mentioned target pool area.

(K4) At least one of the above-mentioned one or more controllers computes the above-mentioned number of migration pages by subtracting the above-mentioned ideal number of unallocated pages from the current number of unallocated pages corresponding to the above-mentioned target pool area.

The following (L1) and (L2) may be carried out in the above-mentioned (L).

(L1) In a case where the above-mentioned number of migration pages is a positive value, at least one of the above-mentioned one or more controllers migrates the above-mentioned number of migration pages worth of unallocated pages from the above-mentioned target pool area to another pool area.

(L2) In a case where the above-mentioned number of migration pages is a negative value, at least one of the above-mentioned one or more controllers migrates the above-mentioned number of migration pages worth of unallocated pages from another pool area to the above-mentioned target pool area.

The above-mentioned one or more controllers may be one or more DKC units, may be distributed among multiple DKC units, may be outside of the multiple DKC units, and may be distributed between at least one of a DKC unit and outside of the multiple DKC units. Either all or a portion of the above-mentioned one or more DKC units may be a DKC internal controller, may be a device for managing multiple DKCs in a DKC unit, and may be a management system (for example, a management computer) that is coupled to multiple DKCs.

[Reference Signs List]

110 . . . Storage system

The invention claimed is:

1. A storage system comprising:
a first storage control unit that comprises one or more first controllers for controlling data received from a higher-level device and addressed to one or more first logical units; and
a second storage control unit that comprises one or more second controllers for controlling data received from the first storage control unit and addressed to one or more second logical units, and a plurality of first storage mediums for storing the data in accordance with the control of one of the second controllers,
wherein the first storage control unit exercises control so as to manage a tier level of the one or more first logical units in accordance with a performance of the second controllers, and to send the data received from the higher-level device, and addressed to the one or more first logical units to the one or more second logical units in accordance with processing by an application of a type suitable for the tier level of the first logical unit,
wherein in a first coupling mode, the one or more first controllers are serially coupled to each other via a first type coupling medium,
wherein in a second coupling mode, at least one of the first storage control unit and the second storage control unit are coupled to an external storage control unit via a second type coupling medium, such that when the first storage control unit is coupled to the external storage control unit, the one or more first logical units virtualize one or more logical units of the external storage control unit, and when the second storage control unit is coupled to the external storage control unit, the one or more second logical units virtualize the one or more logical units of the external storage control unit,
wherein in a third coupling mode, the first storage control unit and the second storage control unit are coupled by the second type coupling medium, such that the one or more first logical units virtualize the one or more second logical units,
wherein the tier level is determined according to whether the first storage control unit and the second storage control unit are coupled in the first, second or third coupling modes.

2. A storage system comprising:
a plurality of storage control apparatus units,
wherein each storage control apparatus unit is configured from one or more storage control apparatuses coupled to one or more hosts, and these one or more storage control apparatuses comprise multiple volumes comprising multiple logical volumes that are provided to these one or more hosts, and the storage control apparatus units are coupled to one another in accordance with a third coupling mode, which is a coupling mode that satisfies the following (a1) through (a3), (a1) one storage control apparatus inside one storage control apparatus unit and one storage control apparatus inside another storage control apparatus unit are coupled via a second type coupling medium, which is a type of coupling medium that differs from an internal bus of the storage control apparatus and has a longer maximum communication distance than a first type coupling medium, which is the same type of coupling medium as the internal bus of the storage control apparatus, (a2) the one storage control apparatus unit virtualizes a logical volume of the one other storage control apparatus unit and provides this virtualized logical volume to one or more hosts coupled to the one storage control apparatus unit, and (a3) the one other storage control apparatus unit virtualizes a logical volume of the one storage control apparatus unit and provides this virtualized logical volume to one or more hosts coupled to the one other storage control apparatus unit, wherein each of the storage control apparatus units store tier management information denoting multiple tiers to which the multiple logical volumes belong, where the multiple tiers are defined on the basis of one or more types of factors that are able to affect an I/O performance of a logical volume, the one or more types of factors include a coupling mode type factor including a first coupling mode, a second coupling mode and the third coupling mode, the first coupling mode satisfies the following (b1);

(b1) the storage control apparatuses in one of the storage control apparatus units are coupled to one another via a first coupling medium, the second coupling mode is a coupling mode that satisfies the following (c1) through (c3);

(c1) one storage control apparatus inside an internal storage control apparatus unit and one storage control apparatus inside an external storage control apparatus unit are coupled to one another via the second type coupling medium, (c2) the internal storage control apparatus unit virtualizes and provides a logical volume of the external storage control apparatus unit to one or more hosts coupled to the internal storage control apparatus unit, and (c3) the external storage control apparatus unit does not virtualize a logical volume of the internal storage control apparatus unit, the internal storage control apparatus unit is one storage apparatus unit that is inside the plurality of storage control apparatus unit, the external storage control apparatus unit is one storage control apparatus unit that is outside of the plurality of storage control apparatus units, a logical volume corresponding to the first coupling mode is a logical volume, which is inside the storage control apparatus unit that provides this logical volume, and is not a virtual logical volume to which is mapped a logical volume of a storage control apparatus unit other than this storage control apparatus unit, and a logical volume corresponding to the second coupling mode is a virtual logical volume to which is mapped to a logical volume that is inside the storage control apparatus unit coupled via the second coupling mode to the storage control apparatus unit that provides this logical volume.

3. A storage system according to claim 2, wherein the plurality of storage control apparatus units are coupled in series using the third coupling mode, and in a case where the plurality of storage control apparatus units are configured from one or more storage control apparatuses, these one or more storage control apparatuses are coupled in series using the first coupling mode.

4. A storage system according to claim 2, wherein each storage control apparatus unit comprises multiple ports, the multiple ports comprise a used port, which is a port to which a logical volume is allocated, and a free port, which is a port to which a logical volume is not allocated, a port-unit load distribution is performed from a first storage control apparatus unit to a second storage control apparatus unit, the first storage control apparatus unit is a certain storage control apparatus unit among the plurality storage control apparatus units, the second storage control apparatus unit is a storage control apparatus unit, which is coupled to the first storage control apparatus unit using the third coupling mode by way of one or more of the second type coupling mediums, the following (F) and (G) are performed in the port-unit load distribution, (F) a used port is selected from multiple ports of the first storage control apparatus unit, (G) a logical volume that is allocated to the selected port, which is the used port selected in the (F), is migrated from the selected port to a free port of the second storage control apparatus unit, the following (G1) through (G5) are performed in the (G), (G1) the tier, to which a migration-source volume that is the logical volume allocated to the selected port belongs, is identified, (G2) a migration-destination volume, which is a logical volume that belongs to the same tier as the tier identified in the (G1), is selected from the multiple volumes of the second storage control apparatus unit, (G3) data is copied from the migration-source volume to the migration-destination volume, (G4) the migration-destination volume is allocated to the free port, and (G5) identification information of the selected port is allocated to the free port, and identification information of the migration-source volume is allocated to the migration-destination volume.

5. A storage system according to claim 4, wherein the first storage control apparatus unit comprises multiple first processors, a first processor, which is in charge of each logical volume that is allocated to one or more used ports of the first storage control apparatus unit, is allocated to the logical volume, and the selected port is the port to which is allocated the logical volume that is under the charge of a high-load first processor, which is the first processor with a load that is higher than a first load.

6. A storage system according to claim 5, wherein, in a case where the high-load first processor is included in the multiple first processors, (X) when a low-load first processor, which is a second processor with a load that is lower than a second load, is included in the multiple first processors, the processor that is in charge of the logical volume, which is under the charge of the high-load first processor, changes from the high-load first processor to the low-load first processor, and (Y) the port-unit load distribution is performed when the low-load first processor is not included in the multiple first processors.

7. A storage system according to claim 4, wherein the selected port is the port for which a first load obtained by subtracting a target load, which is the total load of all the logical volumes allocated to this port, from the load of the first storage control apparatus unit, and a second load obtained by adding this target load to the load of the second storage control apparatus unit, are leveled.

8. A storage system according to claim 4, wherein the second storage control apparatus unit comprises multiple second processors,
- a second processor, which is in charge of each logical volume that is allocated to one or more used ports of the second storage control apparatus unit, is allocated to the logical volume, and
- the second processor, which is in charge of the migration-source volume, is determined such that the loads of the multiple second processors are leveled.

9. A storage system according to claim 2, wherein two or more target units, which are two or more storage control apparatus units of the multiple storage control apparatus units, each comprises a Thin Provisioning volume, which is a logical volume to which Thin Provisioning is applied,
- a pool, which is shared by the two or more target units, is configured on the basis of one or more volumes of each target unit and the tiers to which the one or more volumes belong,
- the pool is partitioned into two or more pool areas, which are respectively associated with the two or more target units,
- each pool area comprises multiple pages, and
- each of the target units allocates a page from the pool area associated with this target unit to the Thin Provisioning volume of this target unit.

10. A storage system according to claim 9, wherein each pool area is configured from a portion of a storage area of a plurality of first volumes, and a portion of a storage area of a plurality of second volumes, and comprises two or more pages,
- all of the volumes that configure the pool belong to the same tier, the one or more types of factors includes a distance factor or a command response time factor,
- for a logical volume, the distance factor is a factor according to the length of one or more of the second type coupling mediums that couple the storage control apparatus unit comprising this logical volume and the storage control apparatus unit comprising a logical volume that is mapped to this logical volume, and
- for a logical volume, the command response time factor is a factor according to the time from when the storage control apparatus unit outputs a I/O command for an I/O with respect to this logical volume until this storage control apparatus unit receives a response to this I/O command.

11. A storage system according to claim 9, wherein
(J) the number of unallocated pages, which are pages that have not been allocated to the Thin Provisioning volume but are able to be allocated to the Thin Provisioning volume, is identified for each pool area, (K) the number of migration pages, which is the number of unallocated pages to be migrated, is determined based on the number of unallocated pages identified in the (J) for a target pool area, which is a pool area associated with one target unit, and (L) unallocated pages equivalent to the number of migration pages are migrated between the target pool area and another pool area.

12. A storage system comprising:
a plurality of storage control apparatus units,
wherein each storage control apparatus unit is configured from one or more storage control apparatuses comprising multiple ports, and these one or more storage control apparatuses comprise multiple volumes including multiple logical volumes, and the one or more storage control apparatuses are connected to each other via a first type coupling medium which is an internal bus of the storage control apparatus according to a first coupling mode, the storage control apparatus units are coupled via a second type coupling medium, which is a type of coupling medium that differs from the internal bus of the storage control apparatus and has a longer maximum communication distance than the first type coupling medium, which is the same type of coupling medium as the internal bus of the storage control apparatus, the multiple logical volumes belong to multiple tiers, where the tiers are defined based on one or more types of factors that affect an I/O performance of the multiple logical volumes, the multiple ports comprise a used port, which is a port to which a logical volume is allocated, and a free port, which is the port to which a logical volume is not allocated, a port-unit load distribution is performed from a first storage control apparatus unit of the storage control apparatus units to a second storage control apparatus unit of the storage control apparatus units, the second storage control apparatus unit is coupled via one or more second type coupling mediums to the first storage control apparatus unit, the following (F) and (G) are performed in the port-unit load distribution, (F) a used port is selected from multiple ports of the first storage control apparatus unit, (G) a logical volume that is allocated to the selected port, which is the used port selected in the (F), is migrated from the selected port to a free port of the second storage control apparatus unit, the following (G1) through (G5) are performed in the (G), (G1) the tier, to which a migration-source volume that is the logical volume allocated to the selected port belongs, is identified, (G2) a migration-destination volume, which is a logical volume that belongs to the same tier as the tier identified in the (G1), is selected from the multiple volumes of the second storage control apparatus unit, (G3) data is copied from the migration-source volume to the migration-destination volume, (G4) the migration-destination volume is allocated to the free port, and (G5) identification information of the selected port is allocated to the free port, and identification information of the migration-source volume is allocated to the migration-destination volume, wherein, at least one of the storage control apparatus units is connected to an external storage control apparatus unit via the second type coupling medium such that the at least one of the storage control apparatus units has one or more logical volumes which virtualize one or more logical volumes of the external storage control apparatus as a second coupling mode, and the second storage control apparatus unit is coupled via one or more second type coupling mediums to the first storage control apparatus unit as a third coupling mode.

13. A storage system comprising:

a plurality of storage control apparatus units, wherein each storage control apparatus unit is configured from one or more storage control apparatuses, and these one or more storage control apparatuses comprise multiple volumes including multiple logical volumes, and the one or more storage control apparatuses are connected to each other via a first type coupling medium which is an internal bus of the storage control apparatus according to a first coupling mode, the storage control apparatus units are coupled via a second type coupling medium, which is a type of coupling medium that differs from the internal bus of the storage control apparatus and has a longer maximum communication distance than the first type coupling medium, which is the same type of coupling medium as the internal bus of the storage control apparatus, the multiple logical volumes belong to multiple tiers, where the tiers are defined based on one or more types of factors that affect an I/O performance of the multiple logical volumes, two or more target units, which are two or more storage control apparatus units of the multiple storage control apparatus units, each comprises a Thin Provisioning volume, which is a logical volume to which Thin Provisioning is applied, a pool, which is shared by the two or more target units, is configured on the basis of one or more volumes of each target unit and the tiers to which the one or more volumes belong, the pool is partitioned into two or more pool areas, which are respectively associated with the two or more target units, each pool area comprises multiple pages, and each of the target units allocates a page from the pool area associated with this target unit to the Thin Provisioning volume of this target unit, and wherein, at least one of the storage control apparatus units is connected to an external storage control apparatus unit via the second type coupling medium such that the least one of the storage control apparatus units has one or more logical volumes which virtualize one or more logical volumes of the external storage control apparatus as a second coupling mode, and the second storage control apparatus unit is coupled via one or more second type coupling mediums to the first storage control apparatus unit as a third coupling mode.

* * * * *